US012811884B2

(12) United States Patent
Heiman et al.

(10) Patent No.: US 12,811,884 B2
(45) Date of Patent: Nov. 24, 2026

(54) SINGLE PASS CLOUD ENGINE

(71) Applicant: CATO NETWORKS LTD, Tel Aviv (IL)

(72) Inventors: Eyal Heiman, Ramot Hashavim (IL); Ofir Agasi, Tel Aviv (IL); Mark Kaplan, Macabim Reut (IL); Elad Menahem, Ramat HaSharon (IL); Rotem Naar Shamir, Hertzliya (IL); Dmitry Babich, Ramat Gan (IL); Peter Novikov, Bat Yam (IL); Avraham Gruda, Modiin (IL); Noa Baron, Modiin (IL); Uri Sivan, Tel Aviv (IL)

(73) Assignee: CATO NETWORKS LTD, Tel Aviv (IL)

( * ) Notice: Subject to any disclaimer, the term of this patent is extended or adjusted under 35 U.S.C. 154(b) by 0 days.

(21) Appl. No.: 19/376,865

(22) Filed: Oct. 31, 2025

(65) Prior Publication Data

US 2026/0189611 A1 Jul. 2, 2026

Related U.S. Application Data

(63) Continuation of application No. PCT/IB2025/058369, filed on Aug. 18, 2025.

(Continued)

(51) Int. Cl.

*H04L 9/40* (2022.01)
*G06F 8/65* (2018.01)

(Continued)

(52) U.S. Cl.

CPC .............. *H04L 47/125* (2013.01); *G06F 8/65* (2013.01); *H04L 12/4633* (2013.01);

(Continued)

(58) Field of Classification Search

CPC ............... H04L 63/205; H04L 63/1416; H04L 63/1425; H04L 63/20; H04L 63/0263; H04L 63/10; H04L 41/0894

See application file for complete search history.

(56) References Cited

U.S. PATENT DOCUMENTS 10,079,843 B2 * 9/2018 Friedman ................ H04L 43/16
11,991,187 B2 * 5/2024 Panse .................. H04L 63/1425

(Continued)

*Primary Examiner* — Ali S Abyaneh

(74) *Attorney, Agent, or Firm* — FINNEGAN, HENDERSON, FARABOW, GARRETT & DUNNER L.L.P

(57) ABSTRACT

Systems, methods, and computer readable medium are disclosed for real-time dynamic policy revisions. Real-time dynamic policy revisions includes tracking, in real-time, first characteristics of dataflow passing through a plurality of engines in a cloud network; generating a first version of a single log line aggregating the first characteristics, including security inspection and routing decision attributes; based on the first characteristics, generating a first real-time dynamic policy; applying the policy to current dataflow; following application of the policy, tracking in real-time second characteristics of dataflow passing through the engines; aggregating in real-time the second characteristics to the single log line to generate a second version, the second characteristics including security inspection and routing decision attributes; determining a real-time change between the first version and the second version; based on the change, generating a real-time change in the dynamic policy; and applying, in real-time to the current dataflow the real-time change.

19 Claims, 49 Drawing Sheets

Related U.S. Application Data

(60) Provisional application No. 63/740,820, filed on Dec. 31, 2024.

(51) Int. Cl.

| | |
|---|---|
| ***H04L 12/46*** | (2006.01) |
| ***H04L 41/5067*** | (2022.01) |
| ***H04L 43/08*** | (2022.01) |
| ***H04L 43/12*** | (2022.01) |
| ***H04L 45/02*** | (2022.01) |
| ***H04L 45/021*** | (2022.01) |
| ***H04L 45/44*** | (2022.01) |
| ***H04L 47/125*** | (2022.01) |
| ***H04L 67/1025*** | (2022.01) |
| ***H04W 24/02*** | (2009.01) |
| ***H04W 28/02*** | (2009.01) |
| ***H04W 28/08*** | (2023.01) |

(52) U.S. Cl.

CPC .......... *H04L 41/5067* (2013.01); *H04L 43/08* (2013.01); *H04L 43/12* (2013.01); *H04L 45/021* (2013.01); *H04L 45/025* (2013.01); *H04L 45/44* (2013.01); *H04L 63/0245* (2013.01); *H04L 63/0428* (2013.01); *H04L 63/101* (2013.01); *H04L 63/102* (2013.01); *H04L 63/1416* (2013.01); *H04L 63/1425* (2013.01); *H04L 63/1433* (2013.01); *H04L 63/20* (2013.01); *H04L 63/205* (2013.01); *H04L 67/1025* (2013.01); *H04W 24/02* (2013.01); *H04W 28/0231* (2013.01); *H04W 28/0289* (2013.01); *H04W 28/0925* (2020.05)

(56) References Cited

U.S. PATENT DOCUMENTS

| | | | | |
|---|---|---|---|---|
| 2008/0294770 | A1* | 11/2008 | Jackson | H04L 41/142 709/224 |
| 2016/0205143 | A1* | 7/2016 | Bryson | H04L 63/205 726/1 |
| 2017/0104790 | A1* | 4/2017 | Meyers | G06F 21/60 |
| 2017/0163666 | A1* | 6/2017 | Venkatramani | H04L 63/1416 |
| 2021/0185072 | A1* | 6/2021 | Andreu | H04L 69/18 |
| 2023/0104129 | A1* | 4/2023 | Miriyala | H04L 41/0813 709/220 |

* cited by examiner

400

| | NAME (500) | IP/SUBNET (502) | NEXT HOP (504) | TYPE (506) | ORIGIN POP (508) | LAST UPDATE (510) | DETAILS (512) |
|---|---|---|---|---|---|---|---|
| 518 | IP@(318) | 214 | 304 | STATIC | 302 | 30 MIN. | METRIC 5 |
| 520 | IP@(324) | 212 | 304 | STATIC | 302 | 30 MIN. | METRIC 5 |

402

| | NAME (500) | IP/SUBNET (502) | NEXT HOP (504) | TYPE (506) | ORIGIN POP (508) | LAST UPDATE (510) | DETAILS (512) |
|---|---|---|---|---|---|---|---|
| 522 | IP@(336) | 212 | DIRECT | STATIC | 304 | 20 MIN. | METRIC 5 |
| 524 | IP@(324) | 212 | DIRECT | STATIC | 302 | 20 MIN. | METRIC 5 |
| 526 | IP@(318) | 214 | DIRECT | STATIC | 302 | 30 MIN. | METRIC 5 |

FIG. 5A

400

| NAME (500) | IP/SUBNET (502) | NEXT HOP (504) | TYPE (506) | ORIGIN POP (508) | LAST UPDATE (510) | DETAILS (512) |
|---|---|---|---|---|---|---|
| 518 IP@(318) | 214 | 304 | STATIC | 302 | 30 MIN. | METRIC 5 |
| 520 IP@(406) 514 | 212 | 304 | STATIC | 302 | 30 MIN. | METRIC 5 |

402

| NAME (500) | IP/SUBNET (502) | NEXT HOP (504) | TYPE (506) | ORIGIN POP (508) | LAST UPDATE (510) | DETAILS (512) |
|---|---|---|---|---|---|---|
| 522 IP@(336) | 212 | DIRECT | STATIC | 304 | 20 MIN. | METRIC 5 |
| 524 IP@(324) | 212 | DIRECT | STATIC | 302 | 20 MIN. | METRIC 5 |
| 526 IP@(318) | 214 | DIRECT | STATIC | 302 | 30 MIN. | METRIC 5 |

*FIG. 5B*

400

| NAME (500) | IP/SUBNET (502) | NEXT HOP (504) | TYPE (506) | ORIGIN POP (508) | LAST UPDATE (510) | DETAILS (512) |
|---|---|---|---|---|---|---|
| IP@(318) | 214 | 304 | STATIC | 302 | 30 MIN. | METRIC 5 |
| IP@(406) | 212 | 304 | STATIC | 302 | 30 MIN. | METRIC 5 |

518, 520, 514

402

| NAME (500) | IP/SUBNET (502) | NEXT HOP (504) | TYPE (506) | ORIGIN POP (508) | LAST UPDATE (510) | DETAILS (512) |
|---|---|---|---|---|---|---|
| IP@(336) | 212 | DIRECT | STATIC | 304 | 20 MIN. | METRIC 5 |
| IP@(406) | 212 | DIRECT | STATIC | 302 | 20 MIN. | METRIC 5 |
| IP@(318) | 214 | DIRECT | STATIC | 302 | 30 MIN. | METRIC 5 |

522, 524, 526, 528

*FIG. 5C*

SINGLE PASS CLOUD ENGINE

PRIORITY CLAIM

This application is a continuation of PCT International Application No. PCT/IB2025/058369, filed Aug. 18, 2025, which also claims the benefit of priority of U.S. Provisional Patent Application No. 63/740,820, filed on Dec. 31, 2024, which is incorporated herein by reference in its entirety.

TECHNICAL FIELD

The present disclosure generally relates to systems, methods, and computer program products for managing and securing computer networking in general, and Secure Access Service Edge (SASE) in particular.

BACKGROUND

Efficient and secure computer networks have become essential for modern organizations, enabling seamless communication, data exchange, and access to critical resources. As businesses increasingly rely on digital infrastructure to operate, the performance and reliability of their networks can directly impact productivity, customer satisfaction, and overall competitiveness. A well-designed network minimizes latency, maximizes uptime, and ensures that users can access necessary applications and data regardless of their physical location. Furthermore, robust security measures are vital to protect sensitive information from cyber threats, maintain regulatory compliance, and preserve the integrity and reputation of the organization.

Secure Access Service Edge (SASE) networks converge wide-area networking (WAN) capabilities with comprehensive security functions, such as secure web gateways, firewalls, and zero-trust network access. A SASE network may integrate WAN capabilities with security functionality into a single, cloud-native service model. This may enable organizations to support distributed workforces and cloud-based applications more effectively. The integration may simplify network management, reduce operational costs, and enhance visibility and control over data traffic. Importantly, SASE networks may offer dynamic, context-aware access policies that adapt to user identity, device status, and real-time threat intelligence, significantly strengthening the overall cybersecurity posture of enterprises in a rapidly evolving digital landscape. However, as the demand for bandwidth continues to grow and the volume and sophistication of cyberthreats escalate, further development of SASE technologies is needed. Advancements in scalability, threat detection, and intelligent traffic management may enable a SASE network to meet the evolving needs of modern enterprises and maintain robust security in an increasingly complex digital environment.

SUMMARY

Embodiments consistent with the present disclosure provide systems and methods generally relating to managing and securing a computer network. The disclosed systems and methods may be implemented using conventional and/or specialized hardware. Some embodiments may involve a combination of conventional and/or specialized hardware and/or software, such as a machine constructed and/or programmed specifically for performing functions associated with the disclosed method steps.

Consistent with disclosed embodiments, systems and methods are provided for performing network synchronization operations in a network containing a plurality of distributed server clusters connected to a plurality of edge devices. Network synchronization operations refer to coordinated operations (e.g., actions, processes, or tasks) for ensuring data consistency, state alignment, and/or timing accuracy across a distributed system—such as between servers or server clusters and edge devices. The operations may include one or more of: maintaining a plurality of copies of a routing table, the plurality of copies of the routing table being distributed to a plurality of locations across the distributed server clusters and the plurality of edge devices; detecting, at at least one server in the plurality of distributed server clusters, a connectivity change, the connectivity change being expressible as a delta in the routing table; and distributing the delta to the plurality of locations across the distributed server clusters and the plurality of edge devices to thereby update the plurality of copies of the routing table rendering the plurality of copies of the routing table synchronized.

Consistent with disclosed embodiments, systems and methods are provided for performing network connection operations. Network connection operations include technical actions or processes involved in establishing, managing, maintaining, and/or terminating communication links between devices or systems over a network. The operations may include one or more of: accessing a cloud service via a client device, the cloud service containing real time network information including at least two of a real time server load for a plurality of network servers, real time server capacity for the plurality of network servers, at least one customer preference, or geolocation IP; receiving from the cloud service identities of a plurality of candidate servers from among the plurality of network servers, wherein, based on the real time network information, the plurality of candidate servers meet criteria for potential establishment of a network connection with the client device; transmitting probe packets from the client device to at least some of the plurality of candidate servers; receiving responses to the probe packets; determining from the responses communication characteristics for at least some of the transmitted probe packets; selecting a server based on the determined communication characteristics; and establishing a network connection between the client device and the selected server.

Consistent with disclosed embodiments, systems and methods are provided for load balancing network traffic. Load balancing network traffic involves distributing incoming and/or outgoing data flows across multiple servers, network paths, or devices to optimize performance, increase reliability, and/or prevent any single component from becoming overloaded. The operations may include one or more of: receiving at a particular server among a plurality of candidate servers, one of a plurality of probes sent from a client device to the plurality of candidate servers; interpreting, at the particular server, the received probe to recognize that the received probe is a precursor to a persistent connection between the particular server and the client device; determining that a prospective connection between the particular server and the client device would be sub-optimal; and transmitting a biased response from the particular server to the client device to discourage establishment of the persistent connection between the client device and the particular server.

Consistent with disclosed embodiments, systems and methods are provided for altering network connections during maintenance periods, the operations may include one or more of: monitoring via a cloud service, a network of distributed servers and client devices, wherein the monitoring includes maintaining records of software upgrade schedules for the distributed servers and existing tunnels between the client devices and the distributed servers; receiving at the cloud service a request to upgrade software on a particular server among the distributed servers; in response to the request, scheduling the software upgrade; accessing the records to identify an existing tunnel between a client device and the particular server; prior to the scheduled software upgrade, accessing the records to identify an alternative server to which existing tunnel traffic can be directed during the software upgrade; and following identification of the alternative server and prior to the scheduled software upgrade, rerouting network traffic flow from the client device to the alternative server to thereby avoid a communication blip.

Consistent with disclosed embodiments, systems and methods are provided for performing unified network security management operations. The operations may include one or more of: maintaining in a cloud service management application, a unified policy for controlling network security across a plurality of servers and edge devices, wherein the plurality of servers and edge devices are configured to perform differing and complementary security actions; instructing, consistent with the unified policy, each edge device to perform first subsets of the security actions; and instructing, consistent with the unified policy, each server to perform second subsets of the security actions, wherein the first subsets of security actions and the second subsets of security actions are coordinated to achieve an overall security state defined by the unified policy.

Consistent with disclosed embodiments, systems and methods are provided for performing bidirectional network policy optimization operations. The operations may include one or more of: maintaining in a cloud service management application a policy prioritizing bandwidth allocation based on organizational preferences; distributing the policy to servers in the network to thereby cause the servers to implement the policy by controlling a first allocation of bandwidth to inbound traffic; and distributing the policy to edge devices in the network to thereby cause the edge devices to implement the policy by controlling a second allocation of bandwidth to outbound traffic.

Consistent with disclosed embodiments, systems and methods are provided for performing dynamic network security operations. The operations may include one or more of: monitoring traffic associated with endpoints in a SASE network; classifying endpoint behavior based on the monitored traffic; generating a dynamic secure access policy for each endpoint based on classified behavior associated with each endpoint, the dynamic secure access policy governing a plurality of resources provided by a plurality of non-related entities and to which each endpoint is entitled to access; enforcing the policy based on the classified behavior to thereby prevent unapproved access to resources among the plurality of non-related entities; monitoring changes in endpoint traffic behavior to determine resource usage variances; and revising the dynamic secure access policy based on the resource usage variances to reduce an attack surface.

Consistent with disclosed embodiments, systems and methods are provided for synchronizing network and endpoint security protocols. The operations may include one or more of: receiving a device posture from an application running on an edge device; receiving from a server in communication with the edge device, network traffic information associated with the edge device; correlating the device posture and the network traffic information; and implementing a network security policy based on the correlation such that both the device posture from the edge device and the network traffic information from the server are used to enforce the network security policy.

Consistent with disclosed embodiments, systems and methods are provided for performing real-time dynamic policy revisions. The operations may include one or more of: tracking in real time first characteristics of dataflow passing through a plurality of engines in a cloud network; generating in real time a first version of a single log line aggregating the first characteristics, wherein the first characteristics include at least security inspection attributes and routing decision attributes; based on the first characteristics, generating a first real time dynamic policy; apply the first real time dynamic policy to current dataflow; following application of the first real time dynamic policy, tracking in real time second characteristics of dataflow passing through the plurality of engines in the cloud network; aggregating in real time the second characteristics to the single log line to generate a second version of the single log line, wherein the second characteristics include at least security inspection attributes and routing decision attributes; determining a real time change between the first version of the single log line and the second version of the single log line; based on the determined real time change, generating a real time change in the dynamic policy; and applying, in real time to the current dataflow the real time change in the dynamic policy.

Consistent with disclosed embodiments, systems and methods are provided for performing context-based data leak prevention operations in a network. The operations may include one or more of: accessing data; classifying the accessed data, wherein in a first context a particular type of the data is classified as sensitive and in a second context the particular type of the data is not classified as sensitive; intercepting outgoing network traffic; determining that the intercepted network traffic contains the particular type of the data; determining whether the particular type of the data in the intercepted network traffic corresponds to the second context; and when the particular type of the data in the intercepted network traffic corresponds to the second context as opposed to the first context, implementing a remedial measure to mitigate leakage of the particular type of the data.

Consistent with disclosed embodiments, systems and methods are provided for enabling selective primary network architecture alterations from an external secondary network. The operations may include one or more of: in a primary network hosted by a first entity and configured to service a plurality of customers, enabling a vendor running a network application in a secondary network to connect to the primary network and to provide the network application as a service in the primary network; receiving from at least some of the plurality of customers serviced by the primary network opt-in confirmations for the network application; and limiting use of the network application within the primary network to the at least some of the plurality of customers from whom opt-in confirmations were received.

Consistent with disclosed embodiments, systems and methods are provided for dynamically selecting egress locations in a network. The operations may include one or more of: determining a first egress location for data transfer from a first server in the network to an application external to the network; sending network traffic to the external application via the first egress location; determining a first data transfer condition associated with the first egress location; determining at least one alternative data transfer condition associated with at least one alternative egress location and the external application; comparing the first data transfer condition with the alternative data transfer condition to ascertain whether the alternative data transfer condition constitutes an improvement; and when the alternative data transfer condition is ascertained to constitute an improvement, re-routing the network traffic to the external application via the at least one alternative egress location.

Consistent with disclosed embodiments, systems and methods are provided for performing clientless operations for performing digital experience monitoring based on real user communications. The operations may include one or more of: monitoring network traffic from at least one non-edge device in the SASE network; for each of a plurality of applications running on each of a plurality of edge devices, determining a digital user experience score from the at least one non-edge device, and transmitting each of the digital user experience scores associated with each of the plurality of applications running on each of the plurality of edge devices to at least one administrator of the SASE network.

BRIEF DESCRIPTION OF THE DRAWINGS

FIG. 5A illustrates two exemplary copies of a routing table at a first time period, consistent with some disclosed embodiments.

FIG. 5B illustrates the two exemplary copies of the routing table of FIG. 5A at a second time period after detection of a connectivity change, consistent with some disclosed embodiments.

FIG. 5C illustrates the two exemplary updated copies of the routing table of FIG. 5A at a third time period after updating based on a delta rendering the copies synchronized, consistent with some disclosed embodiments.

DETAILED DESCRIPTION

Figure 1:
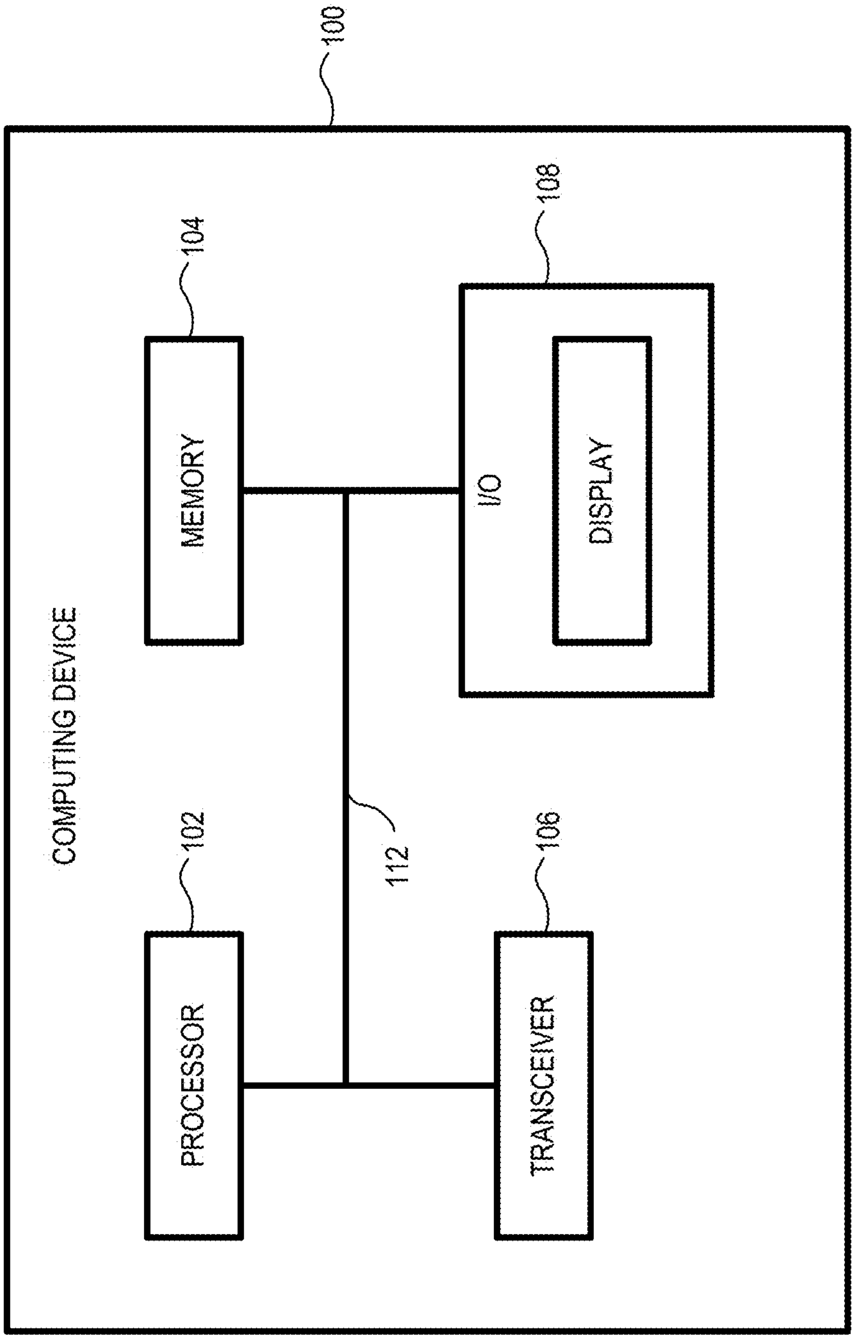
FIG. 1 Illustrates an exemplary schematic diagram of a computing device, consistent with some disclosed embodiments.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily lack that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The terms, generally, substantially, or approximately as used in this disclosure should be interpreted to encompass commonly understood tolerances. For example, similar and/or equivalent may refer to the same within +/−1%, +/−2%, or within +/−5%.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims Some embodiments involve a computing device. A computing device as used herein may include any electrical component or group of electrical components capable of processing data by performing calculations, executing instructions, or running software programs. For example, a computing device may include at least one processor. Such a computing device may include (or be included within) a smartphone, a tablet, a smartwatch, a personal digital assistant, a desktop computer, a laptop computer, an IoT device, a dedicated terminal, a smart, and/or any other electronic device that enables computation, instruction execution, or running software programs. In some embodiments, a computing device may include at least one processor, at least one memory, a transceiver, and an input/output unit, all interconnected via one more buses. In some embodiments, a computing device may include a communications device capable of exchanging data using a wired and/or wireless communications network.

At least one processor may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively and may be co-located or located remotely from each other. The processors may be coupled electrically, magnetically, optically, acoustically, mechanically or by other means that permit them to interact. In some embodiments, the at least one processor may include a remote processing unit (e.g., a "cloud computing" resource) accessible via a communications network. The at least one memory may include a Random Access Memory (RAM), a Read-Only Memory (ROM), a hard disk, an optical disk, a magnetic medium, a flash memory, other permanent, fixed, or volatile memory, or any other mechanism capable of storing instructions. Such a memory may be pre-loaded with instructions for execution by at least one processor. In some embodiments, the at least one memory may include a remote storage (e.g., "cloud" storage) accessible via a communications network.

A processor may be configured to perform calculations and computations, such as arithmetic and/or logical operations to execute software instructions, control and run processes, and store, manipulate, and delete data from memory. An example of a processor may include a microprocessor manufactured by Intel™. A processor may include a single core or multiple core processors executing parallel processes simultaneously. It is appreciated that other types of processor arrangements could be implemented to provide the capabilities disclosed herein.

At least one processor may include a single processor, or multiple processors communicatively linked to each other and capable of performing computations in a cooperative manner, such as to collectively perform a single task by dividing the task into subtasks and distributing the subtasks among the multiple processors, e.g., using a load balancer. In some embodiments, at least one processor may include multiple processors communicatively linked over a communications network (e.g., a local and/or remote communications network including wired and/or wireless communications links). The multiple linked processors may be configured to collectively perform computations in a distributed manner (e.g., as known in the art of distributed computing).

A non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located locally (e.g., in physical proximity to at least one processor and connected via a local communications link) or at a remote location (e.g., accessible to at least one processor via a communications network). Additionally, one or more computer-readable storage mediums can be utilized in implementing a computer-implemented method. Accordingly, the term computer-readable storage medium should be understood to include tangible items and exclude carrier waves and transient signals.

A transmitter may include an electronic device for sending signals and/or data over distance. A transmitter may encode information to a format suitable for transmission through a medium. A transmitter may send information as electromagnetic radiation (e.g., radio and/or optical waves and/or pulses), electric signals, magnetic signals, audio signals, mechanical vibrations, ultrasound signals, and/or any other type of signal. Some examples of transmitters may include Bluetooth and/or Wi-Fi antennas, and/or optical transmitters. In some embodiments, a sensor may be configured with a transmitter to transmit signals encoding sensed data to at least one processor. In some embodiments, a computing device (e.g., a mobile communications device) may include at least one transmitter.

A display may include an output device for visually presenting information, allowing users to interact with and/or view data, applications, and/or multimedia content. For example, a display may include a monitor and/or screen that converts digital signals into images, text, and/or videos by activating one or more pixels or voxels. A display may include, for example, a light-emitting diode (LED) display, an organic light-emitting diode (OLED) display, a liquid-crystal display (LCD), a dot-matrix display, a plasma display, a screen, a touch screen, a light indicator, a light source, or any other device configured to provide visual or optical output. A display may include a two dimensional display or a three-dimensional display (e.g., associated with a wearable display).

By way of a non-limiting example, reference is made to FIG. 1 illustrating an exemplary schematic diagram of a computing device 100, consistent with some disclosed embodiments. Computing device 100 may include at least one processor 102, at least one memory 104 (e.g., a non-transitory computer readable medium), a transceiver 106, and an input/output (I/O) unit 108. At least one processor 102, at least one memory 104, transceiver 106, and input/output unit 108 may be interconnected via a bus 112. In some embodiments, input/output unit 108 may include a display 110. Display 110 may include one or more touch sensitive surfaces, permitting computing device 100 to receive inputs from a user, and present outputs to a user.

A signal may refer to information encoded for transmission via a physical medium. Examples of signals may include signals in the electromagnetic radiation spectrum (e.g., AM or FM radio, Wi-Fi, Bluetooth, radar, visible light, lidar, IR, Zigbee, Z-wave, and/or GPS signals), audio and/or ultrasonic signals, electrical signals (e.g., voltage, current, or electrical charge signals), electronic signals (e.g., as digital data), tactile signals (e.g., touch), and/or any other type of information encoded for transmission between two or more entities via a physical medium.

Consistent with the present disclosure, some disclosed embodiments involve a network. A network (e.g., a communications network) may include any type of physical, wired, wireless computer, or hybrid arrangement of interconnected devices used to exchange data. Such a network may include one or more of a digital communications network, an analog communication network, and/or any other communications network configured to convey data. For example, a network may be the Internet, a private data network, a virtual private network using a public network, a Wi-Fi network, a LAN or WAN network, a satellite communication network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN"), a satellite network, and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

A network may include one or more network devices interconnected by physical (wired), wireless, and/or hybrid communication channels. Some examples of network devices may include a router, a switch, a hub, a modem, an Access Point (AP), and/or any other type of network device. A router may connect different networks and/or subnetworks together. A router may forward data packets to an intended IP address via a connecting network and/or may permit multiple network devices to use a common network connection. A switch may connect multiple devices within a common network and may facilitate in managing data traffic. A hub may connect multiple networked device together, e.g., in a hub-and-spokes configuration and/or a star network architecture. A modem may convert digital data stored in memory on a computing device in a first format to a second format suitable for transmission via a wired and/or wireless medium, e.g., for accessing a network. An AP may permit one or more wireless devices to connect to a wired network. A network may additionally include one or more end devices, such as one or more computing devices, mobile communication devices, servers, printers, cameras, VoIP phones, IoT devices, and/or any other type of computing device associated with a transmitter and/or receiver. A network may be associated with one or more network protocols, such as TCP/IP (Transmission Control Protocol/Internet Protocol), HTTP/HTTPS (Hypertext Transfer Protocol Secure), FTP (File Transfer Protocol), SMTP (Simple Mail Transfer Protocol), DNS (Domain Name System), DHCP (Dynamic Host Configuration Protocol), and/or any other network protocol. A network may provide one or more services, such as a DNS service for resolving domain names to IP addresses, a DHCP service for automatically assigning an IP address to a networked computing device, one or more authentication services (e.g., LDAP or Lightweight Directory Access Protocol, or RADIUS or Remote Authentication Dial-In User Service), and/or user services such as email, file sharing, web hosting, streaming, and/or any other type of service. A network may additionally provide one or more security services, such as hardware and/or software implemented firewalls, Intrusion Detection/Prevention Systems (IDS/IPS), and/or Antivirus, VPNs, and/or encryption tools.

A network connection refers to an establishment of communication between computing devices, enabling an exchange of data and/or resources therebetween. A network connection may be enabled using wired or wireless media and one or more communication protocols, such as TCP/IP. A network node may refer to a network connection point capable of receiving, sending, creating, and/or storing data.

A packet refers to a unit of data formatted for transmission over a network. A packet may include a header containing information about the packet (e.g., the source and destination IP addresses, protocol type, and/or sequence number), and a payload storing the data (e.g., digital content) being transmitted. For example, a larger file may be disassembled into smaller packets, each of which may be sent to a destination separately based on routing considerations. At the destination, the payloads in each packet may be extracted and reassembled according to the correct sequence, to reconstruct the larger file.

An IP address refers to a numeric label assigned to a networked computing device by an Internet Service Provider and may reveal a location of the computing device (e.g., a general geographical location, city, state, and/or country), a name of the service provider used to connect a device to a network, and/or device type.

Network traffic refers to data transmitted over a network between two or more computing devices (e.g., clients, servers, routers, and/or any other connected computing device). Network traffic may be organized into data packets that may flow through computer network infrastructure based on one or more established protocols. Each data packet may include a plurality of layers, such as an inner layer for a payload (e.g., the content being transmitted) and one or more outer layers including routing and/or security information. Network traffic may include unicast traffic from a single sender to a single receiver (e.g., data associated with web traffic and/or file downloads), broadcast traffic from a single sender to a (e.g., general) plurality of networked devices (e.g., ARP or Address Resolution Protocol requests, and/or DHCP or Dynamic Host Configuration Protocol discovery), and/or multicast traffic from a single sender to a plurality of select recipients (e.g., for video conferencing, and/or IPTV streaming). Network traffic may include real-time traffic associated with low latency and higher priorities (e.g., VoIP calls, live streaming), non-real-time traffic which may be less time-sensitive and may tolerate delays (e.g., emails, file transfers), and/or interactive traffic which may require a faster response time that non-real-time traffic and may not be as sensitive to delays as real-time traffic (e.g., web browsing, online gaming). Factors that may affect network traffic may include bandwidth availability, network congestion, latency and/or jitter, packet loss. Some techniques for managing network traffic may include Quality of Service (QoS) for prioritizing critical traffic such as VoIP or video conferencing, Traffic Shaping for controlling data flow to prevent congestion, load balancing for distributing network traffic across multiple servers and/or network paths, and/or Monitoring & Analysis tools for tracking and/or optimizing network traffic.

A mobile communications device (e.g., a mobile computing device) refers to a portable computing device capable of transmitting and receiving information to and from other devices and/or networks. Mobile communications devices may, for example, use cellular or other wireless and/or wired networks to transmit information such as voice and/or other data. For example, such transmissions may be in the form of voice calls, text messages, internet access, and application usage. Mobile communications devices come in various forms, such as smartphones, tablets, laptop computers, IoT devices, wearable electronics (such as smart watches, smart rings, fitness trackers, smart glasses, smart clothing, smart jewelry, smart headphones, wearable digital assistants), and portable wireless hotspots. Depending on configuration and intended use, they may include features such as a touch-screen interface, a built-in camera, Wi-Fi, NFC, and/or Bluetooth connectivity, and GPS navigation.

A server refers to a computing device interconnected with additional computing devices in a computing network for providing access to one or more services, data, additional computing devices (e.g., client devices and/or additional servers), and/or any other type of computing resource. A server may receive and handle requests from client devices, for example, to access a database, run an application, perform computations, connect to additional networked devices, perform security operations, provide software upgrades, and/or any other computing and/or network operation. Servers may include a web server for hosting one or more websites, a file server for storing and/or sharing files over a network, a database server for managing and/or providing access to one or more databases, a mail server for handing electronic email communication, a DNS server for resolving domain names with Internet Protocol (IP) addresses, a DHCP (Dynamic Host Configuration Protocol) server, a VPN (Virtual Private Network) server, a Firewall and/or Proxy server, a directory server for managing user authentication, and/or any other type of server. A server may include a physical computing device, and/or a virtual server implemented using software. A server may provide continuous service within a network. A server may be dedicated to serving particular types of requests and/or clients, and/or may be hosted on a cloud platform, and may be scalable on demand. For example, a server may receive a request from a client device to access a webpage of a website. In response to the request, the server may access a database storing data for the webpage, format the data for the webpage for rendering on the client device, and transmit the formatted data to the client device over the network. The client device may use the data to present the webpage on an associated display.

A server cluster (e.g., a PoP, or Point of Presence) refers to a plurality of servers that may be managed together and may participate in a cooperative manner to manage workloads. A server cluster may operate as a cloud-based data center, providing networking and security services to a plurality of edge devices thereto. For example, a server cluster may utilize SD-WAN software to provide private network service to customers. The private network service may permit connectivity to a public network (e.g., the Internet) conditional on compliance with one or more security, performance, and/or any other criteria affecting network performance. At least some servers of a server cluster may be co-located geographically and may include tens or hundreds of interconnected servers serving thousands of customers (e.g., edge devices). In some embodiments, a server cluster may include more than a thousand interconnected servers. A server cluster may improve network reliability by ensuring continual network service availability, e.g., a server in a cluster may seamlessly switch to take over a different server in the cluster if the different server fails, ensuring minimal downtime and maintaining service continuity. It may enhance network performance by handling more traffic than a single server, leading to faster communication response times by reducing latencies and downtime. A server cluster may be easily scaled up or down by adding or removing servers as needed, allowing dynamic adaptation to changing data traffic demands. In a SASE network, an edge device may connect to a single or multiple server clusters.

A client device refers to a computing device that may request services and/or access to resources from a server over a networked connection and receive a response to the request from the server. Some examples of client devices may include a desktop computer, a laptop, a mobile communications device, an Internet of Things (IoT) device, a printer and/or scanner, a smart TV. For example, a client device may request from a server to access to one or more databases, a software upgrade, a webpage, an electronic message, a shared file, a video stream, and/or any other type of data. A client device may request access to one or more services from a server, such as an email service, a messaging service, a VoIP (Voice over IP) service, a web hosting service, an application hosting service, a streaming service, a file sharing service, a cloud storage service, a backup service, a security service, a connectivity service, a firewall service, and/or any other type of service available over a network. An edge device may include a client device.

A location refers to a position, point, area, and/or site, and may include a physical location, a logical (e.g., virtual) location, a network setting and/or profile, and/or any other attribute affecting interconnectivity between a plurality of network nodes and/or resources. A physical location may include a geographical area where a network device may be physically situated, such as a country, a city, a region within a country and/or city, a data center, a server farm, a building, an office, and/or a specific room. A logical location refers to a position of a computing device and/or resource within a network structure and may be associated with an IP address and/or an alternative network addressing protocol. Two or more devices may be co-located physically but may be associated with different networks and/or different IP addresses (e.g., different logical locations).

An edge device refers to a hardware device that may connect an internal network to an external network. An edge device may serve as an entry and/or exit point for network traffic and may be positioned at the "edge" (e.g., a boundary, border, and/or peripheral limit) of a network for interfacing with other networks (e.g., the Internet, a cloud service, and/or a remote server). An edge device may perform traffic routing for directing data between an internal and one or more external networks, security and/or filtering services by implementing one or more firewalls, intrusion detection, and/or VPNs (virtual private networks, data processing (e.g., edge computing before sending data to a cloud), protocol translation for converting data formats between differing network protocols, and/or any other edge device service. Some examples of edge devices may include routers for directing network traffic between internal and external networks, firewalls for monitoring and/or controlling incoming and/or outgoing traffic for security, gateways for bridging different network types, load balancers for distributing network traffic across multiple servers, and/or IoT edge devices for processing data from sensors prior to transmission to a cloud system.

An endpoint refers to a device and/or node connected to a network for sending and/or receiving data. An endpoint may include a laptop, a mobile communication device, a smartphone, a tablet, an IoT device, a printer, a server, a virtual machine, and/or any other device connectable to a network. Each endpoint may represent a potential entry and/or exit point for data flowing through a network. An endpoint may be vulnerable to attacks or policy violations and thus may be targeted for security monitoring and/or enforcement. Managing endpoint posture (e.g., software version and/or security status) may facilitate in ensuring secure access and/or maintain network integrity.

A firewall refers to a hardware and/or software security system for monitoring, filtering, and/or controlling incoming and/or outgoing network traffic based on one or more predefined security rules. A firewall may act as a barrier between two or more network nodes. For instance, it may act as a filter between a trusted internal network (e.g., a local and/or VPN network) and an untrusted external network (e.g., the Internet). It may be located on an individual (e.g., a personal) device, a server, and/or an edge device defining a network perimeter. It may permit flow of safe data traffic and block harmful and/or suspicious data traffic to protect a network from unauthorized access, cyberattacks, and/or other security threats. A firewall may inspect and/or evaluate a data packet based on one or more of a source IP address, a destination IP address, a physical location (e.g., a country), a port number, a protocol, and/or payload content. It may filter (e.g., by allowing and/or accepting) a packet, deny or drop a packet, and/or log a packet for review. Some types of firewalls may include a packet-filtering firewall for examining and/or filtering packets based on one or more rules associated with an IP address, port, and/or protocol, a stateful inspection firewall for tracking active network connections and filtering packets based on traffic state, an application-level (e.g., proxy) firewall for specific applications (e.g., email), a Next-Generation Firewall (NGFW) that incudes additional functionalities over packet-filtering firewalls, such as intrusion detection, malware blocking, and/or deep packet inspection. Some firewalls may be associated with a specific application, e.g., as an application gateway. A firewall may be implemented using a physical hardware device, e.g., installed at a network perimeter and/or with a router, and/or using software installed on an individual device providing protection at a host level. It may be associated with one or more threat databases, whitelists, and/or blacklists. A threat database (e.g., a threat intelligence database or threat data repository) may store information associated with cybersecurity threats and/or vulnerabilities, such as malware, viruses, and/or phishing attacks. A whitelist may include a list of entities (e.g., IP addresses, websites, and/or applications) to which access may be permitted, e.g., having undergone a security clearance. A blacklist may include a list of entities (e.g., IP addresses, physical locations or countries, malicious actors, websites, and/or applications) to which access may be prohibited. The security policy may permit communication with an entity included on a whitelist and may prohibit communication with an entity included in a blacklist.

A policy refers to a set of rules and/or guidelines defining how a network may operate. It may include rules and/or guidelines associated with implementation of one or more security measures, control of access to one or more network resources and/or usage, version control, updates, and/or maintenance of network resources, reduction and/or expansion of network infrastructure and/or resources, incorporation of one or more network protocols, and/or any other consideration associated with operating a network.

A security policy refers to a set of rules and/or configurations (e.g., settings) for governing and/or enforcing how data and/or users may access network resources in a manner complying with one or more security considerations. A security policy for a SASE network and/or architecture, which may deliver cloud-based network security to a WAN, a security policy may ensure consistent and/or identity-driven protection, e.g., regardless of a location associated with a request to access a network resource. A cloud-based security policy may enforce unified (e.g., consistent) security controls for users, devices, applications, and/or data across a distributed network, and may be associated with one or more user identities, roles, and/or device posture, e.g., rather than IP addresses. It may include integration with Identity Providers (IdPs) for Single Sign-On (SSO), Multi-Factor Authentication (MFA), and may enforce least-privilege access principles using Zero Trust Network Access (ZTNA). A cloud-based security policy may inspect and/or control of traffic based on application signatures, prioritize more critical applications over less critical applications, while restricting and/or throttling unapproved services, and/or implement deep packet inspection (DPI) for advanced visibility. It may include Data Loss Prevention (DLP) policies to detect and prevent unauthorized transmission of sensitive data (e.g., PII, financial data), Cloud Access Security Broker (CASB) capabilities to govern usage of SaaS applications and prevent shadow IT. It may additionally include threat prevention services, such as inline threat detection through Secure Web Gateways (SWG), Next-Generation Firewalls (NGFW), and Intrusion Prevention Systems (IPS), malware scanning, sandboxing, content disarm and reconstruction (CDR), and/or DNS-layer protection to block malicious domains. A cloud-based security policy may enforce security at a cloud edge (e.g., closer to a user) regardless of device location, and may continuously monitor network traffic and continually adapt the security policy based on updated risk assessments. It may enforce mandatory encryption for network traffic (e.g., via IPsec or TLS tunnels), and/or decryption and inspection policies for SSL/TLS traffic to uncover hidden threats. In some embodiments, a network security policy may be associated with a firewall, one or more whitelists, and/or a blacklists, as described elsewhere herein.

Cloud-based security refers to network security provided as a cloud service, e.g., using one or more servers located on the cloud. For instance, before receiving a packet, a client device may query one or more whitelists and/or blacklists stored on a cloud server.

Scalability includes a capability to provide consistent performance under an increasing or decreasing workload, e.g., by adding and removing computing resources on an as-needed basis.

SD-WAN (Software-Defined Wide Area Network) refers to software for managing and/or optimizing WANs (Wide Area Networks). SD-WAN may use software to abstract network hardware across different types of network connections (e.g., MPLS or Multiprotocol Label Switching, broadband Internet, LTE or Long Term Evolution wireless technology, and/or any other type of network connection). It may overlay a virtualized network architecture over a physical network to permit flexible and/or dynamic management of network resources, optimize traffic routing, and/or path selection, and provide a centralized platform to manage and/or monitor a WAN to improve network performance.

A SASE (Secure Access Service Edge) network refers to a computer network that combines network connectivity with cloud-based security services as a unified and scalable cloud solution. A SASE network may combine SD-WAN connectivity with cloud-provided (e.g., cloud native) network security functions into a single platform, e.g., to permit automated software upgrades and provision of network and/or security services within a SaaS (Software As A Service) architecture. It may be situated between an edge device and an ISP (Internet Service Provider) server as a cloud-based gateway providing enhanced connectivity and/or security services before network traffic reaches an external network (e.g., the Internet) and/or a cloud-based application. A SASE network may include a plurality of PoPs (e.g., server clusters) distributed geographically to provide users with global coverage. A PoP near or nearest to an edge device may intercept network traffic from the edge device and apply one or more security policies and/or network optimizations before transmitting the network traffic to an Internet Service Provider (ISP) for connecting to an external network (e.g., the Internet) and/or a cloud resource. Some network security functions provided by a SASE network may include Firewall as a Service (FWaaS) for traffic inspection, threat prevention, and/or application control via a third party vendor, Secure Web Gateway (SWG) to prevent malware, phishing attempts, and other web-based threats from web traffic, and Cloud Access Security Broker (CASB) as a security intermediary between an end user and a cloud application. Some additional network security functions provided by a SASE network may include Zero Trust Network Access (ZTNA) providing access based on user identity and context, Data Loss Prevention (DLP) for preventing sensitive information from leaving an organization and/or from being accessed by an unauthorized party. A SASE network may thus provide flexibility to remote users connecting to a network using a plurality of different devices (e.g., a tablet, a laptop computer, and a cellular phone).

Figure 2:
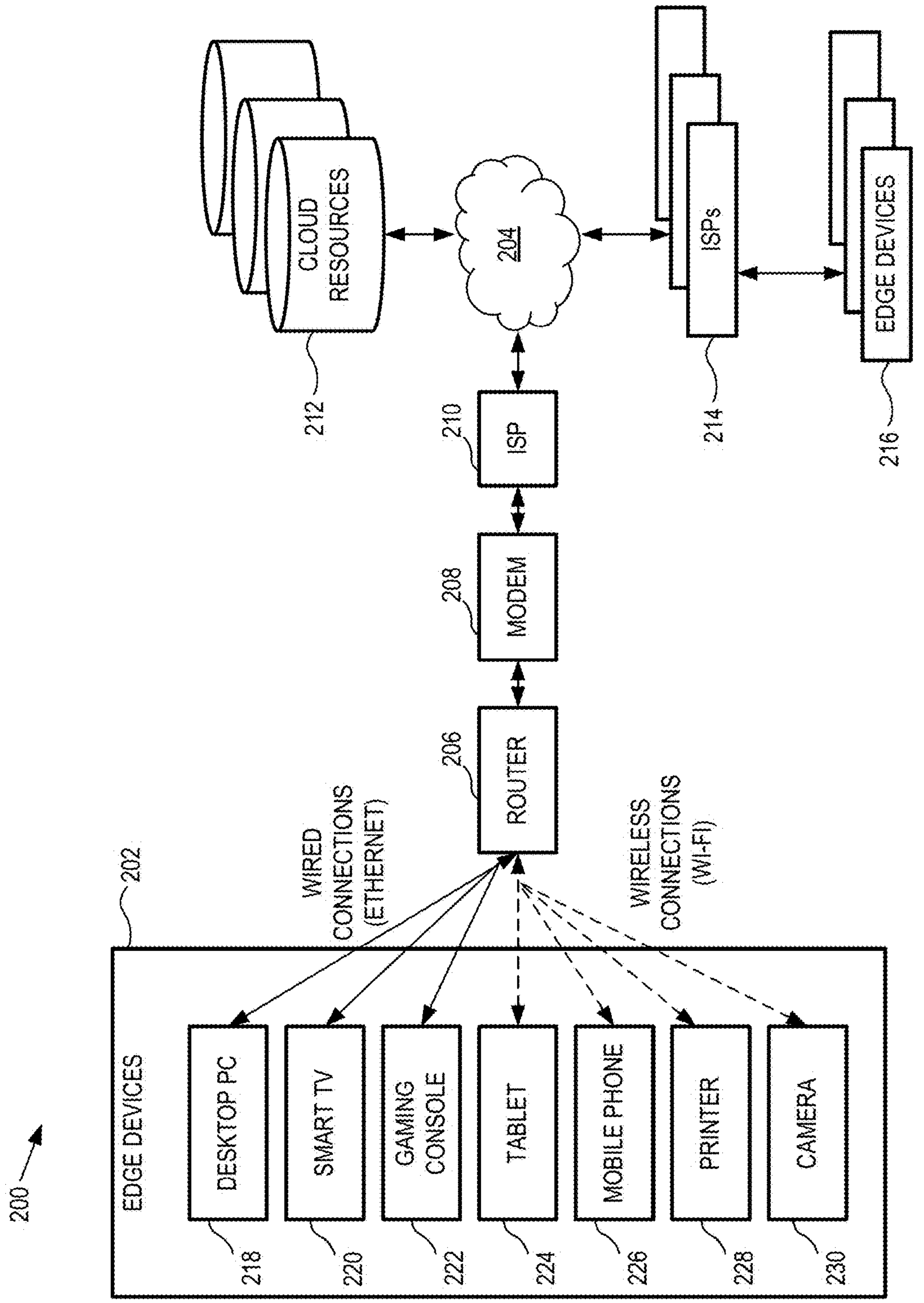
FIG. 2 illustrates an exemplary schematic diagram of a computer network, consistent with some disclosed embodiments.

Reference is now made to FIG. 2, illustrating an exemplary schematic diagram of a communications network 200, consistent with some disclosed embodiments. Communications network 200 may be a non-SASE network. Computer network 200 may include at least one edge device 202 connected to a public network 204 (e.g., the Internet) via a router 206, a modem 208, and an Internet Service Provider (ISP) 210. Router 206 and modem 208 may enable wired and/or wireless communication between at least one edge device 202 and ISP 210. Public network 204 may connect ISP 210 to one or more cloud resources 212, and/or additional ISPs 214 connected to additional edge devices 216. Cloud resources 212 may enable access to one or more data structures for one or more websites, services, and/or applications. At least one edge device 202 and/or edge devices 230 may include one or more of a desktop personal computer 218, a smart TV 220, a gaming console 222, a tablet 224, a mobile communications device 226, a printer 228, and/or a camera 230. Differing ones of one or more of edge devices 202 and/or 230, router 206, ISPs 210 and/or 214 and/or cloud resources 212 may be associated with differing firewalls and/or network policies.

Figure 3:
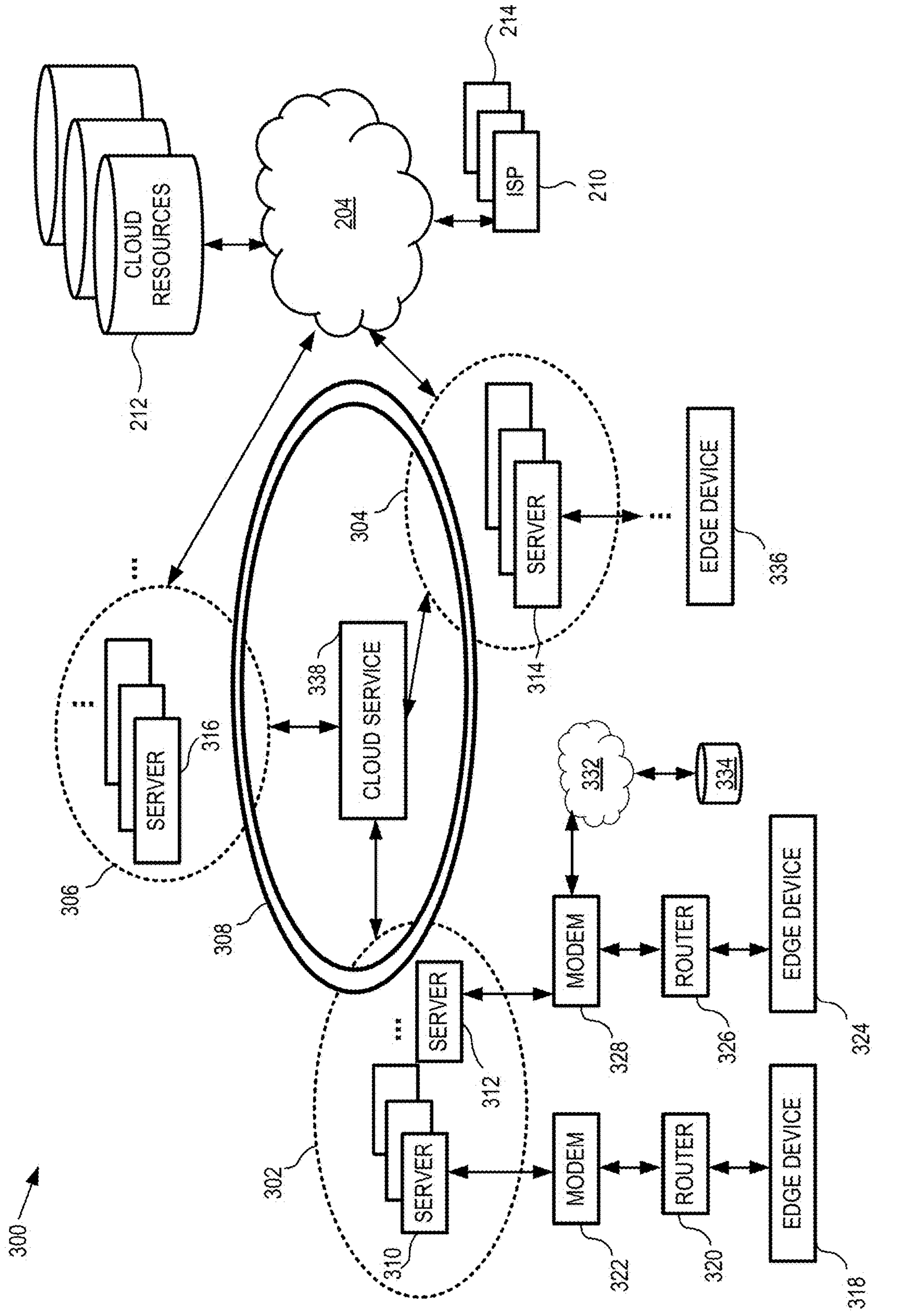
FIG. 3 illustrates an exemplary schematic diagram of another computer network, consistent with some disclosed embodiments.

Reference is now made to FIG. 3, illustrating an exemplary schematic diagram of another network 300, consistent with some disclosed embodiments. Network 300 may include a plurality of server clusters 302, 304, and 306 interconnected via a backbone 308. In some embodiments, network 300 may represent a SASE network, and may include a cloud service 338 connected to server clusters 302, 304, and 306. Backbone 308 may include hardware network infrastructure, such as wires, cables, fiber, transmitters and/or receivers (e.g., antenna) and/or software network infrastructure, such as SD-WAN, NGFW, and/or FWaaS. Each of server clusters 302, 304, and 306 may include a plurality of servers, such as a server 310 and a server 312 included in server cluster 302, at least one server 314 included in server cluster 304, and at least one server 316 included in server cluster 306. Server clusters 302, 304, and 306 may be distributed geographically and may each serve as a central hub providing regional network and security services and/or SD-WAN functionality to one or more edge devices connected thereto. Each of servers 310, 312, 314, and 316 may connect to a plurality of edge devices via a modem and an associated router. For instance, server 310 of server cluster 302 may connect to an edge device 318 via a router 320 and a modem 322 and server 312 may connect to an edge device 324 via a router 326 and a modem 328. Edge devices 318 and/or 324 may correspond to edge devices 202 in FIG. 2. Servers 310 and 312 (and additional servers in server cluster 302) may connect to additional edge devices. Server 314 of server cluster 304 may connect to at least one edge device 336 (e.g., via a modem and router). Server 314 and server 316 and additional servers in server clusters 304 and 306, respectively, may connect to a plurality of additional edge devices via a plurality of additional routers and modems. Server clusters 304 and 306 may connect directly to network 204, permitting access to one or more of cloud resources 212, ISP 210 and/or ISP 214. Thus, edge device 318 and/or edge device 324 may connect to cloud resources 212, ISP 210 and/or ISP 214 via a first route passing through server cluster 302 and server cluster 304 or via a second route passing through server cluster 302 and server cluster 306.

Each server of server clusters 302, 304, and/or 306 may include a common firewall and/or security policy to provide uniform security services across SASE network 300. When edge devices 318 and/or 324 request to access one or more of cloud resources 212, the requests may be sent to server 310 and/or server 312 of server cluster 302, respectively. Server 310 and/or server 312 may inspect the requests and apply the common firewall and/or security policy before forwarding the requests via one of server clusters 304 or 306 to one or more of cloud resources 212 via public network 204. This may ensure that access to one or more of cloud resources 212 will not expose edge device 318 and/or edge device 324 to malware and/or other security breaches. In addition, server 310 and/or server 312 may include routing information to access one or more of cloud resources 212 more efficiently than accessing cloud resources 212 via ISPs 214. Edge device 318 and/or edge device 324 may be associated with an individual home, a private business, a regional branch of an organization (e.g., a business, non-profit organization, and/or a government office), and/or an enterprise and/or headquarter of an organization. Each of server clusters 302, 304, and/or 306 may be dynamically scalable to deliver differing services based on demand and/or performance considerations.

Determining refers to arriving at an outcome. It may include, for example, undertaking an equality comparison to check whether two values are the same or are in a predetermined range. For example, the check may involve an equality operator like==in many languages (e.g., Python, JavaScript, C++). If the values are the same, the comparison evaluates to true; otherwise, it evaluates to false. Determining may additionally or alternatively include making a measurement, comparison, estimation, and/or calculation to arrive at a conclusive outcome.

Detecting refers to sensing, perceiving, discovering, recognizing, and/or identifying. Detecting may include identifying, recognizing, and/or discovering something by monitoring for patterns, signals, and/or anomalies that indicate certain events and/or conditions. Detection may be performed by a sensor, a receiver (e.g., a port and/or an antenna), and/or at least one processor and may involve sensing a change in state from one time period to a subsequent time period.

Transmitting (e.g., signals) refers to conveying information over a distance. Transmitting may be performed on a wired channel (e.g., a twisted pair cable, a coaxial cable, and/or a fiber optic cable) and/or using a wireless channel (e.g., Wi-Fi, Bluetooth, satellite, and/or cellular). Transmitting may involve obtaining digitally encoded data, formatting the data for a communications channel and transmitting the formatted data to a transmitter (e.g., an output port and/or antenna) connected to a network, to enable sending the formatted data to an associated receiver. In some embodiments, transmitting may include encrypting data prior to sending the data.

Receiving (e.g., signals) refers to obtaining, acquiring, and/or otherwise gaining access to information over a distance. Receiving may be performed on a wired and/or wireless channel. Receiving may involve connecting to a network, detecting an incoming signal at a receiver (e.g., a input port and/or antenna), and/or formatting the signal for storage in memory as digital data. In some embodiments, receiving may include decrypting received data.

Identifying refers to recognizing, ascertaining, and/or discovering. Identifying may involve determining a match (e.g., within a threshold) between two or more items, and/or associating an item with an (e.g., uniquely) identifying code and/or index.

Distributing (e.g., distributed) refers to spreading, dispersing, and/or allocating. It may refer to allocating a task for processing by a plurality of differing computing devices, by assigning differing sub-tasks to each computing device. It may include positioning different resources (e.g., computing devices, server clusters, data structures, files, software applications, and/or any other resource) in different geographical and/or logical locations. It may include collocating a plurality of computing devices in the same geographical location and assigning each collocated computing device a different network identifier (e.g., IP address). For example, distributed processing may involve performance of a task by assigning a first set of sub-tasks for performance by a client device and assigning a second set of sub-tasks for performance by one or more cloud servers. As another example, a distributed network may include multiple server clusters connected to a common edge device, permitting the edge device to alternately connect to a network via a first or second server cluster. As an additional example, a file may be distributed by transmitting copies of the file to multiple different computing devices.

Machine learning refers to a branch of artificial intelligence utilizing algorithms to navigate through large collections of data in an iterative manner to converge to a solution. Machine learning may include supervised learning, unsupervised learning, and reinforcement learning. Supervised learning may use annotated (e.g., tagged) data sets, whereas unsupervised learning may use unclassified (e.g., non-annotated) data sets. Reinforcement learning may occur in an absence of data, and may use trial-and-error, and environmental feedback to reach a conclusion. In some embodiments, machine learning algorithms (also referred to as machine learning models) may be trained using training examples. Some nonlimiting examples of such machine learning algorithms may include classification algorithms, data regressions algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, a software agent, such as an Artificial Intelligence or AI agent may perform one or more machine learning and/or deep learning operations, e.g., on an artificial intelligence network. The AI agent may be installed on a client device, a server device, a cloud service, a router, and/or any other device and may be executed by one or more associated processors. The AI agent may be enlisted to analyze data, for example, to determine communication characteristics, network characteristics (e.g., physical and/or virtual network topology, network traffic, network policy, and/or any other network characteristics), efficiency and/or performance characteristics, compliance with network policies, and/or perform testing, diagnostics, reliability checks, and/or simulations. The data may be stored locally and/or remotely and may include data collected in real-time (e.g., current data) and/or data collected over time (e.g., historic data). On receiving a query and/or other input, the AI agent may output one or more predictions, inferences, extrapolations, and/or any other output. The output of the AI agent may be used to facilitate in managing, maintaining, administering, and/or controlling a network.

Disclosed embodiments may include and/or access a data structure or data. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, servers that may be owned or operated by the same or different entities. Thus, the term "data structure" as used herein in the singular is inclusive of plural data structures.

Structured data may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. As used herein, the term "data structure" may include a data pool or may be included in a data pool. A data pool may include a data structure, a data set, a database, a data lake, a data pool, or any other form of information storage whether distributed or undistributed and whether structured or unstructured. It is further to be understood that the term "data structure" as used herein in the singular is inclusive of plural data structures. A data structure may also include any hardware, software, firmware, or combination thereof for storing and facilitating the retrieval of information.

A cloud service refers to a computer resource deliverable over a network (e.g., the Internet). For example, a cloud service may refer to any computing resource, functionality, or application that is delivered over the internet, typically hosted on remote servers rather than on local devices. In a SASE network, a cloud service may include a centralized cloud-based management plane for orchestrating policies, identities, network configurations, security rules, and/or additional settings and/or parameters for controlling and/or operating a network. A cloud service may provide Infrastructure as a Service (IaaS), Platform as a Service (PaaS), Software as a Service (SaaS), Functions as a Service (FaaS, or serverless computing), and/or any other resource deliverable over a network. A cloud service may be available on-demand from any networked connection point to a plurality of customers and may be scaled up or down to match changing needs. Some examples of cloud services may include a shared drive, an email client, an office software suite, a streaming service, a navigation application, a weather application, and/or any other resource located in the cloud and accessible via a network connection. In some embodiments, a cloud service may be associated with a queryable data structure and may be accessed using an Application Programming Interface (API) and/or a web dashboard. In some embodiments, a cloud service may output a log associated with network traffic, user activity, security events, policy enforcement, and/or system operations. For example, a cloud service may provide network traffic information, such as one or more source and destination IP addresses, user and/or device identities (e.g., usernames, device identifiers or IDs, Media Access Control or MAC addresses), one or more applications in use, a destination domain and/or Universal Resource Locator (URL), a port and/or protocol identifier (e.g., TCP/443 or UDP/53), an action taken, a number of bytes sent and/or received, and/or a duration of a connection and/or associated timestamp, and/or any other information indicative of a state of a network. A cloud service may additionally provide security information, such as data related to threat detection, an Intrusion Detection System (IDS) and/or Intrusion Prevention System (IPS), a firewall action (e.g., a blocked port, scan, and/or rule match), a ZTNA decision, Data Loss Prevention (DLP) violations, and/or an outcome of a sandbox simulation. A cloud service may additionally provide identity and/or access information, such as user logins and/or logouts, authentication methods, role and/or policy assignments, access requests, and/or session initiation and/or termination events. A cloud service may further provide data associated with policy enforcements, such as a list of applied access control policies, enforced security policies, traffic steering decisions, routing decisions, and/or violations and/or exceptions. A cloud service may further provide data associated with device and/or account status, configuration changes, firmware and/or software updates, availability, alerts for system failures, track which APIs were called, administrative role changes, and/or audit trails for compliance. This list is not intended to be limiting, and a cloud service may provide additional information and/or services associate with a computer network.

Some disclosed embodiments involve performance of network synchronization operations in a network containing a plurality of distributed server clusters connected to a plurality of edge devices. Synchronization refers to an enforcement of consistency between data sets and/or files stored in more than one location. Synchronization may cause two or more data sets and/or digital files stored in different locations and/or at different devices to remain substantially identical over time. For example, a change made to a first copy of a file stored in a first location may be made to a second copy of the file stored in a second location within a time threshold, and the reverse, such that copies of the file substantially match over time. Synchronization may permit different users and/or devices to share a resource by storing multiple copies of the resource at different locations and ensuring that changes made to one copy of the resource are mirrored on other copies, ensuring consistency between different copies over time. Data synchronization may maintain consistency across file sharing systems, backup and/or replication systems, cloud storage, and/or collaborative tools. Network synchronization may include ensuring that multiple devices, systems, and/or nodes within a computer network operate in coordination with each other. Performance (e.g., implementation) of network synchronization operations by at least one processor may ensure that each device and/or node of a network has access to consistent and/or updated network state information, such as a consistent system time (e.g., adjusted for geographic time zones), information regarding availability of network resources, network traffic levels, active and inactive devices and/or nodes, connectivity issues, traffic congestion, and/or any other state information that may be relevant to ensuring synchronization across a network. In some embodiments, one or more processors may perform network synchronization operations continually, e.g., periodically based on a schedule and/or in response to one or more connectivity changes. A network containing a plurality of distributed server clusters connected to a plurality of edge devices may be understood as described elsewhere herein.

By way of a non-limiting example, FIG. 3 is network 300 containing a plurality of distributed server clusters 302, 304, and 306 connected to a plurality of edge devices 318, 324, and 336. At least one processor (e.g., processor 102 in FIG. 1) may perform network synchronization operations in network 300. The at least one processor may be associated with in at least some of servers 310, 312, 314, and 316 of server clusters 302, 304, and 306. In other words, at least one processor included in one or more of servers 310, 312, 314, and 316 of server clusters 302, 304, and 306 may perform operations for synchronizing network 300. The operations may be performed continually, e.g., periodically according to a schedule and/or in response to connectivity changes in network 300. 336

Some disclosed embodiments involve maintaining a plurality of copies of a routing table. Maintaining refers to the act of keeping something in a desired state or condition over time. It may include storing, protecting, updating, and/or backing up. At least one processor may store a copy of a routing table in memory and may protect the routing table to prevent unauthorized access. The at least one processor may regularly update the routing table and perform routine backups to ensure a current copy of the routing table is available for query. A routing table refers to a chart, index, and/or array stored in a router and/or other networked device informing the router how to forward a packet to the destination indicated in the packet header. It serves as a map and/or guide assisting a router to determine a best path (e.g., from a subset of possible paths) for sending a packet across a network to a destination. Each entry in a routing table may store a destination IP address and/or network address for a packet, a subnet mask defining (e.g., a size) of the destination network, a next hop indicating the IP address of the next router or device along the path to a destination, an interface indicating a port (e.g., an Ethernet port and/or Wi-Fi address) through which a packet should be sent, a cost metric associated with a path (e.g., number of hops and/or latency), and a route source indicating how each route was determined (e.g., a static route configured manually by an administrator, or a dynamic route learned through a protocol). For example, when a router receives a packet, it may compare the destination IP address of the packet with entries in a routing table and select the route with the longest matching prefix (e.g., the most specific network address). A routing table may store multiple routes to the same destination, and prioritize a specific route based on reliability and/or cost. One or more network routers within a network segment may use an OSPF (Open Shortest Path First) to share link-state information (e.g., including a cost for each link) with neighboring routers and may populate local copies of a routing table using an SPF algorithm. Routers in a public network (e.g., the Internet) may use a Border Gateway Protocol (BGP) to maintain path information for each route and enable determination of a best path. In smaller (e.g., private) networks, routers may use a Routing Information Protocol (RIP) to determine a best path for a packet based on a number of hops. A routing table in a SASE network may include multiple layers, such as an underlay for physical routing infrastructure and an overlay associated with SASE-controlled network paths. The underlay of a routing table may employ protocols such as BGP and/or OSPF. The overlay may be maintained by a SASE network provider, for instance via one or more Application Programming Interfaces (APIs), centralized controllers, and/or distributed agents. A routing table may be used in a SASE network in conjunction with SD-WAN capabilities, such as dynamic path selection (e.g., to reduce latency, jitter, and/or packet loss) and/or to continuously measure and/or adjust routes across multiple WAN links (e.g., in response to changing network characteristics). A copy or copies, as used herein may refer to a version, and/or rendition of a file. Two different copies of a file (e.g., a routing table) may be identical or may include one or more differences. A plurality of copies of a routing table refers to multiple versions, renditions, and/or reproductions of a routing table. In some embodiments, copies of routing tables store in different locations may include one or more common portions (e.g., portions that are the same) and one or more uncommon portions (e.g., different). In some embodiments, copies of routing tables store in different locations may be substantially similar. In some embodiments, copies of routing tables stored in differing locations may be substantially similar during some time periods and different during other time periods.

In some disclosed embodiments, the plurality of copies of the routing table are distributed to a plurality of locations across the distributed server clusters and the plurality of edge devices. A plurality of locations may include multiple different locations, as described elsewhere herein. A plurality of locations across the distributed server clusters and the plurality of edge devices refers to multiple locations associated with multiple distributed server clusters and edge devices. For example, the plurality of locations may include differing physical locations for each server cluster (e.g., different geographical regions), differing logical locations of each server within a cluster (e.g., different IP addresses for each server within a cluster), and/or differing physical and/or logical locations for each edge device connected to one or more server clusters. A plurality of copies of the routing table distributed to a plurality of locations refers to versions of a routing table stored at each of a plurality of locations. For example, an SD-WAN controller (e.g., implemented by at least one processor) may transmit copies of a routing table to each server cluster and edge device in a network such that each server cluster and each edge device may access a local copy of the routing table (e.g., stored in local memory). In some embodiments, some servers in a server cluster may maintain individual copies of a routing table for those servers. In some embodiments, each server cluster may maintain a copy of a routing table for use by every server in the server cluster. In some embodiments, a copy or a routing table may be transmitted and/or stored in associated with a time stamp and/or version number.

In some disclosed embodiments, the plurality of copies of the routing table are associated with a common security policy configured for enforcement across the distributed server clusters and the plurality of edge devices. Enforcement refers to an act of ensuring that one or more specific rules, policies, and/or protocols and/or directives are followed. Enforcement may include imposing compliance and/or compelling observance with, e.g., a policy. A common security policy refers to a shared, universal, and/or widespread security policy, as described elsewhere herein. A plurality of copies of a routing table are associated with a common security policy may be understood to mean that the routing information contained in each routing table copy is consistent with a universally shared security policy. Consequently, any route and/or path derived from copies of the routing table copies may inherently comply with the established security policy, e.g., across a WAN network. Thus, network traffic transmitted from any edge device and/or server cluster to another edge device and/or server cluster in the network based on a copy of the routing table may comply with the security policy. For instance, a copy of the routing table may avoid providing a path to a suspicious (e.g., blacklisted) resource and/or location such that access to a blacklisted resource and/or location may be denied. Similarly, a copy of the routing table may restrict paths to a proprietary and/or restricted resource conditional on authentication. Since each router and/or server in the network may store a copy of the routing table associated with the same security policy, circumventing the security policy, e.g., to access a restricted resource, may be difficult more difficult than in a network where different security policies are associated with different network nodes.

In some disclosed embodiments, the common security policy includes a common firewall for the distributed server clusters and the plurality of edge devices. A common firewall refers to a shared, universal, and/or widespread firewall, as described elsewhere herein. Thus, the same or substantially similar firewall may be implemented in each server cluster and each edge device. Consequently, each node in a network may implement the same or substantially similar monitoring and/or control functions for network traffic. Each node may refer to the same and/or similar whitelists and/or blacklists and may perform similar packet inspection and/or filtering functions. A packet travelling from a source to a destination via a network path may undergo substantially similar inspecting, monitoring, and/or filtering at each network node (e.g., each hop) such that circumventing the firewall in the network may be more difficult than in a network where different firewalls are associated with different network nodes.

In some disclosed embodiments, the plurality of edge devices include a gateway device. A gateway device refers to a computing device and/or node functioning as a bridge between two different networks. The gateway devices may operate under the same or different protocols, architectures, and/or data formats. A gateway may be located at an edge of a network and may function as a an entry point and an exit point for network traffic by perform one or more routing, converting, and/or translating operations. Some examples of a gateway device may include a home router interfacing between a local area network in a private home and the Internet, an email gateway which may convert between differing types of email formats and enforce security policies, a VoIP gateway which may convert a voice call (e.g., audio data) to packets for transmission over the Internet, and a cloud gateway for bridging on-premise infrastructure with one or more cloud services. A gateway may enable communication across differing networking environments and may provide security, control, and/or monitoring functionality at a network boundary.

In some disclosed embodiments, the plurality of edge devices include a router device. A router device refers to a computing device dedicated to directing network traffic. It may connect an edge device to a network (e.g., the Internet) using wired and/or wireless technology. A router device may determine an optimal (e.g., more efficient) path from a source to a destination. A router may perform packet forwarding operations by examining incoming packets and sending the incoming packets to an appropriate 'next hop' (e.g., another router device, gateway device, and/or server). A router may additionally perform path selection operations using one or more routing tables and/or algorithms to determine a more efficient path for data to reach a destination. It may translate a private IP address (e.g., associated with a private environment) to a public IP address (e.g., associated with the Internet), and may assign an IP address dynamically to devices on a local network. Some router devices may provide one or more firewall capabilities, such as filtering traffic based on rules. Some types of routers may include a home/consumer router directing network traffic from one or more edge devices, a core router directing Internet backbone traffic to and from an ISP and/or a data center, an edge router interconnecting different networks.

In some disclosed embodiments, the plurality of edge devices include a network segment. A network segment refers to a subnet and/or portion of a network and may be separated from a remaining network by one or more switches, routers, and/or network bridges. It may facilitate in managing network security, traffic, and/or improve network performance (e.g., by improving throughput and/or reduce communication latencies). For example, dividing a network into two or more segments may contain a security breach in one segment from compromising the other segments, reduce an attack surface, facilitate monitoring and/or auditing for suspicious activities, and/or improve compliance with regulatory requirements. Devices in a network segment may share a common communications medium and may communicate directly at a data link layer (e.g., layer 2 of an OSI or Open Systems Interconnection model). In some embodiments, a network segment may be integrated with a Zero Trust security model where each user and/or device within the network segment may undergo verification. Some applications of network segments may include isolating an employee network segment from a guest network segment in a workplace, isolating sensitive data repositories and/or servers from a wider network, isolating different departments and/or business units within an organization (e.g., isolating payroll data from sales data). A segment may be implemented as a physical segmentation or a logical (e.g., virtual) segmentation. In some disclosed embodiments, one of the plurality of edge devices is associated with a user. A user may refer to an individual (e.g., a human), a device, an account, and/or an application that may interact with a network to access one or more network resources. A user may be associated with an (e.g., unique) identifier, such as an account identifier through which the user may be granted access to network resources. In some disclosed embodiments, the network is a SASE network, as described elsewhere herein.

Figure 4:
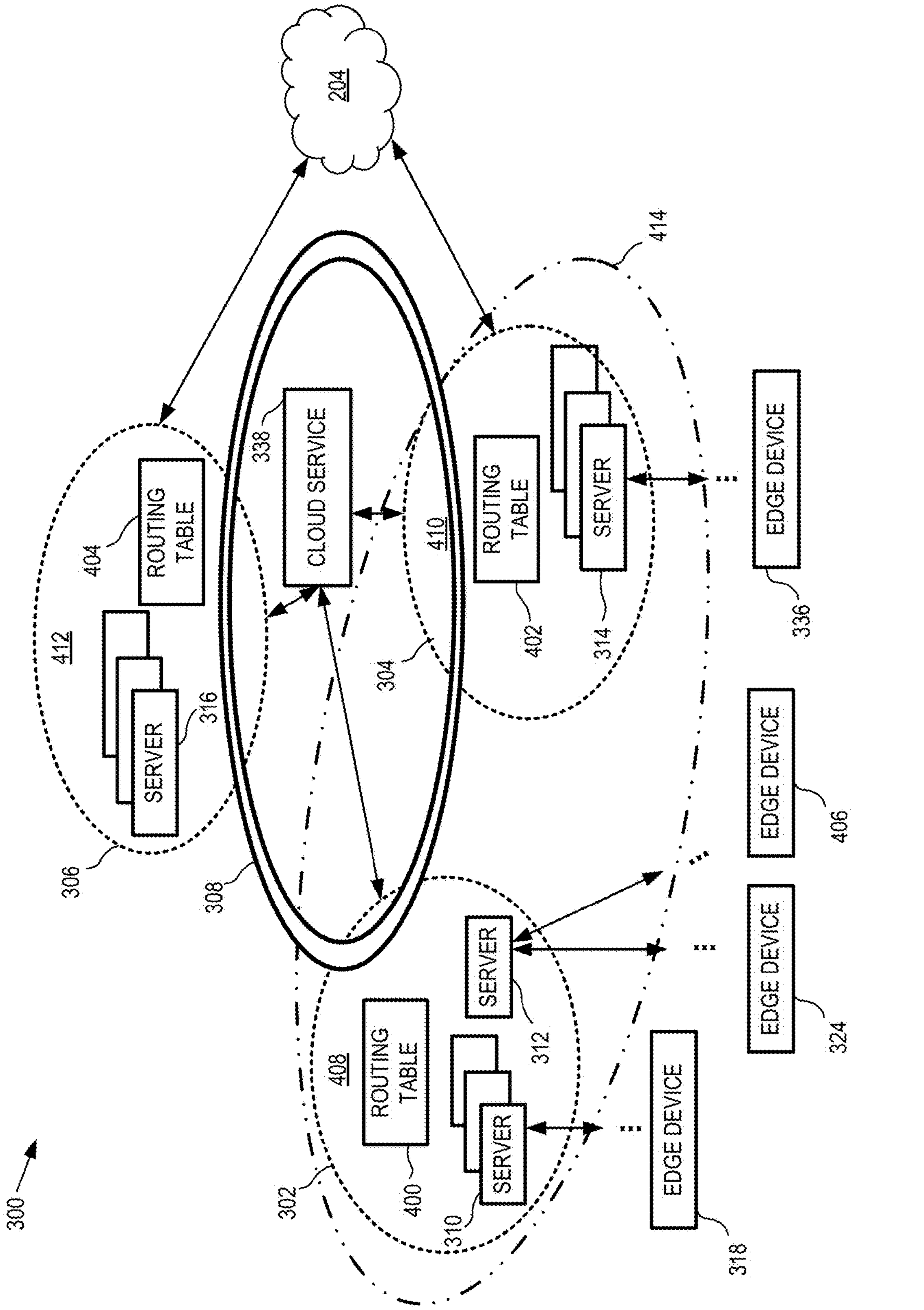
FIG. 4 is an exemplary schematic diagram of a plurality of server clusters and associated routing tables, consistent with some disclosed embodiments.

By way of a non-limiting example, reference is made to FIG. 4 illustrating an exemplary schematic diagram of plurality of server clusters 302, 304, and 306 and associated copies of a routing table, consistent with some disclosed embodiments. Each of server clusters 302, 304, and 306 may maintain at least one copy 400, 402, and 404 of a routing table, respectively. For example, copy 400 of the routing table may include routing information associated with edge devices 318 and 324 and/or any other edge devices, servers, and/or resources in communication with edge devices 318, 324, and/or 406 and/or server cluster 302. Copy 402 of the routing table for server cluster 304 may include routing information associated with edge device 336, and any additional edge devices, servers, and/or resources in communication with edge device 336, and/or server cluster 304. Similarly, copy 404 of the routing table may include routing information for any edge devices connected to server cluster 306 and/or any additional edge devices, servers, and/or resources in communication with those edge devices and/or server cluster 306.

At least one processor (e.g., processor 102 in FIG. 1 associated with network 300) may distribute the plurality of copies 400, 402, 404 of the routing table to a plurality of locations across the distributed server clusters and the plurality of edge devices. Thus, the at least one processor may distribute copy 400 of the routing table to a location 408 for server cluster 302 for access by servers 310 and 312 and additional servers of server cluster 302. At least one processor may distribute copy 402 of the routing table to a location 410 for server cluster 304 for access by server 314 and additional servers of server cluster 304. At least one processor may distribute copy 404 of the routing table to a location 412 for server cluster 306 for access by server 316 and additional servers of server cluster 306. Similarly, edge devices 318, 324, and 406 may access copy 400 of the routing table (e.g., stored in association with routers 320 and 326, and edge device 336 may access copy 402 of the routing table via an associated router. In some embodiments, copies 400, 402, 404 of the routing table may be associated with a common security policy for enforcement across server clusters 302, 304, and 306, and edge devices 318, 324, 406, and 336. For instance, each of copies 400, 402, 404 of the routing table may include a ZTNA network policy to verify users and/or devices before granting access to one or more of resources 212. In some embodiments, the common security policy includes a common firewall for the distributed server clusters and the plurality of edge devices. For instance, the ZTNA network policy may include one or more whitelists for granting access and/or one or more blacklists for denying access based on user and/or device identification.

In FIG. 3, edge device 324 may include a gateway device to a private network 332 for accessing an additional network resource 334 (e.g., via router 326 and modem 328). In some embodiments, edge device 318 may include router 320. In some embodiments, edge device 318 may correspond to mobile phone 226 in FIG. 2 and may be associated with a human user. In some embodiment, edge device 324 may include a network segment (e.g., including private network 332 and resource 334). In some embodiments, network 300 may be a SASE network. For instance, server clusters 302, 304, and 306 may provide SD-WAN functionality via backbone 308.

Some disclosed embodiments involve detecting, at at least one server in the plurality of distributed server clusters, a connectivity change. Detecting may be understood as described elsewhere herein. A connectivity change refers to a modification and/or difference associated with a link between two or more network nodes. A connectivity change may be caused by a change in a policy, a change in a network condition, a change in one or more security rules, a change in user location, onboarding of a new device, offboarding of a previously connected device, a change in routing information, and/or any other change that may affect a network. A change in policy may be due to, for example, a policy update. A change in a network condition may include, for example an increase or decrease in latency, traffic volume, and/or change in traffic type, a change in a number of hops to a destination, and/or a change in a default gateway (e.g., a DHCP may provide a new default route due to an update and/or failover) which may trigger a rerouting of network traffic, and/or a change in a DNS server. A change in a security rule may occur, for example, due to a change in one or more rules associated with a firewall, such as a changed availability and/or configuration of a proxy server, whitelisting of a device that was previously blacklisted or the revers, which may cause a diversion of network traffic. A change in user location may occur, for example, when a user of a mobile device moves from a region linked to a first server cluster (e.g., PoP) to a different region linked to a different server cluster, which may cause a change in an associated IP address. A change in IP address may also occur when a user switches from a wireless connection (e.g., Wi-Fi) to a wired connection (e.g., Ethernet) or the reverse. Onboarding of a new device and/or offboarding of a previously connected device may indicate that a device that was turned on was powered off, or the reverse, that an active network link has become inactive, or the reverse. A change in routing information may occur, for example, due to a network topology event (e.g., a link failure, a route update, and/or a performance change). It may also indicate connection/disconnection to a VPN, a subnet, and/or an external network. The lists and examples provided herein are intended as exemplary only and do not limit this disclosure. In a SASE network infrastructure, a connectivity change may trigger a push event. The push event may be initiated for example, by an SD-WAN controller, a dynamic protocol such as Border Gateway Protocol (BGP), and/or OSFP, a SASE administrator, a software agent (e.g., an artificial intelligence agent), and/or any other party. In some embodiments, an agent and/or device (e.g., a virtual and/or physical device such as an SD-WAN edge appliance) may push one or more updates to one or more local copies of a routing table in response to a connectivity change.

In some disclosed embodiments, the connectivity change is associated with a new edge device previously not identified in the network. An edge device may be understood as described elsewhere herein, and a new edge device previously not identified in a network refers to an edge device recently added to the network which was not previously connected to the network, and which may not have been identifiable in an associated routing table. A connection may be established by connecting to a power supply (e.g., after a power outage), by a user turning on a device and/or a connectivity setting, due to network availability, and/or any other method for establishing a network connection. Upon establishment of a network connection, a server may recognize a device as newly added. For instance, the server may receive one or more heartbeat signals (e.g., packets), a status report, and/or a signal associated with an authentication and/or authorization protocol from a previously unrecognized IP address that is not included in a locally stored routing table. The server may log a connection event associated with an edge device and/or employ one or more network monitoring tools to track network traffic. The server may determine that an IP address associated with the newly added edge device is not included in a local copy of a routing table and may add an entry for the added edge device (e.g., using an associated IP address). If prior to detection of the newly added edge device, the routing table include N entries with N IP addresses for N connected network devices, upon detection of the new edge device, the routing table may include N+1 entries with N+1 IP addresses for N+1 connected network devices Henceforth, the routing table may be used to send/receive network traffic to/from the newly added edge device.

In some disclosed embodiments, the connectivity change is associated with one of the plurality of edge devices disconnecting from the network. This may be understood as a connectivity change resulting from removing from a network an edge device previously connected to the network. Such an edge device may no longer be active and/or accessible via the network. An edge device may become disconnected from a network, for example, due to a power outage, a user powering off and/or terminating connectivity of the edge device, severance of a link between the edge device and a server and/or server cluster (e.g., due to a cable malfunction and/or flaw), a timeout, network traffic congestion and/or overload, a network misconfiguration, inadequate signal strength (e.g., for wireless networks), an IP address conflict, a hardware issue (e.g., overheating), a failure of a network device (e.g., router and/or modem), intermittent service availability (e.g., for satellite communication), and/or any other reason for disconnecting from a network. A server may determine that an edge device disconnected from a network by discerning that heartbeat signals had been received previously, but have not been received more recently, e.g., within a threshold time period, that a timeout period has lapsed, that data packets have not been sent or received from the edge device for a threshold time period. In some embodiments, a server may employ one or more network-level tools (e.g., Wireshark) to monitor network activity and detect physical link failure and/or an address resolution issue association with a disconnection from the network. Upon determining that an edge device has disconnected from the network, the server may remove the entry for the disconnected edge device from a locally stored routing table. If prior to the disconnection, the local copy of the routing table include N entries with N IP addresses for N connected network devices, upon detecting the disconnection, the routing table may include N−1 entries with N−1 IP addresses for N−1 connected network devices Henceforth, network traffic may not be sent/received to/from the disconnected edge device.

In some disclosed embodiments, the connectivity change is detected based on traffic analysis. Traffic analysis refers to monitoring, investigating, and/or inspecting a flow of data packets across a network. Such an analysis may permit at least one processor to learn characteristics about the behavior, performance, and/or security of a network. It may involve continually observing and/or examining data packet traffic moving across the network, inspecting data packets, e.g., by inspecting at least the source and destination IP addresses, a volume of traffic, and/or communication protocols used to transmit packets. Traffic analysis may permit determination of one or more patterns and/or anomalies. For example, after a time period during which a server transmitted and received packets to and from an edge device, a server may detect that traffic flow to and from the edge device has terminated, and that no packets have been sent or received to and from the edge device for a threshold time period (e.g., a timeout). Conversely, after a time period during which no packets were sent/or received to/from an edge device, a server may detect packets transmitted to/from the edge device. In some embodiments, a server may employ one or more machine learning, behavioral modeling, and/or rules to analyze data and identify a connection or disconnection from a network. Upon determining that an edge device has connected/disconnected from the network, the server may add/remove an entry for the edge by updating a local copy of a routing table as described above.

By way of a non-limiting example, in FIG. 4, at least one processor (e.g., processor 102 in FIG. 1) in server cluster 302 may detect a connectivity change. In some embodiments, the connectivity change may be associated with a new edge device 406 previously not identified in network 300. For instance, a user may power on new edge device 406 and establish a new network connection with server 310 of server cluster 302 via router 320. Server 310 may detect the new network connection. In some embodiments, the connectivity change may be associated with edge device 318 disconnecting from network 300. For instance, a user may power off edge device 318. Server 310 may detect the disconnection of edge device 318 from the network 300. In some embodiments, the connectivity change may be detected based on traffic analysis. For example, server 310 may detect that no packets have been received from edge device 318 for a threshold time period (e.g., a timeout). This may cause an automatic severing of a communication link between edge device 318 and server 310.

In some disclosed embodiments, the connectivity change is expressible as a delta in the routing table. A delta may be understood to mean a change and/or difference in a quantifiable measure. It may be calculated mathematically using one or more differential operators and/or combinations thereof. Such differential operators may include one or more subtraction, division, logarithm, trigonometric (e.g., e.g., angular, and/or cosine-based difference), intersection, a logical OR and/or exclusive OR operation, and/or any other differential operator. In some embodiments, calculating a delta may include employing one or more non-differential operators, such as addition, multiplication, union, logical AND, and/or any other mathematical operator. A delta may be described as a percentage, as an absolute value, as a difference in file size, as a different hash code, as an information-theoretic measure, as an amount of work and/or effort needed to recover the difference and/or change measurable by the delta. In some embodiments, a delta may be represented by data. For instance, a delta for two versions of a routing table may include data added to a current version of the routing table and/or removed from a prior version of the routing table. In other words, a delta may include data excluded from a prior version and included in a current version of the routing table, and data included in the prior version and excluded from the current version. In some embodiments, a delta may only include data that was added and/or removed and may exclude any data included in both the prior routing table and current routing table. For instance, if a prior version of a routing table included N entries, a delta may only include a newly added entry and/or a removed entry. In some embodiments, a delta may include some data included in both the prior routing table and the current routing table. Expressible may be understood to mean representable (e.g., capable of being represented), quantifiable, measurable, and/or capable of being modeled and/or captured. In computing, differences and/or similarities between data sets may be expressible via one or more arithmetic operations, such as subtraction, division, and/or a logarithmic operation. A difference between two data sets may be expressed by determining portions common to both data sets, and subtracting (e.g., removing) common portions such that portions remaining after the subtracting may be included in the delta. A delta in a routing table may be understood as a change or difference in a copy of routing table. This may occur over time in response to network changes, e.g., such that a prior version of a copy of the routing table differs from a current version of the copy routing table. A connectivity change expressible as a delta in a routing table may be understood as representing a connectivity change as a difference between versions of a routing table. For example, in response to detection of a connectivity change, an agent (e.g., an SD-WAN edge appliance, an administrator, and/or any other agent) may push one or more updates corresponding to the connectivity change to at least one copy of a routing table. Consequently, a prior version of the copy of the routing table reflective of a state of the network at a prior time instant may differ from a current version of the copy of the routing table. For instance, a change in a network policy may result in a change in priority (e.g., an administrative distance and/or preference) of one or more users, devices, applications, and/or services. This may be expressed as a change in a priority field of a routing table and may influence which route may be chosen when multiple routes are available. As another example, a change in a network condition may change a cost metric associated with one or more nodes and/or paths. This may be expressed as a change in a cost metric of a routing table. A change a security rule may change a status of a network node, e.g., a previously considered node may be marked as invalid, and/or a previously avoided node may be restored. This may cause changes to one or more routes in a routing table, e.g., routes including an invalidated node may be changed to bypass the invalid node, and other routes may be recalculated and directed to a restored node. A change in user location may cause a change in a nearest server cluster (e.g., a nearest hop) listed in the routing table for serving the user. A delta may include an indication to add and/or remove one or more entire rows, modify one or more portions of one or more rows, modify one or more specific cells in one or more rows, and/or any other granular change. In some disclosed embodiments, the delta is associated with an IP address for a computing device. For instance, an entry for a new IP address (e.g., a row) may be added to a copy of a routing table when a new device is onboarded, an entry associated with an IP address (e.g., a row) may be removed when a device is offboarded, and/or an entry associated with an IP address may be modified, e.g., due to a user turning on a new device under an existing user account, switching from a wired network to a wireless network, moving to a location associated with a different server cluster, and/or any other network change associated with an IP address.

By way of example, in response to detecting a connectivity change (e.g., in response to a trigger event, and/or polling a routing table) at least one processor may compare a prior version of a copy of a routing table reflective of the network at a prior time instant with a current version to identify data for including in a delta reflective of the network at a current time instant. The at least one processor may discern differing file sizes and/or differing cryptographic hashes associated with the prior copy and the current copy, and/or probe and/or query the prior and/or current versions, perform a line-by-line comparison, and/or use a Longest Common Subsequence (LCS) algorithm and/or tool (e.g., Unix diff, Git, and/or CMP) to identify added, removed, and/or modified data. Additionally or alternatively, at least one processor may perform a byte-by-byte comparison and flag mismatched bytes for including in a delta, perform a semantic comparison of the two versions, and/or employ an agent (e.g., an AI agent) to identify differences for including in the delta. The at least one processor may perform such a comparison periodically and/or in response to a trigger event. In some embodiments, the delta may be limited (e.g., exclusively) to data added to the current version of the routing table, removed from the prior version of the routing table, and/or modified between the prior version and the current version of the routing table. In some embodiments, the delta may include some data common to the prior and current versions of the routing table. The delta may be substantially smaller than the routing table and transmitting the delta may thus consume fewer network resources (e.g., less memory, less processing bandwidth, and/or less channel bandwidth) than transmitting the (e.g., entire) routing table. In some embodiments, the delta may be sent in a single packet. At least one processor may indicate in the delta which data is to be added, which data is to be removed, and/or which data is to be modified in other copies of the routing table.

By way of a non-limiting example, reference is made to FIG. 5A illustrating two exemplary copies 400 and 402 of a routing table at a first time period, consistent with some disclosed embodiments. Copies 400 and 402 of the routing table may include a plurality of columns and a plurality of rows. Each row may represent a route, and each column may indicate a field for a particular route. The fields in copies 400 and 402 of the routing table may include a name field 500 for an origin for the route, a destination Subnet and/or IP address field 502 indicating a destination of the route, a Next Hop field 504 indicating the next hop device IP address on the route, a routing type field 506 indicating the if the route is dynamic (e.g., learned from a peer device) or static (e.g., defined by a management application), an Original server cluster field 508 indicating the server cluster that the route originates from, a Route Last Update field 510 indicating the last time a server cluster received an update for a route, and a metric field 512 indicating a cost. Copies 400 and 402 of the routing table may include additional fields, e.g., to indicate a priority, a preferred path length, a weight from a peer device, and/or additional information. Copy 400 of the routing associated with server cluster 302 and may include a row 518 for presenting a route connecting edge device 318 to ISP 214 and a row 520 for a route connecting edge device 324 to cloud resources 212. Copy 402 of the routing table associated with server cluster 304 may include a row 522 presenting a route connecting edge device 336 to cloud resources 212. Copy 402 may additionally include rows 524 and 526 for presenting routes connecting edge devices 324 and 318 to cloud resource 212 and ISP 214 via server cluster 304.

By way of a non-limiting example, reference is made to FIG. 5B illustrating copies 400 and 402 of routing table of FIG. 5A at a second time period, consistent with some disclosed embodiments. In the second time period, at least one server (e.g., server 312) in the plurality of distributed server clusters 302, 304 and 306 may detect a connectivity change. In some embodiments, delta 514 may be associated with an IP address for a computing device, e.g., edge device 324 and/or edge device 406. For instance, a user may have disconnected edge device 324 and connected new edge device 406 instead. An SD-WAN controller may trigger a push event and update copy 400 of the routing table, by replacing an IP address for edge device 324 with an IP address for new edge device 406. The connectivity change may be expressible as a delta 514 in the routing table. Server 312 may detect that everything in copy 400 of the routing table has remained the same from the first time period to the second time period, with the exception of delta 514, indicating new edge device 406 has been connected to network 300 via server cluster 302, and edge device 324 has been disconnected from network 300.

Some disclosed embodiments involve distributing the delta to the plurality of locations across the distributed server clusters and the plurality of edge devices. This may be understood to mean transmission and/or sending of the delta to multiple connected devices in the network. For instance, at least one processor may transmit a delta in one or more payloads of one or more packets. In some embodiments, a delta may be transmitted in a single payload of a single packet. In some embodiments, transmitting an entire copy of a current version of a routing table requires transmitting more packets than transmitting a delta. Thus, transmitting the delta may user fewer computation and/or bandwidth resources than transmitting an updated version of a copy of a routing table. If an edge device and/or server detects a connectivity change, the edge device and/or server may transmit the delta to one or more additional edge devices connected thereto and/or to at least one server of a nearby server cluster, e.g., within a time threshold. A server in a server cluster may additionally transmit the delta to at least one additional server in a neighboring cluster, e.g., within a time threshold. Upon receiving a delta from an edge device or a server, an edge device and/or server in a server cluster may transmit the delta to one or more additional edge devices and/or to at least one additional server in the server cluster and/or a neighboring server cluster, e.g., within a time threshold. Thus, a delta may propagate throughout an entire network or throughout a portion of a network (e.g., a subnet) relatively quickly. At least one processor may transmit a delta to one or more additional device prior to and/or while updating a copy of a routing table based on the delta.

Some disclosed embodiments involve updating the plurality of copies of the routing table rendering the plurality of copies of the routing table synchronized. Updating refers to revising and/or changing to reflect a more recent (e.g., current) state. Updating a plurality of copies of a routing table may include adding data, indicated in a delta for addition, to multiple copies of the routing table, and/or removing data, indicated in a delta for removal, from multiple copies of the routing table. For example, upon receiving a delta, at least one processor of an edge device and/or server may read the contents of the delta and access a current copy of a local routing table. The at least one processor may add to the current copy any content labelled in the delta for addition, remove from the current copy any content labelled in the delta for removal, and modify in the current copy any content labelled for modification. By way of example, a delta may include an IP address for a first device added to a network, an IP address for a second device removed from a network, and/or a change in priority associated with a user. At least one processor may add an entry with the IP address for the first device, remove an entry with the IP address for the second device, and modify an entry associated with the user. The same or substantially similar operations may be performed at each edge device and each server upon receiving a delta, such that any changes indicated in the delta may be implemented across different local copies of the routing table across the network. Rendering the plurality of copies of the routing tables synchronized refers to resulting in, and/or causing substantial uniformity and/or consistency between the plurality of copies of the routing tables, e.g., across the network. Performing the same or substantially similar operations (e.g., adding, removing, and/or changing one or more entries) at each edge device and each server (e.g., within a time threshold) may result in substantial consistency between local copies of the routing table across the network, causing the copies to be synchronized, as described earlier. Thus, a connectivity change detected by a first device may trigger transmission of a plurality of associated deltas to a plurality of devices across the network (or a portion thereof), causing updates (e.g., additions, removals, and/or modifications) corresponding to the connectivity change to be implemented in a plurality of copies of the routing table. As a result, queries to the multiple copies of the routing table may return substantially consistent responses.

By way of a non-limiting example, in FIG. 4, at least one processor (e.g., processor 102) associated with network 300 may distributing delta 514 to the plurality of locations across the distributed server clusters and the plurality of edge devices to thereby update the plurality of copies of the routing table rendering the plurality of copies of the routing table synchronized. For instance, the at least one processor may distribute delta 514 across server clusters 302 and 304 and edge devices 318, 406, and 336 to update copies 400 and 402 of the routing table, respectively. In FIG. 5A, in some embodiments, delta 514 may include the entire row 520. In some embodiments, delta 514 may only include the Name cell in row 520.

By way of another non-limiting example, FIG. 5C illustrating exemplary updated copies 400 and 402 of the routing table at a third time period after updating based on delta 514, rendering the copies synchronized, consistent with some disclosed embodiments. Upon receiving delta 514 from server 312, at least one processor of server cluster 304 and/or associated with an SD-WAN controller may update copy 402 of the routing table based on delta 514. For instance, the at least one processor may apply delta 514 to change the IP address in name field 500 of row 524 from the IP address for edge device 324 to the IP address for edge device 406 (e.g., see change 528 based on delta 514). Copies

400 and 402 of the routing table may now both list the IP address for edge device 406 as the source for the routes presented in row 520 of copy 400 and in row 524 of copy 402. As a result of the update, copies 400 and 402 of the routing table may now be synchronized.

Some disclosed embodiments involve associating the delta with at least one particular edge device. This may be understood to mean identifying, recording, noting, connecting, linking, or matching a delta with at least one specific edge device. For example, a relationship and/or relevance between a delta and a specific edge device may be identified. At least one processor may associated a delta with a particular edge device, for example, if the connectivity change is experienced by the particular edge device and/or by a different device connected to the particular edge device. For instance, at least one processor of a mobile phone may pair with a printer and detect a connectivity change. The at least one processor may update a copy of the routing table in association with the particular edge device, e.g., by adding an entry for the printer connected to the mobile phone. By way of another example, a delta may be associated with a particular edge device if the particular edge device experiences a connectivity changes, e.g., a location of a mobile phone may change, causing the mobile phone to offboard from one network associated with a first server cluster and onboard to a different network associated with a second server cluster. At least one processor may associated the offboarding from the network associated with the first server cluster and the onboarding to the network associated with the second server cluster with the mobile device (e.g., via a device identifier).

Some disclosed embodiments involve determining a subset of the plurality of distributed server clusters communicatively associated with the at least one particular edge device. Communicatively associated refers to linked, joined, and/or otherwise involved in a (e.g., virtual, and/or logical) path and/or route for exchanging data in a network. By way of example, a first device and a second device may be physically linked together (e.g., via one or more networked devices) but may lack a logical path enabling data to flow therebetween. A routing table associated with the first and/or second device may lack routing information (e.g., an IP address) enabling data to reach the second and/or first device, respectively. In such a case, the first device may not be communicatively associated with the second device, and the reverse (e.g., despite existence physical links). Establishment of a logical path between the first device and the second device e.g., by adding to one or more associated routing tables, may enable an exchange of data and establish a communicative association. In some embodiments, two or more devices may be communicatively associated if a network distance between the two or more devices is within a threshold value. At least one processor may measure a network distance as a maximal path length, a maximal number of hops, a maximal average round-trip time (RTT), a maximal geographic distance (e.g., a Euclidian distance and/or geodesic distance), and/or any other distance measure. In some embodiments, communicative association between two devices may include a probabilistic distance and/or a time period in a network distance, e.g., a probability that a particular edge device may send/receive data to/from a server cluster within the time period. At least one processor may determine such a probability by analyzing past network behavior, tracking network traffic patterns, applying a predictive model, and/or any other technique. In some embodiments, at least one processor may employ an AI agent to determine a probabilistic distance between a particular edge device and a server cluster, e.g., a probability that a particular edge device may communicate with a server cluster. Determining a subset of the plurality of distributed server clusters communicatively associated with the at least one edge device refers to identifying at least one first server cluster communicatively associated with the at least one edge device and including that first server cluster in the subset. It may also involve identifying at least one second server cluster lacking communicative association with the at least one edge device and excluding the at least one second server cluster from the subset. By way of example, at least one processor may identify an entry for a particular edge device associated with first server cluster in a copy of a routing table and include the first server cluster in the subset. The at least one processor may identify that another copy of a routing table associated with a second cluster lacks an entry for the edge device and may exclude the second server cluster from the subset. As another example, if a probabilistic distance between an edge device and a first server cluster is below a threshold level, at least one processor may include the first server cluster in the subset. Conversely, if a probabilistic distance between an edge device and a second server cluster is above a threshold level, at least one processor may exclude the second server cluster from the subset.

In some disclosed embodiments, distributing the delta includes sending the delta to the subset and avoiding transmission of the delta to at least some of the plurality of distributed server clusters outside the subset. Sending the delta to the subset refers to transmitting the delta to each server and/or server cluster included in the subset. For instance, at least one processor may send the delta (e.g., in a packet) to a server cluster included in a virtual and/or logical path for the particular edge device, and/or within a threshold network distance of the particular edge device. Avoiding transmission of the delta to at least some of the plurality of distributed server clusters outside the subset refers to omitting transmission of the delta to one or more server clusters excluded from the subset. For instance, at least one processor may avoid sending the delta to server cluster omitted from a logical path to the particular edge device, and/or beyond a threshold network distance of the particular edge device. Consequently, server clusters included in the subset may receive the delta and update respective copies of the routing table based on the delta. Conversely, server clusters excluded from the subset may not receive the delta and may omit updating copies of the routing table based on the delta. Thus, only server clusters included in a logical path to the particular edge device, and/or within a threshold network distance may receive the delta for updating local copies of the routing table, whereas server clusters omitted from any logical paths to the particular edge device and/or beyond the threshold network distance may not receive the delta for local updating copies of the routing table. This may prevent the delta from being sent to server clusters that are remote and/or unrelated (e.g., unlikely to communicate) with the particular edge device, which may conserve network resources and improve network performance.

In some disclosed embodiments, at least some of the plurality of copies of the distributed routing table differ from other of the plurality of copies of the distributed routing table. This may be understood to mean that different copies of the routing table may not match. For example, a first copy of the routing table (e.g., associated with a first server cluster) may include routing information relevant only to a first subnet of a network and a second copy of the routing table (e.g., associated with a second server cluster) may include routing information relevant only to a second subnet of a network. The first copy and the second copy may include some common entries, e.g., for locations for which it is highly likely to receive traffic from the first and second server clusters. However, the first copy may include routing information relevant only to the first subnet and may be excluded from the second copy. Similarly, the second copy may include routing information relevant only to the second subnet and may be excluded from the first copy. Consequently, the size of the copies of the routing tables may be smaller than had all the copies of the routing tables been identical. A smaller routing table may improve search time, and may require fewer resources, e.g., for storage, maintenance, and/or processing.

In some disclosed embodiments, the at least some of the plurality of distributed server clusters outside the subset include all of the plurality of distributed server clusters outside the subset. This may be understood to mean that the delta may only be transmitted to server clusters included within the subset and may not be transmitted to a server cluster excluded from the subset. For example, only server clusters within the subset (e.g., including a logical and/or virtual link to the particular edge device, and/or within a threshold network distance to the particular edge device) may receive the delta. Server clusters excluded from the subset (e.g., lacking a logical and/or virtual link to the particular edge device, and/or beyond a threshold network distance to the particular edge device) may not receive the delta. Consequently, only copies of the routing table associated with the subset may be updated based on the delta, and copies of the routing table lacking an association with the subset may not be updated based on the delta. This may avoid overhead, and costs associated with transmitting to the delta to remote and/or non-relevant locations and/or updating associated copies of a routing table. In other words, in some embodiments, synchronization of the routing table may be limited to server clusters deemed and/or predicted to be relevant, e.g., based on identified and/or predicted communication links between end points.

By way of a non-limiting example, in FIG. 4, at least one processor (e.g., processor 102 of FIG. 1) may associate delta 514 with edge device 324 (e.g., having undergone a connectivity change to edge device 406). The at least one processor may determine a subset 414 including only server clusters 302 and 304 of the plurality of distributed server clusters 302, 304, and 306 communicatively associated with edge device 324. The at least one processor may distribute delta 514 by sending delta 514 to server clusters 302 and 304 and avoiding transmission of delta 514 to server cluster 306 outside subset 414. For instance, copy 404 of the routing table for server cluster 306 may lack routing information relevant to edge device 324 and thus may not require an update. Since copies 400 and 402 of the routing table include routing information associated with edge device 324, delta 514 may be sent to server clusters 302 and 304. In FIG. 5A, copy 400 of the routing table may differ from copy 402 of the routing table. For instance, copy 402 for server cluster 304 includes row 522 for edge device 336, whereas copy 400 for server cluster 302 lacks a row for edge device 336. In some embodiments, server cluster 306 external to subset 414 may include all of the plurality of distributed server clusters outside subset 414.

Some disclosed embodiments involve predicting that at least one additional server cluster not communicatively associated with the at least one particular edge device may later become communicatively associated with the at least one particular edge device and transmitting the delta to at least one additional server cluster. At least one additional server cluster not communicatively associated with the at least one particular edge device refers to another server cluster lacking a virtual and/or logical link to the particular edge device, and/or beyond a network threshold distance from the particular edge device. For instance, a server cluster excluded from the subset described above may not be communicatively associated with the at least one edge device. Predicting refers to forecasting, inferring, projecting, and/or estimating. Predicting may include analyzing a history of behavior to identify one or more patterns and using one or more identified patterns to make one or more inferences and/or extrapolations about subsequent events. Later refers to subsequently, e.g., at a future time period. Predicting that at least one additional server cluster not communicatively associated with the at least one particular edge device may later become communicatively associated with the at least one particular edge device may be understood to mean projecting that a server cluster lacking a logical and/or virtual path to the at least one particular edge device and/or beyond a network threshold distance may establish a logical and/or virtual path to the at least one particular edge device and/or may be within a network threshold distance at a future time period. For instance, analysis of a history and/or pattern of network behavior may indicate that the particular edge device may request to access a network resource associated with the additional server cluster. Transmitting the delta to at least one additional server cluster refers to sending the delta to at least one server in the cluster enabling the at least one server to distribute the delta to additional servers in the server cluster. Consequently, copies of routing tables associate with the additional server cluster may be updated based on the delta. For example, an entry associated with the particular edge device (e.g., including an IP address of the particular edge device) may be added to copies of routing tables associate with the additional server cluster. The added entry for the particular edge device may permit subsequent communication between the particular edge device and the additional server cluster.

By way of a non-limiting example, in FIG. 3, at least one processor of network 300 (e.g., processor 102 of FIG. 1) may predict that server cluster 306 not communicatively associated with edge device 318 may later become communicatively associated with edge device 318 and may transmit delta 514 to server cluster 306. For instance, the at least one processor may predict that it may be more efficient to route network traffic between edge device 318 and ISP 214 via server cluster 306 instead of via server cluster 304 due to foreseeable changes in traffic patterns. The at least one processor may transmit delta 514 to server cluster 306 so that copy 404 of the routing table may be updated accordingly. At least one processor may add an entry for edge device 318 to copy 404 of the routing table to permit subsequent routing of network traffic between edge device 318 and ISP 214 via server cluster 306.

Figure 6:
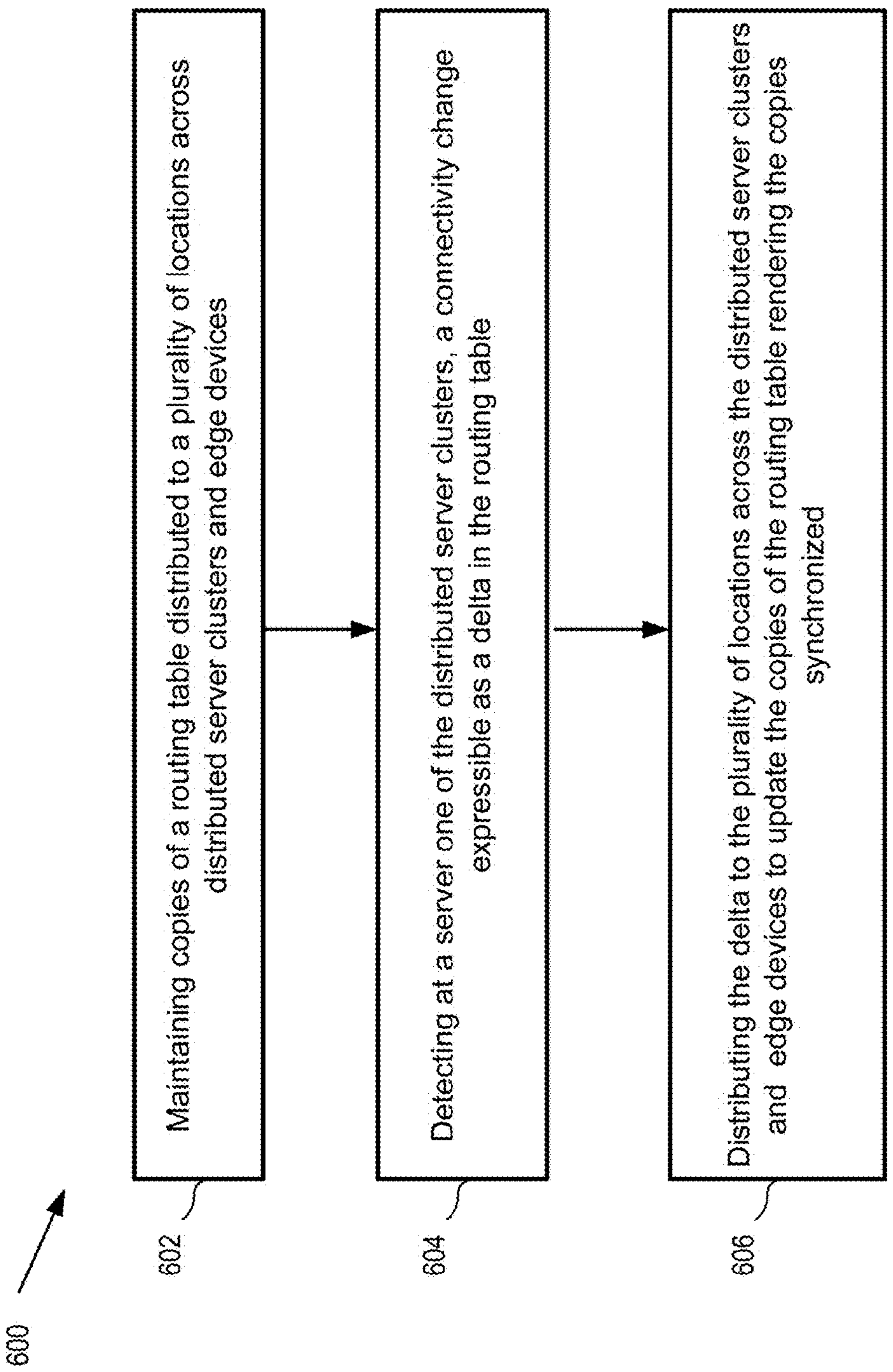
FIG. 6 is a flowchart of example process for performing network synchronization operations in a network containing a plurality of distributed server clusters connected to a plurality of edge devices, consistent with some disclosed embodiments.

FIG. 6 is a flowchart of example process 600 for performing network synchronization operations in a network containing a plurality of distributed server clusters connected to a plurality of edge devices, consistent with some disclosed embodiments. In some embodiments, process 600 may be performed by at least one processor (e.g., processor 102 in FIG. 1) to perform operations or functions described herein. In some embodiments, some aspects of process 600 may be implemented as software (e.g., program codes or instructions) that are stored in a memory (e.g., memory 104) or a non-transitory computer readable medium. In some embodiments, some aspects of process 600 may be implemented as hardware (e.g., a specific-purpose circuit). In some embodiments, process 600 may be implemented as a combination of software and hardware.

Referring to FIG. 6, process 600 may include a step 602 of maintaining a plurality of copies of a routing table, the plurality of copies of the routing table being distributed to a plurality of locations across the distributed server clusters and the plurality of edge devices. By way of a non-limiting example, in FIG. 4, at least one processor (e.g., processor 102 in FIG. 1) may maintain plurality of copies 400, 402, and 404 of a routing table, the plurality of copies 400, 402, and 404 of the routing table may be distributed to plurality of locations 408, 410, and 412 across distributed server clusters 302, 304, and 306, respectively, and plurality of edge devices 318, 324, and 336.

Process 600 may include a step 604 of detecting at one or more servers in the plurality of distributed server clusters, a connectivity change, the connectivity change being expressible as a delta in the routing table. By way of a non-limiting example, in FIG. 4, at least one processor (e.g., processor 102 in FIG. 1) may detecting, at server 312 in plurality of distributed server clusters 302, 304 and 306, a connectivity change. For instance, the at least one processor may detect that edge device 324 disconnected from network 300 and edge device 406 established a new connection. In FIG. 5B, the connectivity change may be expressible as delta 514 in copy 400 of the routing table.

Process 600 may include a step 606 of distributing the delta to the plurality of locations across the distributed server clusters and the plurality of edge devices to thereby update the plurality of copies of the routing table rendering the plurality of copies of the routing table synchronized. By way of a non-limiting example, in FIG. 4, at least one processor (e.g., processor 102 in FIG. 1) may distribute the delta 514 to at least locations 408 and 410 across distributed server clusters 302, 304, and 306 and plurality of edge devices 318, 3-111, and 336 to thereby update the plurality of copies 400 and 402 of the routing table rendering the plurality of copies 400 and 402 of the routing table synchronized. In FIG. 5C, upon receiving delta 514 at server cluster 304, at least one processor may update copy 402 of the routing table by replacing the IP address for edge device 324 with the IP address for edge device 406, such that copies 400 and 402 of the routing table are synchronized.

In a SASE network, automatic connection decisions may be made between edge devices and servers. Such decisions may be made when establishing an (e.g., a first) network connection, or to improve performance when a network connection already exists but underperforms to enable transferring to a different server and/or server cluster. Embodiments are disclosed for selecting a server by probing for a list of candidates, testing at least some of the candidates by sending probe packets, and choosing a server based on the results of the testing.

Some disclosed embodiments involve performing network connection operations. A network refers to a computer network, as described elsewhere herein. A network connection refers to one or more communication channels permitting transfer of data between two or more devices. A network connection may include one or more physical wired and/or wireless channels physically connecting two or more devices and/or one or more virtual and/or logical channels for establishing a communication session between two or more devices (e.g., for a specific time frame). In some embodiments, a network connection may include to a persistent network connection (e.g., using TCP, WebSockets, or HTTP/2 with keep-alive setting) for continuous, bidirectional data exchange without have to repeatedly reconnect. A persistent network connection may maintain data for a session state. Network connection operations refers to functions and/or procedures for establishing connectivity between a plurality of devices in a computer network. For example, network connection operations may include identifying one or more hardware links connecting a plurality of devices in a computer network, locating and/or identifying one or more devices for establishing a communication session, accessing a data structure storing one or more settings and/or parameters for a communication session (e.g., cookies and/or user preferences), implementing one or more communication, encryption, and/or security protocols, establishing one or more communication channels between a plurality of devices for a communication session, updating one or more routing tables, and/or any other operations associated with establishing a network connection.

Some disclosed embodiments involve accessing a cloud service via a client device. A client device may include an edge device, as described elsewhere herein. Such devices may include desktop computers, laptops, smartphones, tablets, smart TVs, printers, smart thermostats, cameras, wearables, other IoT devices, or any other device accessible via a computer network.

A cloud service refers to a computer resource deliverable over a network (e.g., the Internet). For example, a cloud service may refer to any computing resource, functionality, or application that is delivered over the internet, typically hosted on remote servers rather than on local devices. In a SASE network, a cloud service may include a centralized cloud-based management plane for orchestrating policies, identities, network configurations, security rules, and/or additional settings and/or parameters for controlling and/or operating a network. A cloud service may provide Infrastructure as a Service (IaaS), Platform as a Service (PaaS), Software as a Service (SaaS), Functions as a Service (FaaS, or serverless computing), and/or any other resource deliverable over a network. A cloud service may be available on-demand from any networked connection point to a plurality of customers and may be scaled up or down to match changing needs. Some examples of cloud services may include a shared drive, an email client, an office software suite, a streaming service, a navigation application, a weather application, and/or any other resource located in the cloud and accessible via a network connection. In some embodiments, a cloud service may be associated with a queryable data structure and may be accessed using an Application Programming Interface (API) and/or a web dashboard. In some embodiments, a cloud service may output a log associated with network traffic, user activity, security events, policy enforcement, and/or system operations. For example, a cloud service may provide network traffic information, such as one or more source and destination IP addresses, user and/or device identities (e.g., usernames, device identifiers or IDs, Media Access Control or MAC addresses), one or more applications in use, a destination domain and/or Universal Resource Locator (URL), a port and/or protocol identifier (e.g., TCP/443 or UDP/53), an action taken, a number of bytes sent and/or received, and/or a duration of a connection and/or associated timestamp, and/or any other information indicative of a state of a network. A cloud service may additionally provide security information, such as data related to threat detection, an Intrusion Detection System (IDS) and/or Intrusion Prevention System (IPS), a firewall action (e.g., a blocked port, scan, and/or rule match), a ZTNA decision, Data Loss Prevention (DLP) violations, and/or an outcome of a sandbox simulation. A cloud service may additionally provide identity and/or access information, such as user logins and/or logouts, authentication methods, role and/or policy assignments, access requests, and/or session initiation and/or termination events. A cloud service may further provide data associated with policy enforcements, such as a list of applied access control policies, enforced security policies, traffic steering decisions, routing decisions, and/or violations and/or exceptions. A cloud service may further provide data associated with device and/or account status, configuration changes, firmware and/or software updates, availability, alerts for system failures, track which APIs were called, administrative role changes, and/or audit trails for compliance. This list is not intended to be limiting, and a cloud service may provide additional information and/or services associate with a computer network.

Accessing a cloud service refers to an act of connecting to, entering, gaining entry, communicating with, and/or using applications, data, or infrastructure provided by a cloud service (as previously described). For example, Accessing a cloud service may refer to a process of establishing a network connection—typically over the internet or other network—to utilize computing resources hosted on remote servers managed by a cloud service provider. These resources may include data storage, processing power, software applications, or platform services.

At least one processor associated with a client device may query a cloud service, for example with an IP address to retrieve associated user account and/or device information. In some disclosed embodiments, prior to establishment of a network connection between a client device and a selected server and/or a selection PoP, at least one processor may access a cloud service via an open and/or public network connection (e.g., the Internet). Following the establishment of the network connection to the selected server and/or the selected PoP, subsequent network traffic between the client device and the selected server and/or the selected PoP may flow through the established network connection. In some disclosed embodiments, the established network connection includes a secure tunnel connection. In some embodiments, a client device may access a cloud service by connecting to a server cluster (a PoP) to enter a network platform (e.g., a SASE platform). In some embodiments, a client device may access a cloud service using a software agent. The agent may perform authentication and/or identity checks for the client device, e.g., to comply with security and/or authentication protocols such as ZTNA, to enter the network platform. The network platform may use a Cloud Access Security Broker (CASB) to forward a request from the client device to the cloud service. The request and/or a response to the request may be routed to/from the cloud service from/to the client device via one or more secure paths provided by the network platform, such as via one or more encrypted tunnels. In some embodiments, an agent installed on the client device may access a cloud service using direct-to-cloud access, e.g., by tunneling traffic directly to a server cluster and forwarding the traffic to the cloud service. In some embodiments, a client device may access a cloud service using an edge device (e.g., using an SD-WAN tunnel). In some embodiments, a client device may access a cloud service using a ZTNA-Based Application Access (No Network Access) by authenticating via a browser and/or a ZTNA gateway and/or an API.

In some embodiments, a client device may have an existing network connection with a server and may use the existing network connection to access a cloud service. For example, the existing network connection may fail to meet a threshold level of network performance (e.g., due to server-side load and/or network congestion) and/or may fail to comply with one or more policies. The threshold level may be associated with a particular user, customer, device, application, context, and/or any other consideration. For example, performance of an existing network connection may be satisfactory for a first application (e.g., an email client application) and/or first device (e.g., a handheld device) but may be unsatisfactory for a second application (e.g., a live streaming application) and/or a second device (e.g., a gaming personal computer). As another example, a first network path may comply with a first policy associated with a first customer ID (e.g., for private network use) but may fail to comply with a second policy associated with a second customer ID (e.g., for work-related network use) due to security considerations. As a further example, a first network path may comply with a first policy associated with a first software version but may fail to comply with a second policy associated with a second software version, e.g., following an automated upgrade. Thus, changes in network use, customer ID, user ID, device, application, and/or context may (e.g., automatically) prompt at least one processor to query a cloud service for an alternative network connection to switch from the existing (e.g., suboptimal) network connection with a first server to the alternative (e.g., improved) network connection with a second server. Additionally or alternatively, a client device may query a cloud service to establish a first network connection, prior to establishing a connection to a network (e.g., absent an existing network connection).

Accessing a cloud service via a client device may involve establishing a network connection between the client device and at least one server for connecting to a cloud service and/or accessing the cloud service, either directly or indirectly. In some embodiments, at least one processor associated with a client device may access a cloud service using an API, and/or a dashboard (e.g., a user interface). In some embodiments, a client device may initiate a network connection to access a cloud service, e.g., by querying the cloud service. In some embodiments, a cloud service may push data to a client device, thereby causing the client device to access the cloud service, e.g., based on a schedule and/or an event trigger. Some client devices (e.g., mobile devices) may access cloud services through apps and/or applications that synchronize data across multiple platforms, for example, to ensure continuous access to files, emails, and/or business tools from anywhere.

In some disclosed embodiments, a cloud service contains real-time network information including at least two of a real-time server load for a plurality of network servers, real-time server capacity for the plurality of network servers, at least one customer preference, or geolocation IP. Network servers (e.g., servers) may be understood as described elsewhere herein. Real-time refers to a time window satisfied quickly enough to influence or reflect current conditions as they happen. Real-time network information refers to characteristics, properties and/or attributes associated with a current state of a network. Real-time network information may be updated concurrently as a current state of a network changes dynamically over time. Such changes may include, for example, addition and/or removal of one or more subnetworks (subnets) and/or network nodes (e.g., servers and/or edge devices), changes in demand for cloud services, changes in traffic patterns, changes in traffic congestion at one or more particular network nodes and/or paths, changes in security and/or authentication procedures and/or policies, changes in susceptibility to one or more threats and/or vulnerabilities, and/or any other change affecting a state of a network. A cloud service may orchestrate operations in a network and may store information associated with a state of the network at a given point in time. Such state information may include a current network topology, one or more policies currently enforced, current and/or predicted traffic patterns, and/or any other information associated with operating a network, as described above. A real-time server load refers to a measure of work that a server may be experiencing at a current instant in time and/or as an average over a time period. Real-time server load may be based on a number of devices connected to a server, how much processing, memory, and/or channel bandwidth is utilized, a length of one or more queues (e.g., task and/or messaging queues), status of one or more memory buffers, and/or any other measure of work allocated to a server. Real-time server load for a plurality of network servers refers to a real-time server load for each server of the plurality of network servers indicating a level of availability and/or lack of availability for each server of the plurality of servers to take on one or more tasks. Real-time server capacity refers to a capability of a server to handle one or more incoming requests and/or process data. Real-time server capacity may include a maximum amount of data and/or processing that a server may handle for a current level of available processing power, storage space, and/or network bandwidth. Real-time server capacity may be measured over a relatively short timeframe, such as in milliseconds or microseconds, and/or over longer periods of time (e.g., as an average). Real-time server capacity for the plurality of network servers refers to a real-time server capacity for each server of the plurality of network servers and may indicate which servers have capacity to take on additional tasks, and which servers are operating at or near capacity and cannot take on additional tasks. A customer preference refers to an individual choice and/or taste of a user when interacting with a network and/or an associated service. A customer preference may affect how a client device accesses a network, which resources may be accessed, what policies are enforced, a quality of service measure (e.g., bandwidth and/or resolution), and/or any other parameter and/or setting that may affect a user experience. Some examples of customer preferences may include a specific network protocol, choice of wired or wireless connection, a security and/or privacy setting (e.g., two-factor authentication and/or OAuth login), an encryption standard, one or more network performance metrics (e.g., criteria for maximal speed, minimal latency, and/or maximal reliability), and/or a preferred server and/or server cluster (e.g., based on language and/or geographic location). A Geolocation IP (GeoIP) refers to a service (e.g., a cloud service) that uses an IP address to determine an approximate geographical location of a device and/or user. A GeoIP may include a table mapping a plurality of IP addresses to physical (e.g., geographical) locations, such as countries, regions, cities, and/or campuses. At least one processor may query the GeoIP with a specific IP address and receive a geographic location associated with the specific IP address in response. At least one processor may use the geographical location to select a server and/or server cluster for connecting to a client device and/or an edge device based on one or more considerations, such as a user preference, physical proximity, language, locally enforced regulations and/or policies, available technical support and/or backup systems, and/or any other location based consideration.

Figure 7A:
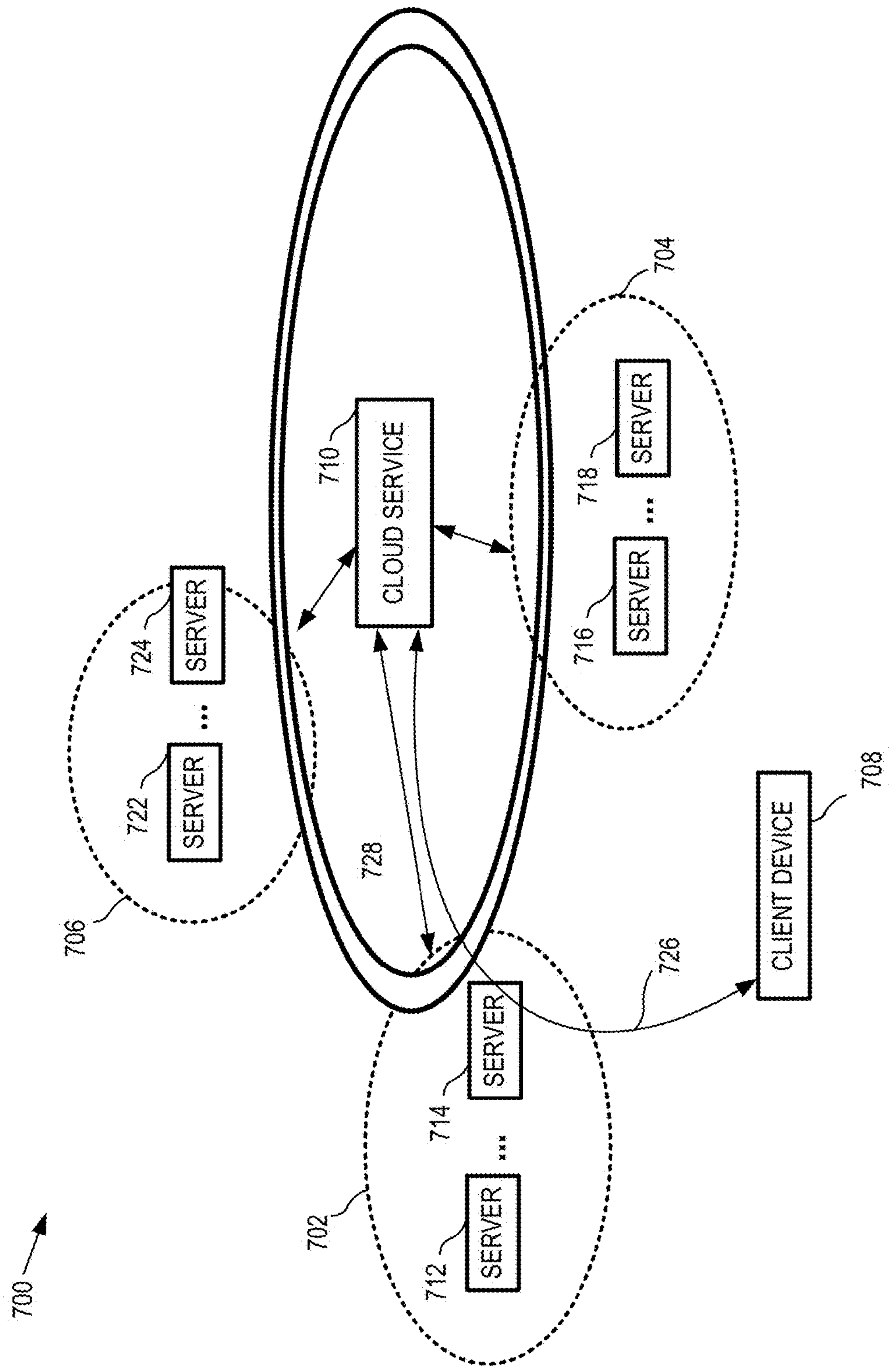
FIG. 7A is an exemplary schematic diagram of a network for performing network connection operations, consistent with some disclosed embodiments.

By way of a non-limited example, reference is made to FIG. 7A which illustrates an exemplary schematic diagram of network 700 for performing network connection operations, consistent with some disclosed embodiments. Network 700 may correspond to network 300 shown in FIGS. 3-4. Network 700 may include a plurality of server clusters, 702, 704, and 706 (e.g., corresponding to server clusters 302, 304, 306), at least one client device 708, and a cloud service 710. Cloud service 710 may be associated with network 700 or may be external to network 700. In some embodiments, network 700 may be a SASE network. Server clusters, 702, 704, and 706 may be connected via a backbone 728 and may connect to a cloud service 710 (e.g., via one or more additional servers and/or networks). Cloud service 710 may include as least one memory and an associated processor (e.g., memory 104 and processor 102 in FIG. 1). Each of server clusters 702, 704, and 706 may include a plurality of servers. Server cluster 702 may include at least a server 712 and a server 714, server cluster 704 may include at least a server 716 and a server 718, and server cluster 706 may include at least a server 720 and a server 722. In some embodiments, client device 708 may access cloud service 710 via network 700. For instance, client device 708 may have an agent installed thereon, and the agent may establish a secure tunnel 726 to cloud service 710 via server 714 of server cluster 702. Cloud service may contain real-time network information including a real-time server load and real-time server capacity for network servers 712, 714, 716, 718, 722, and 724, at least one customer preference (e.g., associated with client device 708). Cloud service may additionally provide a geolocation IP service for physically locating any of servers 712, 714, 716, 718, 722 and/or client device based on an associated IP address.

Some disclosed embodiments involve receiving from a cloud service identities of a plurality of candidate servers from among the plurality of network servers. Receiving may be understood as described elsewhere herein. An identity as used herein refers to distinguishing information that specifies a particular entity, device, network, component (e.g., such as a server) or other item. An identity may include a unique code (e.g., a device identifier), an account name, a device name, a username, a network address (e.g., IP address), MAC address, hostname, digital certificate, ssl/tls certification, a biometric code, a unique identifier, and/or any other distinguishing information permitting to pinpoint and/or access a particular device from a plurality of devices. A candidate server refers to a possible, prospective, and/or potential server for establishing a network connection. Some servers in a network may be available while others are not, may offer better service to a specific client device than other servers, or may otherwise be preferred or selectable for other reasons. At least one processor associated with a cloud service may evaluate a plurality of servers in a network to determine candidates for establishing a network connection with the client device (e.g., based on one or more of availability, expected performance, and/or compliance measures) and transmit the identities to the client device. In some embodiments, the transmission of the identities to the client device may occur via the same channel used to access the cloud service described above. In some embodiments, a client device may prompt a cloud service for identities for a plurality of candidate servers, e.g., by querying the cloud service and receiving the identities in response. For example, the client device may prompt the cloud service to initiate a new network connection, to switch an existing, (e.g., underperforming) network connection to an updated network connection expected to improve performance, and/or for any other consideration. In some embodiments, a cloud service may push identities of a plurality of candidate servers to a client device (e.g., absent prompting by the client device), for example, based on a schedule, an expectation that the client device will imminently request to connect to a network, an indication that an existing network connection is underperforming, and/or any other consideration. In some embodiments, a client device may receive identities for a plurality of candidate servers using a software agent installed on the client device. For example, the software agent may be configured to initiate new network connection by querying the cloud service, monitor an existing network connection and prompt the cloud service for an updated network connection when the existing network connection fails to meet one or more criteria, and/or receive a push notification from the cloud service with identities for a plurality of candidate servers.

In some disclosed embodiments, based on real-time network information, a plurality of candidate servers meet criteria for potential establishment of a network connection with a client device. Potential establishment of a network connection refers to a possible, and/or conceivable linking of one or more networked devices. A device may be considered as a candidate for establishing a network connection prior to establishment of the network connection subject to meeting one or more criteria. Criteria refers to one or more guidelines, constraints, and/or conditions by which something can be decided on. Meeting criteria refers to satisfying and/or complying with one or more guidelines, constraints, and/or conditions, e.g., for deciding something. Some exemplary criteria that a candidate server might meet for establishing a network connection include availability and/or reachability, expected and/or predicted latency and/or network performance, server load, availability, and/or resource utilization, geographical proximity and/or path length, compliance with one or more performance, security, and/or privacy policies, compatibility, failover capabilities, and/or any other consideration. Availability and/or reachability may be associated with an online status, a reachable IP address, and/or an accessible port. An expected and/or predicted latency and/or network performance may be associated with Round-Trip Time (RTT), packet loss and/or jitter. Server load, availability, and/or resource utilization may be associated with available server bandwidth (e.g., CPU, upload, and/or download bandwidth), CPU and/or memory utilization, a number of concurrent connections, and/or availability of associated services (e.g., databases and/or web servers). Geographical proximity and/or path length may be associated with latency, communication times, and/or routing times. Compliance with one or more performance, security, and/or privacy policies may be associated with authentication capabilities (e.g., access to proprietary APIs), server reputation and/or certification, software versions, and/or support for protocols (e.g., secure sockets layer and transport layer security, or SSL/TLS). Compatibility may be associated with API availability, client software and/or operating system version, and/or support for communication protocols. Failover capabilities may be associated with backup and/or mirroring capabilities, and/or readiness for load balancing. Compliance with policies may be associated with updated Access Control Lists (ACLs), client licensing and/or subscriptions, and/or regulatory compliance, e.g., General Data Protection Regulation (GDPR), and/or Health Insurance Portability and Accountability Act (HIPAA). At least one processor (e.g., associated with a cloud service) may use real-time network information to identify a plurality of servers that meet one or more criteria for establishing a network connection. The at least one processor may propose the identified servers as candidates for establishing a network connection with a client device.

In some disclosed embodiments, the plurality of candidate servers are selected from among the plurality of network servers based on geographical proximity to the client device. Geographical proximity refers to a physical closeness and/or nearness of two or more devices. Geographical proximity may quantify a distance separating two or more devices and may affect communication latency and/or a network architecture. For instance, shorter distances may be associated with faster communication times and the reverse. Similarly, shorter distances may suffice by communicating using a local area network (LAN) and/or fewer hops, and longer distances may require communication using a wide area network (WAN) and/or a greater number of hops.

In some disclosed embodiments, the plurality of candidate servers are selected from among the plurality of network servers based on user preferences. A user preference refers to an individual choice and/or taste of a customer when interacting with a network and/or an associated service. A user preference may include a customer preference, as described earlier. For example, a user preference may include a security preference, such as specific firewall rules, an Intrusion Detection and/or Prevention system, threat protection levels, one or more URL filters, DLP, and/or encryption requirements. A user preference may additionally include an identity and/or access preference, integration with an identity provider, such as multi-factor authentication, role-based access control, ZTNA policies (e.g., per user and/or application), context aware access (e.g., device posture, location and/or time of day), session duration, an authentication protocol, an encryption standard, and/or session timeout settings. A user preference may further include one or more network and/or traffic preferences, such as one or more traffic steering rules (e.g., hub-and-spoke routing and/or direct internet), Application prioritization and QoS (Quality of Service), SD-WAN path selection policies (e.g., choose lowest latency or highest bandwidth), DNS filtering preferences, a network connection type (e.g., wired and/or wireless), and/or split tunneling configurations. A user preference may further include one or more user experience settings, such as a preferred server cluster (PoP), latency and/or bandwidth thresholds, Quality of Service (QoS), resolution quality, and/or caching policies. A user preference may additionally include login preferences, such as a log retention period, a log destination, alert preferences, report schedules and/or formats, and/or anonymization options for privacy.

In some disclosed embodiments, the plurality of candidate servers are selected from among the plurality of network servers based on network load. Network load refers to an amount of work imposed on a network or portion thereof at a given time. Network load may include data traffic (e.g., a volume of network packets and/or a number of active connections) and/or an overall demand on network resources (e.g., demand for processing and/or data). Network load may be managed using one or more load balancing techniques. In some embodiments, a network load may be associated with a network backbone infrastructure providing underlying network connectivity. Network backbone infrastructure may include a plurality of server clusters (PoPs) interconnected by physical communication links, a plurality of edge devices (e.g., connecting to additional networks), one or more security services, and network management using SD-WAN.

In some disclosed embodiments, the plurality of candidate servers are selected from among the plurality of network servers based on communication latency. Communication latency refers to a time delay from when a message is transmitted until the message is received. Communication latency may be indicative of network performance and may impact user experience. In some embodiments, communication latency may be measured as a Round-Trip Time (RTT) for a packet to travel from a sender to a receiver and return back to the sender. Communication latency may be affected by a physical distance separation between two or more devices, a quality and/or speed of network infrastructure connecting two or more devices, network congestion, buffer size and/or capacity, and/or processing times.

By way of a non-limiting example, in FIG. 7A, client device 708 may receive from cloud service 710 identities of candidate servers 712, 714, 716, and 718 from plurality of network servers 712, 714, 716, 718, 722, and 724. In some embodiments, the identities of candidate servers 712, 714, 716, and 718 may include IP addresses for each of candidate servers 712, 714, 716, and 718. Based on the real time network information stored at cloud service 710, candidate servers 712, 714, 716, and 718 may meet criteria for potential establishment of a network connection with client device 708. For example, cloud service 710 may select candidate servers 712, 714, 716, and 718 from plurality of network servers 712, 714, 716, 718, 722, and 724 based on geographical proximity to client device 708 and/or one or more user preferences, e.g., servers 722 and 724 may be excluded due to the distance to client device 708 exceeding a threshold. In some embodiments, cloud service 710 may select candidate servers 712, 714, 716, and 718 from plurality of network servers 712, 714, 716, 718, 722, and 724 based on network load and/or communication latency. For example, cloud service 710 may determine, based on the real-time network information that paths routed through server cluster 706 exceed a latency threshold due to network load.

In some disclosed embodiments, the plurality of candidate servers are selected from among the plurality of network servers based on a local language. A local language refers to a set of vocabulary and/or grammatical rules associated with a geographic location. For example, it may refer to a structured system of communication used to convey meaning, express thoughts, and facilitate interaction between individuals or groups. In some embodiments, a content delivery network (CDN) and/or cloud service may use a local language for a browser installed on a client device as an indication to serve region-specific content and/or to route to a localized endpoint and/or to select a content dictionary for data inspection. For example, at least one processor may select between a first server delivering content in a first language and a second server delivering the same content in a second language based on a language setting of a browser, and/or a geographic location of the client device.

By way of a non-limiting example, in FIG. 7A, cloud service 710 may select candidate servers 712, 714, 716, and 718 from plurality of network servers 712, 714, 716, 718, 722, and 724 based on a local language. For example, client device 708, and server clusters 702, and 704 may be collocated in a first region where a first language is spoken, permitting content delivery to client device 708 in the first language, whereas server cluster 706 may be located in a different region associated with a different language.

In some disclosed embodiments, the plurality of candidate servers are selected from among the plurality of network servers based on server load. Server load refers to an amount of work and/or tasks assigned to a server at a particular point in time or a particular time frame. Server load may be associated with several processes waiting in a queue for processing, and/or an amount of available memory and may indicate availability to take on additional tasks. A higher server load may correspond to slower performance, delays, and/or instability (e.g., due to a timeout).

In some disclosed embodiments, the plurality of candidate servers are selected from among the plurality of network servers based on network traffic predictions. Network traffic predictions refer to one or more forecasts, inferences, and/or extrapolations of future network traffic patterns, e.g., based on a history of traffic patterns or other metrics enabling projections. For example, at least one processor may predict that network traffic may be higher during working hours than at night, peak during a high-impact event (e.g., the Super Bowl, a Presidential Address), and/or decrease over a weekend. Network traffic predictions may include, for example, predictions based on volume, time, anomalies, application-specific predictions, user behavior, topology-aware predictions, security, and/or any other factor affecting network traffic. Volume-based predictions may be associated with bandwidth usage, peak load, and/or throughput estimations. Time-series predictions may be associated with historical traffic data to model traffic patterns over time. Anomaly-based predictions may estimate normal traffic patterns to flag deviations (e.g., spikes, sudden drops, and/or behavioral changes) for intrusion detection, network performance troubleshooting and/or monitoring. Application-specific predictions may be associated with a specific application (e.g., streaming software) and/or introduction of a new application. User behavior-based predictions may be associated with traffic bursts (e.g., logins at 9 AM), traffic estimations from remote versus on-site employees, and/or anticipated access to specific events. Topology-aware predictions may be associated with where network traffic may flow, such as which server clusters and/or data centers may handle the most traffic, bottlenecks (e.g., link saturation), and/or anticipated failover traffic paths. Security-based predictions may be associated with a vulnerability and/or attack, any may include modeling of bot behavior, and/or determining precursors of a Distributed Denial of Service (DDoS) attack. These examples are not intended to be limiting.

By way of a non-limiting example, in FIG. 7A, cloud service 710 may select candidate servers 712, 714, 716, and 718 from plurality of network servers 712, 714, 716, 718, 722, and 724 based on server load and/or network traffic predictions. For instance, based on the real-time network information and/or an AI agent, cloud service 710 may determine that loads on servers 722 and 724 are associated with an expectation that some packets may be dropped.

In some disclosed embodiments, the plurality of candidate servers are selected from among the plurality of network servers based on a history of connectivity with the client device. A history of connectivity with the client device (e.g., connection affinity and/or session persistence) refers to a record of communication sessions between a client device and a particular server. For example, a server may store state information for one or more sessions (e.g., cookies, tokens, session identifiers, IP addresses, user IDs, location, and/or cached content) to associate a user to a specific backend server and/or server cluster. A load balancer may subsequently use this information to maintain application-level continuity, and/or achieve a faster connection time and/or reduce route recalculation time. Routing a specific device to a specific server based on a previous connection to the server may also avoid having to update a routing table. In some embodiments, an agent (e.g., an AI agent) may user a history of connectivity with a client device to learn which server cluster performs better for different users, applications, and/or regions. The agent may use the history to adjust a route based on success rates, latencies, and/or error patterns, and may preemptively steer traffic away from server clusters associated with network issues. In some embodiments, a history of connectivity with a client device may permit faster reconnections to a previously accessed server based on one or more previously authenticated sessions. The history may be used to determine a trust level and/or device posture associated with the client device for selecting a server and/or server cluster for subsequent reconnections.

By way of a non-limiting example, in FIG. 7A, cloud service 710 may select candidate servers 712, 714, 716, and 718 from plurality of servers 712, 714, 716, 718, 722, and 724 based on a history of connectivity with client device 708. For example, based on previously established network connections, each of servers 712, 714, 716, 718, 722 may store information associated with client device 708 facilitating subsequent communication sessions, whereas servers 722 and 724 may lack this information. Consequently, establishing a network connection between client device 708 and server 722 and/or 724 may require more overhead (e.g., to establish trust) and cloud service 710 may omit servers 722 and 724 from the plurality of candidate servers.

Some disclosed embodiments involve transmitting probe packets from a client device to at least some of a plurality of candidate servers. Transmitting may be understood as described elsewhere herein. A probe packet refers to a unit of data sent from one device to another device for testing, measuring, and/or discovering characteristics of a network path. A probe packet may be used for diagnostics, performance assessment, and/or path selection. A probe packet may have a minimal data payload, may include a header to distinguish the probe packet from regular network traffic, and/or may comply with a specific protocol. A probe packet may be used, for example, to determine if a device is reachable, to measure latency (e.g., RTT), to estimate available bandwidth, to discover and/or trace a network path, to detect a firewall type, to detect packet loss and/or jitter, and/or to select a server from a plurality of candidate servers, e.g., based on any of the criteria described herein. At least one processor associated with a client device (e.g., via an agent installed thereon) may send at least one probe packet to at least some of the candidate servers included in the plurality of identities received from the cloud service. The probe packet may be sent using a non-persistent network connection, e.g., as a one-off request for checking availability, latency, and/or health of a server using HEAD and/or GET HTTP request. For instance, the at least one processor may send at least one probe packet to any candidate server ranked above a threshold value, and/or select the first N candidate servers for sending one or more probe packets. In some embodiments, at least one processor may send a probe packet to each of the candidate servers. In some embodiments, at least one processor may transmit a series of probe packets to two or more candidate servers, e.g., in succession. Each probe packet of a series of probe packets sent to a particular server may be sent independently of the other probe packets in the series. In some embodiments, at least one processor may send at least three, at least four, at least five, at least six, or at least seven probe packets. The probe packets in the series may be sent at regular or irregular intervals. For instance, probe packets in a series may be sent at less than 1 second, 1 second, 2 second, 3 second, 4 second, 5 second, or longer intervals, or any combination thereof. In some embodiments, a pattern associated with a series of probe packets transmitted to a server may be compared with a pattern associated with responses to the series of probe packets, e.g., to identify communication attributes associated with delays, latency, packet loss, jitter, traffic congestion, and/or any other communication attributes.

Figure 7B:
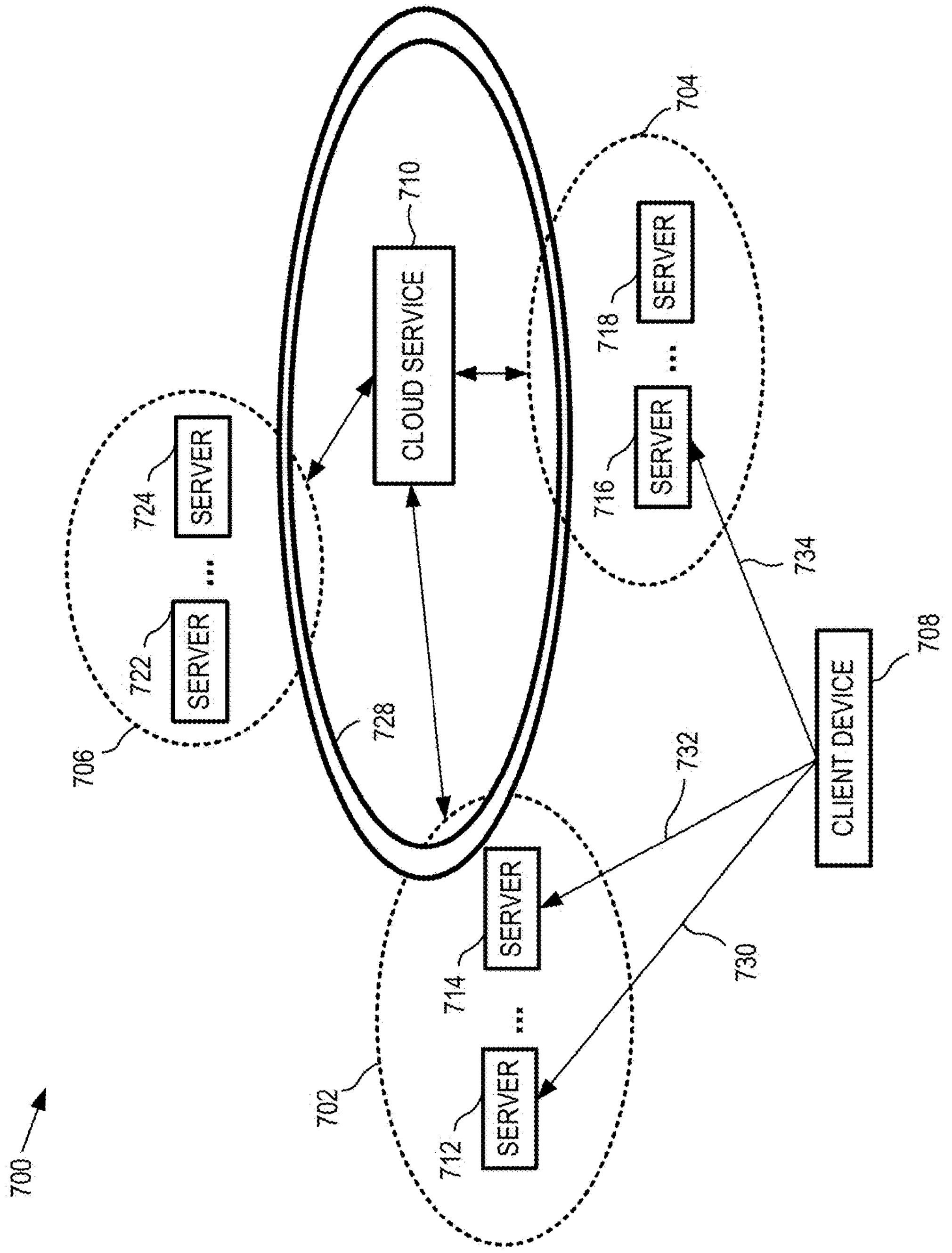
FIG. 7B is another exemplary schematic diagram of the network of FIG. 7A for performing network connection operations, consistent with some disclosed embodiments.

By way of a non-limiting example, reference is made to FIG. 7B which illustrates another exemplary schematic diagram of network 700 for performing network connection operations, consistent with some disclosed embodiments. In FIG. 7B, client device 708 may transmit probe packets 730, 732, and 734 to candidate servers 712, 714, and 716, respectively, of the plurality of candidate servers 712, 714, 716, and 718. For example, client device 708 may omit server 718 due to a lack of a history of connectivity with server 718, whereas client device 708 may have access to a history of connectivity with candidate servers 712, 714, and 716. In some embodiments, each of probe packets 730, 732, and 734 may include a single probe packet. In some embodiments, each of probe packets 730, 732, and 734 may include a series of probe packets.

Some disclosed embodiments involve receiving responses to probe packets. Receiving may be understood as described elsewhere herein. A response to a probe packet refers to a reply generated in response to receipt of a probe packet. For example, the response may itself be a packet or unit of data. A response to a probe packet may be received from a device (e.g., a server) targeted by the probe packet. A response to a probe packet may include a packet confirming receipt by a targeted device, e.g., as an acknowledgement or ACK packet and/or an Echo packet and may include a timestamp and/or a delay measurement. A response to a probe packet may confirm that a targeted device supports one or more protocols and/or standards, and/or complies with one or more policies. In some embodiments, a response to a probe packet may include data associated with a network path and/or one or more network nodes. In some embodiments, a response to a probe packet may include a negative acknowledgement (NACK) packet, and/or a timeout message indicating that a targeted device may be unreachable, and/or that the probe packet and/or the response to the probe packet was dropped (e.g., due to congestion and/or a firewall). A targeted device may be unreachable, for example, if the device is offline and/or powered off and/or if a port is closed. At least one processor associated with a client device may receive responses to at least some of the probe packets sent to at least some of the candidate servers. A client device may receive a series of responses from a particular server in response to transmitting a series of probe packets and/or a single response in response to transmitting a single packet. The client device may analyze a series of responses to determine communication characteristics associated with the particular server and/or server cluster (e.g., if and/or how many packets were dropped, and/or a pattern of response times). In some embodiments, a client device may receive a single response (e.g., a NACK or timeout message) in response to transmitting a series of probe packets indicating that a server is non-responsive or that a packet was dropped. In some embodiments, sending a probe packet and/or receiving a probe packet to/from a candidate server avoids implementation of some procedures and/or protocols.

Figure 7C:
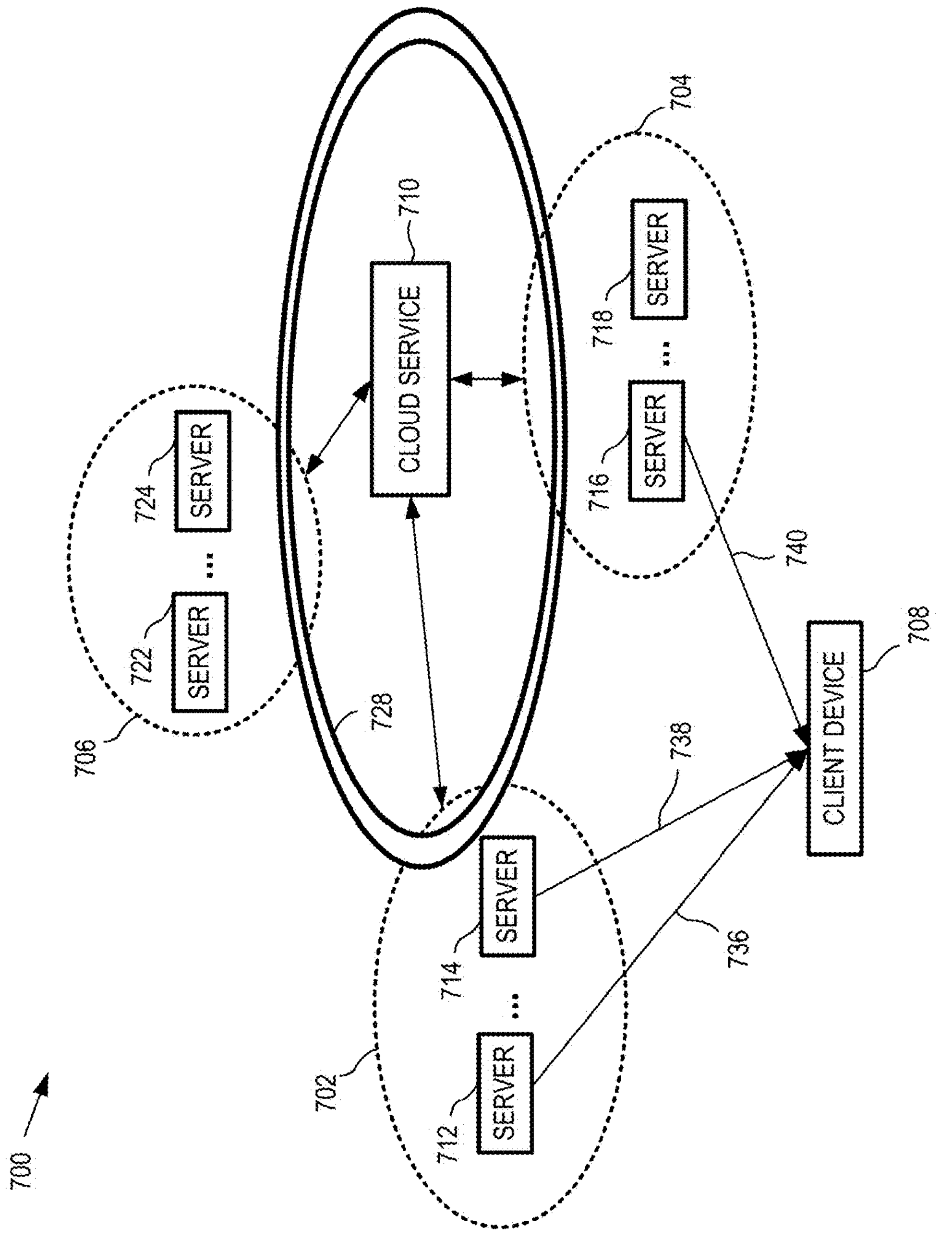
FIG. 7C is another exemplary schematic diagram of the network of FIG. 7A for performing network connection operations, consistent with some disclosed embodiments.

By way of a non-limiting example, reference is made to FIG. 7C illustrating another exemplary schematic diagram of network 700 for performing network connection operations, consistent with some disclosed embodiments. In FIG. 7C, client device 708 may receive from candidate servers 712, 714, and 716, responses 736, 738, and 740 to probe packets 730, 732, and 734, respectively. Responses 736, 738, and 740 may include a single response, e.g., in response to a single probe packet or a series of responses in response to a series of probe packets.

Some disclosed embodiments involve determining from responses communication characteristics for at least some of the transmitted probe packets. Determining may be understood as described elsewhere herein. Communication characteristics refer to attributes and/or properties associated with a route for sending and/or receiving network traffic. The communication characteristics may be associated with one or more of performance, efficiency, security, compliance and/or any other metric and/or policy associated with transmitting, receiving, and/or responding to a probe packet. The communication characteristics may be associated with one or more of a candidate server, a router, a path, and/or any other network component. The communication characteristics may indicate which of the candidate servers may be expected to provide improved or worse network service to the client device and may facilitate in selecting one of the candidate server for establishing a network connection. Determining communication characteristics for some of the probe packets from the responses may involve performing computations based on data included in and/or associated with the responses to the probe packets. The communication characteristics may be determined for a single probe packet based on a single response or for a series of probe packets based on a series of responses. By way of example, a timestamp included in a response to a probe packet may be used to determine latency (e.g., RTT) and/or available bandwidth along one or more network paths. In some embodiments, at least one processor and/or an AI agent may perform one or more statistical and/or probabilistic communication characteristics for some of the probe packets based on the responses.

By way of a non-limiting example, in FIG. 7C, at least one processor (e.g., processor 102 in FIG. 1) associated with network 700 and/or client device 708 may determine from responses 736, 738, and 740, communication characteristics for at least some of probe packets 730, 732, and 734, respectively. For example, each of responses 736, 738, and 740 may include a timestamp which may be used to determine latencies associated with probe packets 730, 732, and 734. Additionally or alternatively, one or more of responses 736, 738, and 740 may include a timeout and/or NACK message which may indicate that one or more of probe packets 730, 732, and 734 was dropped.

Some disclosed embodiments involve selecting a server based on determined communication characteristics. Selecting refers to choosing, designating, and/or electing. Based on the communication characteristics determined from the responses to the probe packets, at least one processor associated with a client device may determine that a particular one of the candidate servers is associated with an expected improvement in network service over the other candidate servers and may elect the particular candidate server for establishing a network connection. For example, the communication characteristics may indicate that a particular candidate server is expected to provide a satisfactory user experience, comply with network policies, and/or improve network traffic throughput. In a similar manner, at least one processor may determine that a different candidate server is expected to provide a non-satisfactory user experience, and/or fail to comply with one or more policies and/or performance metrics and may avoid selecting the different candidate server.

In some disclosed embodiments, the determined communication characteristics for selecting the server include user preferences. User preferences may be understood as described elsewhere herein. At least one processor may analyze one or more responses to one or more probe packets to determine which of the candidate servers satisfy or more individual choices and/or tastes of a user of the client device and select a server from those candidate servers. For example, a user preference may indicate a preference for a wired communication channel and/or a minimal bandwidth rate for a streaming application. As another example, a user preference may indicate a preference for complying with one or more privacy and/or authentication regulations, a particular language and/or to avoid routing traffic through a specific region. As a further example, a user preference may indicate a preference for a particular server cluster (e.g., based on geographical proximity) at some times and/or avoidance of a different server cluster at other times (e.g., based on expected load).

In some disclosed embodiments, the user preferences include a location associated with a geolocation IP service. A geolocation IP service refers to technology that maps an IP address to a physical location—such as a country, region, city, ZIP code, or latitude/longitude coordinates. This enables determination of an exact or approximate location of a device based on an IP address, as described elsewhere herein. A location associated with a geolocation IP refers to an exact geographical location, region, or zone for a device associated with an IP address. The location may include a city, a building, a region, a country, a complex, a campus, and/or any other geographic (e.g., physical) position for a device. A user preference may indicate a propensity to connect or to avoid connecting to a network through a specific region, e.g., due to distance, traffic patterns, performance, enforced policies, security, privacy, language, and/or political considerations. For instance, some geographical regions may be associated with higher incidence of privacy and/or security violations, fraud, power outages, and a user preference may specify avoidance of traffic routes through those regions. Other geographical regions may be associated with strict compliance with privacy and/or security regulation, close geographical proximity, and/or network reliability, and a user preference may specify to prioritize routing network traffic through those regions. At least one processor (e.g., associated with a client device) may extract IP addresses from the responses received to the transmitted probe packets, and query a geolocation IP service with the extracted IP addresses to determine locations for at least some of the candidate servers. The at least one processor may determine which of the candidate servers are located in compliance with the user preference and may select a server from those servers.

By way of a non-limiting example, in FIG. 7C, at least one processor (e.g., processor 102 in FIG. 1) associated with network 700 and/or client device 708 may select server 716 of server cluster 704 based on the determined communication characteristics. In some embodiments, the communication characteristics may include user preference, such as a shortest RTT. At least one processor may determine that an RTT for response 740 received from server 716 of server cluster 704 in response to probe packet 734 is shorter than RTTs for responses 736 and 738 received from servers 712 and 714 in response to probe packets 730 and 732, respectively. In some embodiments, a user preference may include a location associated with a geolocation IP service. For example, a user preference for client device 708 may indicate a preference to connect to a server that is geographically closest. Based on locations for servers 712, 714, and 716 determined from a geolocation IP service, the at least one processor may determine that server 716 is closest.

In some disclosed embodiments, the determined communication characteristics for selecting the server include a prediction for meeting a threshold level of network performance. A threshold level refers to a baseline, limit, and/or boundary (e.g., floor or ceiling). A threshold level may be used to make a decision based on a measurement meeting a criteria. An upper threshold may be used to consider candidate servers associated with a performance metric falling below and/or meeting the upper threshold and exclude candidate servers associated with the performance metric exceeding the upper threshold. A lower threshold may be used to consider candidate servers associated with a performance metric exceeding and/or meeting the lower threshold, and to exclude candidate servers associated with the performance metric falling below the threshold. For example, an upper threshold may include latency, RTT, number of packets dropped, number of error messages, and/or number of hops, and a lower threshold may include a throughput rate, bandwidth, and/or available capacity. A network performance threshold level refers to a threshold for one or more metrics describing how a network functions. A network performance threshold may be associated with a metric network efficiency, reliability, speed, security, availability, and/or effectiveness. A prediction for meeting a threshold level of network performance may correspond to network traffic predictions, as described earlier. For example, at least one processor may select a plurality of candidate servers based on network traffic predictions and transmit probe packets to at least some of those candidate servers. The at least one processor may calculate, from communication characteristics determined from the responses to the probe packets, probabilities for at least some of the candidate servers for meeting a threshold level of network performance. In some embodiments, an AI agent may be enlisted to predict which candidate servers may be expected to meet a threshold level of network performance. The at least one processor may select one of the candidate servers based on an expectation of meeting the threshold level of network performance.

In some disclosed embodiments, the threshold level of network performance is associated with communication latency. Communication latency refers to an amount of time for information to travel through a network. Communication latency may include an RTT metric, a data throughput rate (e.g., data transfer rate), bandwidth utilization, an error rate, and/or a network availability metric. In some disclosed embodiments, the threshold level of network performance is associated with packet loss. Packet loss refers to a failure of a packet to reach an intended destination. Packet loss may be caused by network congestion, hardware failures (e.g., defective routers, switches, and/or cables) and/or software failure (e.g., errors and/or bugs), bandwidth limitations, wireless interference, a high bit error rate (BER), unstable channel characteristics, user mobility, and/or any other reason for a device (e.g., a router) to drop a packet. Packet loss may be measured by a frame loss rate, measuring a number of frames that should have been forwarded but were not as a percentage. Packet loss may be associated with a Quality of Service (QoS) metric and may depend on the type of data being sent. Packet loss may be detected by a protocol, such as Transmission Control Protocol (TCP). At least one processor may access a communication latency threshold from memory and select one of the candidate servers based on an expectation of meeting the communication latency threshold. In some disclosed embodiments, the threshold level of network performance is associated with jitter. Jitter refers to fluctuations, variations, and/or inconsistencies in delay and/or latency of data packets travelling from a source to an intended destination. Jitter may indicate that packets arrive at an intended destination at inconsistent intervals, as opposed to arriving as a consistently smooth stream of information. Jitter may be caused by network congestion, routing changes, hardware limitations, and/or network interference, and may impact performance of real-time data streaming applications and/or other real-time communication. At least one processor may access a jitter threshold from memory and select one of the candidate servers based on an expectation of meeting the jitter threshold.

By way of a non-limiting example, in FIG. 7C, at least one processor (e.g., processor 102 in FIG. 1) associated with network 700 and/or client device 708 may select server 716 of server cluster 704 based on the determined communication characteristics including a prediction for meeting a threshold level of network performance. For example, an AI agent installed on client device 708 may predict that communication routed via server 716 may meet a threshold level of network performance, whereas communication routed via servers 712 or 714 may fail to meet the threshold level of network performance. In some embodiments, the threshold level of network performance is associated with communication latency. For example, a latency associated with response 740 may be shorter than latencies associated with responses 736 and 738. In some embodiments, the threshold level of network performance is associated with packet loss. For example, response 736 to probe packet 730 sent to server 712 of server cluster 702 may include a timeout message indicating that probe packet 730 was dropped. In some embodiments, the threshold level of network performance is associated with jitter. For example, probe packet 732 may include multiple probe packets sent in succession, and response 738 may include multiple responses received in succession. At least one processor may analyze timestamps of the multiple successive responses 738 and determine that responses 738 were received at irregular intervals, indicating jitter. Consequently, at least one processor may exclude candidate servers 712 and 714 from consideration and may select server 716 for connecting to client device 708.

Some disclosed embodiments involve establishing a network connection between a client device and a selected server. Establishing a network connection refers setting up, creating, and/or choosing a communications channel. This may involve, for example, setting up, creating, or choosing a communication link between two or more devices over a network, enabling them to exchange data. In one example, a network connection may be established by initiating, negotiating, and confirming the parameters required for successful data transfer. By way of additional examples, establishing a network connection may include configuring a device with an IP address, detecting a wired and/or wireless link, mapping an IP address to a MAC address, initiating a TCP connection, and/or implementing one or more application layer protocols (e.g., Hypertext Transfer Protocol or HTTP, File Transfer Protocol or FTP, and/or Simple Mail Transfer Protocol SMTP). Upon selecting a particular server from the plurality of candidate servers (e.g., based on one or more of the criteria described herein above), at least one processor associated with the client device may establish a network connection with the selected server to exchange network traffic. In this manner, at least one processor of a client device may steer (e.g., direct and/or guide) network traffic through a selected server based on communication characteristics determined from responses to a plurality of probe packets sent to a plurality of candidate servers. At least one processor may select one of the candidate servers based on multiple criteria, such as meeting a communication latency threshold, location within a distance threshold of the client device (geographical proximity), and a history of connectivity (e.g., a trust measure) with the client device. As another example, a candidate server may be selected after ruling out other candidate servers due to expected server load, packet loss, and jitter exceeding a threshold.

Figure 7D:
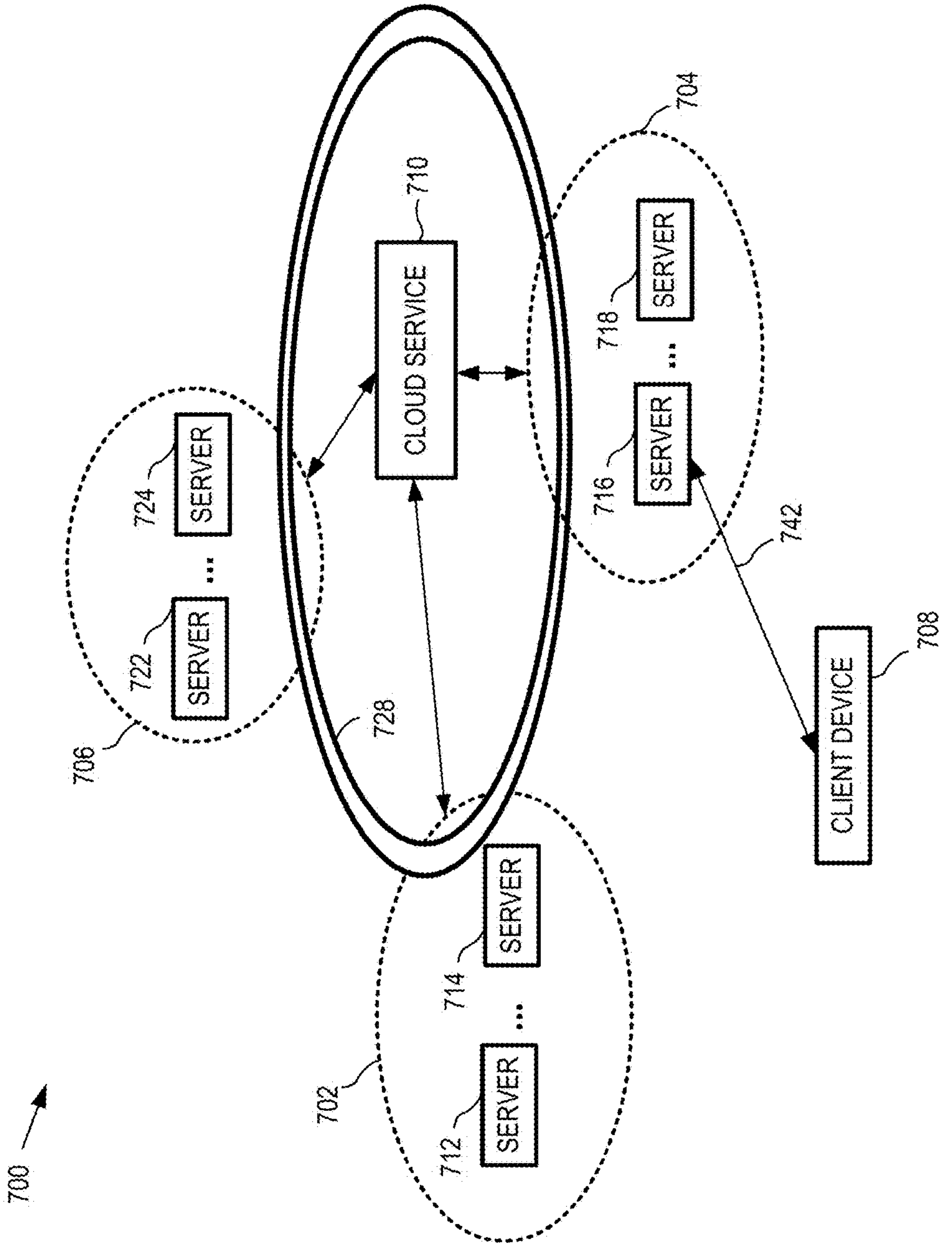
FIG. 7D is another exemplary schematic diagram of the network of FIG. 7A for performing network connection operations, consistent with some disclosed embodiments.

By way of a non-limiting example, reference is made to FIG. 7D illustrating another exemplary schematic diagram of network 700 for performing network connection operations, consistent with some disclosed embodiments. Upon selecting candidate server 716 from candidate servers 712, 714, 716, and 718, at least one processor (e.g., processor 102 in FIG. 1) associated with client device 708 may establish a network connection 742 with server 716, enabling server 716 to route network traffic between client device 708 and network 700.

Figure 8:
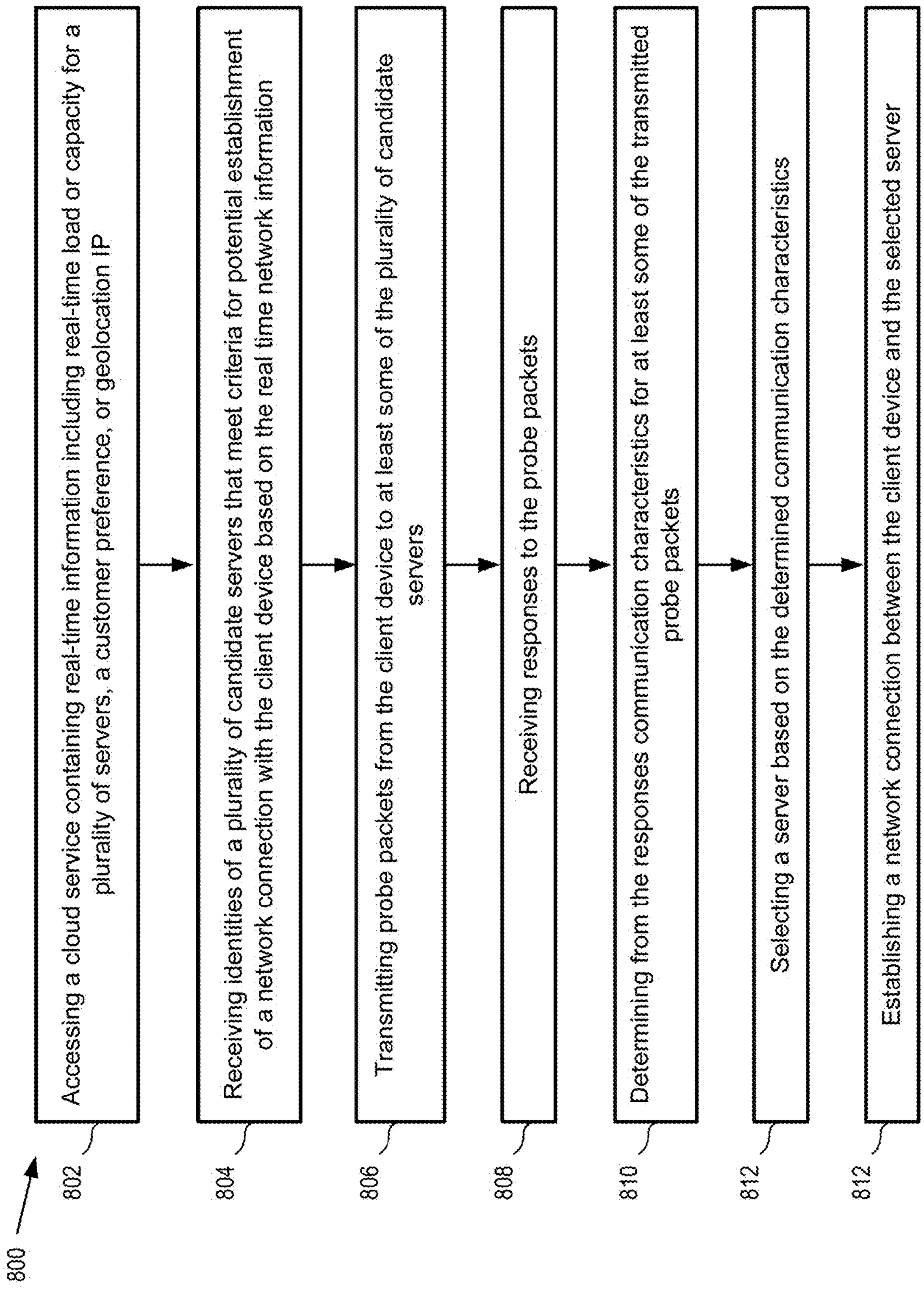
FIG. 8 is a flowchart of example process for performing network connection operations, consistent with some disclosed embodiments.

FIG. 8 is a flowchart of example process 800 for performing network connection operations, consistent with some disclosed embodiments. In some embodiments, process 800 may be performed by at least one processor (e.g., processor 102 in FIG. 1) to perform operations or functions described herein. In some embodiments, some aspects of process 800 may be implemented as software (e.g., program codes or instructions) that are stored in a memory (e.g., memory 104) or a non-transitory computer readable medium. In some embodiments, some aspects of process 600 may be implemented as hardware (e.g., a specific-purpose circuit). In some embodiments, process 800 may be implemented as a combination of software and hardware.

Referring to FIG. 8, process 800 may include a step 802 of accessing a cloud service via a client device, the cloud service containing real-time network information including at least two of a real-time server load for a plurality of network servers, real-time server capacity for the plurality of network servers, at least one customer preference, or geolocation IP. By way of a non-limiting example, in FIG. 7A, client device 708 may access cloud service 710 via network 700. Cloud service 710 may contain real-time network information including at least two of a real-time server load for plurality of network servers 712, 714, 716, 718, 722, and 724, real-time server capacity for the plurality of network servers, at least one customer preference for a user of client device 708, and/or a geolocation IP service for determining locations for client device 708 and network servers 712, 714, 716, 718, 722, and 724 based on IP addresses.

Process 800 may include a step 804 of receiving from the cloud service identities of a plurality of candidate servers from among the plurality of network servers, wherein, based on the real time network information, the plurality of candidate servers meet criteria for potential establishment of a network connection with the client device. By way of a non-limiting example, in FIG. 7A, client device 708 may receive from cloud service 710 identities of candidate servers 712, 714, 716, and 718 from plurality of network servers 712, 714, 716, 718, 722, and 724. For example, servers 722 and 724 may be excluded from the plurality of candidate servers due to geographical distance from client device 708 exceeding a threshold.

Process 800 may include a step 806 of transmitting probe packets from the client device to at least some of the plurality of candidate servers. By way of a non-limiting example, in FIG. 7B, client device 708 may transmit probe packets 730, 732, and 734 to candidate servers 712, 714, and 716, respectively, of the plurality of candidate servers 712, 714, 716, and 718. Probe packets 730, 732, and 734 may include a single probe packet or a series of probe packets.

Process 800 may include a step 808 of receiving responses to the probe packets. By way of a non-limiting example, in FIG. 7C, client device 708 may receive from candidate servers 712, 714, and 716, responses 736, 738, and 740 to probe packets 730, 732, and 734, respectively. Responses 736, 738, and 740 may include a single response or a series of responses.

Process 800 may include a step 810 of determining from the responses, communication characteristics for at least some of the transmitted probe packets. By way of a non-limiting example, in FIG. 7C, at least one processor (e.g., processor 102 in FIG. 1) associated with network 700 and/or client device 708 may determine from responses 736, 738, and 740, communication characteristics for at least some of probe packets 730, 732, and 734, respectively. For example, each of responses 736, 738, and 740 may include a series of responses and each of probe packets 730, 732, and 734 may include a series of probe packets. An analysis of response 738 may indicate irregular time stamps associated with jitter, causing the at least one processor to omit server 714 from consideration for selection, whereas an analysis of response 740 may indicate regular time stamps, causing the at least one processor to consider server 716 for selection.

Process 800 may include a step 812 of selecting a server based on the determined communication characteristics. By way of a non-limiting example, in FIG. 7C, at least one processor (e.g., processor 102 in FIG. 1) associated with network 700 and/or client device 708 may select server 716 of server cluster 704 based on the determined communication characteristics.

Process 800 may include a step 814 of establishing a network connection between the client device and the selected server. By way of a non-limiting example, in FIG. 7D, client device 708 may establish a network connection 742 with server 716, selected from candidate servers 712, 714, 716, and 718 of plurality of servers 712, 714, 716, 718, 722, and 724.

Some disclosed embodiments involve load balancing network traffic. Network traffic may be understood as described elsewhere herein. In the present context, load (e.g., traffic load) refers to an amount of data (e.g., network traffic) passing through one or more communication channels of a computer network at a given moment in time or in a time period. Load may be measured in bits and/or packets per second, and may represent a demand on network resources. Such network resources may include, for example, wired and/or wireless communication channels, routers, switches, memory buffers, queues, stacks, processors (e.g., servers), and/or any other computing resource associated with handling network load. In some embodiments, one or more network resources may be designed and/or adapted to handle a load up to a threshold level. In other words, network performance may be negatively affected when a network load exceeds that threshold level. Balancing refers to adjusting, distributing, and/or organizing. For example, a load may be (e.g., strategically) balanced by distributing portions of the load for handling across a plurality of network resources, tracking the progress of each load portion, and/or coordinating simultaneous (e.g., parallel) and/or in sequential (e.g., serial) handling of a plurality of load portions. Load balancing refers to distributing data and/or execution of one or more processes associated with data transmission across a plurality of network resources to improve one or more network performance metrics. Such performance metrics may include, for example, response time, communication latency, packet loss, jitter, an error rate, and/or any other network performance metric. Load balancing may be associated with one or more layers of a network interconnection system (e.g., an OSI model), such as a transport layer (e.g., based on an IP and/or port address), an application layer (e.g., based on Hypertext Transfer Protocol or HTTP headers, Uniform Resource Locators or URLs, and/or cookies), and/or any other layer of a network interconnection system. Load balancing may be associated with one or more protocols, such as a Round Robin protocol that distributes network requests sequentially, For example, least Connections which send network traffic to a server with the fewest active connections, an IP Hash protocol which distributes network traffic based on a client IP address, and/or a Weighted Round Robin/Least Connection protocol which distributes a load based on server capacity. As another example, data packets, network connection requests, and/or any other task associated may be distributed across a plurality of servers, network links, and/or additional network resources to improve resource use, minimize response time, and avoid overload on any single component. It ensures high availability, reliability, and scalability of services. In some embodiments, a communication network may include a dedicated device for managing traffic distribution by acting as an intermediary between a plurality of clients and servers. In some embodiments, at least some servers in a network may perform load balancing locally, e.g., by discouraging connections associated with an expectation of poor network performance.

Some disclosed embodiments involve receiving at a particular server among a plurality of candidate servers, one of a plurality of probes sent from a client device to the plurality of candidate servers. A server is a component, computer or system that provides resources, data, services, or programs to other computers—known as clients—over a network, as described elsewhere herein. Receiving and a client device may be understood as described elsewhere herein. A plurality of candidate servers refers to multiple servers, each considered, evaluated, and/or assessed for performing one or more tasks and/or handling one or more loads. A candidate server may be selected based on geographical proximity, network connectivity, available bandwidth capacity, available processing and/or memory capacity, one or more user preferences (e.g., associated with security, privacy, efficiency, compatibility, and/or performance metrics), and/or any other consideration for selecting a server to handle a load. A plurality of candidate servers may be associated with the same (e.g., common) server cluster and/or differing server clusters. In some embodiments, a client may receive a list of candidate servers for establishing a persistent network connection via an agent installed on the client device. The agent may receive the list of candidate servers from a network administrator and/or controller. A particular server refers to a specific and/or specified server, e.g., from a plurality of candidate servers considered for handling one or more loads. A probe, in the context of a probe packet, refers to information that serves as a diagnostic or measurement tool. For example, a probe packet may be a packet sent deliberately, for example, to gather information about network conditions, connectivity, performance, or other conditions. Probe packet may refer to a packet associated with diagnostics and/or measurement of network performance, as described elsewhere herein, and may include a ping probe (e.g., to test network connectivity and measure round-trip time or RTT), a traceroute probe (e.g., to identify one or more routers and/or hops along a route between a network source and a network destination), and/or any other type of probe. A probe may be prioritized differently than regular (e.g., non-probe) network traffic. For example, a server may respond to a probe packet faster than to a regular (e.g., non-probe) data packet. Thus, in some embodiments, to discourage a network connection, a server may respond to a probe as through the probe were a regular packet.

In some disclosed embodiments, the plurality of candidate servers are selected from a plurality of servers in a SASE network based on real time network information including at least two of: a real time server load for the plurality of network servers, real time server capacity for the plurality of network servers, at least one customer preference, or geolocation IP. Selected refers to chosen, appointed, and/or picked. A SASE network may converge wide-area networking (WAN) capabilities with comprehensive security functions, as described elsewhere herein. Real time network information refers to characteristics, properties and/or attributes associated with a current state of a network, as described elsewhere herein. Real-time server load refers to a measure of work that a server may be experiencing at an instant in time and/or over a time period and may be based on a number of devices connected to a server, as described elsewhere herein. Real time server capacity refers to a capability of a server to handle one or more incoming requests and/or process data, as described elsewhere herein. A customer preference refers to an individual choice and/or taste of a user when interacting with a network and/or an associated service, as described elsewhere herein. A Geolocation IP (GeoIP) refers to a service (e.g., a cloud service) that uses an IP address to determine a geographical location or an approximate geographical location of a device and/or user, as described elsewhere herein. For example, a Managed Service Provider (MSP) and/or a Cloud Access Security Broker (CASB) may select a plurality of servers as candidates for establishing a persistent connection with a client device based on real-time network information, and may provide the list of candidates to the client device. The client may use the list of candidates to select a particular server with which to establish a persistent connection.

In some disclosed embodiments, based on the real time network information, the plurality of candidate servers meet criteria for potential establishment of a network connection with a client device. A network connection refers to a link established between two devices over a communication network to exchange data. A network connection may be established conditional on implementation of one or more communication protocols (e.g., handshake protocols). Potential establishment of a network connection may be understood to mean possible and/or prospective initiation of a network connection. For instance, prior to establishing a network connection, a server may examine a viability and/or expected performance of a potential network connection. To meet criteria refers to satisfying requirements, fulfilling specifications, and/or attaining standards. Criteria for potential establishment of a network connection with the client device refers to standards and/or specifications for a network connection. Such criteria may be associated with one or more performance metrics, latency thresholds, reliability measures, security and/or privacy requirements and/or recommendations, one or more policies, geographic limitations, regulatory limitations, and/or any other criteria for a network connection. For example, a Managed Service Provider (MSP) and/or a Cloud Access Security Broker (CASB) may oversee network connectivity in a SASE network, and may only select a particular server as a candidate for establishing a persistent connection with a client device if the particular server meets one or more criteria, and may exclude a server that fails to meet one or more criteria.

A plurality of probes sent from a client device to a plurality of candidate servers may be understood as a client device transmitting to each of a plurality of candidate servers at least one probe (e.g., a probe packet). A client device may send a probe packet via a non-persistent (e.g., one-time) connection, such that sending the probe packets may involve less overhead than communicating via a persistent (e.g., continual) network connection. Receiving at a particular server one of a plurality of probe packets sent from a client device refers to a particular server accepting delivery of at least one probe packet transmitted by a client device. The received probe packet may include an IP address associate with the client device, permitting each server to identify the client device. The particular server may extract data from a received packet to identify the packet as a probe (e.g., differentiated from a non-probe packet).

Figure 9:
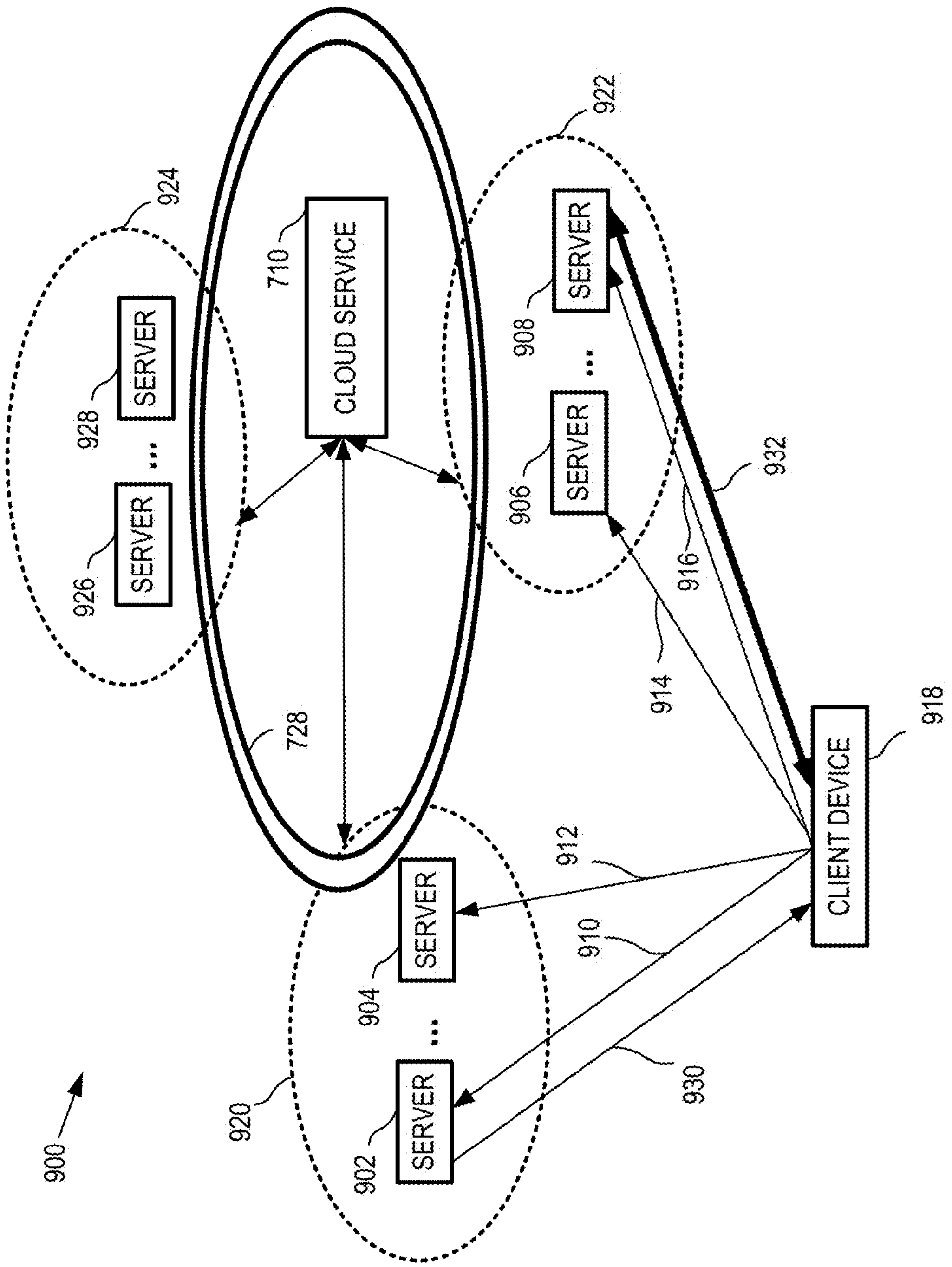
FIG. 9 illustrates an exemplary schematic diagram of a system for load balancing a network, consistent with some disclosed embodiments.

By way of a non-limiting example, reference is made to FIG. 9 which illustrates an exemplary schematic diagram of a system 900 for load balancing a network, consistent with some disclosed embodiments. System 900 may include a plurality of servers 902, 904, 906, 908, 926 and 928, and at least one client device 918. Each of servers 902, 904, 906, 908, 926 and 928, and at least one client device 918 may correspond to computing device 100 of FIG. 1, and may communicate via a communications network (e.g., network 204 in FIG. 2). One or more of servers 902, 904, 906, 908, 926 and 928 may perform load balancing operations for network traffic. Servers 902, 904, 906, and 908 may be candidates for establishing a persistent connection with client device 918. For example, client device 918 may receive IP addresses for each of candidate servers 902, 904, 906, and 908 from an agent installed on client device 918. Each of candidate servers 902, 904, 906, and 908 may receive at least one probe 910, 912, 914, and 916, respectively, from a client device 918. Client device 918 may send probes 910, 912, 914, and 916 to candidate servers 902, 904, 906, and 908 via non-persistent (e.g., one-time) network connections. In some embodiments, plurality of candidate servers 902, 904, 906, and 908 may be selected from a plurality of servers in a SASE network. For example, system 900 may be a SASE network including server clusters 920, 922, and 924. Server cluster 920 may include candidate servers 902 and 904, server cluster 922 may include candidate servers 906 and 908, and server cluster 924 may include servers 926 and 928. SASE network may include a centralized cloud-based manager which may select candidate servers 902, 904, 906, and 908 from plurality of servers 902, 904, 906, 908, 926, and 928 based on real time network information, including at least two of a real-time server load, and a real-time server capacity for plurality of network servers 902, 904, 906, 908, 926, and 928, one or more customer preferences (e.g., associated with client device 918), and a geolocation IP. For instance, the centralized cloud-based manager may determine that distances between servers 926 and 928 and client device 918 exceed a threshold associated with a customer preference, and may disqualify servers 926 and 928 from the plurality of candidate servers, whereas a real-time load and real-time capacity for each of candidate servers 902, 904, 906, and 908 may permit establishment of a persistent connection with client device 918. In some embodiments, based on the real-time network information, plurality of candidate servers 902, 904, 906, and 908 may meet criteria for potential establishment of a network connection with client device 918. The centralized cloud-based manager may provide IP addresses for candidate servers 902, 904, 906, and 908 to client device 918, permitting client device 918 to select one of candidate servers 902, 904, 906, and 908 with which to establish a persistent network connection.

Some disclosed embodiments involve interpreting, at the particular server, the received probe to recognize that the received probe is a precursor to a persistent connection between the particular server and the client device. Interpreting refers to deciphering, construing, and/or decoding. To recognize refers to identify, acknowledge, and/or determine. A precursor refers to something that precedes and/or heralds a future event, and may be harbinger and/or a forerunner leading to a future outcome. A precursor may facilitate prediction of one or more future outcomes. A persistent connection (e.g., a "keep-alive connection") between a particular server and a client device refers to a network channel established between a client device and the particular server that may remain open for a plurality of data transfers (e.g., HTTP requests and responses). A persistent connection may permit a client device to send a plurality of requests and receive a plurality of associated responses via the same connection, and may permit a client device to avoid having to re-establish a new network connection for each transmission of data between the client device and a server (e.g., via a non-persistent connection). A persistent connection may reduce overhead associated with establishing and/or closing a plurality of network connections to repeatedly communicate with the same server, thereby conserving resources and/or improving response times. To establish a persistent connection, a server may receive a "Session( )" command associated with a particular network address, and bind a particular socket to the particular network address in response. Binding the socket may block other requests for connection to the server via the bound socket, causing the bound socket to be dedicated to communicating with the particular address over a period of time. For example, establishment of a persistent connection with a server hosting a web page may permit a client device to request a plurality of images associated with the web page sequentially (e.g., over time, as a video feed), engage in a live chat via the webpage, and/or perform any other continual engagement with one or more remote servers (e.g., to work "online"). A persistent connection may include an HTTP persistent connection, a Digital Subscriber Line (DSL) used by a Virtual Private Network (VPN). Recognizing that a received probe is a precursor to a persistent connection may be understood as a particular server decoding a probe packet transmitted from a client device, and determining, based on the decoding, that the client device may subsequently request to establish a persistent connection with the particular server, e.g., dependent on communication metrics associated with the probe packet. For example, the particular server may recognize the probe as an Internet Control Message Protocol (ICMP) Echo Request Packet associated with a "ping" command for checking network connectivity and/or measuring latency.

For instance, a client device may transmit one or more probe packets to each server of a plurality of candidate servers and wait to receive responses to the probe packets. The client device may analyze one or more communication metrics associated with at least some of the probe packets and/or any received responses to select a particular server among the candidate servers for establishing the persistent connection. Such communication metrics may include, for example, a round trip time or RTT, latency, bandwidth, throughput, packet loss, jitter, error rates, and/or any other communication metric.

By way of a non-limiting example, in FIG. 9, server 902 may interpret received probe 910 and recognize that probe 910 may be a precursor to a persistent connection between server 902 and client device 918. Similarly, candidate servers 904, 906, and 908 may interpret received probes 912, 914, and 916 and recognize that probes 912, 914, and 916 may be precursors to a persistent connection between candidate servers 904, 906, and 908 and client device 918.

Some disclosed embodiments involve determining that a prospective connection between the particular server and the client device would be sub-optimal. Determining may be understood as described elsewhere herein. A prospective connection between a particular server and a client device refers to a predicted, expected, and/or subsequent (e.g., persistent) connection established between the particular server and the client device. For example, upon receiving a probe packet from a client device and interpreting the probe packet as a precursor to a persistent network connection, a server may determine that the persistent connection with the client device is imminent. Sub-optimal refers to sub-standard, inferior, and/or failing to meet one or more (e.g., performance) criteria. A persistent connection between a client device and a server may be sub-optimal for example, if communication latency, packet loss, jitter, an error rate, and/or RTT exceed one or more threshold levels, and/or if bandwidth and/or a throughput rate fail to reach one or more threshold levels. A server may determine that a prospective connection with a client device may be sub-optimal based on a current load handled by the server, a predicted and/or scheduled load for subsequent handling by the server, an amount of available server capacity (e.g., processor, memory, and/or communication capacity), a distance (e.g., network and/or geographic distance) to the client device, one or more communication metrics associated with a probe packet received from the client device, and/or any other consideration that may cause a network connection to be sub-optimal.

In some disclosed embodiments, the determination that that a prospective connection between the particular server and the client device would be sub-optimal is based on at least one of a current load on the particular server, an available bandwidth, a number of devices connected to the particular server, an extent of network flow, or a maintenance schedule. A current load on a particular server refers to an amount of work and/or network traffic presently handled by the particular server. A current load may represent a snapshot indicating how busy a server may be at present. An available bandwidth refers to a capacity for a network resource to handle additional network traffic. Such a network resource may include a communication channel connected to a server, a port, a socket, a buffer, a queue, a stack, a processor, a cache, and/or any other resource associated with networked communication. An insufficient level of available bandwidth may lead to packet loss, e.g., due to a buffer overflow, and may indicate to a server that a prospective connection with a client device may be sub-optimal. An extent of network flow refers to a degree, scale, and/or level of network traffic received and/or sent by a server. An extent of network flow may measure a total amount of network traffic, e.g., in bits per second, and/or a number of packets per time frame. A server associated with an above-threshold level of network flow may be very busy and may be associated with an above-threshold level of packet loss, jitter, buffer overflow, and/or latency, leading to a sub-optimal network connection with a client device. Conversely, a server associated with a below-threshold level of network flow may have capacity to establish one or more persistent connections with one or more client devices. A number of devices connected to a particular server refers to a number of computing devices (e.g., client and/or servers) currently communicating with or having an open communication channel with the particular server. A number of devices that may connect to a particular server may be limited by a number of ports and/or buffers available on the particular server. A server may need to maintain at least a threshold number of open ports to function properly. Open ports may permit a server to listen for incoming connections and/or provide services to client devices. A specific ports that may need to remain open may depend on a service provided by the particular server. For example, a server may keep ports 80 and 443 open for web-based applications, and additional ports for email, file sharing, and/or remote access. A load on a server, a number of connections, and/or network flow that exceeds a threshold level, and/or an available bandwidth metric that falls below a threshold level, may be associated with slower response times, halted and/or terminated execution threads, buffer, stack, and/or queue overflows, packet loss, jitter, and/or other issues associated with a sub-optimal network connection. Thus, a server associated with an above-threshold load, an above-threshold number of connections, an above-threshold network flow may determine that a persistent connection with a client device may be sub-optimal and may send a biased response to deter establishment of such a persistent connection. Similarly, a server associated with a below-threshold level of available bandwidth may determine that a persistent connection with a client device may be sub-optimal. Maintenance (for a server) may refer to upkeep and/or updating of server hardware and/or software. Maintenance may include performance of one or more tasks to ensure that a server functions properly. Maintenance may include installing software updates and/or patches, performance of hardware diagnostics, data backups, security assessments and/or audits, and/or any other task for ensuring proper functioning of a server. While undergoing maintenance, a server may be decommissioned, and/or taken offline, and may be required to migrate one or more pending tasks to a different server. A maintenance schedule refers to a timeline and/or plan for performing a maintenance on a server. For example, a particular server may identify a maintenance scheduled imminently, and determine that the scheduled maintenance may conflict with a prospective persistent connection with a client device. For instance, based on the maintenance schedule, the server may determine that an offline period scheduled for performance of the maintenance may interrupt a prospective persistent connection with the client device, requiring establishment of a different persistent connection with a different server, and migration of one or more associated tasks. Consequently, the server may determine that a persistent connection established with the client device in the immediate future may be sub-optimal and the server may take measures to discourage the persistent connection, e.g., by sending a biased response to a probe.

By way of a non-limiting example, in FIG. 9, server 902 may determine that a prospective connection between server 902 and client device 918 may be sub-optimal. In some embodiments, server 902 may base the determination on at least one of a current load on server 902, an available bandwidth, a number of devices connected to server 902, an extent of network flow, and/or a maintenance schedule. For example, server 902 may be scheduled for a maintenance within an hour, and may identify a history of persistent connections with client device 918 lasting longer than an hour, leading server 902 to predict that a prospective connection with client device may need to be terminated prematurely. Consequently, server 902 may determine that a prospective connection with client device 918 may be suboptimal.

Some disclosed embodiments involve transmitting a biased response from the particular server to the client device. Transmitting and a response to a probe packet may be understood as described elsewhere herein. A biased response refers to a response other than a standard and/or neutral response. A biased response may be influenced by one or more conditions (e.g., network conditions), preferences, and/or policies, and may differ from a standard and/or automated response. For example, a biased response may misrepresent and/or skew one or more associated network performance metrics, and may be transmitted differently than a non-biased (e.g., a normal) response. In some embodiments, a biased response may include a lack or a response (e.g., a dropped packet). By way of example, a server may assign a biased response a lower priority than a non-biased response, e.g., by assigning the biased response a similar or lower priority as a regular (e.g., non-probe) packet. Consequently, performance metrics derived from a biased response to a probe packet may fail to accurately reflect actual network performance. A recipient of a biased response may thus draw one or more inaccurate and/or incorrect conclusions about network performance (e.g., network congestion, RTT, latency, routing, and/or load) based on an analysis of the biased response. For instance, upon receive a biased response from a particular server, a client device may determine that latency and/or RTT associated with the particular server is higher than an actual latency and/or RTT. As a result, the client device may remove and/or disqualify the particular server from a group of candidate servers considered for establishment of a persistent network connection.

In some disclosed embodiments, the biased response is a delayed response. A delayed response refers to a late and/or tardy response. For example, a server may delay a response by pausing and/or waiting before sending the response (e.g., to introduce communication latency artificially), by assigning a lower priority to the response, and/or using any other method to delay a response. As a result, a delayed response may be received by a client device after an expected time to receive the response. A delayed response may cause a client device to assume that a network connection is associated with a longer latency and/or RTT than the actual latency and/or RTT for the network connection.

In some disclosed embodiments, the biased response includes information discouraging the persistent connection. Information may include one or more facts, metrics, and/or measurements encoded as data. Discouraging refers to deterring, hindering, and/or inhibiting. Information discouraging a persistent connection may include data and/or metrics formulated to cause a client device to dismiss and/or disqualify a particular server as a candidate for establishing a persistent network connection. For example, a server may include in a biased response one or more flags (e.g., a TCP reset flag) indicating that the server intends to terminate a network connection, a time stamp indicating an anomalous and/or irregular communication time, and/or one or more labels and/or markings (e.g., metadata) to trigger lower-priority and/or evasive treatment by a communication network. Additionally or alternatively, a server may manipulate a field associated with a Quality of Service (QoS) metric, such as by setting a Differentiated Services Code Point (DSCP/ToS) Field to a lower priority, causing the response to be throttled and/or dropped, include an Explicit Congestion Notification (ECN) suggesting network congestion, and/or include any other information that may dissuade a client device from establishing a persistent connection with a server. In some embodiments, a server may artificially simulate packet loss by deliberately dropping a packet (e.g., by failing to send a response to a probe) and/or by introducing a higher jitter than an actual jitter to discourage a persistent network connection.

By way of a non-limiting example, in FIG. 9, server 902 may transmit a biased response 930 to client device 918. In some embodiments, biased response 930 may be a delayed response. For example, server 902 may wait before sending biased response 930 to client device 918 to cause an RTT to exceed a threshold level. In some embodiments, biased response 930 may include information discouraging the persistent connection. For example, server 902 may set a TCP reset (RST) flag in biased response 930 to indicate to client device 918 that server 902 intends to terminate a network connection with client device 918.

Some disclosed embodiments involve determining the biased response based on an identity of a user associated with the client device. An identity of a user associated with a client device refers to information permitting recognition and/or knowledge about an individual using the client device. An identity of a user may be determined based on identifying information. Non-limiting examples of a identifying information includes username, credentials, authentication token, or attributes. An identity of a user may additionally or alternatively be based on personal information (e.g., a name, a date of birth, a personal home address), an email address, a phone number, a unique identifier (e.g., an account ID, a social security number, a passport number, a biometric token, employee ID, and/or any other unique identifier), an IP address, a device ID, a Wifi address, and/or any other identifying information that may be associated with a probe packet. A server may send a biased response based on an identity of a user, for example, upon determining that the user is associated with a lower priority than other users, that an account of the user is associated with a lower grade of service and/or an obsolete software version, that the user has a history of connectivity problems, that the user is associated with a risk exceeding a threshold level, and/or that the user has a history of network resource usage exceeding a threshold level. For example, a server may discourage connecting to a specific IP address and/or address range, due to a history of malicious activity and/or to prevent overloading the server. As another example, a security policy for a server may require specific security measures to be in place before a connection may be established, e.g., by requiring a client device to present a valid SSL certificate, use a specific authentication method, and/or have an updated version of network software installed thereon. A user failing to comply with the specific security measures and/or a user associated with an above-threshold demand of network resources may cause a server to send a biased response in reply to a probe packet received from a client device associated with the user.

By way of a non-limiting example, in FIG. 9, server 902 may determine biased response 930 based on an identity of a user associated with client device 918. For instance, the user may have a history of malicious activity. Consequently, server 902 may include metadata in biased response 930 to trigger a lower priority setting for client device 918. The lower priority setting may discourage client device 918 from attempting to establish a persistent connection with server 902. By way of another example, a user of client device 918 may be associated with a premium account requiring a level of performance exceeding the available capacity of server 902. Server 902 may lower a priority associated with biased response to discourage client device 918 from establishing a persistent network connection with server 902.

Some disclosed embodiments involve determining the biased response based on a location associated with the client device. A location may include a virtual (e.g., network) location and/or a physical location. A physical location may include a private home, a building, a floor in a building, a street address, a campus, a city, a state, a province, a region, a country, and/or any other designation for a physical location. A server may determine to send a biased based on a physical location of a client device and/or based on a physical location of a resource to which a client device requests access, for example, due to one or more geographic restrictions. Such restrictions may include a physical distance between the server and the client device exceeding a distance threshold, one or more physical obstacles separating the server and the client device (e.g., a mountain and/or a body of water), a history of poor connectivity, a history of vulnerability to fraud and/or malicious behavior and/or insufficient regulation, an availability of servers geographically closer to the client device, and/or inadequate network infrastructure associated with the geographic location. For example, a server may be required to comply with one or more rules that only permit connections to specific geographical regions, e.g., to comply with regulations and/or manage content distribution. If a server receives a probe from a client device outside the specific regions, the server may send a biased response to discourage the client device from establishing a persistent connection with eh server. A virtual location refers to a location other than a physical location of a device, and may include a location simulated via a routing mechanism. For example, a virtual private network (VPN) may route network traffic via a remote server, causing the network traffic to appear as through originating from the remote server. A server may send a biased response to discourage establishment of a persistent connection based on a virtual location, for example, if the virtual location is associated with malicious activity, a history of network resources surpassing a threshold, and/or to prevent overloading the server.

By way of a non-limiting example, in FIG. 9, server 902 may determine biased response 930 based on a location associated with client device 918. For example, server 902 may determine that servers 906 and 908 in server cluster 922 are physically closer to client device 918 than server 902, such that a network connection with either server 906 or server 908 may be predicted to perform better than a connection with server 902 or server 904. Consequently, server 902 may send biased response 930 to client device 918 to discourage establishment of a persistent connection with server 902, and encourage establishment of a persistent connection with server 906 or server 908.

Some disclosed embodiments involve determining the biased response based on a role associated with the client device. A role may refer to a designation associated with one or more (e.g., access) privileges and/or restrictions. A role may include one or more functional responsibilities and/or behaviors that a client device may assume, e.g., to ensure effective communication and/or data exchange. A role may be defined by a network architecture, one or more protocols, and/or administrative requirements. A role may include a device role, a protocol role, an administrative and/or security role, a network architecture role, and/or any other type of role. A device role may designate a device in a context of a communication network, e.g., as a client, a server, a router, a switch, a firewall, a gateway, an access point, or a modem. A protocol role may define a context for a device in a communication process, e.g., as a sender, receiver, requestor, initiator, responder, controller, and/or coordinator. An administrative and/or security role may be based on control and/or policy enforcement, and may include a network administrator, a network authenticator, a monitor, an auditor, and/or a policy enforcer. In a structure network model (e.g., OSI and/or TCP/IP), a role associated with an application layer may interact with an end user applications, a role associated with a transport layer may ensure reliable and/or best-effort data delivery, a role associated with a network layer may handle packet routing, and a role associated with a data link layer may handle delivery of frames, and/or MAC addressing (e.g., for network switches). A server might send a biased response to a device based on an associated role, for example to improve performance, enforce one or more policies, maintain security, and/or manage resources. A server may treat differing roles in a different manner, resulting in non-uniform responses to a received probe packet, depending on a role of a sender of the probe. For instance, a server may reject and/or limit access if a role lacks access and/or administrative privileges, and/or exhibits behavior characteristic of a scanner and/or crawler. A server may tailor a response to match an expected capability and/or priority associated with a role. A server may send a biased response if a role is associated with a monitoring agent and/or a background updater, e.g., to preserve bandwidth for interactive users and ensure Quality of Service (QoS) for time-sensitive applications. A server may send a biased response if a role is designated as a ‘guest’ and send a non-biased response to a corporate device, e.g., to maintain network segmentation and/or organizational policy. A server may send a biased response to a device if an associated role has a history of malicious behavior, e.g., to mitigate threats.

By way of a non-limiting example, in FIG. 9, server 902 may determine biased response 930 based on a role associate with client device 918. For example, based on a role for client device 918, server 902 may determine that client device 918 is an IoT streaming device (e.g., a security camera) associated with a demand for an above-threshold level of bandwidth to transmit a continual stream of high resolution frames. Server 902 may determine that the above-threshold bandwidth demanded by client device 918 exceeds an available capacity for server 902, and may introduce a delay when sending biased response 930 to deter client device 918 from establishing a persistent connection with server 902.

Some disclosed embodiments involve determining the biased response based on an application associated with the client device. An application associated with a client device refers to a software program that may be executed to perform one or more tasks for a user of the client device. The application may be executed by the client device, and/or by another device (e.g., a cloud server) on behalf of the user. Some examples of software applications may include a web browser, a streaming client, a word processor, a media player, and/or a social media platform. For example, a server may prioritize some software applications (e.g., a video conferencing and/or virtual meeting platform for a professional context) higher than other software applications (e.g., a gaming application and/or streaming client for a sports channel), and send a biased response upon determining that an application associated with a client device has a lower priority. As another example, a server may send a biased response after determining that a software application is suspicious and/or compromised (e.g., based on inclusion in a blacklist, and/or an obsolete version).

By way of a non-limiting example, in FIG. 9, server 902 may determine biased response 930 based on an application associated with client device 918. For example, server 902 may identify that a version of an application running on client device 918 is obsolete, which may introduce vulnerabilities and/or compatibility issues if a connection is established between client device 918 and server 902. Consequently, server 902 may set a DSCP/ToS Field of biased response 930 to a lower priority to thereby discourage client device 918 from selecting server 902 for establishing a persistent connection.

Some disclosed embodiments involve determining the biased response based on a prediction of subsequent activity by the client device. A prediction refers to a forecast and/or expectation of a future event. Subsequent activity by a client device refers to future, expected, and/or impending network traffic, connectivity, and/or data flow associated with a client device. A server may predict subsequent activity by a client device based on an associated role, a history of previous behavior, one or more usage patterns, a device type, contextual information, device and/or user attributes, geolocation, network identity, a device and/or user profile, and/or any other information indicative of subsequent network activity. For example, if a client device has a history of running a streaming application associated with a sports channel on Monday evenings, a server may predict that the client device may run the streaming application during an upcoming Superbowl game. If a client device at a specific location regularly accesses a regional database, a server may predict future queries to the regional database. If a client device is associated with a premium account, a server may predict access requests to higher priority services. A server may use such predictions to determine that the server lacks available capacity for a persistent connection with the client device, and may send the client device a biased response based on the prediction. By way of another example, a server may determine that a client device is an IoT device associated with a history of high resource usage, and may send a biased response in reply to a probe to discourage the client device from establishing a persistent connection with the server.

By way of a non-limiting example, in FIG. 9, server 902 may determine biased response 930 based on a prediction of subsequent activity by client device 918. For example, client device 919 may exhibit a pattern of running an interactive video conferencing application during peak traffic periods. Server 902 may determine, based on load patterns, that the resources demanded by client device 918 may exceed server capacity, and may lower a priority for biased response 930 to dissuade client device 918 from pursuing a persistent connection with server 902.

In some disclosed embodiments, a biased response may be transmitted from a particular server to a client device to discourage establishment of the persistent connection between the client device and the particular server. To discourage refers to deter, dissuade, prevent, and/or inhibit. To discourage establishment of a persistent connection between a client device and a particular server may be understood to mean deterring a client device from attempting to establish a persistent connection with the particular server. For example, one or more attributes associated with a biased response to a probe packet (e.g., or a lack of a response) may indicate to a client device that a connection with the particular server may fail to meet one or more performance criteria (e.g., may be sub-optimal). This may cause the client device to pursue a persistent connection with a different one of the candidate servers and abandon pursuit of a persistent connection with the particular server. Thus by sending a biased packet in response to a probe, a particular server may (e.g., locally) balance a load on the particular server, by causing the client device to establish a persistent connection with a different server, thereby transferring the load to another server having greater available capacity than the particular server.

By way of a non-limiting example, in FIG. 9, server 902 may transmit biased response 930 to client device 918 to discourage establishment of a persistent connection between client device 918 and server 902. Consequently, client device 918 may establish a persistent connection 932 with a server other than server 902, such as with server 908.

Figure 10:
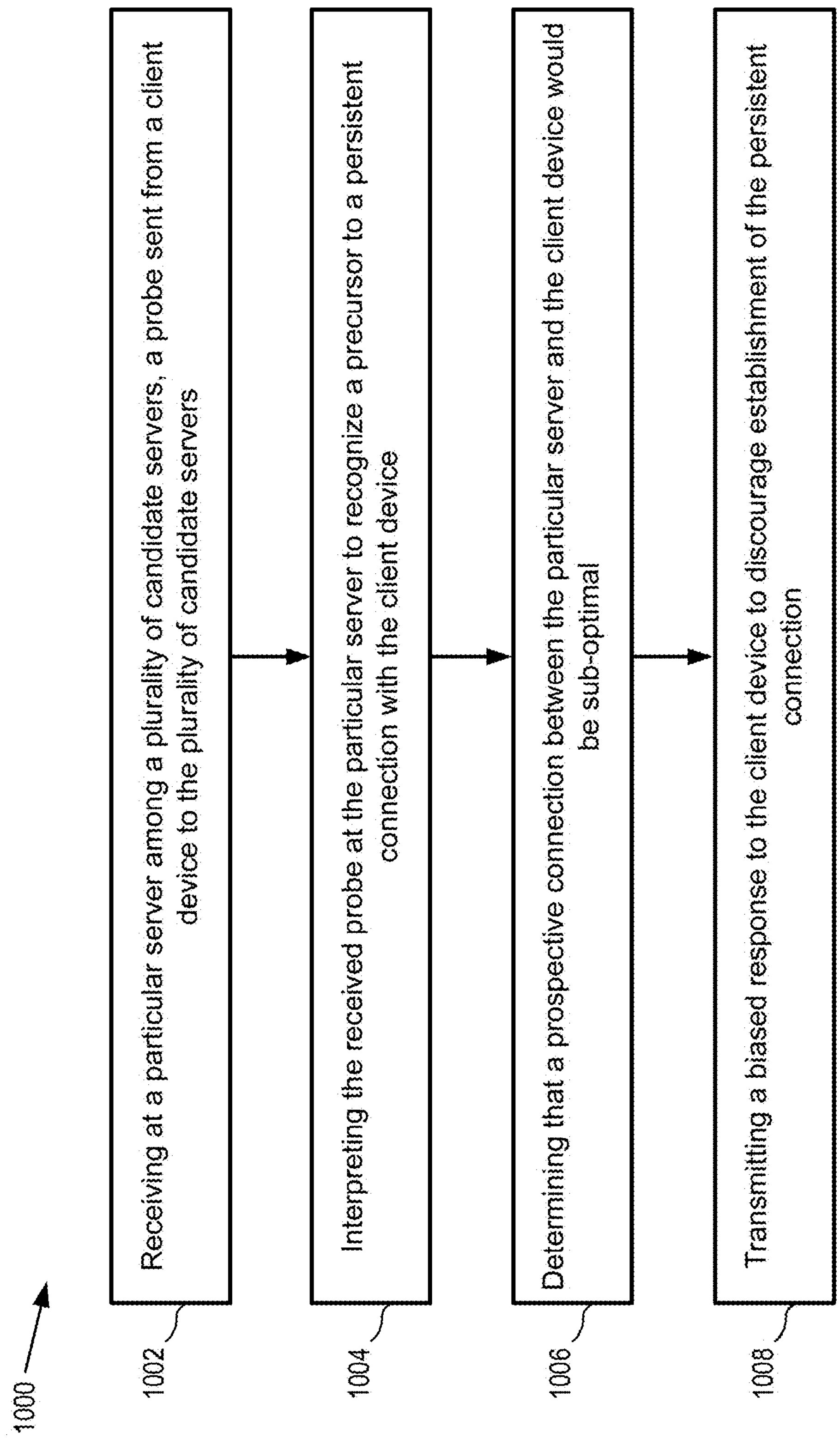
FIG. 10 is a flowchart of an example process for load balancing network traffic, consistent with some disclosed embodiments.

FIG. 10 is a flowchart of example process 1000 for performing load balancing operations, consistent with some disclosed embodiments. In some embodiments, process 1000 may be performed by at least one processor (e.g., processor 102 in FIG. 1) to perform operations or functions described herein. In some embodiments, some aspects of process 1000 may be implemented as software (e.g., program codes or instructions) that are stored in a memory (e.g., memory 104) or a non-transitory computer readable medium. In some embodiments, some aspects of process 1000 may be implemented as hardware (e.g., a specific-purpose circuit). In some embodiments, process 1000 may be implemented as a combination of software and hardware.

Referring to FIG. 10, process 1000 may include a step 1002 of receiving at a particular server among a plurality of candidate servers, one of a plurality of probes sent from a client device to the plurality of candidate servers. By way of a non-limiting example, in FIG. 9, each of candidate servers 902, 904, 906, and 908 may receive at least one of plurality of probes 910, 912, 914, and 916 from client device 918.

Process 1000 may include a step 1004 of interpreting, at the particular server, the received probe to recognize that the received probe is a precursor to a persistent connection between the particular server and the client device. By way of a non-limiting example, in FIG. 9, server 902 may interpret received probe 910 and may recognize that received probe 910 is a precursor to a persistent connection between server 902 and client device 918.

Process 1000 may include a step 1006 of determining that a prospective connection between the particular server and the client device would be sub-optimal. By way of a non-limiting example, in FIG. 9, server 902 may determine that a prospective connection between the server 902 and client device 918 may be be sub-optimal. For example, server 902 may predict that the prospective connection will be used for a live streaming application and the prospective connection may fail to meet one or more performance metrics due to a current load on server 902.

Process 1000 may include a step 1008 of transmitting a biased response from the particular server to the client device to discourage establishment of the persistent connection between the client device and the particular server. By way of a non-limiting example, in FIG. 9, server 902 may transmit biased response 930 to client device 918 to discourage establishment of the persistent connection between client device 918 and server 902. For instance, server 902 may introduce a delay before sending biased response 930 to client device 918 causing client device 918 to determine that an RTT associated with server 902 fails to meet a performance criteria. Consequently, client device 918 may disqualify server 902 as a candidate and establish persistent connection 932 with server 908 instead.

Server software upgrades may cause blips in network communications. To avoid such blips, a cloud service may monitor network connections, and switch connections in advance of software upgrades.

Some disclosed embodiments involve altering network connections during maintenance periods. Altering refers to changing, switching, and/or substituting. Network connections refers to network channels established between one or more client devices and a server that may remain open for a plurality of data transfers (e.g., HTTP requests and responses), as described elsewhere herein. The network connections can be persistent or intermittent. Maintenance periods refers to a time interval and/or duration during which upkeep, upgrading, and/or updating of hardware and/or software may be performed. Such maintenance and/or upgrading may include replacing an existing version of a software application, operating system, and/or service with a newer version, e.g., to obtain new features, security patches, performance improvements, and/or compatibility updates. Maintenance and/or upgrading may additionally include backing up of system files, configurations, and/or databases (e.g., in case the upgrade fails), planning and/or scheduling of downtime to reduce disruption to users, and/or documenting an upgrade. In some instances, maintenance and/or upgrading may include halting of services associated with software undergoing an upgrade, e.g., to avoid conflicts and/or data corruption, and termination of active connections to client devices and/or additional servers. Maintenance and/or upgrading may include installation of a new version of a software application, replacement and/or updating of prior versions of files, and/or preservation, replacement, and/or merging of configuration files. In some cases, a software upgrade may include updating a database structure, introducing new configuration settings and/or replacing and/or removing obsolete settings. Prior to restarting communication services, an upgraded software may undergo testing and/or validation. A maintenance period may range from several minutes (e.g., for simple software updates and/or backups) to several hours (e.g., for major upgrades and/or recovery). Factors influencing duration of a maintenance period may include the type of maintenance (e.g., routine, preventive, or corrective), the complexity of a server network, and/or unexpected issues that may arise. A routine maintenance for a server may involve installing software updates, backups, and performance of routine hardware checks, and may run for a few hours. A major update and/or upgrade for a server may involve overhauling a server, replacing one or more parts (e.g., boards), and/or migrating to a new server environment, and may run for several hours or more. An emergency maintenance for a server may be required due to security vulnerabilities and/or system failure. A period for performance of an emergency maintenance may depend on the severity and/or complexity of the problem. In some embodiments, a downtime policy for a server may define a maximal time period that a server may be taken offline for maintenance. For example, altering network connections during maintenance periods may include changing, replacing, and/or substituting a plurality of (e.g., prior) connections to one or more former servers to a plurality of (e.g., new) connections to one or more substitute servers.

Some disclosed embodiments involve monitoring via a cloud service, a network of distributed servers and client devices. This may be understood to mean that a cloud service may check, track, record, and/or oversee a network of interconnected servers and client devices (as described elsewhere herein). For example, a cloud service may provide a software agent for installation on each of a plurality of devices (e.g., distributed servers and/or client devices). Each software agent may monitor network activity associated with the device on which it is installed, and may transmit data associated with the monitored network activity to one or more processor associated with the cloud service. The cloud service may collect, organize, and/or analyze the data received from each device to determine a current state of a network. In some embodiments, a cloud service may store data received from a plurality of servers and/or client devices in a data structured and/or a data pool for analysis. Based on the analysis, the cloud service may identify existing network connections between specific client devices and specific servers, current loads and/or available capacity on one or more specific servers and/or network channels, and/or any other information associated with a state of a network. In some embodiments, the cloud service may analyze a history of network activity to predict future network activity by one or more client devices and/or distributed servers, e.g., using one or more machine learning and/or artificial intelligence tools. For example, a cloud service may predict, based on a history of software upgrades, that a software upgrade may be expected for one or more servers during an approaching maintenance period. As another example, a cloud service may receive an indication of a security breach and predict a software upgrade to install a patch for the security breach during an approaching maintenance period. As a further example, a cloud service may receive an indication of provision of an expanded suite of services to one or more client devices and predict a software upgrade during an approaching maintenance period.

In some disclosed embodiments, the monitoring includes maintaining records of software upgrade schedules for the distributed servers and existing tunnels between the client devices and the distributed servers. Software upgrade schedules for distributed servers refers to timetables, programs, and/or plans for installing updates, improvements, and/or patches to software running on a plurality of servers. Software running on servers may need to be regularly updated, e.g., in response to exposure of new vulnerabilities and/or threats, changes in network topology (e.g., scale up or scale down), to accommodate new services and/or devices, and/or any other reason for updating software. To ensure that a network provides continual and/or uninterrupted service to clients (e.g., users), a cloud service may ensure that software and/or hardware updates to servers providing service to the clients are based on a schedule. The schedule may enable a cloud service and/or user to predict when a server may be taken offline to begin a software upgrade, how long an upgrade may last (e.g., a time duration for each upgrade to occur), and/or when a server may be returned online after the software upgrade is completed. For instance, a user may use a software upgrade schedule to select a particular time for an upgrade on a particular server to reduce disruption to one or more network connections.

A tunnel refers to a channel for transmitting data securely or privately over a computer network. Transporting data via a tunnel may include encapsulating and/or wrapping a data packet associated with a first protocol inside another data packet (e.g., an outer packet) associated with a second protocol, and transmitting the wrapped data packet via a communication channel associated with the second protocol. At the destination, the outer packet may be removed to expose the data (e.g., the payload). A tunnel may permit bypassing one or more network restrictions, enhance network security, and/or connect incompatible two or more networks. Some examples of a tunnel may include a Virtual Private Network (VPN), a Generic Routing Encapsulation (GRE), a Secure Shell (SSH), and/or IP in IP. A tunnel may provide site-to-site connectivity to interconnect entire networks, remote access VPNs to connect individual users to a network, and/or cloud connectivity (e.g., cloud based VPNs). A VPN tunnel may include a specific encrypted pathway for data within a VPN to protect data during transmission. Some protocols for establishing a VPN tunnel may include OpenVPN, Internet Protocol Security (IPsec), Internet Key Exchange version 2 (IKEv2), Layer 2 Tunneling Protocol (L2TP), WireGuard, Point-to-Point Tunneling Protocol (PPTP), Secure Socket Tunneling Protocol (SSTP), and/or Secure Shell (SSH). A VPN may transmit data via a tunnel by encrypting and encapsulating private network traffic for transmission over a public network, an IPv6 over IPv4 tunnel may encapsulate a packet conforming with an IPv6 protocol for transmission over IPv4 network infrastructure, and an SSH (Secure Shell) tunnel may forward data from a local device to a remote machine.

An existing tunnel between a client device and a server refers to a tunnel currently used to transport data between a client device and a server. Disrupting an existing tunnel connecting a server with a client device (e.g., due to installing a software upgrade on the server) may disrupt a flow of network traffic there between, and may affect network performance and/or a user experience associated with the client device. A record refers to an organized arrangement of data based on type. A record may include one or more rows and/or columns in a matrix, a linked list, a ring, a tree, and/or any other organization of data for storage in memory. Maintaining records of software upgrade schedules and existing tunnels may include storing data associated with software upgrade schedules and existing tunnels in a data structure to permit subsequent access to the schedules and existing tunnels. For example, a record for an existing tunnel between a particular server and a particular client device may include identifiers for the particular server and the particular client device, a start time for the tunnel connection, an expected duration, a maximum time-out, a protocol type, and/or any other information associated with the tunnel. A cloud service may maintain a plurality of such records for a plurality of existing tunnels in a network in a data structure, e.g., in response to receiving a notification from a particular server and/or client device that a tunnel was established (e.g., a push notification) and/or in response to polling a status of the particular server and/or client device (e.g., a pull notification). When a tunnel connection terminates, the cloud service may update the data structure to reflect the termination, e.g., by deleting and/or flagging the associated record. Upon receiving a software upgrade schedule for one or more servers, the cloud service may store the schedule in a data structure in association with the identifiers for each server. The cloud service may query the data structure with a particular identifier to determine if a particular server is scheduled for a software upgrade within a selected time period, and identify any existing tunnels between the particular server and one or more client devices that may be affected. This may permit the cloud service to identify one or more conflicts (e.g., overlaps) between a scheduled upgrade and cloud services provided by a particular server via one or more existing tunnels.

Figure 11A:
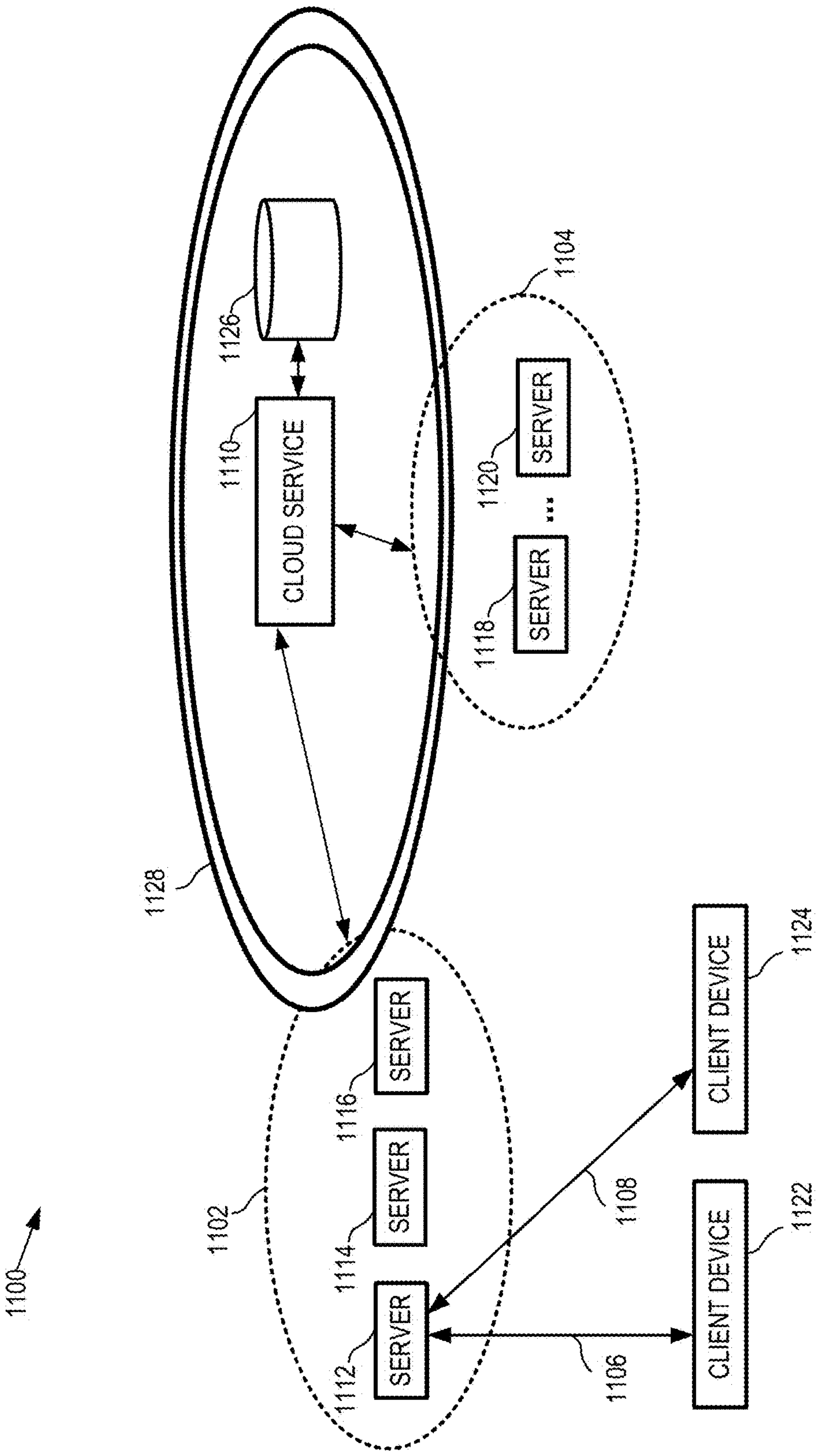
FIG. 11A is an exemplary schematic diagram of a network for altering network connections during maintenance periods, consistent with some disclosed embodiments.

By way of a non-limiting example, reference is made to FIG. 11A illustrating an exemplary schematic diagram of a network 1100 configured to alter network connections during maintenance periods, consistent with some disclosed embodiments. Network 1100 may be substantially similar to network 700 of FIG. 7A, and may include at least a cluster 1102 and a cluster 1104 (e.g., corresponding to cluster 702 and cluster 704, respectively). Cluster 1102 may include at least a server 1112, a server 1114, and a server 1116. Cluster 1104 may include at least a server 1118 and a server 1120. Cluster 1102 and cluster 1104 may be connected by a backbone 1128 (e.g., corresponding to backbone 728). A client device 1122 may communicate with server 1112 via an existing tunnel 1106 and a client device 1124 may communicate with server 1112 via an existing tunnel 1108. For example, tunnels 1106 and 1108 may each be associated with differing virtual private networks. A cloud service 1110 may monitor network 1100 of distributed servers 1112, 1114, 1116, 1118, and 1120 and client devices 1122 and 1124. Distributed servers 1112, 1114, 1116, 1118, and 1120, client devices 1122 and 1124, and cloud service 1110 may each include computing device 100 in FIG. 1. In some embodiments, cloud service 1110 may be associated with a centralized management system of a SASE network. Cloud service 1110 may maintain records of software upgrade schedules for distributed servers 1112, 1114, 1116, 1118, and 1120 and records for existing tunnels 1106 and 1108 between client devices 1122 and 1124 and server 1112 in a data structure 1126 (e.g., corresponding to memory 104 in FIG. 1).

Some disclosed embodiments involve receiving at the cloud service a request to upgrade software on a particular server among the distributed servers. A request to upgrade software on a particular server among the distributed servers refers to a notification to update and/or revise one or more software components installed on a particular server. A cloud service may receive a push and/or pull notification as a request for a software upgrade. The request may be initiated by one or more of a policy engine (e.g., of a SASE network), a cloud service provider (e.g., a SASE vendor), an administrator, a user, and/or any other party. The request may be associated with a scheduled maintenance, a feature rollout, a security patch deployment, a security warning and/or breach, a compatibility warning (e.g., associated with one or more new software and/or hardware components and/or protocols), a request to upgrade, expand, and/or improve network performance and/or service, based on an automated schedule, and/or based on any other consideration. Receiving at a cloud service a request to upgrade software at a particular server may be understood as triggering and/or otherwise notifying a cloud service of a request for the software upgrade. For example, a cloud service vendor managing one or more cloud services may initiate a request for a software upgrade on one or more servers, e.g., to apply one or more security patches, performance improvements, and/or to roll out one or more new features. In some embodiments, a centralized cloud management console and/or portal may be provided for managing, monitoring, and/or configuring cloud-based infrastructure, services, and/or policies. The centralized cloud management console may permit an Information Technology (IT) and/or a cloud service administrator to set one or more policies for automated software upgrades on one or more particular servers, such as by defining one or more maintenance schedules, time windows, and/or location-based upgrade rollouts (e.g., geographic-based rollouts). In some embodiments, a policy engine associated with a vendor of a cloud service may initiate a request for a software upgrade. Software upgrades initiated by a vendor and/or a policy engine may be rolled out based on a schedule (e.g., automatically) in staggered and/or phased rollouts to reduce disruption to customers, and may involve minimal intervention by customers (e.g., "zero-touch"). In some embodiments, an edge device and/or a software agent installed thereon may initiate a request for a software upgrade.

Some disclosed embodiments involve, in response to the request, scheduling the software upgrade. In response to a request may be understood as consequent to, and/or as a result of receiving the request. Scheduling a software upgrade may refer to booking, setting, arranging, and/or planning a software upgrade. For example, a vendor and/or an administrator and/or policy engine associated therewith may set a maintenance window and/or add one or more tasks associated with implementing the software upgrade to an execution queue, buffer, and/or stack. In some instances, a vendor may notify a customer of a schedule software upgrade (e.g., via email, message, an administrative dashboard, and/or a support portal). Prior to initiating the software upgrade, the vendor may perform a risk assessment of a potential impact on currently provided services by one or more servers scheduled for the software upgrade. The vendor may generate a backup and/or system snapshot of any affected servers to ensure data recovery if problems occur during the upgrade. The vendor may check compatibility between the upgraded software and existing configurations, settings, application programming interfaces (APIs), and/or dependencies with additional software and/or services (e.g., database schemas and/or software running on client devices). A vendor may initiate a software upgrade manually (e.g., by an administrator) and/or automatically (e.g., by a deployment tool and/or a cloud engine). In some instances, prior to performance of a software upgrade, a vendor may pause and/or temporarily terminate one or more services currently provided by a server undergoing a software upgrade. In some instances, network traffic associated with a server undergoing a software upgrade may be routed to another server and/or added to a queue to avoid data loss. During a software upgrade, a new software package may be installed, compiled, and/or deployed. One or more software scripts may perform updates on one or more databases, apply one or more software patches, and/or migrate and/or merge one or more configuration files. The software upgrade may be tested and may undergo one or more health checks to validate successful installation. In some instances, one or more system logs and a system status may undergo inspection for anomalies. Upon verification of a software upgrade, a vendor may restart services affected by the upgrade, and test the upgraded software for conformance with an expected functionality. The vendor may monitor a particular server following a software upgrade for a time period, e.g., to track CPU and/or memory usage, error rates, response times, and/or log anomalies, and may revert a previous software version using a backup and/or snapshot if issues associated with the upgrade are detected. Upon completing a software upgrade on a particular server, a vendor may update a data structure tracking software upgrades on the network.

In some disclosed embodiments, the software upgrade is scheduled to occur within a time window. A time window refers to a time range. It may be a set period of time, spanning from a start time to a finish time, or it may have a more general designation (e.g., morning, early morning, late morning, after business hours, after daylight hours, etc.). A time window for a software upgrade may last several seconds, several minutes, or several hours. A start time and/or a finish time for a time window may be associated with a particular day of the week and/or month, a particular time of the day (e.g., a specific hour, minute, and/or second). In some embodiments, a time window for a software upgrade may coincide with a period associated with a low expected network traffic level, e.g., to reduce disruptions to network connectivity. For example, time window for a software upgrade may be scheduled at night and/or over a weekend. A time window for a scheduled software upgrade may be at least as long as an expected time to complete the software upgrade. In some embodiments, a time window for a scheduled software upgrade may be longer than an expected time to complete a software upgrade, permitting selection of a start time to initiate the software upgrade within the time window.

Some disclosed embodiments involve receiving from the client device a specific time for rerouting the network traffic flow within the time window. A specific time for rerouting network traffic within a time window refers to a selected point in time, instant, or a selected time range within the time window for establishing a new tunnel to replace an existing tunnel. For example, a cloud service may notify a client device connected to a server of a time window during which the server may undergo a software upgrade. The time window may be longer than an expected duration of the software upgrade. The client device may select a particular time instant along the time window for the software upgrade on a particular server, during which traffic may be rerouting to an alternative server. In some embodiments, a client device may select a specific time within a time window for rerouting traffic based on an expected duration of a software upgrade, e.g., to permit the completion of the software upgrade within the time window. For instance, if an expected duration for a scheduled software upgrade is two hours, and a time window allotted for completing the scheduled software upgrade is five hours, a client device may select any time within the first three hours of the time window to initiate the software upgrade, such that at least two hours are available to complete the software upgrade within the time window. In some embodiments, a client device may select a specific time for rerouting network traffic based on a predicted and/or expected flow of network traffic via a tunnel, e.g., prior to downloading a large file and/or launching a streaming and/or interactive application, and/or based on a history of network activity. In some embodiments, a cloud service may reject a specific time for rerouting traffic if insufficient time remains within the time window to complete a software upgrade on a particular server. In some embodiments, a cloud service may recommend a specific time, choose a default time, and/or prompt a user for a different time to initiate an upgrade if a time provided by the client is unsuitable.

By way of a non-limiting example, in FIG. 11A, cloud service 1110 may receive a request to upgrade software on server 1112 among distributed servers 1112, 1114, 1116, 1118, and 1120. For example, cloud service 1110 may receive an automated request from a policy engine associated with network 1100 to install a security patch. In response to the request, cloud service 1110 may schedule the software upgrade on server 1112. For instance, cloud service 1110 may add an event for the software upgrade for server 1112 to a queue, causing data (e.g., software instructions) associated with the software upgrade to be transmitted to server 1112 for execution based on the schedule via backbone 1128. In some embodiments, the software upgrade may be scheduled to occur within a time window (e.g., within twelve hours) of a current time. In some embodiments, server 1112 and/or cloud service 1110 may receive from client device 1122 a specific time for rerouting network traffic flow within the time window. For example, a user of client device 1122 may expect to complete a video conference within an hour, and may request that the software upgrade begin during the second hour of the time window, to permit completion of the video conference via existing tunnel 1106.

Some disclosed embodiments involve accessing the records to identify an existing tunnel between a client device and the particular server. Accessing records refers to reading and/or retrieving data stored in memory. The data may be organized in a data structure permitting access to the data by querying using one or more associated keys, such as a unique identifier for a particular server). In some embodiments, accessing records may include accessing a data structure via one or more network connections. To identify an existing tunnel between a client device and a particular server refers to determining, recognizing, and/or discovering a tunnel through which data may be currently and/or presently transferred between a client device and a particular server. For example, a vendor may query a data structure storing information for existing tunnels using an identifier for a particular server to discover one or more existing tunnels between the particular server and one or more client devices. The information may identify the one or more client devices, the one or more existing tunnels, one or more time stamps indicating when a specific tunnel was established, an expected time duration and/or timeout for a specific tunnel, one or more tunnel characteristics (e.g., an associated protocol, performance requirements, a maximal response time and/or latency, a minimal packet loss and/or jitter, and/or available bandwidth) and/or any other information associated with a tunnel between a particular server and a client device.

Some disclosed embodiments involve prior to the scheduled software upgrade, accessing the records to identify an alternative server to which existing tunnel traffic can be directed during the software upgrade. Prior to the scheduled software upgrade refers to before implementation and/or installation of a scheduled upgrade. This may include prior to pausing and/or terminating one or more services currently provided by a particular server to a client device. An alternative server to which existing tunnel traffic can be directed during a software upgrade refers to a different server, other than the particular server currently serving a client device, designated, available, and/or selected to communicate network traffic associated with the existing tunnel while the particular server undergoes the software upgrade. In some embodiments, the alternative server may seamlessly replace and/or substitute the particular server such that the client device may be unaware of the diversion of the tunnel traffic via the alternative server. A cloud service may identify an alternative server to direct tunnel traffic based on one or more criteria. Such criteria may include confirmation that any software upgrades scheduled for the alternative server do not interfere and/or conflict with an expected time period during which the tunnel traffic is diverted, confirmation of available resources (e.g., CPU, memory, and/or channel bandwidth) of the alternative server for handling the diverted tunnel traffic, geographic proximity of the alternative server to the client device and/or to the particular server undergoing the software upgrade, conformance with one or more network policies (e.g., including a priority, performance and/or security requirements, and/or regional considerations), and/or any other criteria that may affect network performance due to directing tunnel traffic to an alternative server. In some embodiments, a cloud server may access a data structure storing network state information and/or one or more rules and/or policies to select an alternative server for directing tunnel traffic. For example, a cloud service may select an alternative server based on compliance with regional privacy and/or security regulations, on a current version of software installed on the alternative server, on available capacity, and/or based on any other consideration.

In some disclosed embodiments, the particular server and the alternative server are included in a common cluster of servers. A common cluster of servers refers to the same group of servers. For example, the particular server and the alternative server may belong to the same Point of Presence (PoP). A common cluster of server may include a physical cluster or servers and/or a virtual cluster of servers. A physical cluster or servers refers to a tangible location housing hardware devices, such as routers, switches, and/or servers. For instance, the particular server and the alternative server may be co-located in a specific geographic location for providing connectivity to client devices located in proximity thereto. A virtual cluster of servers may utilize virtualized network functions hosted in a cloud, and may provide flexibility and/or scalability in response to network demands.

Some disclosed embodiments involve scheduling the software upgrade for each server in the common cluster of servers. Scheduling a software upgrade refers to planning, coordinating, and/or arranging for a software upgrade. Scheduling a software upgrade for each server in a common cluster of servers may include accessing a data structure storing schedules for the servers in the cluster to identify tasks scheduled for subsequent execution, accessing a records associated with previous software upgrades completed for each of the servers, and/or utilizing a predictive model to forecast workloads for the servers in the cluster (e.g., during the period of the scheduled upgrade). Scheduling a software upgrade for servers in a common cluster may further include adding events associated with the software upgrade to an execution stack and/or queue, and/or obtaining one or more snapshots of existing states of the servers. In some embodiments, a cloud service may schedule a software upgrade for each server in a common cluster in staggered and/or phased rollouts such that at least some (e.g., a threshold number of) servers in the cluster may be operational at any given time, e.g., to reduce disruption to customers and/or ensure compliance with one or more performance criteria.

In some disclosed embodiments, the software upgrade is scheduled during different time windows for at least some of the servers in the cluster of servers. Different time windows refers to time windows having at least some non-overlapping and/or non-coinciding time periods. Different time windows may have different start times, different finish times, and/or different durations. Scheduling a software upgrade during different time windows for at least some servers may include staggering and/or phasing rollouts for the software upgrades for the at least some servers, such that at least some servers undergo software upgrades during non-overlapping time periods. This may ensure that a first subset of the at least some servers may continue to provide network services (e.g., remain online) while a second subset of the at least some servers may be taken offline to undergo a software upgrade, and the reverse, and may reduce disruption to customers.

In some disclosed embodiments, the software upgrade is scheduled during a common time window for at least some of the servers in the cluster of servers. Common time windows refers to overlapping and/or coinciding time periods, e.g., concurrently, simultaneously, and/or in parallel. Common time windows may include one or more of a same start time, a same finish time, and/or a same duration.

Scheduling a software upgrade during a common time window for at least some servers in a cluster may cause the at least some servers to undergo the software upgrade during coinciding time periods, and may cause the at least some servers to be offline concurrently and go back online at the end of the common time window. A cloud service, a policy engine, and/or an administrator may schedule at least some servers in a cluster to undergo concurrent software upgrades to enable completion of the software upgrade for each server in a cluster sooner than if each server were scheduled to undergo an upgrade during a different time window. A cloud service, policy engine, and/or administrator may select the common time window to coincide with a period associated with a low expected network traffic level, e.g., to reduce disruptions to network connectivity. For example, the common time window may be overnight and/or over a weekend.

By way of a non-limiting example, in FIG. 11A, cloud service 1110 may access records stored in data structure 1126 to identify existing tunnel 1106 between client device 1122 and server 1112. For example, cloud service 1110 may add a record for tunnel 1106 when client device 1122 established tunnel 1106 with server 1112. Prior to the scheduled software upgrade, cloud service 1110 may access records stored in data structure 1126 to identify alternative server (e.g., server 1116) to which existing tunnel traffic (e.g., currently transmitted via tunnel 1106) may be directed during the software upgrade. For example, cloud service 1110 may identify alternate server 1116 based on proximity to client device 1122, inclusion of server 1116 in cluster 1102 with server 1112, available capacity, a software upgrade schedule for server 1112, and/or any other consideration. In some embodiments, the particular server (e.g., server 1112) and the alternative server (e.g., server 1116) may be included in common cluster 1102 of servers. In some embodiments, cloud service 1110 may schedule a software upgrade for each server 1112, 1114, and 1116 in common cluster 1102 of servers. In some embodiments, cloud service 1110 may schedule the software upgrade during different time windows for server 1112 and servers 1114 and 1116. For example, cloud service 1110 may schedule the software upgrade for servers 1114 and 1116 during a first time window (e.g., from midnight on January 1 until midnight on January 2), and may schedule the software upgrade for server 1112 during a second time window following the first time window (e.g., from midnight on January 2 to midnight on January 3), such that the software upgrade on alternate server 1116 may be completed before the software upgrade initiates on particular server 1112. Consequently, rerouting traffic flowing through tunnel 1106 to flow via server 1116 may not be interrupted by a software upgrade. In some embodiments, cloud service 1110 may schedule a software upgrade for servers 1114 and 1116 included in cluster 1102 during a common time window (e.g., from midnight on January 2 to midnight on January 3). A duration for the software upgrade may be less than the scheduled time period (e.g., six hours) such that the software upgrades for servers 1114 and 1116 may at least partially overlap, or may not overlap.

In some disclosed embodiments, the particular server is included in a first cluster of servers, and wherein the alternative server is included in a second cluster of servers. This may be understood to mean that the particular server and the alternative server are located in differing server groupings. For example, the servers may be part of different PoPs. The particular server and the alternative server may be associated with different geographic locations and/or different virtual locations. For instance, if all or most of the servers in a first server cluster are scheduled for a software upgrade during a first time window, a cloud service, a policy engine, and/or an administrator may select one or more servers in a second (e.g., neighboring) cluster to handle traffic routed from the servers in the first cluster. The servers in the second cluster may be scheduled to undergo a software upgrade during a second time window to avoid disruptions to the rerouted traffic. In some embodiments, the second cluster of servers may be selected based on geographical proximity to the first cluster of servers. For instance, the second cluster may be physically closer to the first cluster than any other cluster of servers. In some embodiments, the second cluster of servers may be selected based on geographical proximity to at least some client devices connected to servers in the first cluster. For instance, a client device connected to a server in the first cluster may be physically closer to the second cluster than to the first cluster. In some embodiments, the second cluster may be selected based on availability to handle traffic routed from the first cluster, completion of a recent software upgrade, one or more policies (e.g., regulatory, security, performance, regional, and/or any other policy), customer preferences and/or settings (e.g., a priority, performance criteria, cost, and/or any other customer preference), and/or any other criteria.

Some disclosed embodiments involve scheduling the software upgrade for each server in the first cluster of servers. This may be understood to mean planning and/or preparing a software upgrade for all the servers included in the first cluster containing the particular server. In some embodiments, a cloud service, policy engine, and/or administrator may schedule the software upgrades for servers in a cluster in a staggered and/or phased rollout to ensure that a least some servers in the first cluster remain online at any given time. Alternatively, the software upgrades may be scheduled to occur concurrently for each server in a cluster, such all or most of the servers in the first cluster may be unavailable to handle network traffic during the upgrade. Consequently, the cloud service may select one or more servers in the second cluster to handle network traffic during the software upgrade on the servers in the first cluster. In some embodiments, upon completion of the software upgrade for each server in the first cluster, traffic may be rerouted back from the servers in the second cluster to one or more servers in the first cluster, e.g., to permit scheduling a software upgrade for the servers in the second cluster. Thus, a cloud service, policy engine, and/or administrator may stagger and/or phase rollouts of software upgrades across a computer network within a server cluster and/or across different server clusters in the network.

By way of a non-limiting example, in FIG. 11A, prior to the scheduled software upgrade, cloud service 1110 may access records in data structure 1126 to identify server 1118 as an alternative server to which existing tunnel traffic (e.g., flowing via tunnel 1108) may be directed during the software upgrade on server 1112. The particular server (e.g., server 1112) may be included in cluster 1102 and the alternative server (e.g., server 1118) may be included in cluster 1104. In some embodiments, cloud service 1110 may schedule a software upgrade for each of servers 1112, 1114, and 1116 in cluster 1102 of servers (e.g., such that servers 1112, 1114, and 1116 may be concurrently unavailable to handle network traffic for client device 1122 during the software upgrade). Consequently, cloud service 1110 may select server 1118 in cluster 1104 to handle network traffic for client device 1124 during the software upgrade on server 1112.

Some disclosed embodiments involve, following identification of the alternative server and prior to the scheduled software upgrade, rerouting network traffic flow from the client device to the alternative server to thereby avoid a communication blip. Following identification of the alternative server and prior to the scheduled software upgrade refers to after determining an alternative server for diverting tunnel traffic, but before pausing one or more services currently provided to the client device by the particular server scheduled to undergo the software upgrade. Rerouting network traffic flow from the client device to the alternative server refers to diverting, redirecting, and/or switching tunnel traffic from an existing tunnel associated with the particular server scheduled to undergo the software upgrade to a substitute tunnel associated with an alternative server expected to be available for handling the tunnel traffic during the software upgrade. For example, a cloud service may provide a client device with an IP address for an alternative server and notify the client device to establish a new substitute tunnel to the alternative server, replacing the existing tunnel to the particular server, such that subsequent network traffic to and from the client device flows through the newly established tunnel from and to the alternative server. The substitute tunnel to the alternative server may comply with a similar protocol, network policies, and/or customer settings as the exiting tunnel to the particular server scheduled to undergo the software upgrade. A communication blip refers to a temporary disruption in network connectivity. A communication blip may last a fraction of a second, one or more seconds, one or more minutes, and/or one or more hours.

A communication blip experienced by a client device while a server undergoes a software upgrade may depend on a type of the software upgrade, a type of interaction between the client device and the server (e.g., a real-time interaction, stateless API call, and/or long-lived session), and/or a server architecture. For example, a communication blip may include a temporary loss in connectivity, packet loss and/or increased latency, an authentication timeout, issues with routing and/or Domain Name System (DNS) resolution, an application-level error, and/or a relatively brief interruption as a new tunnel is established and/or due to a change in IP address of an endpoint. A temporary loss in connectivity may be due to a session drop if a tunnel drops while a server is rebooted, and/or while an associated network stack is restarted during a software upgrade. Additionally or alternatively, a temporary loss in connectivity may be due to a connection reset if an application-level session (e.g., HTTPS, SSH, and/or file transfer session) is terminated during a software upgrade. Packet loss may occur due to restarting of a server and/or rerouting of traffic following a software upgrade. Jitter and/or delay may occur if a tunnel is reevaluated and/or a load-balancer re-engages following a software upgrade. An authentication timeout may occur if an upgrade affects identity services and/or authentication modules (e.g., SAML and/or RADIUS) are affected by a software upgrade. Routing and/or DNS resolution issues may be caused if a software upgrade affects one or more routing tables and/or DNS services. For example, a client device may experience a connection drop if a server closes a TCP/UDP connection during a software upgrade, a timeout error if a server is unreachable and/or non-responsive, and/or an unavailability error (e.g., an HTTP 503 error). Additionally or alternatively, a client device may be logged out of a session if session data is not regular persisted and/or replicated, and/or experience packet loss and/or degraded service due to slower response times, limited access to services, and/or limited server functionality. Avoiding a communication blip refers to evading, eluding, and/or preventing a communication blip. Diverting network traffic via a new tunnel to an alternative server before the particular server undergoes a software upgrade may permit network traffic to continually flow to and from the client device (e.g., seamlessly) such that the client device may be oblivious to occurrence of the software upgrade on the particular server. Diversion of network traffic to avoid a communication blip may permit the client device to communicate with the network seamlessly and/or continuously, absent noticeable breaks, stops, and/or interruptions in connectivity. Absent rerouting of tunnel traffic prior to scheduling, implementation and/or installation of a software upgrade on the particular server, the client device connected to the particular server via a tunnel may experience one or more of the communication blips described herein.

Figure 11B:
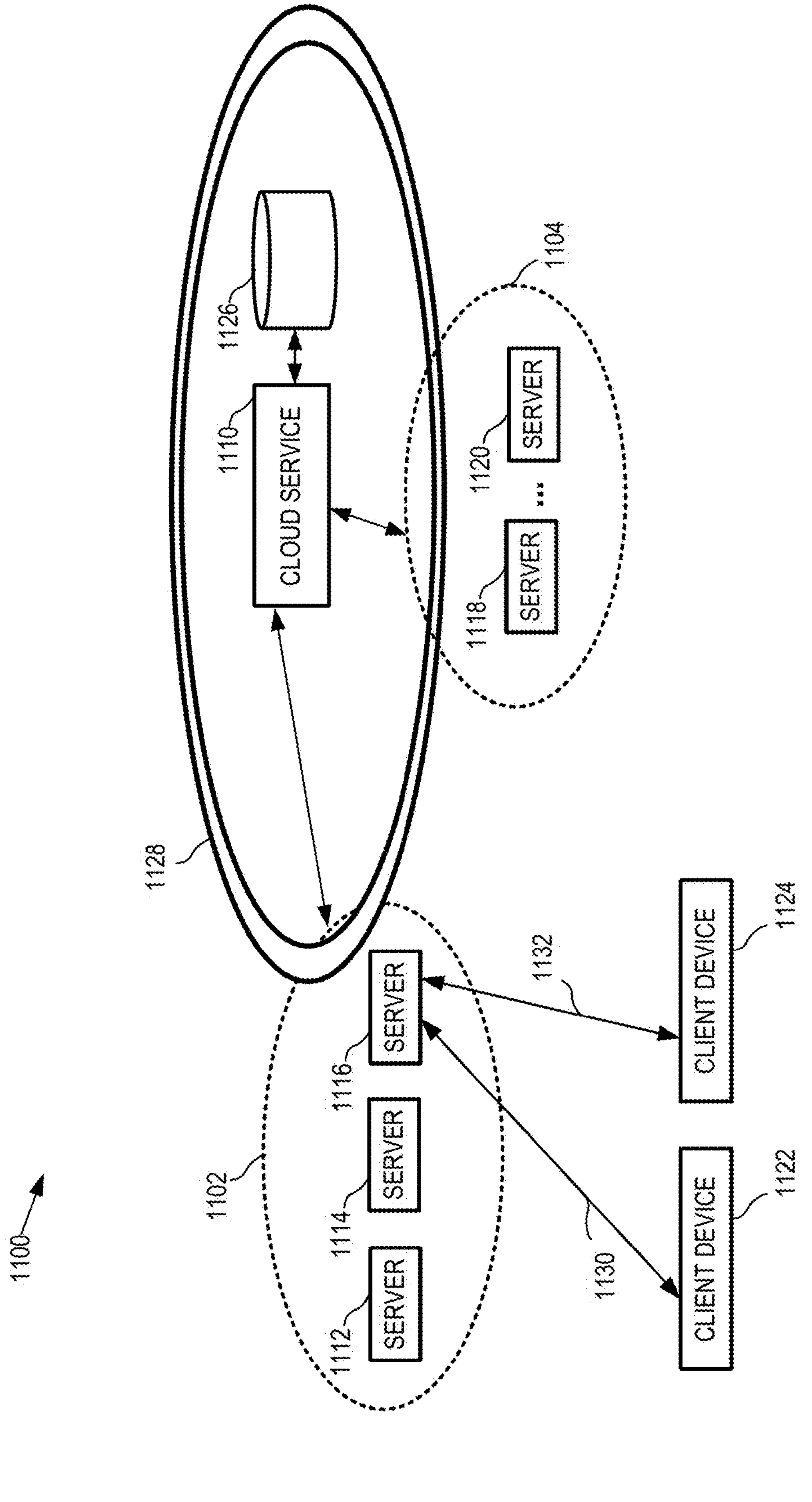
FIG. 11B is another exemplary schematic diagram of the network of FIG. 11A for altering network connections during maintenance periods, consistent with some disclosed embodiments.

By way of a non-limiting example, reference is made to FIG. 11B illustrating another exemplary schematic diagram of network 1100 of FIG. 11A for altering network connections during maintenance periods, consistent with some disclosed embodiments. FIG. 11B is substantially similar to FIG. 11A with the noted difference of a tunnel 1130 between client device 1122 and server 1116, replacing tunnel 1106 between client device 1122 and server 1112 in FIG. 11A. Server 1112 and server 1116 may be included in the same cluster 1102 of servers. Following identification of alternative server 1116, and prior to the scheduled software upgrade (e.g., on particular server 1112), cloud service 1110 may cause network traffic flow to be rerouted from client device 1122 to alternative server 1116 to thereby avoid a communication blip. Consequently, network traffic flow may continue to flow (e.g., seamlessly) via tunnel 1130 while server 1112 undergoes a software upgrade, preventing client device 1122 from experiencing a communication blip.

Some disclosed embodiments involve, following completion of the scheduled software upgrade, routing network traffic flow back from the alternative server to the particular server. Following completion of a scheduled software upgrade may refer to a time after a scheduled software upgrade is concluded and/or achieved. For instance, a schedule software upgrade may be completed after software associated with the upgrade has been installed on a server, and the server has been restarted. Completion of a scheduled software upgrade may additionally include completion of one or more tests, monitoring and/or simulating an execution of the upgraded software, and/or testing and/or trouble shooting an outcome of an execution of the upgraded software. Following one or more of these steps, the cloud service may determine that the server is ready to go back online and provide services to client devices. Routing network traffic flow back from an alternative server to a particular server may refer to establishing a connection between the client device and the particular server, and terminating the connection between the client device and the alternative server. For example, prior to a scheduled upgrade, a client device may communicate with a network via a first tunnel connection to a first server. During a scheduled upgrade on the first (e.g., particular) server, the client device may continue communicating with the network, however the communication may flow via a second tunnel connection to a second (e.g., alternative) server, replacing the first tunnel connection. Once the scheduled upgrade on the first server is complete, the client device may continue communicating with the network via a third tunnel connection to the first server, replacing the second tunnel connection to the second server. A client device may elect to route traffic flow back to the particular server based on an indication that the first server is back online, a recommendation from a cloud server and/or a load balancer, one or more user preferences, an indication of a pending software upgrade scheduled on the alternative server, and/or any other consideration for routing network traffic back via a tunnel to the particular (e.g., first) server.

Some disclosed embodiments involve, following completion of the scheduled software upgrade, maintaining network traffic flow between the client device and the alternative server. Maintaining network traffic flow between a client device and an alternative server refers to preserving and/or continuing network traffic flow between the client device and the alternative server. A client device may elect to continue routing traffic flow via the alternative server based on a recommendation from a cloud service and/or load balancer, one or more user preferences (e.g., stipulating to avoid switching to another tunnel connection if a network connection meets one or more performance criteria), and/or any other consideration for maintaining traffic flow with the alternative server. Maintaining traffic flow with the alternative server may reduce overhead costs associated with terminating an existing tunnel connection to the alternative server and establishing a new tunnel connection with the particular server.

By way of a non-limiting example, in FIGS. 11A-11B, following completion of the scheduled software upgrade on server 1112, cloud server 1110 may route network traffic flow back from alternative server 1116 (FIG. 11B) to particular server 1112 (FIG. 11A). For example, client device 1122 may terminate tunnel 1130 connecting client device 1122 to alternative server 1116, and re-establish tunnel 1106 (FIG. 11A) connecting client device 1122 to particular server 1112. In some embodiments, in FIG. 11B, following completion of the scheduled software upgrade on server 1112, cloud server 1110 may maintain network traffic flow between client device 1122 and alternative server 1116 (e.g., by maintaining tunnel 1130 connected client device 1122 to alternative server 1116).

In some disclosed embodiments, the identification of the alternative server is based at least on a recent completion of the software upgrade on the alternative server. A recent completion of a software upgrade on an alternative server refers to a prior and/or previous software upgrade completed on the alternative server within a limited time of the present (e.g., currently). For example, a recent completion of a software upgrade on an alternative server may be completed within the last day, the last week, the last month, or the last year. A recent completion of a software upgrade may be an indication that the alternative server may be available to handle traffic rerouted from a different server scheduled to undergo a software upgrade, and/or that the alternative server may be equipped with up-to-date security patches, software versions, protocols, and/or performances optimizations that may improve network performance. When a server undergoes a software upgrade, details of the upgrade (e.g., the time, day, version, protocol and/or any other detail associated with the software upgrade) may be stored in a data structure in associated with an identifier for the server. When selecting an alternative server to (e.g., temporarily) handle traffic for a server scheduled for a software upgrade, a cloud service may access the data structure to determine which servers already underwent a similar software upgrade, and are therefore available to handle traffic rerouted from the server scheduled for the upgrade.

By way of a non-limiting example, in FIGS. 11A-11B, cloud service 1110 may identify alternative server 1116 based at least on a recent completion of the software upgrade on alternative server 1116. For instance, cloud service 1110 may have scheduled an upgrade for servers 1114 and 1116 during an earlier time window than for server 1112 such that the upgrade may be completed on server 1116 by the time the upgrade begins on server 1112.

Some disclosed embodiments involve accessing the records to identify at least one additional existing tunnel between at least one additional client device and the particular server. An additional existing tunnel between an additional client device and the particular server refers to another current tunnel through which traffic may flow between another client device and the particular server. For example, the particular server may be simultaneously connected to a plurality of different client devices via a plurality of different tunnels. The different tunnels may be associated with a similar or different communication protocols, network settings, and/or user preferences. A cloud service, policy engine, and/or administrator may access a data structure storing records of any existing tunnels to a particular server to permit identification of tunnel traffic that may need to be rerouted while the particular server undergoes a software upgrade. Some disclosed embodiments involve, prior to performance of the scheduled software upgrade on the particular server, rerouting network traffic flow from the at least one additional client device to thereby avoid at least one an additional communication blip. Rerouting network traffic flow from an additional client device to avoid an additional communication blip may be understood to mean diverting traffic flowing through the additional existing tunnel to prevent the additional client device from experiencing a disruption in network connectivity while the particular server undergoes a software upgrade. Rerouting the network traffic flow may include establishing a substitute tunnel between the additional client device and another server, e.g., replacing the existing tunnel to the particular server. The substitute tunnel may conform with the same protocol, network policies, and/or customer preferences as the previous (e.g., additional existing) tunnel between the additional client device and the particular server.

In some disclosed embodiments, the network traffic flow is rerouted from the at least one additional client device to the alternative server. This may be understood to mean that network traffic between a plurality of client devices each connected to a first (e.g., common) server may be diverted to a second (e.g., common) server while the first server undergoes a software upgrade. The alternative server to which the network traffic flow is rerouted may be selected based on availability, proximity to the client device and the at least one additional client device, proximity to the particular server, one or more network policies, a load balancer, a record of a recent software upgrade on the alternative server, and/or any other consideration for selecting the alternative server. The client device and the at least one additional client device may each establish a substitute tunnel to the alternative server, each substitute tunnel conforming to a protocol, network policy, and customer preferences of the respective existing tunnel and additional existing tunnel.

By way of a non-limiting example, in FIG. 11A, cloud service 1110 may access the records in data structure 1126 to identify at least one additional existing tunnel 1108 between at least one additional client device 1124 and the particular server. Thus client device 1122 may connect to server 1112 via tunnel 1106 and client device 1124 may connect to server 1112 via tunnel 1108. Prior to performance of the scheduled software upgrade on particular server 1112, cloud service 1110 may reroute network traffic flow from client device 1124 to thereby avoid at least one additional communication blip. Byway of a non-limiting example, in FIG. 11B, cloud service 1110 may reroute traffic flow from client device 1124 to alternative server 1116. For instance, client device 1124 may establish a tunnel 1132 to server 1116, replacing tunnel 1108 to server 1112 in FIG. 11A. Consequently, cloud service 1110 may migrate traffic flowing through tunnels 1106 and 1108 connecting client devices 1122 and 1124 to server 1112 (FIG. 11A) to tunnels 1130 and 1132 connecting client devices 1122 and 1124 to server 1116 (FIG. 11B).

In some disclosed embodiments, the network traffic flow is rerouted from the at least one additional client device to at least one additional alternative server. This may be understood to mean that network traffic between a plurality of client devices connected to a common server may be diverted to a at least one other server. For example, network traffic between a first client device and a particular server may be diverted to a first alternative server and network traffic between a second client device and the particular server may be diverted to a second alternative server. The first client device may establish a first tunnel connection to the first alternative server and the second client device may establish a second tunnel connection to the second alternative server.

In some disclosed embodiments, the alternative server and the at least one additional alternative server are included in a common cluster of servers. This may be understood to mean that the alternative server receiving traffic diverted from the client device and the additional alternative server receiving traffic diverted from the additional server may be co-located in the same cluster (e.g., included in the same PoP). A cloud service, policy engine, and/or administrator may reroute traffic directed to a particular server scheduled to undergo a software upgrade to one or more servers included in the same cluster, e.g., based on proximity of the server and/or cluster to an associated client device, proximity to the cluster including the alternative server and the at least one additional alternative server, one or more network policies, user preferences, regulations, availability, a record of a recent upgrade, and/or any other consideration.

Figure 11C:
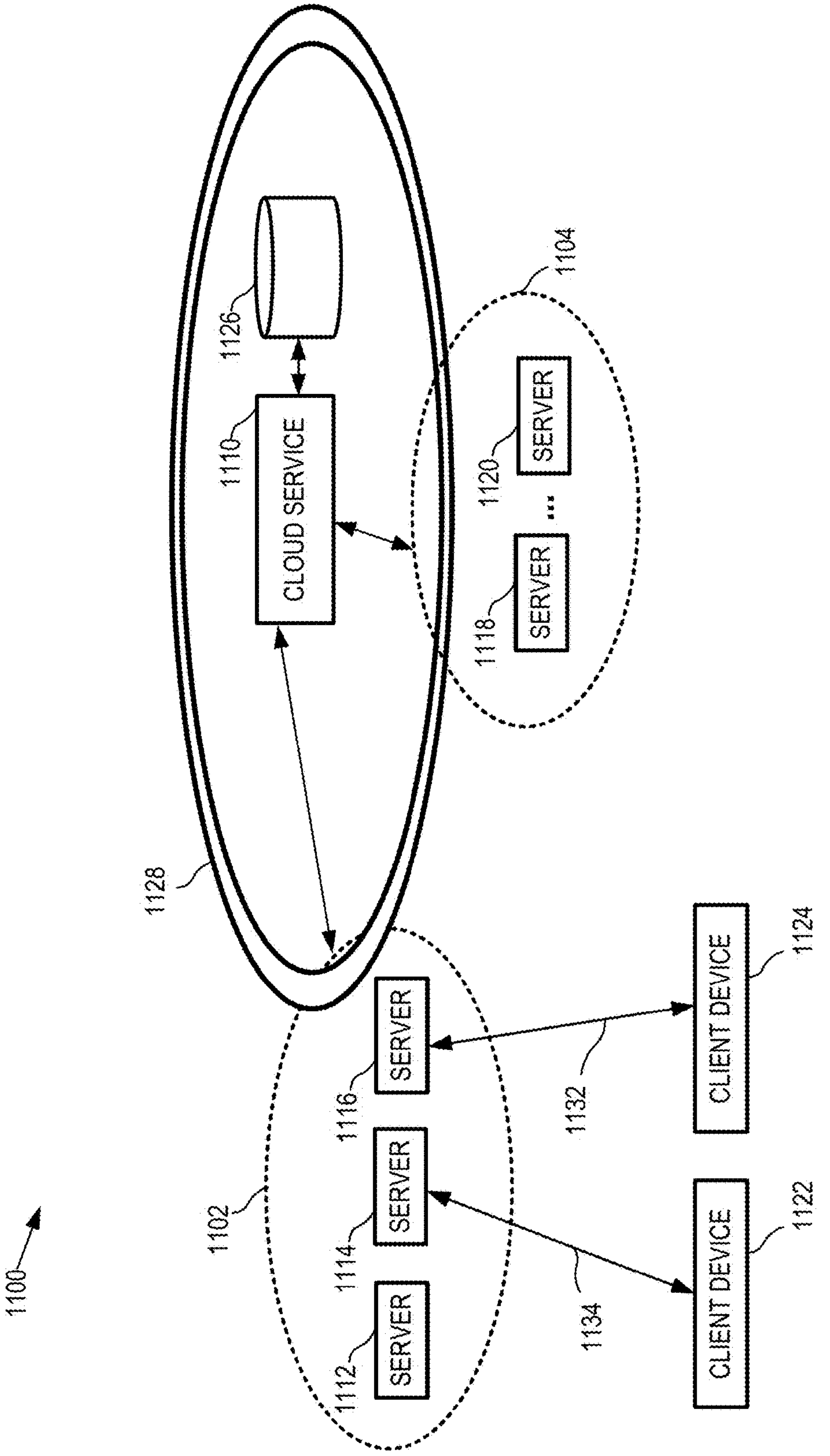
FIG. 11C is an additional schematic diagram of the network of FIG. 11A for altering network connections during maintenance periods, consistent with some disclosed embodiments.

By way of another non-limiting example, reference is made to FIG. 11C illustrating an additional exemplary schematic diagram of network 1100 of FIGS. 11A-11B for altering network connections during maintenance periods, consistent with some disclosed embodiments. FIG. 11C is substantially similar to FIG. 11B with the noted difference of a tunnel 1134 connecting client device 1122 with server 1114 (e.g., replacing tunnel 1108 between client device 1124 and server 1112). Thus, client device 1122 may be connected to server 1114 via tunnel 1134 and client device 1124 may be connected to server 1116 via tunnel 1132. Network traffic flowing through tunnel 1106 may be diverted to tunnel 1134 and network traffic flowing through tunnel 1108 may be diverted to tunnel 1132 while server 1112 undergoes a software upgrade. Server 1114 and server 1116 may be included in a common cluster 1102 of servers (e.g., the same cluster 1102).

In some disclosed embodiments, the alternative server is included in a first cluster of servers and wherein the at least one additional server is included in a second cluster of servers. This may be understood to mean that the alternative server receiving traffic diverted from the client device and the additional alternative server receiving traffic diverted from the additional server may be distributed in different clusters (e.g., each server may be included in a different PoP). A cloud service, policy engine, and/or administrator may reroute traffic directed to a particular server scheduled to undergo a software upgrade to servers in different clusters based on proximity of the first and second clusters to the cluster including the particular server, proximity of the first and second clusters to each respective client device, one or more network policies, user preferences, locality-based regulations, availability, records of recent upgrades, and/or any other consideration.

Figure 11D:
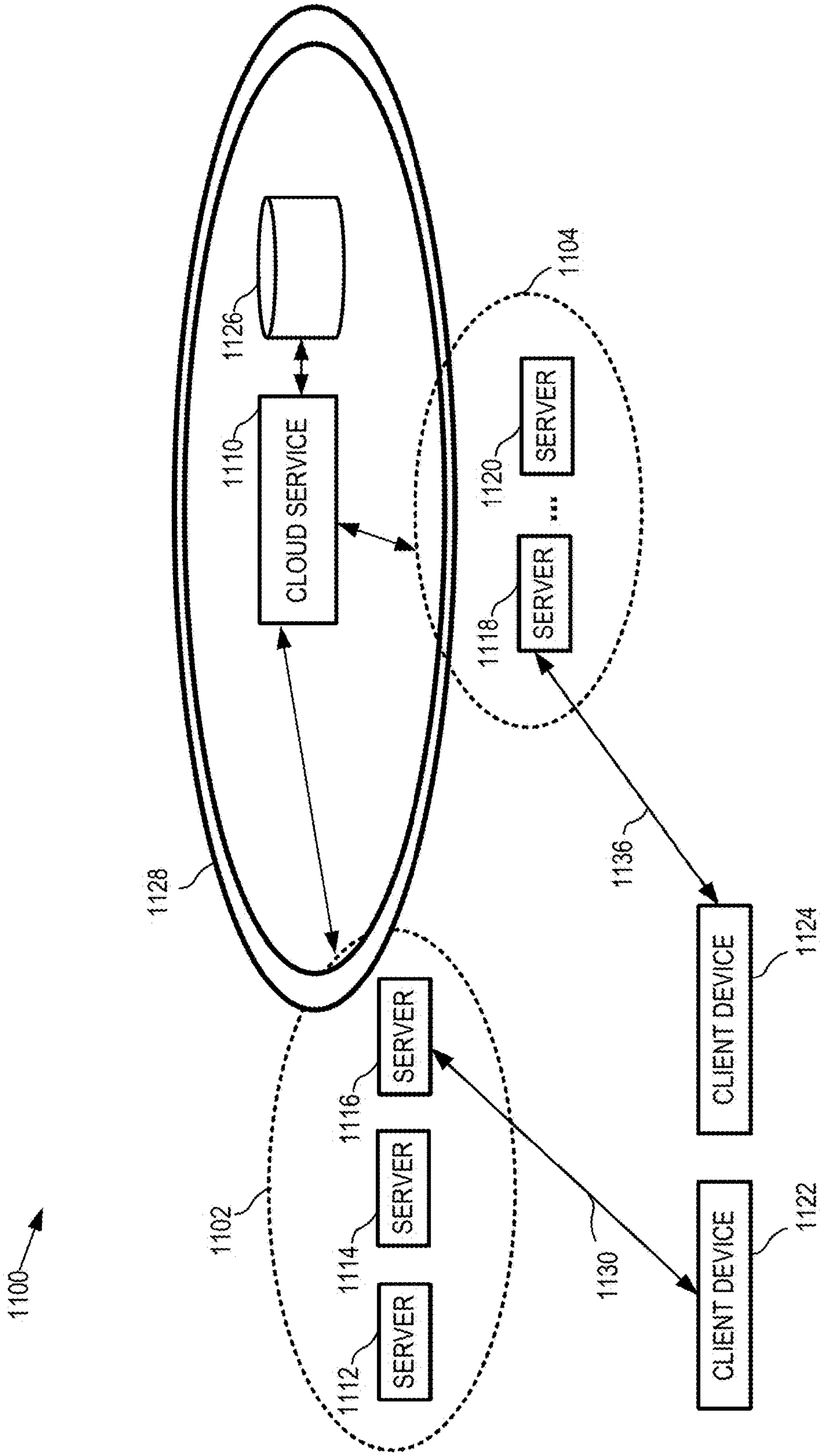
FIG. 11D is a further schematic diagram of the network of FIG. 11A for altering network connections during maintenance periods, consistent with some disclosed embodiments.

By way of another non-limiting example, reference is made to FIG. 11D illustrating an additional exemplary schematic diagram of network 1100 of FIGS. 11A-11C for altering network connections during maintenance periods, consistent with some disclosed embodiments. FIG. 11D is substantially similar to FIG. 11B with the noted difference of a tunnel 1136 connecting client device 1124 with server 1118 (e.g., replacing tunnel 1108 between client device 1124 and server 1112 in FIG. 11A). Thus, client device 1122 may be connected to server 1116 via tunnel 1130 and client device 1124 may be connected to server 1118 via tunnel 1136. Network traffic flowing through tunnel 1106 may be diverted to tunnel 1130 and network traffic flowing through tunnel 1108 may be diverted to tunnel 1136 while server 1112 undergoes a software upgrade. Server 1116 may be included in cluster 1102 and server 1118 may be included cluster 1104.

In some disclosed embodiments, the rerouting of the network traffic flow from the client device and from the at least one additional client device occur during a common time window. This may be understood to mean that multiple traffic flows to a particular server scheduled to undergo a software upgrade may be rerouted to one or more alternative servers concurrently (or within a general timeframe), to provide a common time window (as described earlier) to complete the software upgrade.

By way of a non-limiting example, in FIG. 11B, cloud service 1110 may reroute network traffic flow from client devices 1122 and 1124 during a common time window. Thus, tunnels 1130 and 1132 connecting clients devices 1122 and 1124 to alternate server 1116 may transmit data concurrently.

Figure 12:
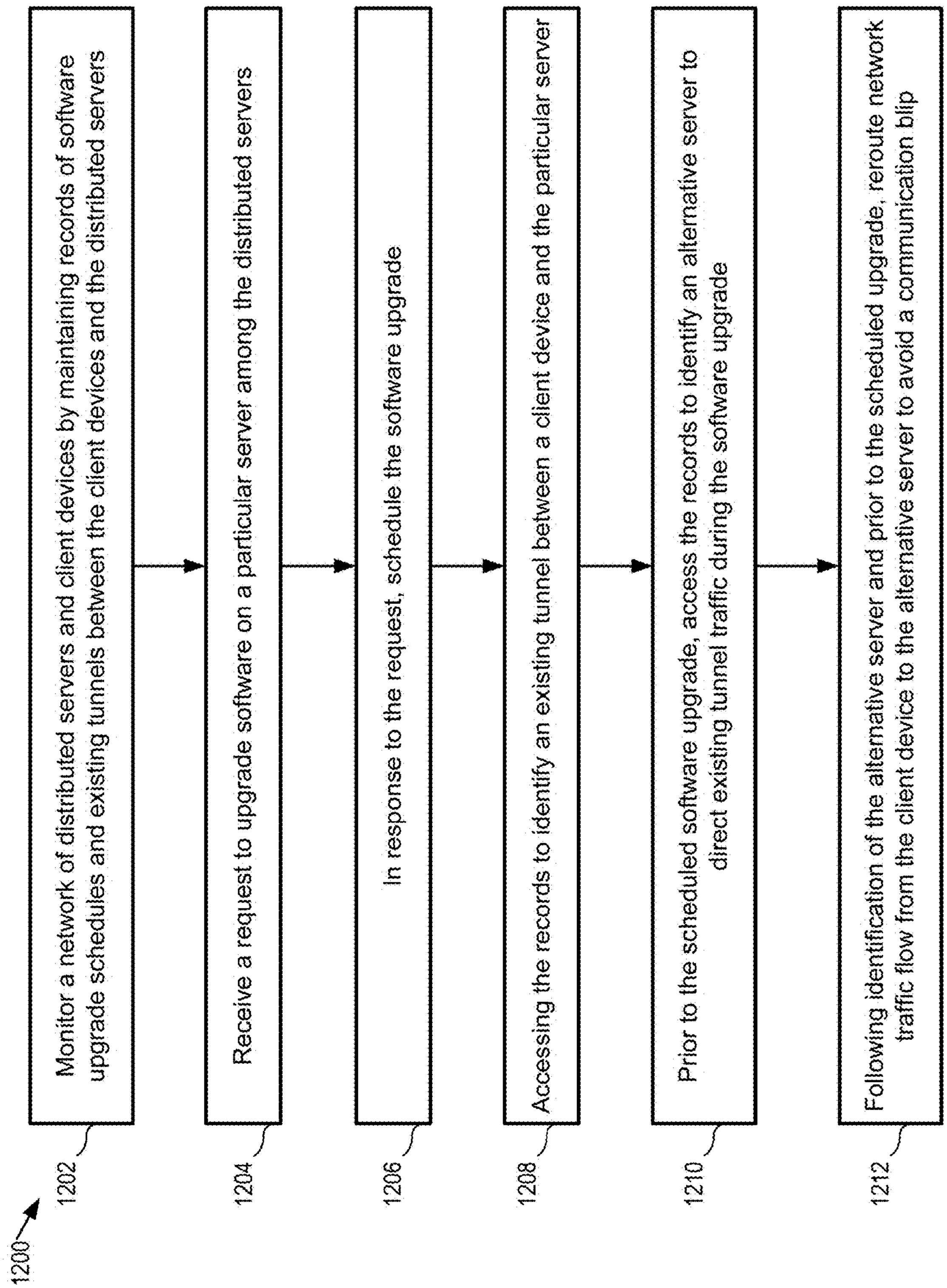
FIG. 12 is a flowchart of an example process for altering network connections during maintenance periods, consistent with some disclosed embodiments.

FIG. 12 is a flowchart of example process 1200 for performing load balancing operations, consistent with some disclosed embodiments. In some embodiments, process 1200 may be performed by at least one processor (e.g., processor 102 in FIG. 1) to perform operations or functions described herein. In some embodiments, some aspects of process 1200 may be implemented as software (e.g., program codes or instructions) that are stored in a memory (e.g., memory 104) or a non-transitory computer readable medium. In some embodiments, some aspects of process 1200 may be implemented as hardware (e.g., a specific-purpose circuit). In some embodiments, process 1200 may be implemented as a combination of software and hardware.

Referring to FIG. 12, process 1200 may include a step 1202 of monitoring via a cloud service, a network of distributed servers and client devices, wherein the monitoring includes maintaining records of software upgrade schedules for the distributed servers and existing tunnels between the client devices and the distributed servers. By way of a non-limiting example, in FIG. 11A, cloud service 1110 may monitor network 1100 of distributed servers 1112, 1114, 1116, 1118, and 1120 and client devices 1122 and 1124. The monitoring may include maintaining records of software upgrade schedules for distributed servers 1112, 1114, 1116, 1118, and 1120 and existing tunnels 1106 and 1108 between client devices 1122 and 1124 and one or more of distributed servers 1112, 1114, 1116, 1118, and 1120. For example, the records may be maintained in data structure 1126.

Process 1200 may include a step 1204 of receiving at the cloud service a request to upgrade software on a particular server among the distributed servers. By way of a non-limiting example, in FIG. 11A, cloud server 1110 may receive a request to upgrade software on particular server 1112 among distributed servers 1112, 1114, 1116, 1118, and 1120.

Process 1200 may include a step 1206 of in response to the request, scheduling the software upgrade. By way of a non-limiting example, in FIG. 11A, in response to the request, cloud service 1110 may schedule the software upgrade.

Process 1200 may include a step 1208 of accessing the records to identify an existing tunnel between a client device and the particular server. By way of a non-limiting example, in FIG. 11A, cloud service 1110 may access the records in data structure 1126 to identify existing tunnel 1106 between client device 1122 and particular server 1112.

Process 1200 may include a step 1210 of prior to the scheduled software upgrade, accessing the records to identify an alternative server to which existing tunnel traffic can be directed during the software upgrade. By way of a non-limiting example, in FIG. 11A, prior to the scheduled software upgrade, cloud service 1110 may access the records in data structure 1126 to identify alternative server 1116 to which existing tunnel traffic can be directed during the software upgrade.

Process 1200 may include a step 1212 of following identification of the alternative server and prior to the scheduled software upgrade, rerouting network traffic flow from the client device to the alternative server to thereby avoid a communication blip. By way of a non-limiting example, in FIG. 11B, following identification of alternative server 1116 and prior to the scheduled software upgrade, cloud service 1110 may reroute network traffic flow from client device 1122 to alternative server 1116 to thereby avoid a communication blip. For instance, cloud service may migrate traffic from tunnel 1106 connecting client device 1122 to server 1112 to tunnel 1130 connecting client device 1122 to server 1116.

Some disclosed embodiments involve performance of unified network security management operations. Security refers to practices, technologies, and/or policies designed to protect the integrity, confidentiality, and/or availability of data and/or systems that are transmitted or accessed. For example, security may involve preventing unauthorized access to data or resources, detecting and responding to intrusions or malicious activity, ensuring data confidentiality, maintaining data integrity, or any other suitable actions. Network security may include security of and/or for a network, including any connected devices and/or associated data. For example, network security may include implementing a firewall, antivirus software, antimalware software, an intrusion detection system (IDS), a virtual private network (VPN), encryption, or any other network security measure known to those having skill in the art.

Unified refers to a capability or characteristic of combining, integrating, centralizing, and/or bringing together one or more parts into a single whole. For example, unified may include consistent or compatible parts that, together, operate or function as a single entity or to achieve a single goal. Management refers to the process of planning, organizing, directing, and/or controlling resources to achieve specific goals. For example, management may include defining policies, conducting risk assessment, assigning roles and responsibilities, and/or enforcing policies. Unified network security management may include security policy enforcement, threat monitoring, incident response, asset management, change management, and/or compliance management for a network in a unified manner, as described elsewhere herein. Performance (e.g., implementation) of unified network security management operations by at least one processor may ensure that a network is managed according to defined security protocols or operations as executed by the at least one processor in a unified manner.

By way of non-limiting, the at least one processor may include one or more central processors (e.g., processor 1302), one or more servers (e.g., server cluster 1312, 1418), and/or one or more edge devices (e.g., edge device cluster 1306, 1416), any combination of which may be configured to perform unified network security management operations. By way of non-limiting example, a network (e.g., network 1300, 1400) may include at least one processor (e.g., as exemplified above) and a communication means (e.g., backbone 1304) between devices in the network.

Some disclosed embodiments involve maintaining in a cloud service management application, a unified policy for controlling network security across a plurality of servers and edge devices. Cloud service refers to a computing resource or application that is delivered over the internet, as described elsewhere herein. For example, cloud service may provide resources on-demand (e.g., storage, computing power, software) to a user and may include infrastructure as a service (IaaS), platform as a service (PaaS), or software as a service (SaaS).

Figure 13:
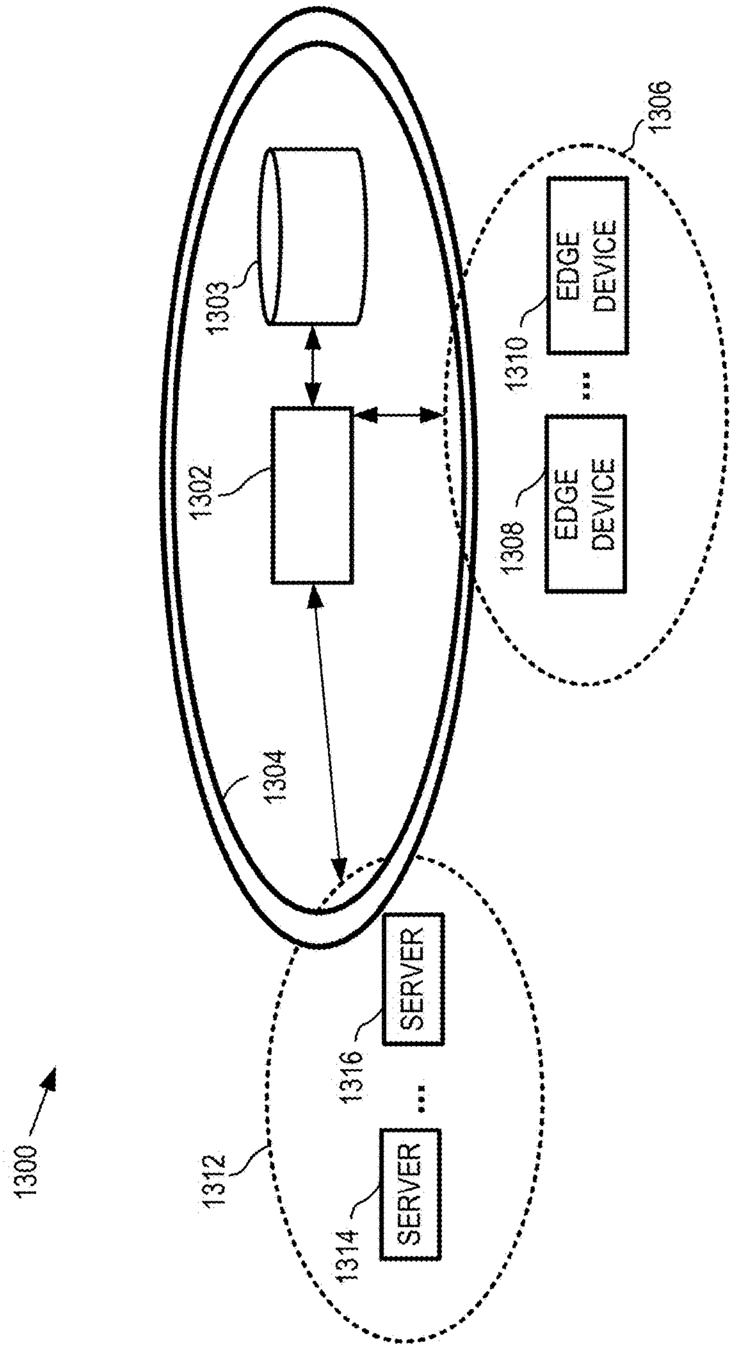
FIG. 13 illustrates an exemplary schematic diagram of a system for coordinating security, consistent with some disclosed embodiments.

By way of non-limiting example and with reference to FIG. 13, processor 1302 and database 1303 may host or execute instructions related to a cloud service management application. By way of non-limiting example and with reference to FIG. 14, cloud service system 1402, which may include at least one processor and/or at least one memory component (e.g., database), may host or execute instructions related to a cloud service management application. In general, it may be appreciated by one having ordinary skill in the art that cloud service system 1402 may comprise processor 1302, database 1303, any other processor, any other memory component, or any combination of the foregoing.

A unified policy may include a policy that is centralized and/or governs one or more devices in a unified manner, as described elsewhere herein. For example, a unified policy may define the set of rules and/or interactions that may govern an entire network as managed by at least one processor and may include a unified security policy, as described elsewhere herein. Controlling refers to issuing commands or instructions that direct a processor's hardware and/or software to carry out specific tasks or operations. Thus, a unified policy for controlling network security across a plurality of servers and edge devices by at least one processor may be understood to mean that the at least one processor may use the unified policy to coordinate or manage security for a network with a plurality servers and edge devices.

By way of non-limiting example, a memory component of cloud service system 1402 (e.g., database 1303) may store a unified policy 1404 that may be used (e.g., by processor 1302) to control network security across edge device cluster 1306, 1416 and server cluster 1312, 1418.

An application refers to a software program or collection of programs designed to perform specific tasks or functions. For example, an application may include a user-facing interface (e.g., graphical user interface, application programming interface). For example, an application may be hosted or operated on one or more processors and accessible to one or more devices (e.g., edge device, server) via a network. A cloud service management application may include a cloud-based application configured to manage one or more files, policies, or data. For example, a cloud service management application may include an application configured to manage a public, private, or hybrid cloud infrastructure by providing visibility, automation, compliance enforcement, and/or operational efficiency. Consequently, maintaining in a cloud service management application, a unified policy for controlling network security across a plurality of servers and edge devices may be understood to mean that a cloud-based application is configured to maintain and/or manage a unified policy (e.g., security policy) that governs network security across a plurality of connected devices (e.g., servers, edge devices).

By way of non-limiting example, cloud service system 1402 may be configured to run a cloud service management application configured to manage a cloud service (e.g., a cloud service hosted by cloud service system 1402).

In some disclosed embodiments, the unified policy for controlling network security includes at least an implementation of a common firewall at each edge device and at each server. Common refers to a characteristic of being shared between at least two entities or devices. A common firewall may include a shared firewall for one or more devices, as described elsewhere herein. For example, a common firewall may include a single firewall shared between a set of one or more edge devices, a single firewall shared between a set of one or more servers, or a single firewall shared between each edge device and each server. Implementation of a common firewall at each edge device and at each server may be understood to include having a single, common firewall acting as a barrier for each edge device and for each server, as described elsewhere herein.

Figure 14:
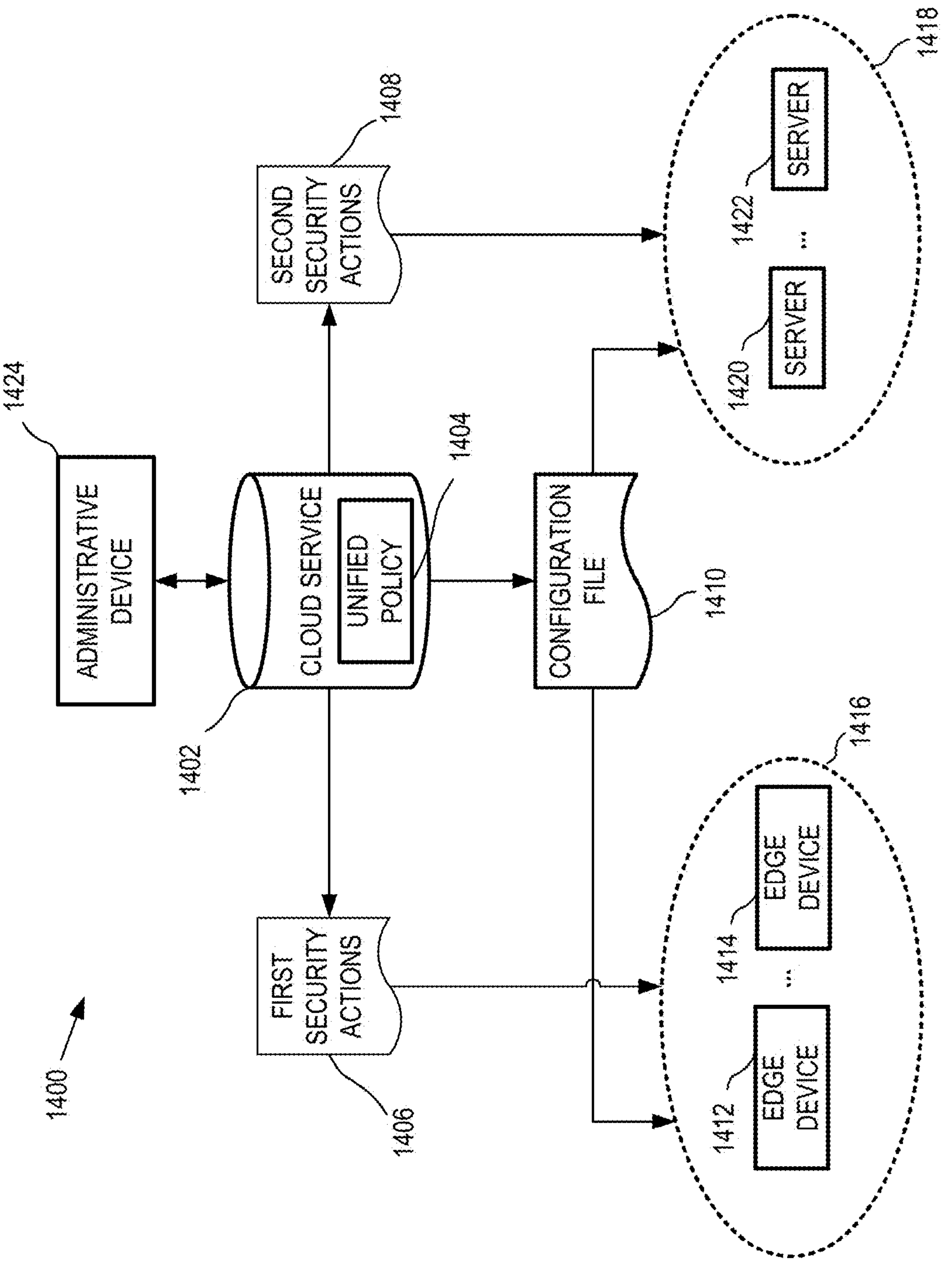
FIG. 14 illustrates an exemplary schematic diagram of a system for coordinating security, consistent with some disclosed embodiments.

By way of non-limiting example and with reference to FIG. 14, cloud service system 1402 may use unified policy 1404 to determine rules for and/or implement a common firewall at each edge device 1412, 1414 and at each server 1420, 1422. The common firewall may act as a protective security point between a device and another device connected to said device via a network. Additionally or alternatively, cloud service system 1402 may, using or enforcing unified policy 1404, implement a single common firewall for each cluster of edge devices (e.g., cluster 1306, 1416) and for each cluster of servers (e.g., cluster 1312, 1418). Although some non-limiting examples described herein are with reference to FIG. 14 and its depicted elements, in general it may be appreciated by one having ordinary skill in the art that some disclosed embodiments may be similarly applied with reference to FIG. 13 and its depicted elements, including when not explicitly stated (e.g., for similarly labeled elements).

In some disclosed embodiments, the unified policy for controlling network security includes at least an implementation of a coordinated encryption protocol at each edge device and at each server. Coordinated refers to a characteristic or capability of deliberately organizing, synchronizing, or aligning multiple entities to achieve a common goal efficiently and effectively. For example, one or more devices may coordinate with one or more other devices to accomplish a shared goal. In one example, a cloud service system (e.g., including a processor and/or a memory component) may coordinate one or more edge devices and/or one or more servers to each perform security operations (e.g., different security operations, similar security operations, same security operations) to achieve an overall security state, as further described and exemplified below. Encryption refers to the process of converting plaintext (i.e., readable data) into ciphertext (i.e., unreadable or scrambled data) to prevent unauthorized access. For example, encryption may include using an algorithm and a cryptographic key to encrypt, and thereby protect, data. Protocol refers to a formal set of rules and/or procedures that define how data is transmitted and processed between systems, devices, or components in a network. Consequently, a coordinated encryption protocol may include a structured set of rules and/or processes that enables multiple entities to work together in a synchronized way to perform encryption and decryption tasks securely and consistently. For example, a coordinated encryption protocol may include Transport Layer Security (TLS), Internet Protocol Security (IPsec), multi-party computation (MPC), or any other suitable coordinated encryption protocol known to those having skill in the art. Further, a coordinated encryption protocol may include transport layer security inspection (TLSi). TLSi refers to a technique used by network security devices (e.g., firewalls, secure web gateways, intrusion detection systems, or the like) to inspect encrypted traffic that uses TLS.

Implementation of a coordinated encryption protocol at each edge device and at each server may be understood to mean that each edge device and each server may conform to the same coordinated encryption protocol. For example, each edge device and each server may transmit and receive data according to the common coordinated encryption protocol.

By way of non-limiting example and with reference to FIG. 14, each edge device 1412, 1414 and each server 1420, 1422 may implement a coordinated encryption protocol, which may be based on unified policy 1404 and maintained and managed by cloud service system 1402.

In some disclosed embodiments, the unified policy for controlling network security includes at least a connectivity portion. A portion refers to a part or segment of a whole. For example, a portion may include some or all parts of a whole. Connectivity refers to a characteristic or capability of being connected. For example, connectivity may include the ability of a device, system, or node to communicate with others over a network. A connectivity portion may include a part of a policy relating to network connections. For example, a connectivity portion may specifically govern or restrict how data can flow to and from devices (e.g., edge devices, servers) and/or applications. The unified policy including at least a connectivity portion may be understood to mean that at least a portion of the unified policy is a connectivity portion that may define or dictate security policies and/or rules relating to connectivity.

In some disclosed embodiments, the connectivity portion includes restricting incoming and outgoing data associated with at least one application running on the edge devices. Restricting refers to limiting, controlling, and/or placing rules on access, movement, or usage of something. For example, restricting may include enforcing a security policy that limits or blocks certain types of data traffic, access, and/or operations and may enhance security or compliance of a network. Incoming data refers to information, files, and/or data packets that are received by a device or system from another source over a network. Outgoing data refers to information, files, and/or data packets that are sent from a device or system to an external destination over a network. For example, when a first device sends data to a second device, from the first device's perspective, the data is outgoing data, and from the second device's perspective, the data is incoming data. Associated with may be understood to include any connection, linkage, correlation, affiliation, or any other logical relationship with an entity. For example, data associated with an application may include any data produced by, received by, or related to the application. Restricting incoming and outgoing data associated with at least one application running on the edge devices may be understood to include limiting or controlling the incoming data may be received and the outgoing data that are associated with at least one application running on one or more edge devices and that may be sent over a network.

By way of non-limiting example and with reference to FIG. 14, if edge devices 1412, 1414 are running an application that is defined in the connectivity portion of unified policy 1404, implementation of unified policy 1404 may include restricting incoming and outgoing data associated with said application.

In some disclosed embodiments, the connectivity portion includes assigning different priorities for allocating bandwidth to different applications running on the edge devices. Assigning refers to designating and/or allocating resources to a specific entity, element, or purpose. For example, assigning may include formally associating or linking something (e.g., a task, a resource, an identifier) with another thing (e.g., device, computer, processor). A priority refers to the relative importance or precedence of an entity. For example, a priority may dictate or be used to determine an order or preference in which actions are handled and/or resources are allocated. Allocating refers to distributing, reserving, or setting aside resources, time, space, or capacity for a specific purpose or entity based on a policy, requirement, or request. For example, allocating may include coordinating or dedicating a certain amount of processing power for a certain application running on a device. Bandwidth refers to a maximum rate of data transfer or capacity of a communication channel, network link, or system to transmit data and may be measured in bits per second. For example, bandwidth may include a device or system's capability to perform a task or run an application. Further, bandwidth may be set or predefined and may be less than the absolute maximum rate defined by the physical capabilities of the system and/or network. Assigning different priorities for allocating bandwidth to different applications running on the edge devices may refer to ranking or prioritizing different applications running on an edge device such that bandwidth is allocated to an application based on its assigned priority. For example, a first application may have a highest priority, a second application may have a lowest priority, and a third application may have a middle priority. In such an example, an edge device running all three applications may allocate the most bandwidth (e.g., largest proportion, majority) to the first application, the least bandwidth (e.g., smallest proportion, minority) to the second application, and the second most bandwidth (e.g., between the bandwidth allocated for the first application and the bandwidth allocated for the third application) to the third application.

By way of non-limiting example and with reference to FIG. 14, unified policy 1404 may include a connectivity portion that assigns different priorities for allocating bandwidth to different applications running on the edge devices 1412, 1414. In such an example, a first application running on edge devices 1412, 1414 may have a higher priority and a second application running on edge devices 1412, 1414 may have a lower priority. The first application would have more of the edge device's bandwidth allocated (e.g., according to unified policy 1404, as commanded by cloud service system 1402) compared to the second application.

In some disclosed embodiments, the connectivity portion includes assigning different priorities for allocating bandwidth to different edge devices associated with different users. Assigning different priorities for allocating bandwidth to different edge devices associated with different users may be understood to mean ranking or prioritizing different edge devices such that bandwidth is allocated to an edge device associated with a user based on its assigned priority.

By way of non-limiting example and with reference to FIG. 14, if edge device 1412 is associated with a first user and if edge device 1414 is associated with a second user, unified policy 1404 may include a connectivity portion that assigns different priorities for allocating bandwidth to edge device 1412 associated with the first user and to edge device 1414 associated with the second user. Although edge devices are discussed above, one having ordinary skill in the art would appreciate that similar techniques may be applied to servers or any other device connected to the network (e.g., administrative device 1424).

In some disclosed embodiments, the plurality of servers and edge devices are configured to perform differing and complementary security actions. Differing refers to a characteristic of being unlike or distinct from another entity in some way. For example, two entities (e.g., devices, systems, users, etc.) may be understood to be differing as long as the two entities have at least one different trait, characteristic, function, and/or operation. Complementary refers to a characteristic of serving to complete or to enhance another entity. For example, a complementary action may, in conjunction with another action, serve to accomplish a single goal. Security action refers to any step, operation, or measure taken to protect a system, network, or data from threats, vulnerabilities, or unauthorized access. For example, a security action may include encrypting data, blocking suspicious IP addresses, or forcing multi-factor authentication. Consequently, differing and complementary security actions may include at least two security actions that are different from each other and work together to accomplish a common security goal. For example, differing and complementary security actions may include both using encryption to protect data confidentiality and implementing firewall rules to control access. By way of another example, differing and complementary security actions may include both implementing intrusion detection (e.g., to monitor for and alert in case of intrusion event) and automatically quarantining a threat.

Some disclosed embodiments involve instructing, consistent with the unified policy, each edge device to perform first subsets of the security actions. Consistent refers to a characteristic of being in agreement, conformity, or harmony with a rule, standard, or set of conditions. Consistent with a unified policy may include a state of an entity in which the entity complies with the rules defined in the unified policy. For example, a device may operate consistent with a unified policy by performing operations as prescribed by the unified policy and not performing operations limited by the unified policy. A subset refers to set of elements, all of which are contained within a larger set. For example, a subset may include one, some, or each element of a set. Instructing refers to giving commands, directions, or orders to an entity to perform a specific task or action. For example, instructing a device may include transmitting or inputting a command or command signal to the device to perform operations consistent with the command or command signal. Instructing, consistent with the unified policy, each edge device to perform first subsets of the security actions may be understood to mean commanding one or more edge devices to perform first subsets of security actions (e.g., each first subset comprising a set of one or more security actions) defined in a unified policy.

Some disclosed embodiments involve instructing, consistent with the unified policy, each server to perform second subsets of the security actions. Instructing, consistent with the unified policy, each server to perform second subsets of the security actions may be understood to mean commanding one or more servers to perform second subsets of security actions (e.g., each second subset comprising a set of one or more security actions) defined in a unified policy.

In some disclosed embodiments, the first subsets of security actions and the second subsets of security actions are coordinated to achieve an overall security state defined by the unified policy. Achieving refers to successfully reaching or attaining a desired goal, condition, or result. For example, achieving may include performing actions or operations to attain the desired goal. Security state refers to a specific security condition or status of a system, network, or device. For example, a security state may characterize a network by its level of protection against threats, vulnerabilities, and/or unauthorized access. Overall refers to a characteristic of being comprehensive, aggregate, or considering all parts as a whole. For example, an overall security state defined by the unified policy may be understood to represent the combined, holistic security posture of the entire system or environment, taking into account all devices and their compliance with the unified policy. Further, coordinating the first subsets of security actions and the second subsets of security actions to achieve an overall security state defined by the unified policy may be understood to mean managing the first subsets of security actions and the second subsets to security actions such that the overall security state of the network is achieved in a manner that is compliant with the unified policy.

By way of non-limiting example and with reference to FIG. 14, edge device 1412 and 1414 may perform a first security action 1406 as defined in unified policy 1404. Further, server 1420 and 1422 may perform a second security action 1408 as defined in unified policy 1404. First security action 1406 and second security action 1408 may be different and complementary security actions. Additionally or alternatively, first security action 1406 and second security action 1408 may be coordinated such that their joint operation puts network 1400 in an overall security state. Further, in some disclosed embodiments, a subset of edge devices and/or a subset of servers may be configured to perform first security actions and another subset of edge devices and/or another subset of servers may be configured to perform second security actions.

In some disclosed embodiments, the instructing includes transmitting a common configuration file defining at least a portion of the unified policy to each edge device and to each server. A configuration file refers to a file that contains settings, parameters, and/or instructions used to control the behavior, operation, and/or characteristics of a software program, system, or device. For example, a configuration file may specify IP addresses, security policies, and routing protocols. Consequently, a common configuration file may include a configuration file that is common or shared between a plurality of entities. Defining refers to formally establishing, specifying, or setting forth the details, scope, or characteristics of something. For example, defining may include stating the rules, conditions, and/or actions that may govern system behavior and/or user activities. Transmitting a common configuration file defining at least a portion of the unified policy to each edge device and to each server may include sending (e.g., over a network) copies of a single configuration file that includes at least a portion of a unified security policy to one or more edge devices and/or one or more servers.

In some disclosed embodiments, the instructing includes transmitting a first configuration file defining the unified policy to each edge device and transmitting a second configuration file defining the unified policy to each server. Transmitting a first configuration file defining the unified policy to each edge device may include sending a first configuration file that includes information defining at least a portion of the unified policy to one or more edge devices and not to one or more servers. Transmitting a second configuration file defining the unified policy to each server may include sending a second configuration file that includes information defining at least a portion of the unified policy to one or more servers and not to one or more edge devices.

In some disclosed embodiments, the first configuration file is formatted according to first file format and wherein the second configuration file is formatted according to a second file format. Formatted refers to organizing, arranging, and/or preparing the data within a file according to a specific structure, layout, or standard. For example, formatting may include modifying a text file to include line breaks and encoding so that it can be read by a word processor. A file format refers to a specific structure or organization of data within a file, defined by a set of rules or standards that determines how the data is stored, encoded, and interpreted by software. For example, a file format may include JSON, YAML, XML, INI, TOML, or any other suitable file format known to one having skill in the art. By way of an example, a first configuration file formatted according to a first file format may include a configuration file formatted according to JSON, and a second configuration file formatted according to a second file format may include a configuration file formatted according to YAML. In such an example, the first configuration file and the second configuration file may include the same information but formatted according to different file formats. Additionally or alternatively, the first configuration file and the second configuration file may share some or none of the same information (e.g., at least a portion of a unified policy).

By way of non-limiting example, cloud service system 1402 may transmit (e.g., via backbone 1304) configuration file 1410 to edge devices 1412, 1414 and to server 1420, 1422. In such an example, configuration file 1410 may be a common configuration file that defines unified policy 1404. Additionally or alternatively, cloud service 1402 may transmit a first configuration file of a first file format to edge devices 1412, 1414 and may transmit a second configuration file of a second file format to servers 1420, 1422. In such an example, the first configuration file may share none, some, or all of the information (e.g., at least a portion of unified policy 1404) with the second configuration file.

In some disclosed embodiments, a processor may be configured to format a file according to an intended destination or recipient. By way of non-limiting example, cloud service system 1402 may be configured to format configuration file 1410 according to a file format accepted by a receiving device (e.g., edge device 1412, 1414; server 1420, 1422). In this way, an administrator of cloud service system 1402 can edit or maintain unified policy 1404 and/or configuration file 1410 (e.g., via administrative device 1424) agnostic to the file formatting of any connected devices.

In some disclosed embodiments, capabilities of the unified policy differ between the edge devices and the servers.

Capability refers to the ability or functionality of a system, device, application, and/or component to perform a specific task or support a particular operation. For example, capabilities of a unified policy may include the abilities or functionalities of the unified policy. Capabilities of the unified policy differing between the edge device and the servers may be understood to mean that the unified policy may have different capabilities for edge devices as compared to servers. For example, the unified policy may permit edge devices to only perform certain security actions and may permit servers to perform differing security actions.

Some disclosed embodiments involve providing an administrative view of the differences in capabilities. Providing refers to making available, offering, delivering, and/or supply something. For example, providing may include permitting a function for use by a user or device. Administrative refers to a characteristic of relating to the management, configuration, oversight, or control of systems, networks, or users. For example, an administrative user or device may have elevated permissions or capabilities compared to a non-administrative user. A view refers to an interface, perspective, or representation of information presented to a user. For example, an administrative view may include a specialized interface or display available to administrative users and/or devices, which shows or allows access to management-level functions not available to regular users. Consequently, providing an administrative view of the differences in capabilities may be understood to mean sending, for display, an administrative view of the differences in capabilities of the unified policy as applies to edge devices and servers.

By way of non-limiting example and with reference to FIG. 14, administrative device 1424 may be configured as having the permission to be provided (e.g., by cloud service system 1402) an administrative view that displays the capabilities of the unified policy as applies to edge devices 1412, 1414 and as applies to servers 1420, 1422. The administrative view may highlight or emphasize the differences in capabilities.

In some disclosed embodiments, an administrative view may include enforcement details. Enforcement details may include any information relating to enforcement of a policy, such as a unified security policy, associated with one or more devices. For example, enforcement details may include to what extent each device is enforcing the policy.

By way of non-limiting example, administrative device 1424 may be configured as having the permission to be provided (e.g., by cloud service system 1402) an administrative view that displays the enforcement details of unified policy 1404 as applies to edge devices 1412, 1414 and as applies to servers 1420, 1422. The administrative view may highlight or emphasize which devices are compliant with unified policy 1404, which devices are not compliant with unified policy 1404, and in what ways a device is not complying with unified policy 1404. Although a separate administrative device is depicted in FIG. 14, it may be understood that any device, including edge device 1412 or server 1422, may be provided an administrative view of the differences in capabilities and/or enforcement details. For example, any device associated with an administrative user (e.g., as logged into with an administrative account) may be provided the administrative view of the differences in capabilities and/or enforcement details.

In some disclosed embodiments, the first subsets of the security actions and the second subsets of the security actions include at least partial enforcement of the unified policy. Enforcement refers to ensuring that rules, policies, or conditions are followed or applied. For example, enforcement may include applying rules or taking actions (e.g., blocking access, triggering alerts) to ensure compliance with defined security or operational policies (e.g., unified security policy). Partial refers to a characteristic of being incomplete, limited, or covering only a portion of the whole. For example, partial enforcement may include enforcing at least some aspects or rules of a policy while not or failing to enforce the others. The first subsets of the security actions and the second subsets of the security actions including at least partial enforcement of the unified policy may be understood to mean that the performance of the first subsets of security actions and the second subsets of security actions each at least partially enforces the unified policy.

By way of non-limiting example and with reference to FIG. 14, first security actions 1406 and second security actions 1408 may at least partially enforce unified policy 1404. In such an example, the combination of the partial enforcement by first security actions 1406 and the partial enforcement by second security actions 1408 may together provide an overall security state that fully enforces unified policy 1404.

Figure 15:
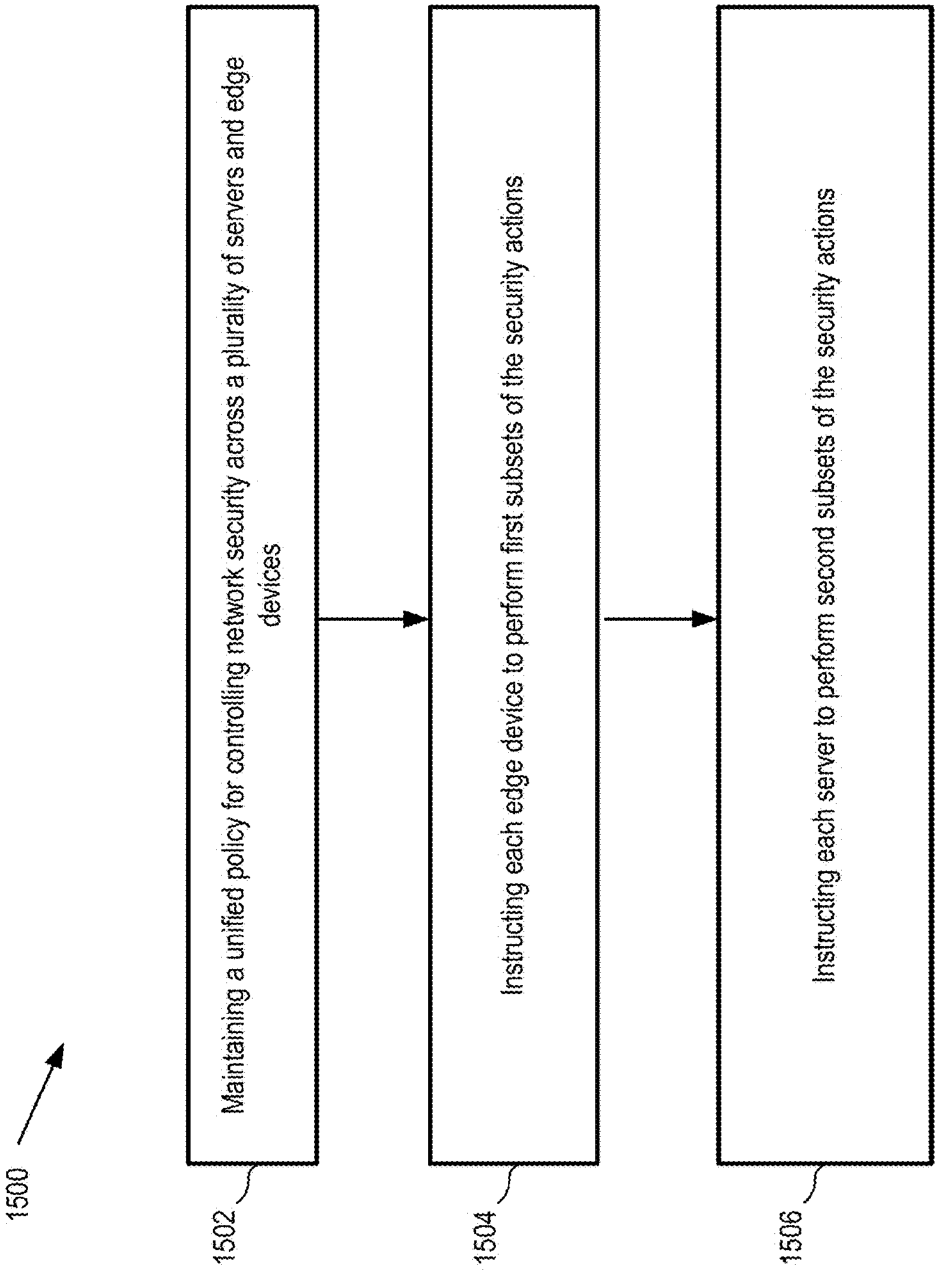
FIG. 15 is a flowchart of an example process for coordinating security, consistent with some disclosed embodiments.

FIG. 15 is a flowchart of example process 1500 for performing unified network security management operations, consistent with some disclosed embodiments. In some disclosed embodiments, process 1500 may be performed by at least one processor (e.g., processor 102 in FIG. 1) to perform operations or functions described herein. In disclosed some embodiments, some aspects of process 1500 may be implemented as software (e.g., program codes or instructions) that are stored in a memory (e.g., memory 104) or a non-transitory computer readable medium. In disclosed some embodiments, some aspects of process 1500 may be implemented as hardware (e.g., a specific-purpose circuit). In some disclosed embodiments, process 1500 may be implemented as a combination of software and hardware.

Referring to FIG. 15, process 1500 may include a step 1502 of maintaining in a cloud service management application, a unified policy for controlling network security across a plurality of servers and edge devices, wherein the plurality of servers and edge devices are configured to perform differing and complementary security actions. By way of non-limiting example, in FIG. 14, at least one processor (e.g., processor 102 in FIG. 1) may maintain a unified policy in a cloud service management application (e.g., as hosted or operated by cloud service system 1402). Further, a plurality of edge devices (e.g., edge device 1308, 1310, 1412, 1414) may be configured to perform security actions (e.g., first security actions 1406), and a plurality of servers (e.g., server 1314, 1316, 1420, 1422) may be configured to perform security actions (e.g., second security actions 1408).

Process 1500 may include a step 1504 of instructing, consistent with the unified policy, each edge device to perform first subsets of the security actions. By way of non-limiting example, in FIG. 14, at least one processor (e.g., processor 102 in FIG. 1) may instruct each edge device 1412, 1414 to perform first security actions 1406 consistent with unified policy 1404.

Process 1500 may include a step 1506 of instructing, consistent with the unified policy, each server to perform second subsets of the security actions, wherein the first subsets of security actions and the second subsets of security actions are coordinated to achieve an overall security state defined by the unified policy. By way of non-limiting example, in FIG. 14, at least one processor (e.g., processor 102 in FIG. 1) may instruct each server 1420, 1422 to perform second security actions 1408 consistent with unified policy 1404.

Some disclosed embodiments may involve a computer readable medium may contain instructions, that when executed by at least one processor, cause the performance of bidirectional network policy optimization operations. Bidirectional network policy operations refer to a security or traffic rule that allows or controls data flow in both directions between two endpoints (such as devices, IP addresses, or network segments).

Some disclosed embodiments may include instructions for one or more operations for managing network traffic in accordance with defined policies. Instructions refers to commands or rules for performing certain operations or enforcing behaviors. In an example, this may include monitoring, shaping, prioritizing, or otherwise controlling data flow through a network based on one or more pre-established rules, preferences or conditions governing bandwidth allocation, access rights, quality of service, or traffic routing. As used herein, bandwidth allocation may refer to the assignment or distribution of available network bandwidth among different users, devices, applications, or data flows, based on one or more rules, priorities, or performance objectives, in order to manage traffic load and optimize network efficiency.

In some embodiments, maintaining in a cloud service management application a policy prioritizing bandwidth allocation based on organizational preferences. As used herein, maintaining a policy may include storing, persisting, updating, retrieving, or managing access to configuration data or logic in a memory, database, or data structure accessible to one or more processors. A policy prioritizing bandwidth allocation is a network management rule or set of rules designed to control how available bandwidth is distributed among users, devices, or applications, giving preference to certain types of traffic. Specific examples of them are described elsewhere herein.

In some embodiments, the bandwidth allocation policy may be stored within or associated with the cloud service management application, such that the application servers act as a central point of orchestration and policy control. A cloud service management application refers to instructions and/or software that helps a system or users monitor, configure, optimize, and control cloud-based infrastructure, applications, and services. For example, a cloud service management application may act as a central control panel for managing cloud resources across one or more providers like AWS, Azure, or Google Cloud. A central point of orchestration may include, for example, a system, platform, or component that coordinates and manages multiple interconnected services, tasks, or resources from a single control layer. Effectively, it may act as a "conductor" in a complex digital environment, ensuring that various systems—whether cloud services, microservices, or automated tasks—work together in the right order, at the right time, and under the right conditions.

A policy control is a mechanism or system that enforces rules (policies) to govern how resources, users, or data are used within a network, application, or service environment. For example, a policy control may define rules (e.g., "users in group A can access system X during business hours"); monitor activity—continuously assess behavior against rules; enforce compliance—Allow, block, throttle, or log based on defined policy; adjust dynamically—Adapt rules in real time based on usage, threats, or business logic. Policy controls can ensure that operations align with business objectives, security requirements, or performance goals.

An application server may refer to a computing resource within the cloud service management application that executes orchestration logic, manages bandwidth allocation policies, and coordinates distribution to servers and edge devices. In an example, such a policy may define rules or hierarchies for allocation of bandwidth among departments, user roles, applications, services, and/or devices associated with the organization. As used herein, maintaining may include storing, updating, managing access to, or otherwise persisting data, logic or configuration in a memory, database, or other data structure that is accessible to one or more processors. As used herein, a cloud service management application may refer to a software or software-hardware platform, hosted in a cloud environment, that may facilitate centralized orchestration, configuration, and policy control across distributed network components, including servers, edge devices, and service endpoints. As used herein, the term bandwidth allocation may refer to the assignment or distribution of available network bandwidth among different users, devices, applications, services, or data flows, based on one or more rules, priorities, or performance objectives, to manage traffic load and optimize network efficiency. The term organization preferences may refer to a set of policy parameters, rules, priorities, or heuristics defined by an entity that may govern how network resources are to be allocated, prioritized, or restricted based on business needs, user roles, compliance, or operation goals. The entity providing the organizational preferences may be for example an enterprise, institution, or administrative domain. As used herein, directing an application, server, or edge device refers to initiating, triggering, or instructing the target component to perform a specific operation or apply a configuration, such as implementing a bandwidth allocation policy, based on control signals, commands, or data provided by a centralized management system.

In alternative embodiments, the bandwidth allocation policy need not be stored within the cloud service management application. Instead, it may may be maintained in a remote or distributed policy store, configuration, service, or external policy engine. The cloud service management application may access the policy as needed, for example to execute or update bandwidth prioritization operations across network components. The separation of the policy from the application may enable independent scaling, external policy governance, or dynamic policy versioning.

Some embodiments involve distributing the policy to servers in the network to thereby cause the servers to implement the policy by controlling a first allocation of bandwidth to inbound traffic. As used herein, distributing the policy may refer to transmitting, deploying, synchronizing, or otherwise propagating a network policy, such as a bandwidth allocation policy, from a central location (e.g., a cloud service management application) to one or more remote components in a network (e.g., servers, edge devices, or endpoints). The distribution may be initiated in response to scheduled updates, configuration changes, triggering events, (e.g., detection of a condition), or administrative instructions. The policy may be transmitted using secure communication protocols, and may include metadata for versioning, authentication, or targeted deployment. For example, a cloud service management application may push a revised bandwidth allocation policy to all edge devices in response to detected congestion, instructing them to prioritize video traffic. A server may periodically poll a configuration endpoint to retrieve the latest policy update and apply new bandwidth rules locally. Upon detection of a security incident, the central management system may distribute a policy restricting non-critical data flows to affected regions. A policy defining bandwidth prioritization for executive users may be distributed only to gateways servicing a VIP subnet. In some examples, the servers may throttle, queue, or shape incoming packets based on defined bandwidth priorities.

As used herein, inbound traffic refers to data transmissions or packets that originate from external sources (e.g., the internet, cloud services, or remote endpoints) and are directed toward internal components of a network, such as organizational servers, applications, or user devices. Inbound traffic typically traverses the network perimeter and is received by internal resources for further processing, storage, or delivery. Examples of inbound traffic include: a cloud-based CRM system sending data updates to an internal sales dashboard hosted on enterprise servers; HTTP requests from external clients accessing a company-hosted website; and a remote employee connecting to a corporate VPN to retrieve internal documentation.

As used herein, the first allocation of bandwidth refers to the assignment, reservation, or prioritization of network capacity for handling inbound traffic within the network infrastructure, typically managed by servers or internal policy-enforcing components. The first allocation may be governed by organizational policies that prioritize certain types of inbound data flows over others based on performance, criticality, or business objectives. For example, a bandwidth allocation policy may assign a higher percentage of inbound bandwidth to secure email traffic to ensure reliable message delivery; prioritize software patch data arriving from vendor servers during scheduled deployment windows; or enforce higher priority for inbound video conferencing streams during peak collaboration hours while de-prioritizing non-critical media downloads.

As used herein, directing a bandwidth allocation policy may refer to initiating, triggering, distributing, or causing the transmission or propagation of the policy. This may occur, such as by issuing control signals, invoking distribution logic, or scheduling updates from a central management system (e.g., a cloud service management application) to one or more remote devices. The direction may involve selecting target devices, formatting the policy data, and initiating a push or synchronization process so that the receiving devices can locally enforce the policy.

Some disclosed embodiments involve distributing the policy to edge devices in the network to thereby cause the edge devices to implement the policy by controlling a second allocation of bandwidth to outbound traffic. The term edge devices is described elsewhere herein. As used herein, distributing the policy to edge devices refers to transmitting, pushing, or synchronizing a bandwidth allocation policy to the edge devices. Such distribution may occur, for example, from a centralized management system (e.g., a cloud service management application) to network components located at or near the boundary of the network, such as routers, firewalls, or gateways, for the purpose of localized enforcement or traffic control. The distribution may occur via secure channels using protocols such as HTTPS, gRPC, or MQTT, and may include metadata to support targeted updates, device-specific parameters, or rollback mechanisms. As used herein, the second allocation of bandwidth may refer to the assignment or control of bandwidth for outbound traffic originating from internal network components toward external destinations, where the edge devices apply the bandwidth allocation policy to prioritize, restrict, or shape such outbound flows according to organizational preferences or dynamic conditions. As used herein, outbound traffic refers to data transmissions that originate from within a network (such as from servers, user devices, or internal applications) and are directed toward external destinations, such as the internet, external servers, or remote endpoints.

Outbound traffic typically exits through edge devices (e.g., routers, firewalls, or gateways), which may apply policies for bandwidth allocation, prioritization, or security enforcement. For example, an edge device including a firewall may receive an updated bandwidth policy that limits outbound streaming traffic during peak business hours to preserve capacity for critical services. A gateway router may apply prioritization rules from the policy to ensure outbound VoIP packets are transmitted with minimal delay. A load balancer may enforce a policy update that restricts outbound data synchronization jobs from internal databases to cloud storage providers during periods of detected network congestion. A network edge device may receive a bandwidth policy push that dynamically throttles outbound traffic to certain external domains based on time-of-day or compliance rules. Additionally, a branch-office gateway may enforce bandwidth caps on outbound software update downloads to prevent saturation of the WAN link. For example, edge devices such as routers, gateways, or firewalls may manage upstream traffic flows in accordance with the organizational bandwidth preferences defined in the policy. As illustrative examples: a firewall may receive a policy update that limits streaming media bandwidth during business hours; a router may synchronize with a central server to receive priority rules for emergency services; a gateway may download policy configurations that define burst rate limits for IoT device traffic; and a software-defined WAN (SD-WAN) edge device may be pushed differentiated service rules for remote office traffic routing.

Figure 16:
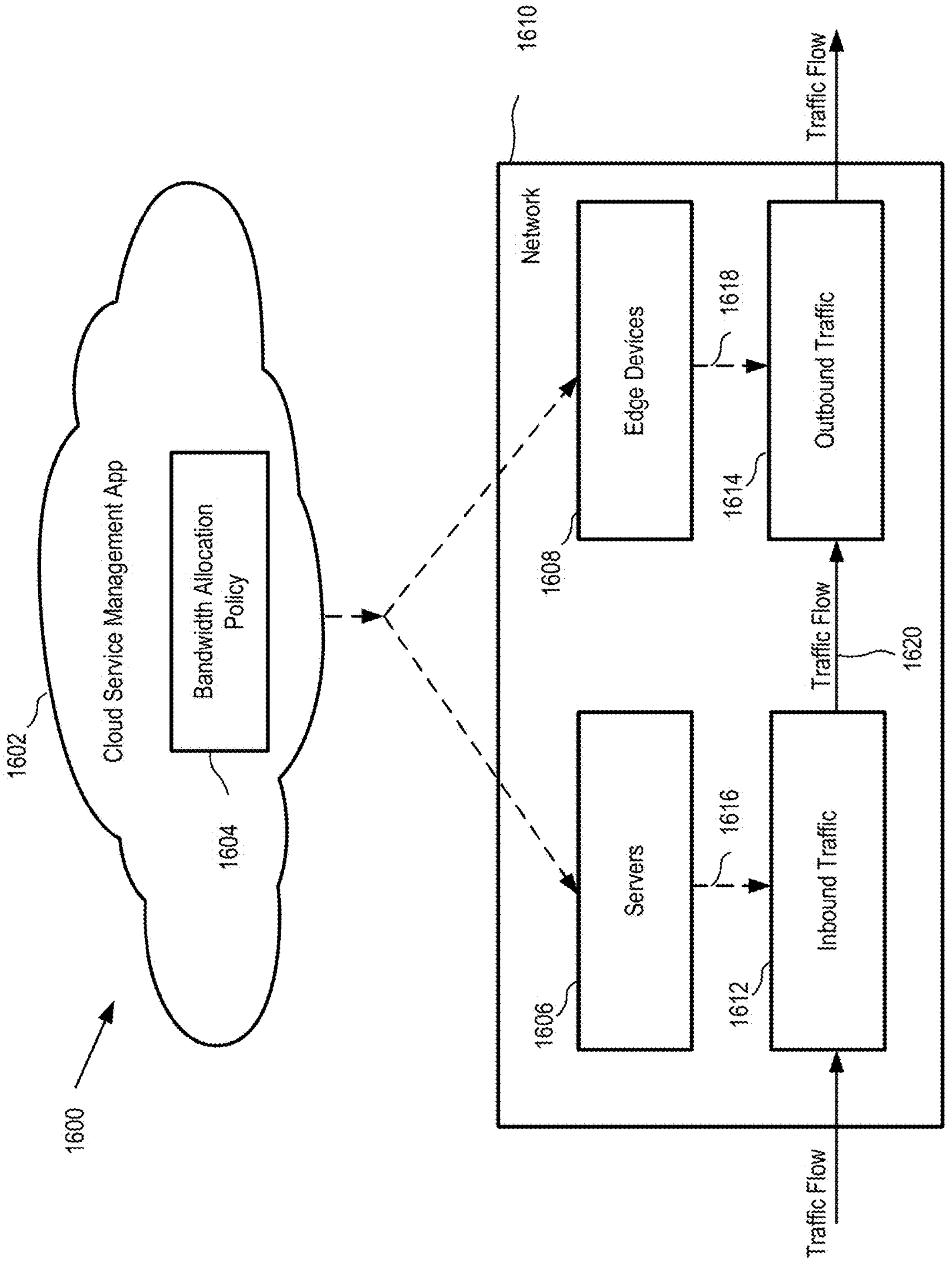
FIG. 16 illustrates an exemplary schematic diagram of a system for bidirectional network policy optimization, consistent with some disclosed embodiments.

FIG. 16 illustrates an exemplary system 1600 configured to perform bidirectional network policy optimization operations, in accordance with some embodiments. The system includes a cloud service management application 1602, a bandwidth allocation policy 1604, one or more servers 1606, one or more edge devices 1608, and a network 1610. Also depicted are inbound traffic 1612, outbound traffic 1614, a first allocation of bandwidth 1616, a second allocation of bandwidth 1618, and traffic flow 1620 representing bidirectional data transmission between components. Although FIG. 16 shows one example architecture, alternative configurations and component groupings may also be used in accordance with the disclosed embodiments. For example, cloud service management application 1602 may access or store bandwidth allocation policy 1604, which may be defined by organizational preferences. The policy may be directed to servers 1606 within network 1610 to implement a first allocation of bandwidth 1616 to inbound traffic 1612. Similarly, edge devices 1608 may receive and implement the policy to control a second allocation of bandwidth 1618 to outbound traffic 1614.

Some disclosed embodiments involve updating the policy prioritizing bandwidth dynamically in response to detection of at least one condition. As used herein, updating the policy may refer to modifying, replacing, or supplementing the existing bandwidth allocation rules, thresholds, or preferences in order to adapt to network conditions or operational objectives. As used herein, dynamically may refer to performing an action automatically and/or in real-time or near-real-time based on current network conditions or events, without requiring manual user intervention. As used herein, a condition refers to any detectable network state, event, trigger, or threshold, such as changes in traffic volume, latency, packet loss, user behavior, security incidents, or time-based criteria, that may prompt adjustment of network policies or resource allocations. The updated policy may reflect adjusted bandwidth priorities or reallocation logic responsive to these conditions.

Conditions may include, but are not limited to, fluctuations in traffic volume, spikes in latency, increased packet loss, deviations in user behavior, detection of security incidents, or time-based scheduling criteria. The updated policy may reflect adjusted bandwidth priorities or reallocation logic responsive to these conditions. For example, the policy may be updated to deprioritize video streaming during periods of high latency; to increase bandwidth for VoIP traffic when packet loss exceeds a threshold; to restrict certain services during detected DDoS attacks; or to prioritize backup traffic during off-peak hours based on a scheduled time-of-day rule. These policy updates may be applied to bandwidth allocation policy 1604, implemented via cloud service management application 1602, and distributed across servers 1606 or edge devices 1608 in network 1610 to affect inbound traffic 1612 and outbound traffic 1614, respectively.

Some disclosed embodiments involve distributing the updated policy to the servers to thereby cause the servers to implement the updated policy by controlling a third allocation of bandwidth to inbound traffic. As used herein, distributing the updated policy may refer to transmitting, synchronizing, or deploying new or modified bandwidth allocation rules. This may occur, for example, from a central management system to selected devices for enforcement. For example, the servers may reconfigure traffic classification, filtering, or rate-limiting behavior based on the updated policy parameters, such as reprioritizing video conferencing over file downloads during peak usage, throttling backup services in response to congestion, or allocating increased bandwidth to authenticated users during security events. As used herein, the third allocation of bandwidth may refer to the assignment, regulation, or control of bandwidth for inbound traffic received by one or more servers, where the allocation is based on an updated bandwidth allocation policy. This third allocation may represent a revised prioritization or redistribution of available network capacity, determined dynamically in response to detected conditions or administrative updates. For example, the third allocation of bandwidth may involve reallocating more bandwidth to critical inbound services, such as secure remote access or video conferencing, during high-usage periods, or reducing bandwidth for non-essential incoming data, such as software updates or bulk file transfers, to ensure quality-of-service for latency-sensitive applications.

Some disclosed embodiments involve distributing the updated policy to the edge devices to thereby cause the edge devices to implement the updated policy by controlling a fourth allocation of bandwidth to inbound traffic. The edge devices may additionally or alternatively implement the updated policy by controlling a fourth allocation of bandwidth to outbound traffic. As used herein, distributing the updated policy to edge devices may refer to transmitting, synchronizing, or deploying modified bandwidth rules from a centralized service to downstream nodes for localized enforcement. As used herein, the fourth allocation of bandwidth to inbound traffic may refer to the selective assignment, control, or prioritization of incoming network data flows directed toward edge devices, such as routers, firewalls, or gateways, based on updated bandwidth allocation policies. This allocation may govern how edge devices manage traffic arriving from external sources before it is routed internally, ensuring critical inbound services—such as real-time telemetry, security alerts, or remote management—receive sufficient bandwidth under dynamic network conditions. For example, the fourth allocation may include increasing bandwidth for inbound traffic from monitoring systems during incident response, reducing bandwidth for bulk update servers during business hours, or applying QoS rules to incoming VoIP streams.

In some disclosed embodiments, the at least one condition is associated with at least one of a traffic congestion threshold, channel capacity threshold, a communication link quality threshold, a time of day, a latency threshold, a packet loss threshold, a jitter threshold, a round trip time (RTT) threshold, a quality of service threshold, at least one client preference. These conditions may be defined in advance, dynamically learned, or specified by network administrators to reflect performance objectives or user requirements. The client preference, jitter threshold, communication link threshold, latency threshold, and packet loss threshold as used herein are described elsewhere.

As used herein, a traffic congestion threshold may refer to a predefined level of network utilization or queue depth beyond which performance degrades or action is triggered. For example, if an edge device such as a firewall detects that outbound traffic exceeds 90% of its available uplink bandwidth, it may apply traffic shaping policies to deprioritize large file transfers. In another example, if a server managing inbound connections observes that its allocated bandwidth has reached a saturation threshold (e.g., 800 Mbps of a 1 Gbps link), it may throttle low-priority inbound data streams. In yet another case, a load balancer at the edge may detect queue buildup due to excessive concurrent sessions and redirect traffic to a less congested server node with greater available bandwidth to maintain application responsiveness.

As used herein, a channel capacity threshold may refer to a limit on the usable bandwidth of a channel, link, or path, beyond which resource reallocation may be initiated. For example, when an edge device including a firewall detects that its uplink to the ISP consistently exceeds 90% of its rated capacity, the system may reduce bandwidth allocations for non-essential applications like software updates. In another example, if a server's 10 Gbps interface approaches its channel capacity threshold due to sustained backup traffic, the bandwidth allocation policy may reassign backup tasks to a lower-priority window or redirect traffic to a secondary node. In yet another example, upon detecting that a site-to-site VPN tunnel has reached its throughput ceiling, the cloud service management application may update the bandwidth policy to route latency-sensitive services through a less saturated direct internet path.

As used herein, a time-of-day condition may refer to policies that vary based on scheduled intervals, such as business hours, off-peak times, or maintenance windows. For example, during peak business hours (e.g., 9:00 AM to 5:00 PM), a server may prioritize bandwidth for video conferencing and enterprise resource planning (ERP) applications, while throttling bulk file transfers. In another example, an edge device may implement relaxed traffic shaping policies after 10:00 PM to allow high-bandwidth cloud backups without disrupting user activity. In a further example, during scheduled maintenance windows on weekends, bandwidth allocation policies may shift to prioritize update distribution to branch locations while reducing bandwidth for streaming or recreational traffic.

As used herein, a round-trip time (RTT) threshold may refer to a maximum allowable time for a signal to travel from a source to a destination and back. For example, if the RTT between an edge device and a central application server exceeds 150 milliseconds, the system may deprioritize non-critical data synchronization and reallocate bandwidth toward real-time traffic. In another example, when RTT measurements between branch office routers and cloud-hosted services fall below a defined threshold, the bandwidth allocation policy may increase throughput for time-sensitive applications such as voice-over-IP (VoIP). In a further example, if RTT increases during peak usage periods, the server may dynamically reassign bandwidth from background processes to maintain user experience for latency-sensitive services.

As used herein, a quality-of-service threshold may refer to a metric-based limit on performance criteria such as throughput, availability, or error rate as may be defined by service-level objectives. For example, if throughput on a key business application falls below a defined threshold (e.g., 10 Mbps), an edge device may prioritize its traffic by throttling less critical services. In another example, when server availability drops below 99.9% due to maintenance or outages, the system may redistribute traffic to alternative servers to preserve service continuity. In a further example, if packet error rates on a video conferencing stream exceed a QoS threshold, the bandwidth allocation policy may reduce capacity for bulk file transfers to improve stream stability.

As used herein, a client preference may refer to a user- or application-based specified requirement such as prioritization of real-time traffic, reservation of minimum bandwidth, preference for low-latency connections, or scheduling of high-bandwidth transfers during peak hours. For example, a video conferencing application may express a preference for low-latency connections, prompting edge devices to reserve dedicated upstream bandwidth and deprioritize non-real-time services. In another example, a client may request that a data backup process occur only during overnight hours, allowing the server to allocate high bandwidth to the task during scheduled windows without impacting daytime traffic. In yet another case, a user may specify a preference for guaranteed minimum bandwidth to a VoIP application, causing the network to throttle less essential traffic during periods of congestion.

A latency communication link-threshold may refer to a maximum allowable delay associated with transmission of data over a specific communication link, beyond which corrective action may be triggered, such as rerouting traffic, updating bandwidth allocation, policies, or throttling non-essential services to maintain performance. For example, if a server-to-edge-device communication link exceeds a 100 ms delay threshold, the system may automatically divert traffic through a backup path with lower latency. In another instance, a latency-sensitive application such as online gaming may trigger the throttling of background data syncs on the same link when latency exceeds a defined threshold. In yet another case, exceeding a latency threshold between regional data centers may prompt dynamic reallocation of available bandwidth to prioritize control signals or reduce video stream quality to preserve responsiveness.

In some disclosed embodiments, controlling the first allocation of bandwidth and controlling the second allocation of bandwidth includes prioritizing allocations of bandwidth. As used herein, prioritizing allocations of bandwidth refers to assigning varying levels of importance or precedence to several types of data flows, users, applications, or services, such that higher-priority traffic receives preferred access to available network resources, particularly under conditions of congestion or limited bandwidth availability. For example, edge devices 1608 may prioritize bandwidth for VoIP traffic over bulk file downloads to ensure call quality during peak hours. In another example, servers 1606 may reserve minimum bandwidth for mission-critical telemetry applications and deprioritize non-urgent software updates. A further example includes prioritizing bandwidth for real-time video conferencing applications while throttling bandwidth used by background data synchronization. In some cases, traffic originating from executive-level users or administrative systems may be given higher priority than that from guest or anonymous endpoints. Edge devices may also prioritize traffic tagged with quality-of-service (QoS) metadata for low-latency operations, such as industrial control or medical monitoring. Similarly, servers may deprioritize traffic from specific regions or devices during regulatory enforcement or load balancing periods to preserve network compliance and performance.

In some disclosed embodiments, prioritizing allocations of bandwidth includes allocating bandwidth for at least one first application at a higher priority than allocation of bandwidth for at least one second application. As used herein, prioritizing bandwidth between applications refers to enforcing rules or preferences that determine which application traffic receives preferential treatments such as more bandwidth, reduced latency, or higher transmission frequency—relative to other applications, especially under constrained network conditions. An application refers to a set of instructions and/or a software program designed to perform specific tasks or functions.

By way of example only, the at least one first application may include a latency-sensitive or mission-critical service, such as a video conferencing platform, voice-over-IP (VoIP), or security monitoring application, and the at least one second application may include a lower-priority or background service, such as file synchronization or bulk data transfer. In one example, a cloud management system may assign higher bandwidth priority to a live incident response dashboard than to periodic software updates on endpoint devices.

In another example, edge devices 1608 may prioritize application traffic from a health telemetry app over traffic generated by automated marketing bots. In some embodiments, two latency-sensitive applications—such as a VoIP platform and a remote desktop protocol (RDP) tool—may be differentiated based on user role, where the VoIP app used by executives receives higher priority. Conversely, two non-mission-critical applications, such as system logging and multimedia streaming, may be prioritized based on bandwidth thresholds, time of day, or organizational usage trends. The prioritization of bandwidth between applications may be dynamically determined in accordance with the organizational policy described elsewhere herein and may be implemented via tagging, queuing, rate-limiting, or shaping techniques across network devices such as servers 1606 and edge devices 1608.

In some disclosed embodiments, prioritizing allocations of bandwidth includes allocation of bandwidth for at least one first user at a higher priority than allocation of bandwidth for at least one second user. As used herein, user-based prioritization (e.g., between a first one user and a second one user) may refer to the dynamic or rule-based assignment of bandwidth resources based on user identity, role, activity, or associated policy parameters. In an example, the first user may be associated with an elevated role (e.g., administrator, executive, or time-sensitive service account) while the second user may be associated with a lower role (e.g., general or background usage). User-based prioritization may be based on the organizational policy described elsewhere herein, which may also define the bandwidth preferences according to user roles, authentication level, usage history, or other attributes. For instance, an executive user may be allocated a minimum guaranteed bandwidth during high traffic periods, while general users may experience rate limiting. In another example, a support technician's device may receive elevated priority during a maintenance window, while guest accounts may be limited to a capped bandwidth. Edge devices 1608 or servers 1606 may enforce these user-specific allocations based on policy instructions received from the cloud service management application 1602, as shown in FIG. 16.

In some disclosed embodiments, controlling the first allocation of bandwidth and controlling the second allocation of bandwidth includes restricting data flow associated with at least one application. As used herein, restricting data flow refers to selectively limiting, delaying, or managing the volume, timing, or prioritization of network traffic generated or consumed by an application. This may occur, for example, in order to comply with bandwidth allocation policies. The restriction may be implemented through techniques such as bandwidth throttling, packet queuing, or traffic shaping. For example, a video streaming application may be rate-limited during peak hours to preserve capacity for latency-sensitive applications. In another example, a software update process may be delayed or queued by edge devices 1608 during business hours to prevent disruption of higher-priority services. Such restrictions may be defined by organizational policy and enforced by servers 1606 or edge devices 1608 based on traffic direction (e.g., inbound traffic 1612 or outbound traffic 1614), as illustrated in FIG. 16.

In some disclosed embodiments, controlling the first allocation of bandwidth and controlling the second allocation of bandwidth includes restricting data flow through at least one region. As used herein, restricting data flow through a region refers to limiting, rerouting, or controlling network traffic that is transmitted to, from, or within a specific geographic, logical, or administrative boundary. A region may refer to a geographic area, network segment, data center, availability zone, or jurisdictional domain. In an example, an organization may restrict inter-region bandwidth between data centers in different countries to comply with data sovereignty requirements. In another example, bandwidth to a low-priority backup region may be throttled during high-demand intervals in a primary region to preserve performance. These restrictions may be implemented by servers 1606 or edge devices 1608 according to policy-defined constraints, such as geographic rules or organizational compliance mandates, as illustrated in FIG. 16.

In some disclosed embodiments, controlling the first allocation of bandwidth and controlling the second allocation of bandwidth is based on availability of at least one resource. As used herein, a resource may include, but is not limited to, processing capacity, memory availability, storage bandwidth, power supply, or network interface utilization. Availability of a resource refers to whether the resource is operating within a predefined performance threshold or has sufficient headroom to support current or anticipated network load. For example, if network interface utilization on an edge device 1608 exceeds a predefined threshold, the system may reduce outbound bandwidth to lower-priority services to avoid congestion. In another example, if server 1606 has underutilized processing capacity, additional inbound bandwidth may be allocated to latency-sensitive applications to maximize efficiency. In some embodiments, the availability of such resources may act as a condition, as described elsewhere herein, that triggers dynamic updates to the bandwidth allocation policy. Bandwidth allocations may be adjusted in real time to respond to resource constraints or surpluses and to maintain optimal system performance, as illustrated in FIG. 16.

In some disclosed embodiments, controlling the first allocation of bandwidth and controlling the second allocation of bandwidth includes compliance with at least one regulation. As used herein, a regulation may refer to any legal, contractual, industry, or organizational rule or policy that governs the use, transmission, handling, or prioritization of data within a networked environment. Such regulations may include, but are not limited to, data localization laws requiring certain data to remain within specific geographic regions, export control rules restricting cross-border transmission of sensitive information, privacy requirements, net neutrality mandates that prohibit discrimination of traffic types, service-level agreements (SLAs) that specify minimum performance metrics, and internal organizational policies that enforce security or performance requirements. For example, if an SLA specifies a minimum bandwidth for a critical application, servers 1606 may prioritize inbound traffic for that application to maintain compliance. In another example, edge devices 1608 may throttle or redirect outbound traffic to comply with regional data sovereignty laws, as depicted in FIG. 16.

In some disclosed embodiments, the at least one regulation is associated with a specific region. As used herein, a region may refer to a geographic location (e.g., country, state, or province), logical network partition (e.g., subnet or VLAN), availability zone (e.g., AWS Region), or administrative domain (e.g., an enterprise-managed zone). A regulation may be applicable within such a region based on legal jurisdiction, organizational boundaries, or contractual scope. Region-specific regulations may include, for example, data residency requirements mandating that user data remain within national borders, cross-border data transfer restrictions enforced by trade or privacy laws (e.g., GDPR, ITAR), or bandwidth usage caps imposed by regional network providers or infrastructure limitations. For instance, edge devices 1608 may restrict outbound traffic volumes in regions with capped service plans, while servers 1606 may prioritize inbound traffic to comply with intra-region performance guarantees, as illustrated in FIG. 16.

Figure 17:
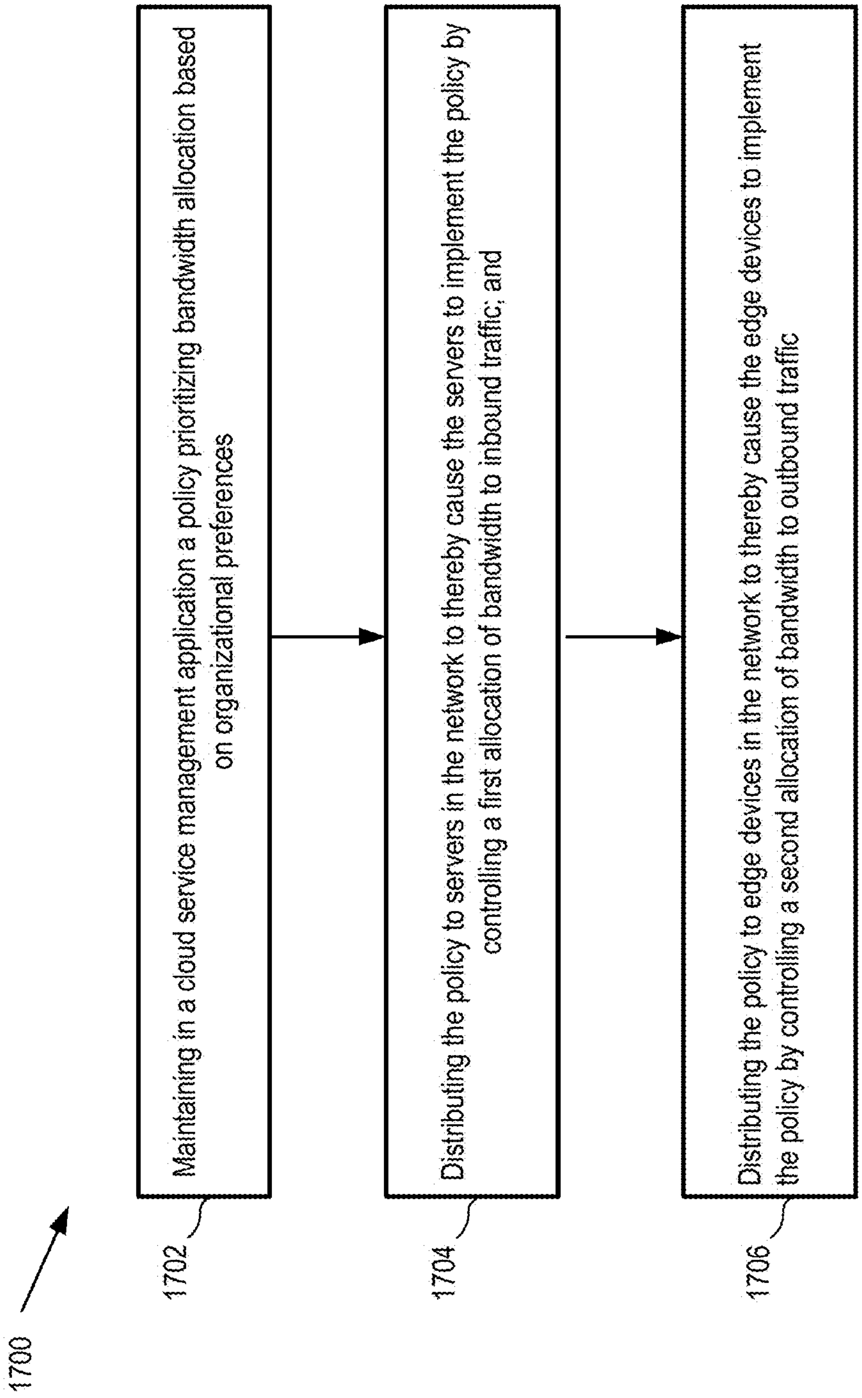
FIG. 17 is a flowchart of an example process for bidirectional network policy optimization operations, consistent with some disclosed embodiments.

FIG. 17 is a flowchart of example process 1700 for performing bidirectional network policy optimization operations, consistent with some disclosed embodiments. In some embodiments, process 1700 may be performed by at least one processor (e.g., processor 102 shown in FIG. 1) to carry out one or more operations described herein. In some embodiments, aspects of process 1700 may be implemented in software (e.g., program code or instructions) that are stored in a memory (e.g., memory 104) or a non-transitory computer readable medium. In other examples, aspects of process 1700 may be implemented in hardware (e.g., one or more specific-purpose integrated circuits, logic components, or processing units). In some embodiments, process 1700 may be implemented as a combination of hardware and software components operating cooperatively.

Referring to FIG. 17, process 1700 may include a step 1702 of maintaining, in a cloud service management application, a policy prioritizing bandwidth allocation based on organizational preferences. As used herein, maintaining may include storing, updating, managing access to, or otherwise persisting data, logic, or configuration in a memory, database, or other data structure accessible to one or more processors. The cloud service management application may function as a centralized orchestration platform that hosts the policy. The policy may define one or more rules, hierarchies, or conditional logic that govern the distribution of bandwidth among users, applications, services, or network regions according to performance goals, business priorities, or compliance requirements. For example, the policy may prioritize bandwidth for mission-critical applications during peak business hours, limit non-essential data flows in congested regions, or apply differentiated bandwidth quotas based on user roles or departments.

Process 1700 may include a step 1704 of distributing the policy to servers in the network to thereby cause the servers to implement the policy by controlling a first allocation of bandwidth to inbound traffic. Distributing the policy may involve transmitting policy data or configuration settings. Such distribution may occur, for example, from a central management system, such as a cloud service management application, to one or more target servers. The first allocation of bandwidth may refer to bandwidth assigned for handling inbound traffic based on policy-defined prioritization or restriction rules. For example, the servers may throttle, prioritize, queue, or shape incoming packets using traffic control techniques in accordance with the bandwidth preferences defined in the policy.

Process 1700 may include a step 1706 of distributing the policy to edge devices in the network to thereby cause the edge devices to implement the policy by controlling a second allocation of bandwidth to outbound traffic. Distributing the policy may involve transmitting or synchronizing bandwidth management rules. This may occur, for example, from a central management system to one or more edge devices. The second allocation of bandwidth may refer to bandwidth assigned for handling outbound traffic based on the policy. For example, edge devices such as routers, firewalls, or gateways may adjust upstream traffic flows in accordance with the organizational preferences defined in the policy.

Some disclosed embodiments involve performance of dynamic network security operations. Dynamic network security operations include any set of continuously adaptive, context-aware processes and mechanisms used to protect digital networks, systems, and data (as previously described and exemplified) from evolving threats and unauthorized access. These operations may adjust in real-time based on observed network activity, threat intelligence, and behavioral analysis, rather than relying solely on static rules or predefined configurations. There are several possible processes and mechanisms that may comprise a set of dynamic network security operations, including, among others: (1) access control and policy enforcement operations such as dynamic access policy assignment, zero trust enforcement, conditional multi-factor authentication (MFA), and just-in-time (JIT) access provisioning, (2) behavioral analytics and anomaly detection operations such as behavior-based threat detection, dynamic user or device risk scoring, application behavior profiling, and insider threat detection, (3) traffic monitoring and control operations such as dynamic traffic shaping or rerouting, dynamic deep packet inspection (DPI) triggering, policy-based microsegmentation, and quarantine or isolation of network segments, (4) automated threat containment, security playbook execution, and dynamic honeypot deployment, (5) cloud and edge-specific operations such as cloud resource access governance and edge network policy synchronization, (6) infrastructure and configuration-level operations such as adaptive firewall rules, real-time configuration hardening, and dynamic virtual private network (VPN) or tunnel termination, (7) integrated intelligence and feedback loop operations such as threat intelligence feedback loops, cross-domain correlation, and artificial intelligence/machine learning-based policy optimization, and (8) operational and governance controls operations such as dynamic audit logging and visibility adjustments and geo-fencing and time-based controls.

Some disclosed embodiments involve monitoring traffic associated with endpoints in a SASE network. Traffic associated with endpoints refers to network traffic (as previously described and exemplified) originating from or directed to endpoints such as laptops, smartphones, servers (as previously described and exemplified), Internet of Things (IoT) devices, or virtual machines, typically involving user applications, system processes, or automated services interacting with local or remote resources. Monitoring traffic associated with endpoints in a SASE network may refer to the continuous observation and analysis of network traffic flows that originate from or are destined to endpoints within a SASE network (as previously described and exemplified). This involves capturing, inspecting, and analyzing network-layer and application-layer communications from endpoints to detect (as previously described and exemplified) usage patterns, assess security posture, and/or inform real-time policy enforcement decisions within a unified cloud-native security architecture. Ways in which traffic associated with endpoints in a SASE network may be monitored include: (1) protocol-level traffic monitoring, (2) user behavior and access pattern monitoring, including login time, login location, abnormal resource access, high-frequency access, access to unsanctioned applications, and cross-cloud app hopping, (3) device and posture-related traffic monitoring, (4) application-layer monitoring, (5) data security and exfiltration, (6) lateral movement and internal threat monitoring, (7) threat and malware activity detection, (8) operational and compliance monitoring, (9) edge and cloud enforcement points, including SD-WAN edge device traffic visibility and ZTNA gateway traffic monitoring, and (10) advanced analytics and correlation, including traffic correlation with threat intelligence, traffic-to-identity mapping, and AI-based anomaly detection.

Some disclosed embodiments involve classifying endpoint behavior based on the monitored traffic. Endpoint behavior refers to the observable patterns of actions, activities, and communications performed by an endpoint over time and across network (as previously described and exemplified), system, and application layers. The endpoint behavior includes the set of measurable characteristics exhibited by an endpoint, including, for example, its network activity, system events, user interactions, process execution, resource access, and external communications, which can be analyzed to assess normal operation, detect anomalies, and enforce security policies. Classifying endpoint behavior based on the monitored traffic is the act of analyzing traffic patterns to assign a behavioral class, label, role, or risk score to the endpoint, enabling context-aware security policy (as previously described and exemplified) enforcement and anomaly detection in a SASE network. Exemplary classifiers of endpoint behavior based on the monitored traffic may include those classifiers based on rules or logic conditions, behavioral heuristics, threat intelligence correlation, or machine learning (as previously described and exemplified) classification using anomaly detection models, unsupervised learning approaches, or supervised learning approaches. Endpoint behavior may be classified as normal, risky, anomalous, compromised, infected, developer, administration, misuse, remote access, or any other classification that may inform the assessment of normal operation, detection of anomalies, and/or enforcement of security policies.

In some disclosed embodiments, classifying the endpoint behavior is based on endpoint device type. Classifying endpoint behavior based on device type may enable security systems to align behavior expectations or policies with the device's role and capabilities. There are several types of endpoint devices, which may have differing functional roles, capabilities, risk levels, and typical network behaviors. Endpoint device types may include corporate laptops and workstations, mobile devices such as smartphones and tablets, printer and scanner devices, IoT devices (e.g. sensors, cameras, HVAC), virtual machines, servers, kiosks and shared terminals, payment terminals, personal devices on enterprise network, industrial control systems, virtual desktop infrastructure, ATMs, networked lab or testing equipment, or any other device that connects to a network and acts as an entry or exit point for network traffic (as previously described and exemplified).

In some disclosed embodiments, classifying the endpoint behavior is based on user type. Classifying endpoint behavior based on user type may involve analyzing the user identity, role, department, privileges, or access level and using that information as context for evaluating the endpoint behavior. Different user types may exhibit different behavior patterns and by aligning observed behavior with expected user roles, dynamic network security operations like anomaly detection, access control, and policy enforcement may be enhanced. User types may include those users with (1) enterprise roles such as staff, IT, executives, engineers, compliance, administrative, or facilities, (2) third party roles such as contractors, vendors, outsourced personnel, or field personnel, (3) remote and hybrid roles such as remote workers, hybrid workers, travelling workers, or hoteling workers, (4) education and research roles such as academic users, library staff, research staff, or resource staff, (5) healthcare roles such as clinical staff, pharmacy staff, mental health resources, laboratory staff, or care coordinators, (6) government and defense roles such as civil servants, security-cleared users, law enforcement, military, or elected officials, (7) retail, payment, and frontline roles such as store staff, back office, franchise users, or seasonal or temporary users, (8) industrial and manufacturing roles including production staff, engineers, field maintenance, or supply chain and logistics, (9) guest and transient roles such as guest users, kiosk users, or unidentified or anonymous users, (10) automated or system users such as service accounts, scheduled task users, or machine identities, (11) other roles such as interns, test users, suspended or inactive users, shadow IT users, or any other type of user that may exhibit unique usage, access, or risk characteristics.

In some disclosed embodiments, classifying the endpoint behavior is based on traffic type. Classifying endpoint behavior based on traffic type may involve analyzing the kinds of network traffic that an endpoint generates or receives (as previously described and exemplified), identifying (as previously described and exemplified) the nature, purpose, and protocol of the endpoint traffic, using the identified patterns and categorizations to profile and baseline endpoint activity and determine whether behavior is normal or poses a security risk. Traffic type may include user activity traffic in the form of web, email, chat or collaboration, voice or video, or streaming traffic. Traffic type may include file and data transfer through file sharing, cloud storage and sync, or peer-to-peer file sharing. Traffic type may include remote access and administration via remote desktop, command line and shell access, or remote management protocols. Traffic type may include infrastructure and backend access in the form of database traffic, directory services, or API traffic, or traffic type may include network services such as Domain Name System (DNS) traffic, Dynamic Host Configuration Protocol (DHCP) and addressing traffic, or Network Time Protocol (NTP) or Precision Time Protocol (PTP) traffic. Traffic type may include system and security traffic for update services, authentication and identification, or security services. Traffic type may include cloud platform traffic and Software as a Service (SaaS) traffic. Traffic type may additionally include encrypted and tunneling traffic via VPN and tunnels or tunneling and proxies. Traffic type may include traffic from IoT protocols or Industrial Control Systems (ICS) and Supervisory Control and Data Acquisition (SCADA) systems. Some additional traffic types may include blockchain and cryptocurrency traffic, game traffic from video game networks and game protocols, mobile application protocols, and any other traffic type that may have a different nature, purpose, protocol, or risk profile than those listed.

Some disclosed embodiments involve generating a dynamic secure access policy for each endpoint based on classified behavior associated with each endpoint. Generating a dynamic secure access policy for each endpoint based on classified behavior associated with each endpoint may involve creating and tailoring access control rules for each endpoint based upon the characteristics of the endpoint and the observed and classified behavior of the endpoint. These access control rules may be created and tailored by analyzing the behavior, context, and attributes of that specific endpoint, then generating or updating a dynamic secure access policy that may be unique to each endpoint, which may govern what the endpoint can access, under what conditions, and how. The generation of a dynamic secure access policy for each endpoint may allow differing treatment of each endpoint, which may support zero trust network architectures, SASE network architectures, dynamic control, real-time control, least privilege, network visibility, network auditability, or adaptability. Creating and tailoring a dynamic secure access policy may entail generating a unique access policy for each endpoint based on classifying endpoint behavior through monitoring and classifying endpoint activity, assessing contextual factors, determining risk profile, enforcing policy in real time, or continuous evaluation and revision. A dynamic secure access policy may be a policy (as previously described and exemplified) that has a continuously adaptive, context-aware access control rule or set of access control rules that may automatically change in real time based on the context of the access request or current factors, which may include or depend upon device type, user type, traffic type, device posture, identity, behavior, location, risk level, time, risk posture, business intent, or any additional information about the surrounding environment or situation of an endpoint that can be used to adapt network behavior or provide individualized services. The dynamic secure access policy may be generated based on at least one of predefined rules or logic, artificial intelligence/machine learning (AI/ML) techniques, attribute-based access control (ABAC), risk-adaptive access control (RAdAC), intent-based policy generation, or template-based policy generation.

In some disclosed embodiments, the dynamic secure access policy permits transmission of a data type in association with a first context and denies transmission of the data type in association with a second context. A data type may be a descriptive label for the nature of the content being protected or transmitted (as previously described and exemplified), including sensitive data, regulated data, business data, compliance-specific data, media or format-oriented data, and system or infrastructure data. As previously described and exemplified, the dynamic secure access policy is a continuously adaptive, context-aware access control rule or set of access control rules, and this dynamic secure access policy may allow or block data transmission of the same data type based on the association with a first context or a second context. There are several ways in which a first context and a second context might differ such that a dynamic secure access policy treats a data type associated with a first context different from the data type associated with a second context including by differing user role, device type, device posture, network location, application, destination, time or session context, risk score, anomaly detection, geolocation, compliance boundary, collaboration policy, or any other difference between transmission features beyond the descriptive label for the content being protected or transmitted.

In some disclosed embodiments, the dynamic secure access policy governs a plurality of resources provided by a plurality of non-related entities and to which each endpoint is entitled to access. Non-related entities refers to organizations or service providers that own, operate, or manage resources and are not under common ownership, control, or administrative domain. Each non-related entity may have organizational independence, distinct infrastructure, or no inherent trust relationship. A dynamic secure access policy may centrally control endpoint access to multiple resources, even when those resources do not share common ownership or control. The resources provided by a plurality of non-related entities and to which each endpoint is entitled to access may include software applications, files and data stores, infrastructure services, web-based resources, physical or virtual devices, SaaS productivity and collaboration, cloud infrastructure and DevOps, customer relationship management (CRM), human resources (HR), enterprise resource planning (ERP), customer support and communication, data storage, document management, security and identity services, external vendor portals, application programming interfaces (APIs), educational and research platforms, or industry-specific resources including healthcare, legal, and manufacturing resources. In addition to governing access to software and digital resources that may exist on a network, the dynamic secure access policy may control access to physical resources such as enterprise physical resources, office equipment, security and surveillance, laboratory and research equipment, industrial and manufacturing equipment, logistics and transportation, user-controlled physical devices, network infrastructure, network edge, healthcare and critical infrastructure, educational and institutional resources, and energy and utilities.

In some disclosed embodiments, the plurality of non-related entities are associated with at least two of an email application, a file sharing application, or a web browsing application. An email application may include Google Gmail, Microsoft Outlook, ProtonMail, Yahoo Mail, Zoho Mail, Fastmail, Apple Mail, Tuta or Tutanota, or any other software program or service that enables users to send, receive, manage, and organize email messages electronically over a network. A file sharing application may include Google Drive, Dropbox, OneDrive, Box, Mega, WeTransfer, Nextcloud, iDrive, or any other software program, platform, or service that enables users to store, access, send, receive, or collaboratively manage digital files—such as documents, images, videos, or software—over a network. A web browsing application may include Google Chrome, Mozilla Firefox, Microsoft Edge, Apple Safari, Brave, Vivaldi, Opera, Tor Browser, DuckDuckGo Browser, or any other software program that acts as a client that communicates with web servers using standard protocols to load and render webpages, files, or applications, allowing users to access, retrieve, view, and interact with content and services on the World Wide Web or Internet.

Some disclosed embodiments involve enforcing the policy based on the classified behavior to thereby prevent unapproved access to resources among the plurality of non-related entities. Unapproved access refers to any attempt to use, view, modify, transmit, or otherwise interact with a system, resource, or data that is not explicitly permitted under the applicable security policies, user roles, or contextual conditions. The basis for unapproved access may include user type, user behavior, device type, device posture, network characteristics, resource requested, context of request, misuse of legitimate access, and any additional classified behavior for which a dynamic secure access policy might reject an access request. Enforcing the policy based on the classified behavior to thereby prevent unapproved access to resources among the plurality of non-related entities involves classifying the behavior of an endpoint, evaluating the classified behavior based on a dynamic secure access policy, and enforcing the dynamic secure access policy. This enforcement may allow, deny, quarantine, redirect, require step-up authentication, or throttle or restrict an access request from an endpoint.

Some disclosed embodiments involve monitoring changes in endpoint traffic behavior to determine resource usage variances. Resource usage variances refer to deviations from an endpoint's typical pattern of accessing network resources over time, including changes in what, how, when, or how much an endpoint interacts with various resources, such as network-accessible tools, platforms, or data, especially when those changes differ significantly from expected or baseline behavior. Network resources may refer to any digital or physical services, data, systems, or components that are accessible via a network connection, and which endpoints or users can interact with, consume, or request access. Network resources may include applications (e.g. SaaS, web, legacy, email servers, HR software, CRM tools, ERP systems, web-based dashboards), data stores (e.g. files, databases, data lakes, file servers, cloud storage buckets, SQL or NoSQL databases, document repositories), services (e.g. authentication services, APIs, CI/CD pipelines), infrastructure components (e.g. virtual machines, Kubernetes clusters, remote desktops, container registries, cloud workloads), communications platforms (e.g. email servers, VoIP, chat systems, Zoom, Microsoft Teams, Slack, internal messaging platforms), control systems (e.g. IoT management consoles, SCADA), security layers (e.g. VPN gateways, SASE nodes), physical resources (e.g. industrial gateways, smart cameras, environmental sensors, SCADA systems, printers, scanners, industrial and operational technology (OT), embedded devices, IoT devices, office equipment, physical security systems, transportation and mobile assets, routers, switches, physical IT infrastructure, healthcare and laboratory devices), or any other digital or physical services, data, systems, or components that are accessible via a network connection. These resource usage variances may result from changes including legitimate changes such as a software update or a new job role, policy violations such as accessing a restricted system, or security threats such as malware, an insider threat, or credential threat. These resource usage variances may result in flagging for inspection, alerting, or adjusting a dynamic secure access policy. Resource usage variances may include data volume variances, application or service access variances, network and connection variances, behavioral and usage pattern variances, security-related variances, resource type variances, frequency variances, cross-entity or multi-entity access variances, endpoint device variances, or any other significant, unusual, or unexpected changes in how an endpoint consumes, accesses, or interacts with network resources, across multiple dimensions such as volume, timing, type, and context. Monitoring changes in endpoint traffic behavior to determine resource usage variances refers to the process of continuously analyzing how an endpoint interacts with network resources over time to determine (as previously described and exemplified) if there exists resource usage variances. This determination of resource usage variance may be used for enforcing continuously adaptive, context-aware access policies including security threat detection, access policy adjustment, compliance enforcement, or behavioral profiling.

Some disclosed embodiments involve revising the dynamic secure access policy based on the resource usage variances to reduce an attack surface. Revising the dynamic secure access policy may refer to the process of modifying or updating access control rules in real time or near-real time to ensure that only appropriate access is allowed, based on changing factors that may include endpoint behavior, resource usage patterns, security risk indicators, or environmental or contextual conditions. Revisions to the dynamic secure access policy may occur automatically or programmatically, in response to changes in the environment, behavior, or risk posture. These revisions may affect specific users, endpoints, actions, or data types and may take into account the context. Revising the dynamic secure access policy may help to prevent stale or excessive privileges, respond to an emerging threat or unusual behavior, support Zero Trust by continuously validating access, or reduce an attack surface. An attack surface is a set of points within a system, network, or environment that are accessible to potential attackers and could be used to attempt unapproved access, data theft, disruption, or system compromise. An attack surface may encompass both external and internal access points including hardware, software, a network interface, a user, a service, an API, or a configuration, and an attack surface grows with system complexity, connectivity, and user interaction. Categories of an attack surface may include digital, network, software, human, physical, cloud environment, and hybrid environment. Revising the dynamic secure access policy based on the resource usage variances to reduce an attack surface may involve dynamically adjusting access based on behavior or risk through the dynamic secure access policy, disabling or removing unused services or accounts, restricting user and device privileges to only what is necessary, limiting available entry points for attackers, or any other revision of policies that modifies access to reduce vulnerabilities of a system, network, or environment.

In some disclosed embodiments, the resource usage variances include at least one time-based anomaly. An anomaly may be a deviation from an expected, typical, or baseline pattern that is material enough to trigger evaluation, classification, or policy adjustment. An anomaly may include a single deviation or multiple deviations. An anomaly may be detected or determined by a threshold-based method (e.g. greater than 5%, 10%, or 50% increase from average), a statistical method (e.g. 3 standard deviations from the mean), a heuristic method (e.g. access request for a new resource or outside of typical working hours), a machine learning based method (e.g. classified as anomalous by a model), a time-series or behavioral baseline method (e.g. non-anomalous gradual increase, anomalous sudden spike), a signature-based method (e.g. malware fingerprint), or a context-aware method (e.g. a set of differing thresholds based on risk profile, 2% deviation for high risk determination, 20% deviation for low risk determination). Anomaly detection or determination methods may be based on the context of an endpoint, where the identification of abnormal or unexpected behavior may be in light of surrounding environmental or situational conditions, rather than purely numerical thresholds or patterns alone. Additionally, a hybrid model may be used, which may combine multiple anomaly detection and determination methods. A time-based anomaly of resource usage is a change in the detected timing or temporal pattern of resource usage. A time-based anomaly included in resource usage variances may comprise an unusual access time, a burst or spike of activity, a long period of inactivity followed by intense activity, repeated failed access attempts clustered in time, access pattern deviations relative to a user's normal schedule, rapid switching between resources, an unusual session duration, time-shifted access patterns, a time-based correlation with external events, or any other unusual timing pattern related to resource access.

In some disclosed embodiments, the resource usage variances include at least one context-based anomaly. A context-based anomaly of resource usage refers to unusual or unexpected resource usage that deviates from established norms when considering contextual information beyond just raw usage data. This contextual information may include pieces of information or attributes surrounding an event or action that provide additional meaning, background, or conditions to interpret that event accurately, as well as the relevant circumstances or metadata about an endpoint, user, device, environment, or time that may help determine whether a behavior is normal or anomalous. A context-based anomaly included in resource usage variances may comprise a user role and behavior mismatch, device and security posture anomalies, location-based anomalies, time-based contextual anomalies, permission and access rights violations, application and resource usage deviations, behavioral pattern deviations, network environment anomalies, a threat intelligence correlation, or resource usage does not align with the expectation of who is accessing, from what device or location, at what time, and with what permissions or behavior history.

In some disclosed embodiments, the resource usage variances include at least one location-based anomaly. A location-based anomaly of resource usage refers to unexpected, unusual, or suspicious activity related to the geographic location or network origin of an endpoint's access to a resource, signaling that resource usage is happening from a location that differs from what is normal, permitted, or expected for the user, device, or organization. These location-based anomalies may help with the detection of compromised accounts, VPN misuse, location spoofing, insider threats operating outside of sanctioned environments, or policy violations. A location-based anomaly included in resource usage variances may comprise unexpected geographic locations, impossible travel events, unusual IP geolocation patterns, suspicious network environments, bypassing geofencing or location-based policies, a device or account mismatch across locations, or any other unusual or suspicious access or activity pattern based on geographic or network origin.

In some disclosed embodiments, the resource usage variances include at least one usage-based anomaly. A usage-based anomaly of resource usage refers to any unusual or unexpected pattern in the nature, intensity, or behavior of interactions with a resource, relative to historical norms, user roles, or expected behavior patterns. Interactions with a resource may include accessing, reading, writing, modifying, uploading, downloading, executing, or invoking functions, for example. These usage-based anomalies may reveal insider threats, malware or exfiltration attempts, credential abuse, privilege escalation through abnormal activity, or policy violations. A usage-based anomaly may include a data volume anomaly, a frequency or repetition anomaly, an action-type deviation, a resource scope change, a time-related usage shift, a device or tool mismatch, a workflow sequence anomaly, collusion-like behavior, an application-specific anomaly, cloud or infrastructure anomalies, or other unusual activity related to the pattern and nature of interactions with a resource.

In some disclosed embodiments, the usage-based anomaly indicates cessation of performance of an activity that was previously permitted, and wherein the revised dynamic secure access policy denies performance of the activity. A cessation of performance indicates that an endpoint that no longer performs an activity that it used to perform or was permitted to perform under the prior dynamic secure access policy. A usage-based anomaly may comprise a cessation of performance. A revision of the dynamic secure access policy may result from such a usage-based anomaly and may reduce an attack surface by eliminating access to the activity.

In some disclosed embodiments, the usage-based anomaly indicates performance of a new activity, and wherein the revised dynamic secure access policy permits performance of the activity. A performance of a new activity refers to a situation where an endpoint initiates a task, behavior, or interaction with a system, service, resource, or data that is novel for the endpoint based on prior observed behavior or historical usage patterns. A usage-based anomaly may comprise performance of a new activity. A revision of the dynamic secure access policy may result from such a usage-based anomaly and may allow the endpoint to access the new activity.

Some disclosed embodiments involve automatically applying the revised dynamic secure access policy in response to the monitored changes. Automatically applying the revised dynamic secure access policy refers to the update, enforcement, or maintenance of the access control rule or set of access control rules without requiring a manual input or intervention from a user or administrator. Upon detecting changes in monitored endpoint traffic, the system may respond by revising the dynamic secure access policy based upon these changes and enforce this dynamic secure access policy.

Some disclosed embodiments involve confirming approval of the automatic application of the revised dynamic secure access policy following the automatic application of the revised dynamic secure access policy. Confirming approval refers to requiring a user, administrator, or system to review the automatic application of the revised dynamic secure access policy and confirm that the automatic application of the revised dynamic secure access policy was appropriate, safe, or aligned with an organizational policy or security policy. After the automatic application of the revised dynamic secure access policy, a user, administrator, or system must validate the automatic application, which may support auditability and compliance, prevent permanent application of unintended or risky access changes, allow for human oversight, or allow for rollbacks or policy hardening after automated enforcement.

In some disclosed embodiments, the revised dynamic secure access policy restricts access to a resource to which access was previously permitted. A system may revise a dynamic secure access policy, which may modify a control access rule or a set of control access rules to limit an endpoint's access to a resource, even if the endpoint could previously access the resource. This access modification may be due to a detected anomaly, changed context, increased risk level, updated role or entitlement, or system behavior flagged as suspicious. Access restrictions may be due to user behavior, device state, time or schedule, location or network, network traffic or protocol, account or identity based, policy learning, or any other context, trigger, behavior, or interaction that might prompt the system to reduce access to networked resources.

In some disclosed embodiments, the revised dynamic secure access policy permits access to a resource to which access was previously restricted. A system may revise a dynamic secure access policy, which may modify a control access rule or a set of control access rules to increase an endpoint's access to a resource, even if the endpoint could not previously access the resource. This access modification may be due to a risk subsiding or a context becoming trustworthy. Increased access may be helpful for improving user productivity, reducing manual administrative overhead, or supporting Zero Trust principles. Increased access permissions may be due to user-based triggers, device-based triggers, location or network context, time and schedule-based access, behavior-driven access changes, role- or job-based transitions, policy-learning or admin-driven adjustments, resource types available, or any other context, trigger, behavior, or interaction that might prompt the system to increase access to networked resources.

Figure 18:
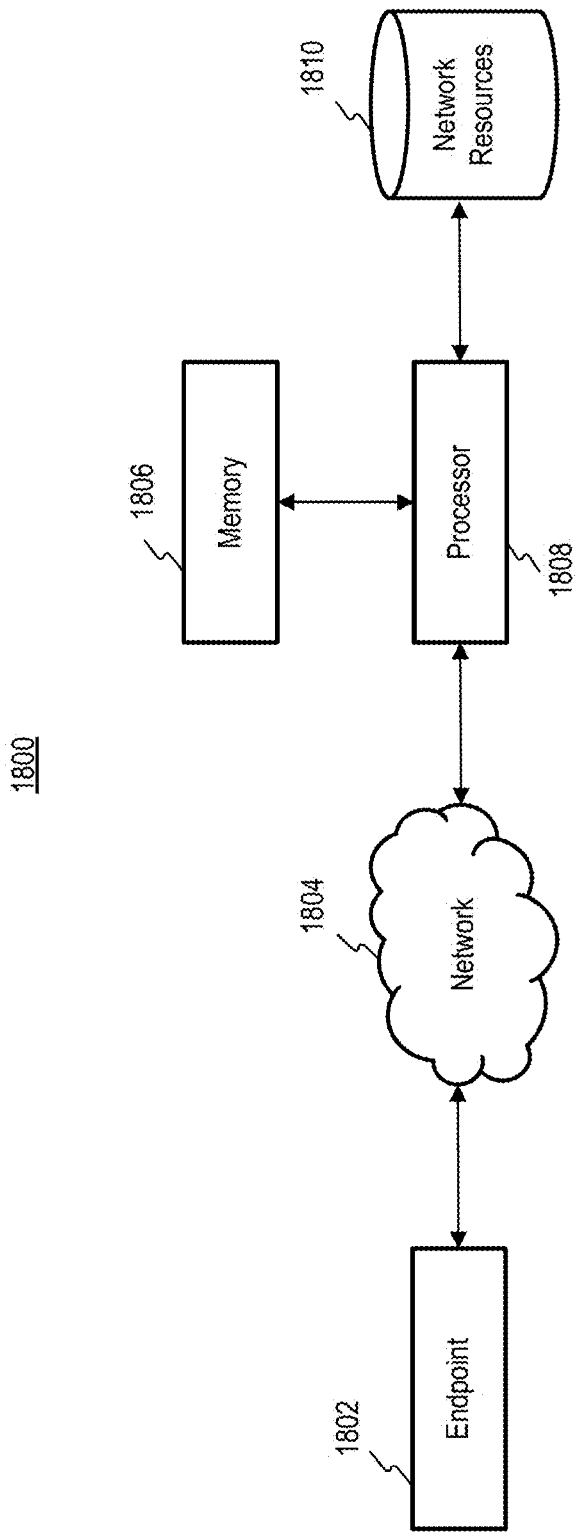
FIG. 18 illustrates an exemplary system for performing dynamic network security operations, consistent with some disclosed embodiments.

FIG. 18 illustrates an exemplary system 1800 for performing dynamic network security operations, consistent with some disclosed embodiments. In some embodiments, system 1800 may include at least one endpoint 1802, as described herein. In some embodiments, system 1800 may include a network (as previously described and exemplified) 1804, which may be implemented as a SASE network (as previously described and exemplified). In some embodiments, system 1800 may comprise at least one processor (as previously described and exemplified) 1808 configured to perform operations or functions described herein. In some embodiments, system 1800 may comprise a computer readable medium (as previously described and exemplified), memory 1806, containing instructions that when implemented by at least one processor 1808 cause the at least one processor 1808 to perform operations or functions described herein. In some embodiments, system 1800 may include network resources 1810.

Referring to FIG. 18, system 1800 may include at least one processor 1808 configured to monitor traffic associated with endpoints in a SASE network.

System 1800 may include at least one processor 1808 configured to classify endpoint behavior based on the monitored traffic.

System 1800 may include at least one processor 1808 configured to generate a dynamic secure access policy for each endpoint based on classified behavior associated with each endpoint, the dynamic secure access policy governing a plurality of resources provided by a plurality of non-related entities and to which each endpoint is entitled access.

System 1800 may include at least one processor 1808 configured to enforce the policy based on the classified behavior to thereby prevent unapproved access to resources among the plurality of non-related entities.

System 1800 may include at least one processor 1808 configured to monitor changes in endpoint traffic behavior to determine resource usage variances.

System 1800 may include at least one processor 1808 configured to revise the dynamic secure access policy based on the resource usage variances to reduce an attack surface.

Referring to FIG. 18, system 1800 may include at least one computer readable medium, memory 1806, containing instructions that when implemented by at least one processor 1808 cause the at least one processor 1808 cause the at least one processor to perform dynamic network security operations including monitoring traffic associated with endpoints in a SASE network.

System 1800 may include at least one computer readable medium, memory 1806, containing instructions that when implemented by at least one processor 1808 cause the at least one processor 1808 cause the at least one processor to perform dynamic network security operations including classifying endpoint behavior based on the monitored traffic. In some embodiments, the classifying the endpoint behavior is based on endpoint device type. In some embodiments, the classifying the endpoint behavior is based on user type. In some embodiments, the classifying the endpoint behavior is based on traffic type.

System 1800 may include at least one computer readable medium, memory 1806, containing instructions that when implemented by at least one processor 1808 cause the at least one processor 1808 cause the at least one processor to perform dynamic network security operations including generating a dynamic secure access policy for each endpoint based on classified behavior associated with each endpoint, the dynamic secure access policy governing a plurality of resources provided by a plurality of non-related entities and to which each endpoint is entitled to access. In some embodiments, the dynamic secure access policy permits transmission of a data type in association with a first context and denies transmission of the data type in association with a second context. In some embodiments, the plurality of non-related entities are associated with at least two of an email application, a file sharing application, or a web browsing application.

System 1800 may include at least one computer readable medium, memory 1806, containing instructions that when implemented by at least one processor 1808 cause the at least one processor 1808 cause the at least one processor to perform dynamic network security operations including enforcing the policy based on classified behavior to thereby prevent unapproved access to resources among the plurality of non-related entities.

System 1800 may include at least one computer readable medium, memory 1806, containing instructions that when implemented by at least one processor 1808 cause the at least one processor 1808 cause the at least one processor to perform dynamic network security operations including monitoring changes in endpoint traffic behavior to determine resource usage variances. In some embodiments, the resource usage variances include at least one time-based anomaly. In some embodiments, the resource usage variances include at least one context-based anomaly. In some embodiments, the resource usage variances include at least one location-based anomaly. In some embodiments, the resource usage variances include at least one usage-based anomaly. In some embodiments, the usage-based anomaly indicates cessation of performance of an activity that was previously permitted, and wherein the revised dynamic secure access policy denies performance of the activity. In some embodiments, the usage-based anomaly indicates performance of a new activity, and wherein the revised dynamic secure access policy permits performance of the activity.

System 1800 may include at least one computer readable medium, memory 1806, containing instructions that when implemented by at least one processor 1808 cause the at least one processor 1808 cause the at least one processor to perform dynamic network security operations including revising the dynamic secure access policy based on the resource usage variances to reduce an attack surface. In some embodiments, the revised dynamic secure access policy restricts access to a resource to which access was previously permitted. In some embodiments, the revised dynamic secure access policy permits access to a resource to which access was previously restricted.

System 1800 may include at least one computer readable medium, memory 1806, containing instructions that when implemented by at least one processor 1808 cause the at least one processor 1808 cause the at least one processor to perform dynamic network security operations including automatically applying the revised dynamic secure access policy in response to the monitored changes.

System 1800 may include at least one computer readable medium, memory 1806, containing instructions that when implemented by at least one processor 1808 cause the at least one processor 1808 cause the at least one processor to perform dynamic network security operations including confirming approval of the automatic application of the revised dynamic secure access policy following the automatic application of the revised dynamic secure access policy.

Figure 19:
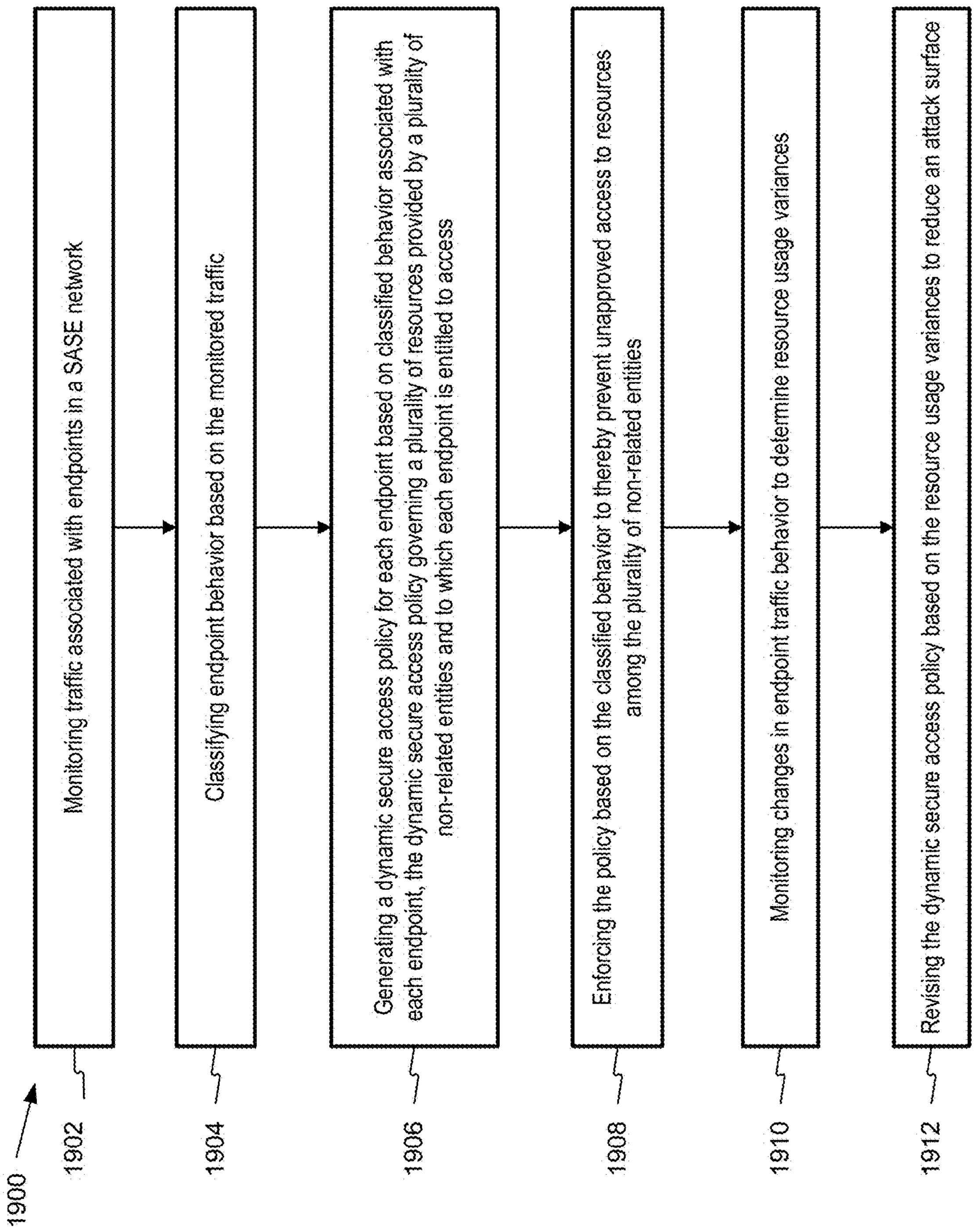
FIG. 19 is a flowchart of an example process for performing dynamic network security operations, consistent with some disclosed embodiments.

FIG. 19 is a flowchart of example process 1900 for performing dynamic network security operations, consistent with some disclosed embodiments. In some embodiments, process 1900 may be performed by at least one processor (as previously described and exemplified) (e.g., processor 1808 in FIG. 18) configured to perform operations or functions described herein. In some embodiments, some aspects of process 1900 may be implemented as software (e.g., program codes or instructions) that are stored in a memory (e.g., memory 1806 in FIG. 18) or a non-transitory computer readable medium (as previously described and exemplified). In some embodiments, some aspects of process 1900 may be implemented as hardware (e.g., a specific-purpose circuit). In some embodiments, process 1900 may be implemented as a combination of software and hardware.

Referring to FIG. 19, process 1900 may include a step 1902 of monitoring traffic associated with endpoints in a SASE network.

Process 1900 may include a step 1904 of classifying endpoint behavior based on the monitored traffic.

Process 1900 may include a step 1906 of generating a dynamic secure access policy for each endpoint based on classified behavior associated with each endpoint, the dynamic secure access policy governing a plurality of resources provided by a plurality of non-related entities and to which each endpoint is entitled to access.

Process 1900 may include a step 1908 of enforcing the policy based on the classified behavior to thereby prevent unapproved access to resources among the plurality of non-related entities.

Process 1900 may include a step 1910 of monitoring changes in endpoint traffic behavior to determine resource usage variances.

Process 1900 may include a step 1912 of revising the dynamic secure access policy based on the resource usage variances to reduce an attack surface.

Figure 20:
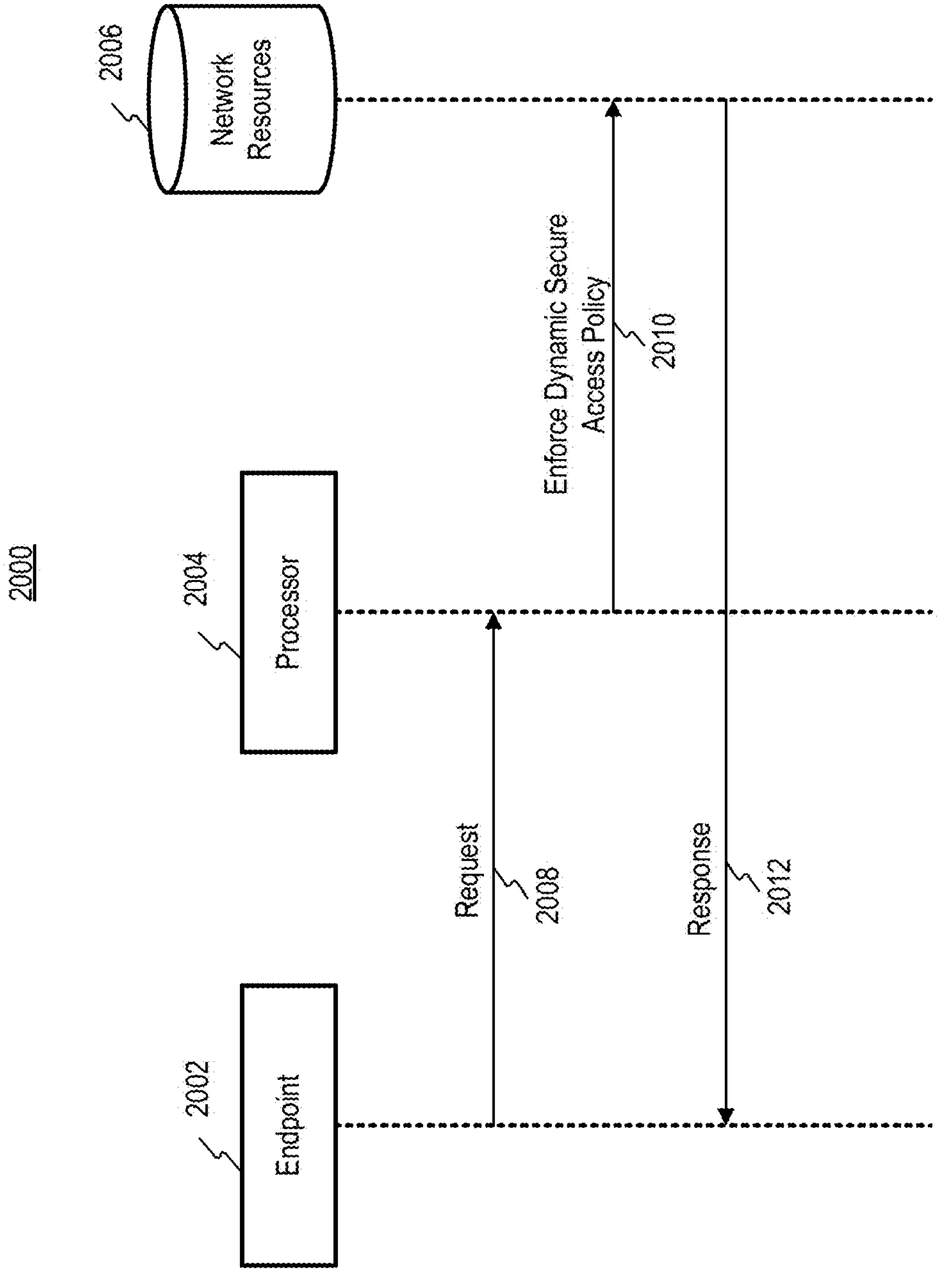
FIG. 20 illustrates an exemplary communication protocol for performing dynamic network security operations, consistent with some disclosed embodiments.

FIG. 20 illustrates an exemplary communication protocol 2000 for performing dynamic network security operations, consistent with some disclosed embodiments.

In some embodiments, communication protocol 2000 may include an endpoint 2002, as described herein, which may be configured to transmit data as network traffic (as previously described and exemplified). In some embodiments, as in communication protocol 2000, the network traffic transmitted by endpoint 2002 may comprise a request 2008. In some embodiments, communication protocol 2000 may include a processor (as previously described and exemplified) 2004. In some embodiments, processor 2004 may be configured to receive a request 2008 from an endpoint 2002 or a client device (as previously described and exemplified). In some embodiments, a server (as previously described and exemplified) or a server cluster (as previously described and exemplified) may be configured to receive, handle, or process request 2008. In some embodiments, processor 2004 may be configured to enforce dynamic secure access policy 2010, determining the access of endpoint 2002. In some embodiments, processor 2004 may enforce dynamic secure access policy 2010 on request 2008 from endpoint 2002 before the request 2008 reaches the server or the server cluster or after the request 2008 reaches the server or the server cluster. Additionally, in some embodiments, the processor 2004 may be included at the server or the server cluster so that receiving, handling, processing, and enforcing the dynamic secure access policy all occur at the server or the server cluster. In some embodiments, communication protocol 2000 may include network resources 2006. In some embodiments, enforcing dynamic secure access policy 2010 by processor 2004 may permit access of network resources 2006 to endpoint 2002. In some embodiments, the network resources 2006 may transmit a response 2012 to endpoint 2002.

A request (i.e. request 2008) may refer to a communication or message initiated by a client or endpoint (i.e. endpoint 2002) directed to a server, service, or resource (i.e. network resources 2006), typically to initiate an action, retrieve data, or establish a connection over a network. A request may be a discrete unit of interaction that follows a particular protocol (e.g., HTTP, DNS, TCP) and may contain metadata (headers), a destination, or a payload. The lifecycle of a request may include: (1) initiation, where a client (e.g. an endpoint) may prepare a request to access something, (2) transmission, where the request may be sent over the network using a specific protocol (e.g. HTTP, HTTPS, DNS, FTP, MQTT), (3) reception and processing, the destination (e.g. server, service, or processor 2004) may receive the request, processes the request, or perform the requested action (e.g. processor 2004 receives request 2008, processes the request, enforces dynamic secure access policy 2010, determining endpoint 2002 access to network resources 2006), (4) response (e.g. response 2012), a response may be returned to the requester (e.g. endpoint 2002).

Embodiments are disclosed to correlate device posture and network traffic information to thereby implement a network security policy based on the correlation. In this way both edge device posture and network traffic information may be used to enforce the network policy.

Some disclosed embodiments involve synchronizing network and endpoint security protocols. Synchronization refers to an enforcement of consistency between data sets and/or files stored in more than one location, as described elsewhere herein. Synchronization may ensure consistency between different sets of data, and may resolve incompatibilities, and/or conflicting and/or contradictory information. Network protocols refers to rules and/or guidelines governing how devices communicate and/or exchange data over a communications network. These protocols may determine how data is structured, transmitted, and/or interpreted, and may ensure consistent and reliable interactions between different systems, regardless of manufacturer or platform. A network protocol may serve as a common language permitting differing devices (e.g., including differing hardware and/or software components) to interact and/or share information. Endpoint security protocols refer to rules, measures, and/or technologies for protecting endpoint devices. For example, such rules may protect one or more endpoint devices, network resources, and/or network infrastructure connecting an endpoint device to one or more network resources from cyberattacks, vulnerabilities, malware, viruses, worms, and/or any other type of threat. For example, synchronizing network protocols and endpoint security protocols may ensure that communication permitted by a network protocol does not violate an endpoint security protocol, and/or the reverse.

Figure 21:
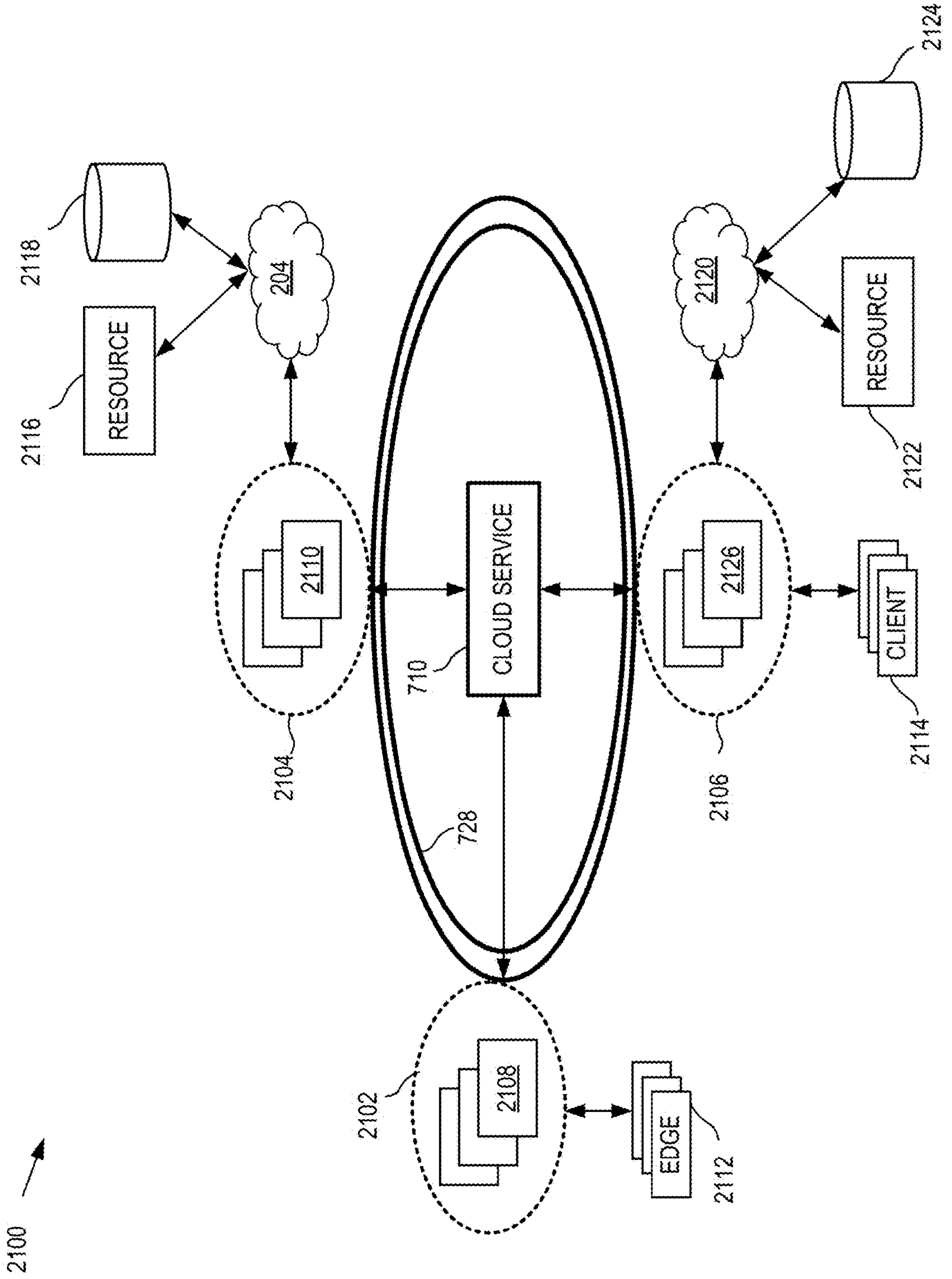
FIG. 21 is an exemplary schematic diagram of a system for synchronizing network and endpoint security protocols, consistent with some disclosed embodiments.

By way of a non-limiting example, reference is made to FIG. 21 which is an exemplary schematic diagram of a system synchronizing network and endpoint security protocols, consistent with some disclosed embodiments. The system may include a network 2100 including a plurality of server clusters 2102, 2104, and 2106 interconnected via backbone 728. Server cluster 2102 may include at least one server 2108, server cluster 2104 may include at least one server 2110, and server cluster 2106 may include at least one server 2126. At least one server 2108, at least one server 2110, and at least one server 2126 may communicate with cloud service 710 via backbone 728. An edge device 2112 may connect to network 2100 via at least one server 2108 in server cluster 2102. Server cluster 2104 may connect to public network 204, providing network connectivity to an external resource 2116 and an external resource 2118. Server cluster 2106 and/or server 2126 may connect to a private network 2120, providing network connectivity to a private resource 2122 and a private resource 2124. At least one client 2114 may connect to server 2126 in server cluster 2106. At least one processor (e.g., an instance of processor 102 in FIG. 1 associated with cloud service 710) may synchronize network and endpoint security protocols for network 2100.

Some disclosed embodiments involve receiving a device posture from an application running on an edge device. A device posture refers to a security status and/or compliance with one or more policies, as described elsewhere herein. A device posture may include one or more criteria indicating if a device is safe to access network resources based on an operating system, software, security configurations, and/or applications installed on the device. An application running on an edge device (as described elsewhere herein) refers to computer code instructions executed by at least one processor of an edge device. Running an application on an edge device may distribute computation and/or data storage to devices that are physically closer to sources of data and/or users. This may reduce communication latency when compared to running an application at a centralized data center, and may provide access to information associated with the edge device that may otherwise be inaccessible. Additionally or alternatively, running an application, such as an agent, on an edge device, may provide real-time access to device posture information associated with the edge device. Receiving a device posture from an application running on an edge device may include receiving (as described elsewhere herein) a file or code containing device posture data via an application executed by an edge device. By way of example, the file or code may be packetized. For instance, a software agent installed on an edge device may transmit packets including device posture data for the edge device to a server in a server cluster. In some embodiments, at least one processor may continually receive an updated device posture from the edge device in real-time.

In some disclosed embodiments, the device posture includes at least one software application type. A software application type refers to a genre, category, and/or classification. Some examples software application types may include an operation system, a browser application, a social media application, an interactive (e.g., video conferencing) application, a file sharing application, a streaming application, an office suite, a data analytics application, an artificial intelligence application (e.g., edge AI), a graphics rendering application, and/or any other type of software application. Some additional software application types running on an edge device may include predictive maintenance and/or real-time monitoring applications (e.g., to control industrial and/or home IoT appliances), applications associated with real-time control of robotics, security and/or surveillance systems (e.g., security cameras and/or motion detectors), energy management, wearable devices, diagnostics, autonomous and/or semi-autonomous vehicles, smart cameras, Content Delivery Networks (CDNs), and/or video analytics.

In some disclosed embodiments, the device posture includes at least one software application version. A software application version refers to a specific edition and/or release of a software application. Each version of a software application may be associated with a stage in development of the software application, and may include differing features, improvements and/or vulnerabilities over previous versions, and/or fixes (e.g., patches) to vulnerabilities (e.g., bugs) discovered in prior versions. A software application version may include an identifying code and/or name, a date. In some embodiments, an identifier for a version of a software application may indicate an extent of commonality and/or differences from prior versions, and/or the significance of any changes. For example, a version number may indicate how many lines of code were changed in the application, which features were added and/or removed, a potential impact to transition to a new version, a risk of defects and/or errors (e.g., bugs).

In some disclosed embodiments, the device posture includes at least one endpoint device type. An endpoint device refers to a device connected to a communication network for sending and/or receiving data. Endpoint device types may include corporate laptops and workstations, mobile devices such as smartphones and tablets, printer and scanner devices, IoT devices (e.g. sensors, cameras, HVAC), virtual machines, servers, kiosks and shared terminals, payment terminals, personal devices on enterprise network, industrial control systems, virtual desktop infrastructure, ATMs, networked lab or testing equipment, routers, and/or any other device that connects to a network and acts as an entry or exit point for network traffic (as described elsewhere herein).

By way of a non-limiting example, in FIG. 21, at least one processor (e.g., an instance of processor 102 in FIG. 1 associated with cloud service 710) may receive a device posture (e.g., as an electronic file packetized for transmission) from an application running on edge device 2112. For example, the at least one processor may receive the device posture from a software agent installed on edge device 2112. Edge device 2112 may transmit the device posture over a communication channel established with server 2108 in server cluster 2102. In some embodiments, the device posture may include at least one software application type. For example, edge device 2112 may be a smart TV, and the application may include a streaming application for receiving streamed content from external resource 2116. In some embodiments, the device posture may include at least one software application version, (e.g., "LiveStreamPro Version 2.4.1 (Build 2025.07.15) Release Date Jul. 15, 2025; Release Type: Minor Update"). The software application version may indicate features that are new, improved, fixed, and/or pending. In some embodiments, the device posture may include at least one endpoint device type, e.g., "device_type: smart-tv"; "manufacturer": "Samsung®"; "network connectivity": "wifi"; "operating system: "Tizen®").

Some disclosed embodiments involve receiving from a server in communication with the edge device, network traffic information associated with the edge device. Network traffic information associated with an edge device refers to details, characteristics, and/or properties of network traffic (as described elsewhere herein) received and/or transmitted by the edge device. Such information may include structured data, and/or metadata about network traffic and/or network activity, and may include, for example, a volume of network traffic, a type and/or context for the network traffic, a software application associated with the network traffic, a hardware device associated with the network traffic, a schedule, frequency, and/or timing associated with transmitting the network traffic to and/or from the edge device, and/or any other type of information. Network traffic information may be formatted using a JavaScript Object Notation (JSON) format, a Syslog format (e.g., for logging network traffic), a NetFlow/IPFIX format (e.g., for high-volume network traffic sent via routers and/or firewalls), gRPC and/or REST Payloads (e.g., when using an Application Programming Interface or API to stream network traffic), and/or as log lines (e.g., plain-text and/or JSON formatted lines for ingesting by a cloud logging service). A server in communication with an edge device refers to a server (as described elsewhere herein) coupled to an edge device via one or more physical and/or virtual (e.g., logical) communication channels. A server communicating with an edge device may transmit network traffic information to at least one processor associated with a centralized cloud service. For example, the network traffic information may indicate if network traffic flowing between the edge device and the server is in compliance or requires implementation of one or more heightened security measures. For instance, the network traffic information may indicate if the network traffic includes sensitive information, and/or is associated with a high-value asset, critical network infrastructure, and/or a network security zone. Additionally or alternatively, the network traffic information may indicate determine which processes and/or actions are performed on the edge device, such as which applications, operating systems, and/or browsers (e.g., which vendor and/or version) are installed and/or running on the edge device. In some embodiments, at least one processor may continually receive updated network traffic information from the server in real-time.

In some disclosed embodiments, the network traffic information includes a destination server type. A destination server type refers to a class and/or category for a server (as described elsewhere herein) designated as a target and/or end server for a network communication. For example, the communication may include a request to receive data from the destination server, and/or data transmitted to the destination server for storage. A destination server type may include an application server (e.g., a web server, and/or an Application Programming Interface or API server), a database server (e.g., managing access to one or more data structures), a streaming media server, a file and/or storage server for providing access to shared documents, a virtual desktop and/or remote access server, a Software-as-a-Service (SaaS) cloud server, an infrastructure server (e.g., a Domain Name System or DNS server, a Lightweight Directory Access Protocol or LDAP server, and/or an authentication server), a container-oriented server (e.g., for software development), a security server (e.g., for inspecting network traffic and/or enforcing policies), and/or any other type of server associated with network traffic. A destination server type may indicate a context and/or type of data included in network traffic. Moreover, different types of servers may be subject to different network security considerations. Thus, a destination server type may influence how a network security policy may be implemented.

In some disclosed embodiments, the network traffic information includes a destination server location. A destination server location refers to a physical and/or logical positioning of a server. For example, destination server location may include an IP address, a MAC address, and/or identify a country, state, province, city, campus, and/or region where a destination server is located. The destination sever location information may indicate if a server resides in a particular data center, branch location, server cluster, and/or public and/or private cloud. Destination sever location information may indicate which network or networks are connected to a particular server and/or edge device. A destination server location may indicate if additional security measures may be needed, for example, due to deficiencies in local regulations and/or enforcement, and/or heightened risks associated with local infrastructure and/or cyber threats. In some embodiments, destination server location may indicate a context and/or use of network traffic, and/or a version and/or type of network protocol used, a browser version, a local language, an encryption standard, local regulations and/or laws enforced on network traffic, and/or a distance from a source. In some embodiments, different servers at different locations may be compatible with different versions of software and/or hardware. For example, software updates may be installed on a location-based schedule, such that servers and/or server clusters at some locations may already have undergone upgrades for compatibility with newer software versions, whereas other servers and/or server clusters in other locations may not have undergone those upgrades. Consequently, an edge device running an newer software version (e.g., a newer browser and/or operating system) may only be able to establish a network connection with servers at certain locations that have undergone the upgrade. Conversely, an edge device running an older version of software application may be able to establish a communication channel with a first server at a first location, but may not be able to user the older version of software application to establish a communication channel with a second server at a second location.

In some disclosed embodiments, the network traffic information includes prioritization of traffic based on traffic type. Traffic type refers to a category and/or classification of network traffic. Some examples of traffic type may include real-time and/or non-real-time traffic. Real-time traffic may include audio and/or video streamed traffic (e.g., for video conferencing, Voice over IP or VoIP, and/or video streaming), multimedia streaming (e.g., for online gaming), and/or any other type of data sensitive to latency and packet loss. Non-real-time traffic may include emails, file downloads, software updates, web browsing, and/or any other type of non-time sensitive data that may tolerate delays. At least one processor may identify traffic type based on, for example, a network protocol used to transmit the traffic, a port number associated with sending and/or receiving the traffic, an application and/or server type associated with the traffic, and/or packet content. Prioritization of traffic based on traffic type refers to assigning differing levels of importance to different type of network traffic. Prioritization of traffic may permit delivery of critical and/or latency-sensitive traffic before non-critical and/or non-sensitive traffic, e.g., to maintain a QoS threshold. For example, at least one processor may assign a higher priority to traffic associated with VoIP than to traffic associated with a video conferencing and/or interactive application, and may assign a higher priority to transaction data (e.g., for point-of-sale and/or financial applications) than to web browsing, file transfer, and/or email applications. Traffic prioritization may occur at a router, an SD-WAN appliance, a firewall and/or edge note, and/or at a network switch. For instance, an SD-WAN appliance may prioritize critical network traffic along better performing network paths, and a server in a server cluster (e.g., a PoP) may prioritize network traffic to comply with one or more QoS policies.

By way of a non-limiting example, in FIG. 21, at least one processor (e.g., an instance of processor 102 in FIG. 1 associated with cloud service 710) may receive from server 2108 in communication with edge device 2112, network traffic information. The network traffic information may be associated with edge device 2112. In some embodiments, the network traffic information includes a destination server type. In some embodiments, the network traffic information includes a destination server location. In some embodiments, the network traffic information includes prioritization of traffic based on traffic type.

For example, the network traffic information may include a data structure in a JavaScript Object Notation (JSON) format, and may include a timestamp, a source IP address, a destination IP address, a source port number, a destination port number, a network type (e.g., "wifi"), a protocol used (e.g., "TCP"), an application layer protocol used (e.g., "HTTPS"), bytes sent (e.g., "45230"), bytes received (e.g., "38976"), a duration (e.g., "1250 milliseconds"), a destination server name (e.g., "Web Server 01"), a user name (e.g., "janedoe@example.com"), a destination server location (e.g., "Cloud Center, USA"), a device type (e.g., "database-server"), a QoS Policy name (e.g., "VoiceTraffic"), a priority level (e.g., "High"), and a traffic type (e.g., "VoIP").

Some disclosed embodiments involve correlating the device posture and the network traffic information. Correlating refers to identifying and/or analyzing the relationship and/or connection between two or more things. Correlating may include determining a mutual relationship and/or association between two or more variables. In some embodiments, correlating may include a statistical measure quantifying an extent and/or direction of a relationship between two or more variables, and/or one or more of comparing, matching, performing a logical operation (e.g., AND, OR, XOR), subtracting, associating, and/or computing a distance measure. Some distance measures that may be computed to correlate different sets of data may include a hamming distance, a Euclidian distance, a Manhattan Distance, a Minkowski distance, a Cosine Similarity distance, a Jaccard Similarity Distance, Mahalanobis Distance, a Canberra Distance, a Chi-square distance, a Chebyshev distance, a Jensen-Shannon distance, and/or a Levenshtein distance. In some embodiments, correlating may include determining a commonality and/or consistency between at least a portion of two pieces of information. In some embodiments, at least one processor may use an artificial intelligence engine to determine a correlation between a device posture and network traffic information.

Correlating a device posture and network traffic information refers to analyzing network traffic information and the device posture to identify a relationship therebetween. A least one processor (e.g., associated with a centralized cloud service) may receive a device posture for an edge device (e.g., via an agent installed thereon) and network traffic information from a server connected to the edge device. The at least one processor may determine one or more associations and/or relationships between the device posture and the network traffic information and use the associations and/or relationships to synchronize, ensure compatibility, and/or resolve conflicts and/or contradictions between one or more network and/or endpoint security protocols. For instance, at least one processor may link a device identity and/or a device status included in a device posture for an edge device with one or more network activities originating from and/or targeting the edge device and included in the network traffic information. Such as correlation may enable real-time enforcement of security protocols, risk scoring, and/or access decisions. By way of example, the device posture may indicate an older browser version installed on the edge device, and the network traffic information may indicate that a destination for network traffic flowing from the edge device is not compatible with the older browser version. As another example, a device posture for an edge device may indicate that implementation of a multi-factor authentication is required to communicate with servers located in specific regions, and the network traffic information may indicate that a server connected to the edge device is located in one of the specific regions. Correlating the device posture and the network traffic may include resolving one or more inconsistencies therebetween and thereby synchronize security protocols implemented by the edge device and the network. In some embodiments, at least one processor may continually receive device posture information and network traffic information in real-time, and may continually correlate the device posture and network traffic information in real-time.

By way of a non-limiting example, in FIG. 21, at least one processor (e.g., an instance of processor 102 of FIG. 1 associated with cloud service 710) may correlate the device posture (e.g., received from edge device 2112) and the network traffic information (e.g., received from server 2108).

For example, an agent installed on edge device 2112 may transmit a device posture to cloud service 710 as a first JSON formatted data structure, e.g.:

```
{
 "device_id": "smarttv-0342",
  "device_type": "smart_tv",
  "manufacturer": "LG",
  "os": "webOS 7.0",
  "firmware_version": "v3.1.2",
  "compliance_status": "non_compliant",
  "last_patch_date": "2024-12-01",
  "network_interface": "ethernet",
  "location": "Store-101 / Display-A1",
```

-continued

```
  "last_checkin": "2025-07-23T13:58:00Z"
}
```

If edge device 2112 requests to receive streamed content from external resource 2116 (e.g., a public media server), server 2108 may transmit first network traffic information to cloud service 710 as a second JSON formatted data structure, e.g.:

```
{
"timestamp": "2025-07-23T14:00:25Z",
  "device_id": "smarttv-0342",
  "source_ip": "192.168.15.34",
  "destination_domain": "ads.analytics.example.com",
  "application": "HTTPS",
  "bytes_sent": 2304,
  "bytes_received": 8761,
  "action": "requested"
}
```

Cloud service 710 may correlate the first JSON formatted data structure with the second JSON formatted data structure to produce a third JSON formatted data structure storing a first correlation, e.g.:

```
{
 "policy_id": "IOT-204",
 "result": "deny",
 "reason": "device non-compliant and domain not on allowlist",
 "device_id": "smarttv-0342",
 "destination": "ads.analytics.example.com"
}
```

By way of a further example, if edge device 2112 with the same device posture presented above with the first JSON formatted data structure attempts to access private resource 2122 (e.g., a private media server), server 2108 may transmit second network traffic information to cloud service 710 as a fourth JSON formatted data structure, e.g.:

```
{
 "timestamp": "2025-07-23T14:05:00Z",
 "device_id": "smarttv-0342",
 "source_ip": "192.168.15.34",
 "destination_ip": "10.5.1.20",
 "application": "RTSP",
 "port": 554,
 "action": "requested"
}
```

Cloud service 710 may correlate the first JSON formatted data structure storing the device posture with the fourth JSON formatted data structure storing the second network traffic information to produce a fifth JSON formatted data structure storing a second correlation, e.g.:

```
{
 "policy_id": "IOT-101",
 "result": "allow",
```

-continued

"reason": "trusted destination and media protocol permitted for smart_tv",
"device_compliance_override": true
}

Some disclosed embodiments involve implementing a network security policy based on the correlation such that both the device posture from the edge device and the network traffic information from the server are used to enforce the network security policy. A network security policy refers to a security policy (as described elsewhere herein) associated with a network. A network security policy may define how an organization protects network infrastructure, data, and/or users from unauthorized access, misuse, and/or cyber threats. A network security policy may govern permitted and prohibited behaviors for accessing and/or using network resources, such as how network traffic may be filtered, monitored, encrypted, and/or controlled. A network security policy may protect sensitive data, prevent unauthorized access to network resources, ensure regulatory compliance, maintain network performance, and/or ensure secure connectivity to remote locations. Network security policies may include access control policies defining who can access specific resources and/or data and under what circumstances, firewall policies defining what traffic to block and what traffic to allow, intrusion policies for triggering actions when suspicious patterns are detected, encryption policies, endpoint policies controlling what devices can connect to a network, Data Loss Prevention or DLP policies for blocking and/or flagging transmission of sensitive data, and/or traffic prioritization policies to ensure sufficient bandwidth for critical applications. In a SASE network, one or more network security policies may be centrally defined by a centralized cloud service. Such a network security policy may adjust access permission based on a current situation and/or context (i.e., context aware), for example based on user location, user role, edge device type, time of day, and/or a connecting network. The network security policy may be enforced dynamically across a plurality of server clusters and/or cloud engines. For example, a network security policy may deny outbound network traffic from a guest Virtual Local Area Network (VLAN) to an internal database, and permit a SaaS application for authenticated users. Implementing refers to the process of putting a plan, idea, system, or set of rules into action or practice. Implementing a network security policy based on the correlation refers using the correlation to apply, deploy, activate, and/or establish the network security policy. For instance, a commonality and/or consistency between the device posture received from the edge device and the network traffic information received from the server may be used to trigger one or more rules and/or configurations of the network security policy to govern network traffic flowing to and/or from the edge device. In some embodiments, at least one processor may continually implement a network security policy based on the correlation in real-time, thereby responding dynamically to any changes in the network traffic information and/or the device posture in real-time. For instance, a real-time change in the device posture and/or in the network traffic information may affect a security status of the edge device and/or a network resource, which may require updating the network security policy (e.g., to prevent exposure of a vulnerability, an exploit, an attack, and/or a malicious infiltration).

By way of example, applying network security policy based on the correlation between the device posture and the network traffic information may cause network traffic associated with the edge device to be quarantined for further testing, whereas applying the network security policy, independent of the correlation may permit the network traffic to flow uninterrupted. By way of another example, applying network security policy based on the correlation may cause implementation of a multi-factor authentication for a user of the edge device before granting access to a resource, whereas applying the network security policy independent of the correlation may permit the user to access to the resource, without the multi-factor authentication. In some embodiments, implementation a network security policy based on the correlation may permit integration of the endpoint device posture with network security requirements in real-time. Such real-time integration may permit real-time, dynamic decision-making by and/or for the network security policy, and may simultaneously address endpoint security requirements and network security requirements. In some embodiments, at least one processor may implement the network security policy based on the correlation in real-time, thereby addressing, in real-time, one or more potential incompatibilities and/or inconsistencies between the device posture and the network traffic information.

In some disclosed embodiments, the device posture indicates at least one obsolete security standard. A security standard refers to a guideline and/or regulation for safeguarding one or more aspects of a communication network. A security standard may pertain to data and/or a source thereof, a software application, a communication channel, a communication protocol, a device, and/or any other aspect of a communication network. An obsolete security standard refers to an expired, out-of-date, and/or irrelevant security standard. An obsolete security standard may fail to address one or more weaknesses and/or vulnerabilities of a communication network, thereby exposing such weaknesses and/or vulnerabilities to malicious exploits. For example, an obsolete security standard may include an outdated encryption standard leaving encrypted data vulnerable to newer decryption methods, an outdated communication protocol leading to data breach, outdated software leading to unauthorized access to proprietary network resources, and/or any other expired security standard that may expose a resource (e.g., data and/or a device) to attack and/or exploitation.

In some disclosed embodiments, implementing the network security policy includes taking a remedial action. A remedial action refers to a corrective measure, operation and/or procedure for addressing a problem, deficiency, and/or violation. For example, a remedial action may include sending an alert to a network administrator and/or user, issuing a report, blocking network traffic, shutting down one or more devices, communication channels, and/or ports, disconnecting one or more devices from a network, backing up data, and/or executing an application in a protected environment (e.g., a sandbox) to address a vulnerability, exploit, and/or threat. Additional examples of remedial actions may include suggesting a patch and/or providing a link to a patch for an obsolete software application, providing a link to download a software application, and/or suggesting a proxy server for re-routing network traffic.

In some disclosed embodiments, the remedial action includes permitting communication associated with a first group of resources, and denying communication associated with a second group of resources. A resource refers to a physical and/or logical asset. A resource may include a data resource (e.g., a file, a folder, a database), a software resource (e.g., an application, a service, a software engine), a virtual resource (e.g., a virtual machine, disk, and/or memory), a hardware resource (e.g., a device, a router, a switch, a printer, a hub, an access point, and/or a modem), a network connection, a queue, CPU and/or channel bandwidth, and/or any other type of resource. A resource may include a shared resource accessible by multiple users, devices, and/or applications, and/or a non-shared resource dedicated to a specific user, device, and/or application. Permitting communication with a group of resources refers to allowing transmission of data to and/or from a collection of resources. Permitting such communication may include identifying one or more resources included in the group, establishing a channel and/or opening a port associated with one or permitted resources, formatting data for compatibility with one or more permitted resources, forwarding and/or routing data destined for and/or received from one or more permitted resources, connecting one or more devices from a communication network, and/or performing any other action to enable communication with a group of resources. Denying communication associated with a group of resources refers to blocking, preventing, and/or prohibiting transmission of data to and/or from a collection of resources. Denying such communication may include identifying one or more resources included in the group, closing a channel and/or port associated with one or denied resources, blocking and/or diverting data destined for and/or received from one or more denied resources, disconnecting one or more devices from a communication network, and/or performing any other action to deny communication with a group of resources. For example, the edge device may include a security camera, and the device posture may indicate a privacy standard imposed on livestreamed footage of the security camera (e.g., due to implementation of a particular encryption standard associated with maintaining privacy). At least one processor may permit the livestreamed footage to flow to a first group of resources associated with a data owner of the livestreamed footage, and may deny the livestreamed footage from flowing to a second group of resources unassociated with the data owner. As another example, the network traffic information may indicate a volume of traffic exceeding a threshold level and requiring additional cloud processing before flowing to the edge device. At least one processor may permit the volume of traffic to flow to a first group of cloud resources capable of handing the above-threshold volume, and may block the above-threshold volume of traffic from flowing to a second group of cloud resources incapable of handling above-threshold volume. As a further example, a network security policy may categorize resources (e.g., websites) based on type, risk score, and/or any other category, and may permit or deny access to a resource based on the category. For instance, implementation of a network security policy may permit an edge device to access news website (e.g., having lower security standards), but may deny access to financial websites (e.g., requiring to stricter security standards).

In some disclosed embodiments, the remedial action includes conditioning communication in response to receiving a confirmation from a user. Conditioning communication refers to making communication, e.g., a transfer of data, contingent, dependent, and/or subject to one or more circumstances (e.g., conditions). In response to receiving confirmation from a user may be understood as meaning that something occurs as a result of receiving approval and/or agreement from a user. For instance, at least one processor may prompt a user of the edge device for approval before implementing the network security policy based on the correlation. For example, implementing the network security policy may including reducing a priority for traffic flowing to the edge device and/or temporarily quarantining the traffic, which may increase communication latency. At least one processor may request approval from the user of the edge device to approve the reduction in priority and/or quarantining prior to implementing the network security policy.

By way of a non-limiting example, in FIG. 21, at least one processor (e.g., an instance of processor 102 of FIG. 1 associated with cloud service 710) may implement a network security policy based on the correlation such that both the device posture from edge device 2112 and the network traffic information from server 2108 may be used to enforce the network security policy. Returning to first example, above, based on the first correlation, at least one processor may block network traffic flowing from external resource 2116 to edge device 2112. Based on the second correlation, at least one processor may allow network traffic flowing from private resource 2122 to edge device 2112. In some embodiments, the device posture indicates at least one obsolete security standard. For instance, in the example above the device posture indicated the firmware version installed on edge device 2112 as:

"firmware_version": "v3.1.2",
"compliance_status": "non_compliant",
"last_patch_date": "2024-12-01", The at least one processor may implement the network security policy by taking a remedial action. In some embodiments, the remedial action includes permitting communication associated with a first group of resources (e.g., private resources 2122 and/or 2124), and denying communication associated with a second group of resources (e.g., public resources 2116 and/or 2118). In some embodiments, the remedial action includes conditioning communication in response to receiving a confirmation from a user of edge device 2112.

Figure 22:
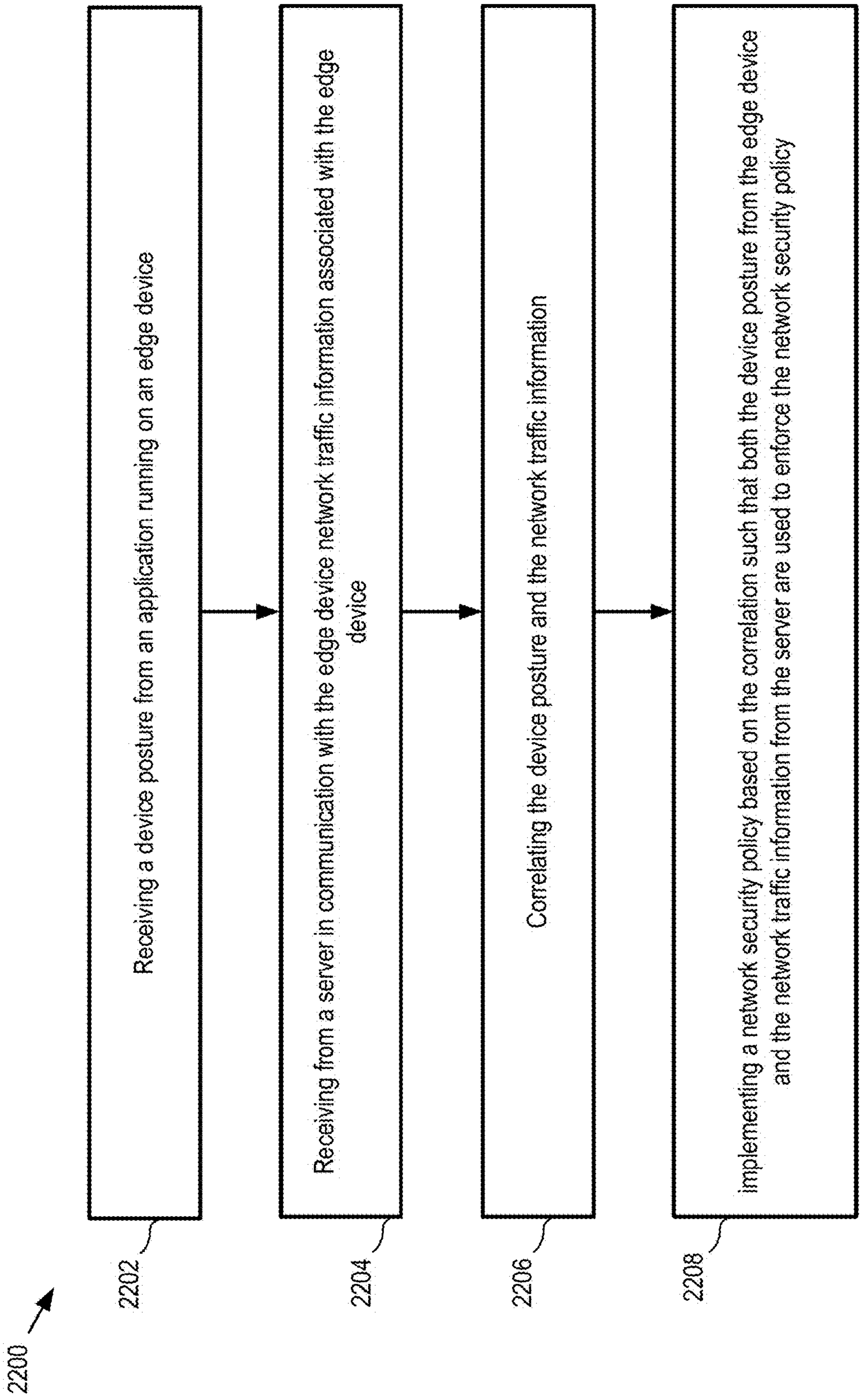
FIG. 22 is a flowchart of an example process for synchronizing network and endpoint security protocols, consistent with some disclosed embodiments.

FIG. 22 is a flowchart of example process 2200 for synchronizing network and endpoint security protocols, consistent with some disclosed embodiments. In some embodiments, process 2200 may be performed by at least one processor (e.g., processor 102 in FIG. 1) to perform operations or functions described herein. In some embodiments, some aspects of process 2200 may be implemented as software (e.g., program codes or instructions) that are stored in a memory (e.g., memory 104) or a non-transitory computer readable medium. In some embodiments, some aspects of process 2200 may be implemented as hardware (e.g., a specific-purpose circuit). In some embodiments, process 2200 may be implemented as a combination of software and hardware.

Referring to FIG. 22, process 2200 may include a step 2202 of receiving a device posture from an application running on an edge device. By way of a non-limiting example, in FIG. 21, at least one processor (e.g., an instance of processor 102 in FIG. 1 associated with cloud service 710) may receive a device posture from an application running on edge device 2112 via network 2100.

Process 2200 may include a step 2204 of receiving from a server in communication with the edge device network traffic information associated with the edge device. By way of a non-limiting example, in FIG. 21, at least one processor (e.g., an instance of processor 102 in FIG. 1 associated with cloud service 710) may receive from server 2108 in communication with edge device 2112 network traffic information associated with edge device 2112.

Process 2200 may include a step 2206 of correlating the device posture and the network traffic information. By way of a non-limiting example, in FIG. 21, at least one processor (e.g., an instance of processor 102 in FIG. 1 associated with cloud service 710) may correlating the device posture and the network traffic information.

Process 2200 may include a step 2208 of implementing a network security policy based on the correlation such that both the device posture from the edge device and the network traffic information from the server are used to enforce the network security policy. By way of a non-limiting example, in FIG. 21, at least one processor (e.g., an instance of processor 102 in FIG. 1 associated with cloud service 710) may implement a network security policy based on the correlation such that both the device posture from edge device 2112 and the network traffic information from server 2108 are used to enforce the network security policy.

Some disclosed embodiments involve performance of real-time dynamic policy revisions. In the present context, dynamic refers to continually and/or periodically changing and/or developing. Performance of real-time dynamic policy revisions may include updating, modifying, and/or adjusting one or more policies within a sufficiently short time window to influence and/or reflect current conditions as they happen. For example, in response to one or more network events, a change in one or more network conditions, a network state, a network topology, and/or any other factor and/or change affecting a communication network, a cloud service may implement one or more revisions to one or more policies governing one or more portions and/or aspects of the network.

Some disclosed embodiments involve tracking, in real-time, first characteristics of dataflow passing through a plurality of engines in a cloud network. A cloud network refers to a computer network architecture in which one or more network services may be abstracted and delivered through one or more cloud-based services and/or infrastructure (e.g., hosted by a cloud service provider). It may refer to a system of interconnected computing resources, services, and/or infrastructure that are delivered and managed via the internet—rather than through traditional on-premises hardware. Some examples of network services delivered and/or provided by a cloud network may include network connectivity, routing, security, privacy, traffic management, computation, storage, backup, and/or any other type of cloud service. A cloud network may be built using software-defined networking (SDN) and/or virtualized hardware implemented on physical computer hardware devices, to provide scalability and/or global accessibility, and/or programmability for dynamic management of network behavior (e.g., using one or more APIs and/or cloud orchestration tools).

An engine (e.g., a cloud engine) refers to software and/or hardware for performing one or more processing operations within a cloud environment. An engine may be executed by at least one processor. Differing engines may be dedicated to performance of differing functionalities. An engine may automate one or more threat detection, policy enforcement, encryption, authentication, access control, and/or compliance monitoring operations. For example, some engines may provide computation services, such as a Compute Engine for a virtual machine, a Platform-as-a-Service (PaaS) Engine for deploying software applications, and/or a Function Engine providing serverless execution of workloads (e.g., AWS®, Lamda®, Azure®). Some engines may provide data analytics services, such as a Big Data Engine, a Query Engine, a Streaming Engine for real-time data ingestion and/or analysis, a Data Integration Engine, and/or an Artificial Intelligence (AI) and/or Machine Learning (ML) engine for model training and/or inference. Some engines may provide network and traffic management services, such as a routing engine providing load balancing, a DNS engine for resolving domain names, and/or Traffic Management Engines for directing traffic. Some engines may coordinate resources and/or automate workflows, such as a Workflow Engine, a Provisioning Engine, and/or a Container Orchestration Engine. Some engines manage persistent data storage and/or recovery. Some engines may provide security and/or policy compliance. A Policy Decision Engine (PDP) and/or policy enforcement engine may evaluate cloud configurations and/or apply security rules to ensure compliance with organizational and/or regulatory policies. A threat detection engine may (e.g., continuously) scan logs, traffic, and/or behavior patterns to identify anomalies and/or malicious activity using one or more rules, heuristics, and/or machine learning. An access control engine may interpret and/or enforce identity-based access policies, e.g., using IAM roles, attribute-based access control (ABAC), and/or role-based access control (RBAC). An encryption engine may handle encryption and/or decryption of data at rest and/or in transit. A compliance engine may analyze system configurations and/or event logs to generate audit trails and/or verify alignment with standards (e.g., ISO 27001, HIPAA, and/or SOC 2). This list is not intended to be limiting. A plurality of engines in a cloud network refers to multiple different engines, each dedicated to performing a differing set of cloud operations, sharing a workload, and/or provide differing functionalities. In some embodiments, a plurality of engines in a cloud network (e.g., a SASE stack) may be organized in a pipeline for sequential application to a dataflow.

An engine may operate autonomously or in coordination with other components (e.g., other engines) of a cloud-based security framework to evaluate security posture, detect anomalous behavior, and/or initiate corrective actions in response to identified risks and/or policy violations. Some cloud engines may process a dataflow in parallel (e.g., concurrently), and some cloud engines may process a dataflow sequentially. Each cloud engine may produce differing data indicative of one or more cloud operations performed in associated with a dataflow. Such data may include an alert (e.g., a threat detection alert), a decision (e.g., an access and/or routing decision, a flag setting), an action (e.g., for data loss prevention), a log (e.g., for recording and/or auditing user behavior), a value (e.g., a risk score), a report (e.g., for policy enforcement), and/or any other data that may be produced by a cloud engine when processing a dataflow.

In some embodiments, the plurality of engines may be included in one or more server clusters included in an (e.g., optimal) SD-WAN path determined between a source and destination for the dataflow. For instance, the plurality of engines may be included in a server cluster connecting the source and/or the destination to the cloud network. In some embodiments, at least some of the plurality of engines may be included in one or more server clusters excluded from an (e.g., optimal) SD-WAN path between a source and destination. For instance, at least one processor may divert a dataflow from an (e.g., optimal) SD-WAN path to permit processing by the plurality of cloud engines.

In some disclosed embodiments, the plurality of engines include at least two of a device posture identification engine, a user risk score determination engine, a packet inspection engine, an Internet Protocol address (IP) reputation engine, a malware classification engine, a Data Loss Prevention (DLP) classification engine, a Next-generation of firewalls (NGFW) engine, an intrusion prevention system (IPS) engine, a secure web gateway (SWG) engine, a cloud access security broker (CASB) engine, a Zero Trust Network Access (ZTNA) engine, and a Remote browser isolation (RBI) engine. A device posture identification engine refers to a cloud engine for determining if a device meets one or more security requirements and/or compliance criteria, e.g., prior to granting access to one or more network resources. A device posture identification engine may evaluate attributes associated with an operating system and/or version, presence and/or status of antivirus and/or antimalware tools, a firewall status, an encryption standard, a security patch update, a device certificate, and/or a serial number for assessing device health. A device posture identification engine may determine that a device is compliant (e.g., for granting full access), partially compliant (e.g., for granting partial access), and/or non-compliant (e.g., for denying access).

A user risk score determination engine refers to software and/or hardware for calculating a trust grade and/or rank for a user based on behavior, identity, context, and/or threat intelligence. A risk score may be indicative of a probability that a user account and/or device has been compromised, and may be used in a Zero Trust context, identity security, behavioral analytics, and/or an adaptive access control system quantifying a likelihood that a user account has been compromised. A user risk score engine may determine a risk score based on logic, statical baselines, and/or machine learning.

A packet inspection engine refers to software and/or hardware for analyzing contents of data packets as they flow through a network, and may detect, classify, and/or block, e.g., unwanted, malicious, and/or non-compliant traffic in real-time. A packet inspection engine may perform shallow packet inspection (SPI) inspecting only packet headers, deep packet inspection (DPI) inspecting headers and payloads, and/or deep packet analysis (DPA) correlating packets over time and analyzing traffic behavior.

An Internet Protocol (IP) Reputation Engine refers to software and/or hardware for assessing trustworthiness and/or a risk level associated with an IP address based on historical and/or real-time threat intelligence. An IP reputation engine may identify potentially malicious, suspicious, and/or compromised IPs to support network protection, threat detection, and/or access control.

A malware classification engine refers to a software and/or hardware engine for analyzing software and/or files to determine malicious behavior. A malware classification engine may determine the type of malware (e.g., virus, worm, ransomware, trojan) and may classify threats based on behavioral patterns, code structure, and/or known threat signatures. A malware classification engine may perform static analysis (e.g., without execution) and/or dynamic analysis (e.g., during execution in a sandbox), and may apply machine learning and/or artificial intelligence based analysis and may output a label (e.g., malicious or clean), a malware family, malware type, severity, and/or a behavior type.

A Data Loss Prevention (DLP) Classification Engine refers to software and/or hardware for analyzing data to identify, classify, and/or protect sensitive information. A DLP classification engine may detect whether data (e.g., at rest, in transit, or in use) corresponds to predefined patterns and/or policies and may assign a sensitivity level (e.g., confidential, internal, public) to prevent unauthorized sharing, access, and/or exfiltration.

A next-generation of firewalls (NGFW) engine refers to software and/or hardware for combining conventional (e.g., legacy) firewall capabilities with deep, application-level inspection and/or threat intelligence to detect and block cyber threats. Unlike legacy firewalls that be limited to analyzing IP addresses, ports, and/or protocols, an NGFW engine may analyze a fuller context of network traffic, e.g., including users, applications, and/or content. An NGFW engine may provide application awareness and control, deep packet inspection, intrusion prevention, threat detection, URL and/or web filtering, SSL/TLS decryption for traffic inspection, QoS and traffic shaping, and/or integration with additional security services.

An intrusion prevention system (IPS) engine refers to software and/or hardware for detecting and/or blocking malicious and/or unauthorized activity by inspecting traffic for signs of known and/or unknown attacks. An IPS engine may provide a proactive defense layer between a network and a destination, to prevent intrusions from reaching internal systems. An IPS engine may apply traffic signature and/or pattern based detection, anomaly based detection, heuristic and/or behavioral analysis, protocol analysis, and/or reputation and/or threat intelligence.

A Secure Web Gateway (SWG) engine refers to software and/or hardware for monitoring filters, and/or enforcing policies on web traffic to protect users from threats and/or prevent data leakage when accessing the Internet. An SWG engine may provide a security checkpoint between users and the web, ensuring that outbound and inbound HTTP/HTTPS traffic complies with organizational policies and/or security standards.

A cloud access security broker (CASB) engine refers to a security control point between users and cloud services for monitoring and/or governing cloud app usage to enforce enterprise security policies. A CASB engine may provide visibility, threat protection, compliance enforcement, and/or data security for cloud-based applications.

A Zero Trust Network Access (ZTNA) engine refers to software and/or hardware for enforcing access to applications and/or services based on identity, device posture, context, and/or risk (e.g., as opposed to network location and/or IP address). A ZTNA engine may implements a Zero Trust principle of "never trust, always verify" by ensuring continuous, adaptive access control following user authentication.

A Remote browser isolation (RBI) engine refers to software and/or hardware for executing web browsing activity in a remote and/or isolated environment (e.g., in a secure container) and may limit data streaming to safe content (e.g., pixels and/or rendering data) to a browser of an end user. An RBI engine may protect users from web-based threats (e.g., malware, phishing, drive-by downloads) by ensuring that potentially malicious code fails to reach a client device.

Tracking in real-time refers to monitoring, recording, observing, and/or evaluating data continuously or regularly, to permit performance of processing and/or taking of actions within a sufficiently short time window to influence and/or reflect current conditions as they happen. Characteristics of dataflow passing through a plurality of engines in a cloud network refers to properties, traits, and/or attributes of a flow of network traffic (as described elsewhere herein) as the network traffic undergoes real-time (e.g., serial and/or parallel) processing by a plurality of cloud engines. Such real-time characteristics may be tracked by analyzing, in real-time, data outputted by one or more cloud engines in response to processing the dataflow. Some examples of such real-time characteristics may include routing decisions, such as policy-based dynamic path selection outputs, (e.g., lowest latency and/or highest throughput), network performance metrics (e.g., latency, jitter, packet loss, and/or bandwidth usage), Quality of Service (QoS) adjustments (e.g., prioritizing actions for differing traffic types), and/or identity and/or access control outputs (e.g. complying with zero trust principles). Some additional examples of real-time characteristics may include authentication results (e.g., success or failure of user and/or device authentication), user-to-application mapping (e.g., identity-based session metadata indicating who accessed what and when), session context outputs (e.g., risk scores, device posture reports, and/or contextual decisions influencing access control), analytics and/or visibility outputs, alerts and/or notifications (e.g., for anomalies, policy violations, and/or performance degradation). Some additional examples of real-time characteristics may include audit trails (e.g., immutable logs for compliance and/or forensic investigation), updated policy packages, configuration synchronization (e.g., including changes to access rules, routing tables, inspection profiles), and/or any other characteristics of a dataflow. First characteristics of a dataflow may refer to characteristics of a dataflow relevant and/or pertaining to a first time instant and/or time window.

Figure 23:
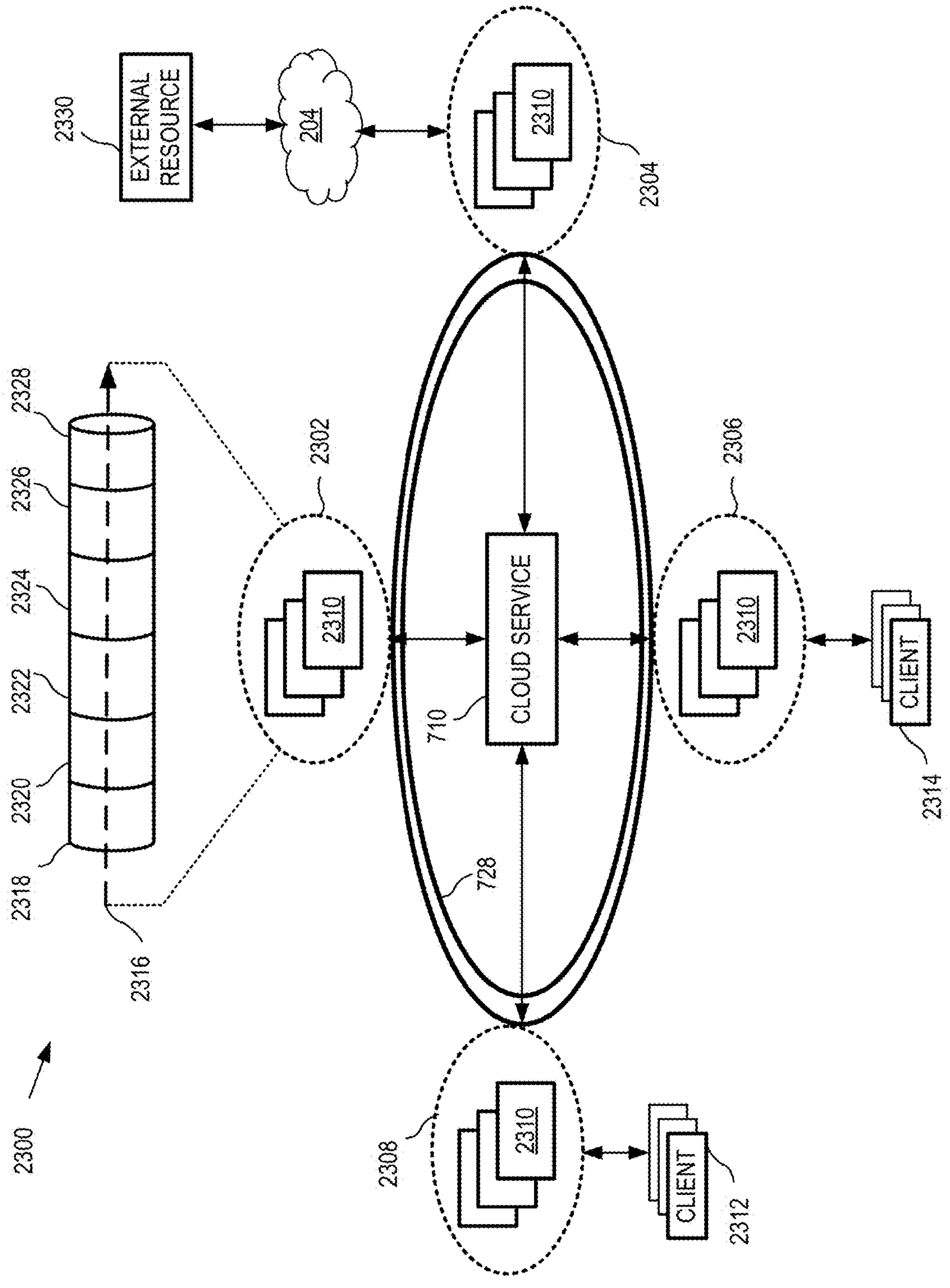
FIG. 23 is an exemplary schematic diagram of a cloud network with real-time dynamic policy revision capabilities, consistent with some disclosed embodiments.

By way of a non-limiting example, reference is made to FIG. 23, which is an exemplary schematic diagram of a cloud network 2300 with real-time dynamic policy revision capabilities, consistent with some disclosed embodiments. Cloud network 2300 includes a plurality of server clusters 2302, 2304, 2306, and 2308, interconnected via backbone 728 to cloud service 710. Each of server clusters 2302, 2304, 2306, and 2308 may include a plurality of servers 2310 for providing network connectivity to a plurality of client devices, such as client device 2312 and client device 2314. Servers 2310 and client devices 2312 and 2314 may correspond to computing device 100 of FIG. 1.

At least one processor may cause a dataflow 2316 to pass through a plurality of engines 2318 through 2328 (e.g., engines 2318, 2320, 2322, 2324, 2326, and 2328). For example, client device 2312 (e.g., a source) may establish a connection with client device 2314 (e.g., a destination) via server cluster 2308, server cluster 2306 and backbone 728 to transmit dataflow 2316 from client device 2312 to client device 2314. By way of another example, an external resource 2330 (e.g., a website) may transmit dataflow 2316 to client device 2312 via cloud network.

The at least one processor may track, in real-time, first characteristics of dataflow 2316 passing through plurality of engines 2318 through 2328 in cloud network 2300. In some embodiments, plurality of engines 2318 through 2328 may be organized in a pipeline, e.g., to process dataflow 2316 sequentially, however this is not required. In some embodiments, some of engines 2318 through 2328 may process portions of dataflow 2316 in parallel (e.g., concurrently). In some embodiments, plurality of engines 2318 through 2328 may include at least two of a device posture identification engine, a user risk score determination engine, a packet inspection engine, an Internet Protocol address (IP) reputation engine, a malware classification engine, a Data Loss Prevention (DLP) classification engine, a Next-generation of firewalls (NGFW) engine, an intrusion prevention system (IPS) engine, a secure web gateway (SWG) engine, a cloud access security broker (CASB) engine, a Zero Trust Network Access (ZTNA) engine, and a Remote browser isolation (RBI).

In some disclosed embodiments, real-time application of the plurality of engines to the data flow is coordinated by a single entity. Coordinating refers to organizing, scheduling, overseeing, and/or managing. Real-time application of a plurality of engines to a data flow refers to real-time (as defined elsewhere herein) processing and/or analysis of a data flow by a plurality of engines. A single entity refers to a sole network component or combination of components. A single entity may include one or more processor dedicated to collectively perform one or more network operations (e.g., in unison). A single entity may include a virtual component (e.g., including multiple distributed physical components grouped together logically to perform one or more functionalities). For example, a single entity may oversee, administer, and/or schedule processing of a dataflow by a plurality of cloud engines. The single entity may determine a schedule for processing a dataflow by the plurality of cloud engines. The schedule may define parallel (e.g., concurrent) processing by some of the engines and sequential processing by other engines. The single entity may monitor progress of a dataflow passing through a plurality of engines, e.g., to ensure that the dataflow undergoes processing by each of the engines according to a defined schedule. In some embodiments, a centralized cloud service may serve as a single entity overseeing application of a plurality of engines to a data flow.

In some disclosed embodiments, the plurality of engines are located in a single cluster of servers. A cluster of servers (e.g., a PoP) may be understood as described elsewhere herein. In some instances, the plurality of cloud engines may be located in geographical proximity to each other, e.g., to reduce communication latency. The plurality of engines may be implemented by a single server in a cluster or distributed across a plurality of servers in the same cluster. In some embodiments, a plurality of server clusters may each include a plurality of cloud engines, e.g., to permit selection of a particular server cluster to process a data flow by the plurality of engines. For example, the selection may be based on geographical proximity to a source and/or destination of the dataflow, available capacity, communication latency and/or bandwidth, and/or any other criteria.

By way of a non-limiting example, in FIG. 23, a single entity (e.g., cloud service 710) may coordinate a real-time application of plurality of engines 2318 through 2328 to data flow 2316. In some embodiments, plurality of engines 2318 through 2328 may be included in a single cluster of servers (e.g., server cluster 2302). Returning to the first example given above, dataflow 2316 may flow from client device 2312 (e.g., the source) to client device 2314 (e.g., the destination) via at least server cluster 2308 connecting client device 2312 to cloud network 2300, server cluster 2302, where dataflow 2316 may pass through plurality of engines 2318 through 2328, server cluster 2306, connecting client device 2314 to cloud network 2300, and backbone 728. Returning to the second example from above, dataflow 2316 may flow from external resource 2330 (e.g., a source) to client device 2312 (e.g., a destination) via at least server cluster 2304, connecting external resource 2330 to cloud network 2300, server cluster 2302, where dataflow 2316 may pass through plurality of engines 2318 through 2328, server cluster 2308 connecting client device 2312 to cloud network 2300, and backbone 728.

In some disclosed embodiments, the plurality of engines are distributed across a plurality of clusters of servers. A plurality of cluster of servers (e.g., a plurality of PoPs) may be understood as described elsewhere herein. Differing server clusters may be located in differing geographical locations, each server cluster hosting one or more of the plurality of cloud engines. Thus a dataflow may flow through a plurality of differing server clusters in order to pass through a plurality of engines.

Figure 24:
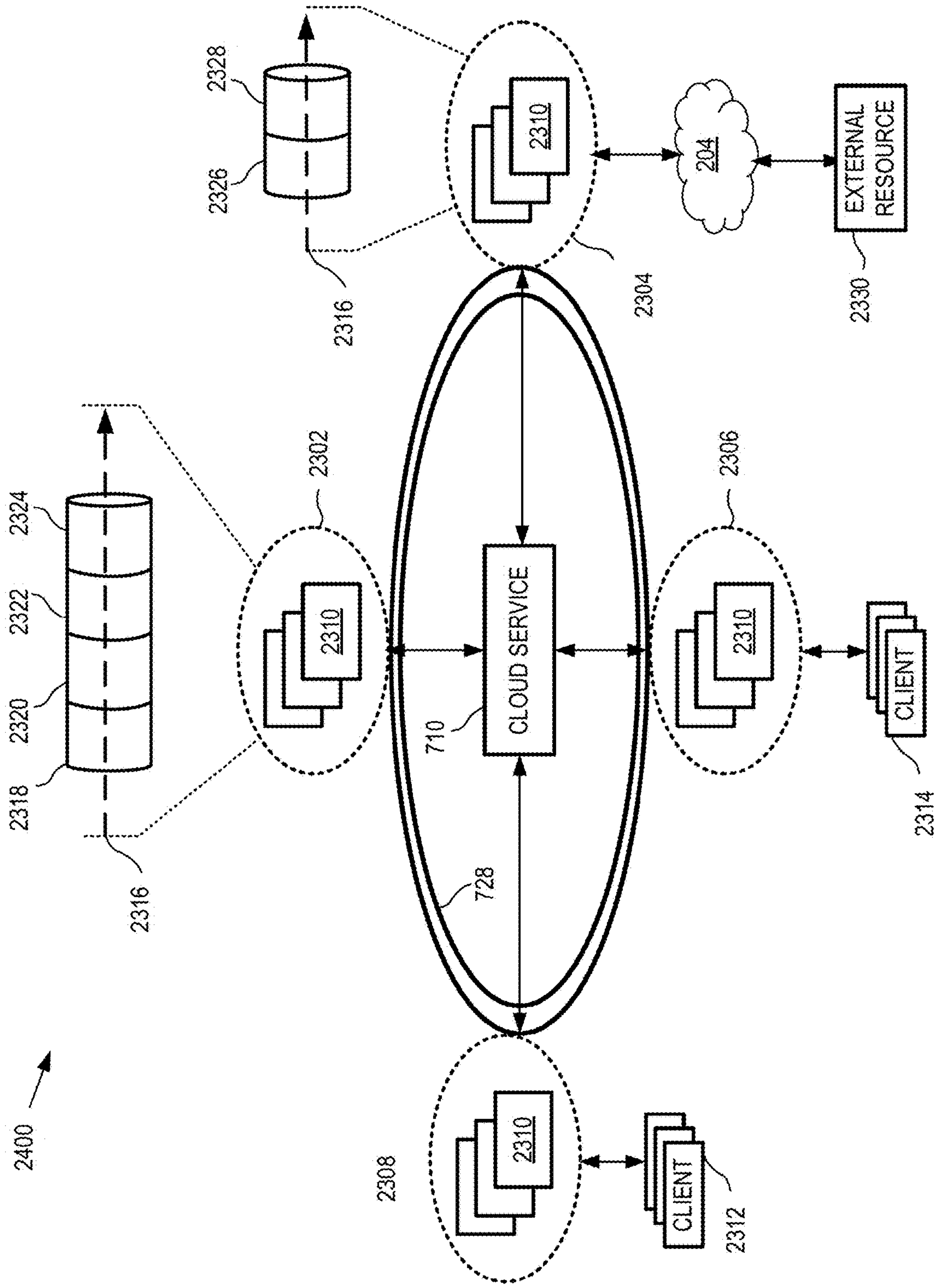
FIG. 24 is another exemplary schematic diagram of a cloud network with real-time dynamic policy revision capabilities, consistent with some disclosed embodiments.

By way of another non-limiting example, reference is made to FIG. 24, which is another exemplary schematic diagram of a cloud network 2400 with real-time dynamic policy revision capabilities, consistent with some disclosed embodiments. Cloud network 2400 is substantially similar to cloud network 2300 with the notable difference that plurality of engines 2318 through 2328 may be distributed across clusters 2302 and 2304. Returning to the first example given above, dataflow 2316 may flow from client device 2312 to client device 2314 via at least server cluster 2308 connecting client device 2312 to cloud network 2400, server cluster 2302 where dataflow 2316 may pass through plurality of engines 2318 through 2324, server cluster 2304, where dataflow 2316 may pass through plurality of engines 2326 through 2328, server cluster 2306, connecting client device 2314 to cloud network 2400 and backbone 728. Returning to the second example from above, dataflow 2316 may flow from external resource 2330 to client device 2312 via at least server cluster 2304, connecting external resource 2330 to cloud network 2400, server cluster 2302 where dataflow 2316 may pass through plurality of engines 2318 through 2326, back to server cluster 2304 where dataflow 2316 may pass through plurality of engines 2326 through 2328, server cluster 2308 connecting client device 2312 to cloud network 2400, and backbone 728.

Some disclosed embodiments involve generating, in real-time, a first version of a single log line aggregating the first characteristics. A single log line refers to an individual structured record of data. A single log line may be a one-dimensional array, a linked list, a ring, and/or any other one-dimensional data structure. A single log line may document one or more events and/or actions taken and/or observed by one or more cloud engines. A single log line may be generated within a sufficiently short time window to pertain to events as they occur (e.g., in real-time) and may be used to monitor and/or audit a communication session, detect threats, and/or check compliance with one or more policies. Aversion of a single log line refers to a rendition, edition, and/or copy of a log line. A version of a single log line may be associated with a particular time instant and/or time window. Differing versions of a single log line may each be associated with different time instants and/or time windows, and may reflect changes to the single log line in response to one or more events, and/or changes to a network state and/or topology over time. For example, a cloud engine may produce differing versions of a log line over time in response to differing network conditions. A first version of a single log line may be relevant and/or pertain to a first time instant and/or time window.

Generating in real-time, a version of a single log line aggregating characteristics (e.g., of a dataflow passing through a plurality of engines in a cloud network) refers to producing, outputting, and/or providing access to an individual and/or sole log line recording characteristics collected and/or merged in association with a plurality of differing cloud engines within a sufficiently short time window to reflect network events and/or changes to a network state as they occur. For example, a cloud network may provide a plurality of differing engines to analyze and/or process a dataflow in real-time (e.g., sequentially and/or in parallel), each engine associated with a differing cloud functionality. Each particular engine may determine, in real-time, a differing subset of characteristics of the dataflow passing there through at a particular point in time (e.g., for generating a real-time log line specific to a particular engine). Each subset of characteristics may be reflective of a particular functionality provided by each engine. At least one processor may combine and/or merge some or all of the differing subsets, in real-time, to produce a single log line including characteristics generated by a plurality of engines, each associated with a differing functionality. A single log line aggregating characteristics from a plurality of differing engines may provide a snapshot reflecting a state of a cloud network and/or a dataflow at a given time instant and/or window for a plurality of differing contexts and/or applications, each context associated with a differing engine.

In some embodiments, a (e.g., central) cloud service may generate a single log line aggregating characteristics from a plurality of engines. For example, the cloud service may periodically probe a plurality of engines for an updated set of characteristics and/or receive updated characteristics from one or more engines in response to network events. Some engines may generate an engine-specific log line including characteristics, such as an event type (e.g., authentication, file download, policy violation, URL access, and/or threat blocking), an associated timestamp, a user identifier (e.g., username, account identifier, role, and/or group), source information (e.g., source IP, device type, geolocation, operating system, and/or compliance posture), destination information (e.g., destination IP, domain, geolocation, URL, application, and/or service), an action taken (e.g., allowed, blocked, redirected, quarantined), an associated policy, a risk and/or threat indication, a session and/or transaction identifier, and/or any other data produced by the cloud engine in association with an event and/or action. A cloud service may obtain a plurality of engine-specific log lines from a plurality of differing cloud engines, and merge the plurality of engine-specific log lines to generate a single log-line aggregating dataflow characteristics from the plurality of cloud engines.

In some disclosed embodiments, the first characteristics include at least security inspection attributes and routing decision attributes. Security inspection attributes refers to properties and/or traits associated with assessment and/or monitoring of efforts to mitigate risks and/or vulnerabilities. Security inspection attributes may include, for example, a security posture of a cloud environment for identifying one or more vulnerabilities and/or ensure compliance with one or more security standards, policies, and/or rules. It may refer to specific characteristics or parameters used to analyze, filter, and enforce security policies. These attributes may, for example, help determine whether data packets should be allowed, blocked, logged, or further inspected. Routing decision attributes refers to properties and/or traits associated with determining and/or selecting a path for a dataflow in a cloud network. It may refer to criteria or parameters used to determine the path for forwarding packets across a network.

In some disclosed embodiments, the security inspection attributes are associated with threat detection, policy enforcement, or compliance assessment. Threat detection refers to a capability to observe and/or predict one or more risks and/or hazards. Policy enforcement refers to a capability to apply and/or implement one or more policies. Compliance assessment refers to a capability to measure and/or estimate a degree to which observed network behavior conforms with one or more policies. Security inspection attributes may be received from a user, a device, a network component, a software application, and/or network traffic.

Security inspection attributes may include identity and/or access attributes, such as a user identity, an authentication method (e.g., a password, multi-factor authentication or MFA, single-sign-on or SSO, and/or biometric credential), a role and/or group membership (e.g., a user, administrator, viewer, and/or group association), an access control policy (e.g., an IAM rule, a role-based access control or RBAC and/or attribute-based access control or ABAC setting), and/or one or more session details (e.g., session ID, token expiry, and/or refresh activity). Security inspection attributes may additional include network and/or location attributes, such as a source and/or destination IP and/or geolocation, network type (e.g., VPN, corporate LAN, and/or public Wi-Fi), protocol used (e.g., HTTP/S, SSH, FTP), and/or a port number. Security inspection attributes may further include device attributes, such as a device ID and/or fingerprint, an operating system and/or version (e.g., for compliance and/or vulnerability checks), a browser type and/or version, a device posture (e.g., including an antivirus status, firewall enablement, and/or disk encryption), and/or a compliance status indicator. Security inspection attributes may additionally include data classification (e.g., public, confidential, and/or restricted), encryption status (e.g., at rest, in transit, and/or algorithm used), an access history (e.g., who accessed, when, and how often), data leakage risk, and/or storage location. Security inspection attributes may further include application and/or runtime attributes, such as an application ID, an App permission, runtime behavior (e.g., suspicious calls, memory usage, and/or process injection), executable signature (e.g., for validating against known trusted sources), and/or API usage patterns. Security inspection attributes may additionally include threat and/or anomaly detection attributes, such as known threat indicators (e.g., IP reputation, URL reputation, and/or hash signatures), anomalous behavior, malware indicators, lateral movement, and/or privilege escalation attempts. Security inspection attributes may further include log integrity, policy adherence indications, changes from approved configuration (e.g., drift), status of security patches and/or updates, and/or an audit trail.

In some disclosed embodiments, the routing decision attributes may be associated with at least one of a source, a destination, an application, a session, or a network performance metric. Source and/or destination attributes may include a source and/or destination IP address, subnet, and/or domain name, source and/or destination port numbers, geolocation and/or any other information associated with a source and/or destination. Routing decision attributes associated with a source and/or destination may additionally include data indicative of blocking a dataflow, allowing a dataflow, quarantining a dataflow (e.g., for further inspection), rerouting and/or diverting the dataflow, and/or any other routing decision associated with a dataflow. Application attributes may include an Application type (e.g., e.g., Software-as-a-Service or SaaS, Voice-over-IP or VoIP, video, and/or HTTP), an application ID and/or name, application behavior (e.g., known traffic patterns and/or usage profile), a protocol used (e.g., HTTP/HTTPS, TCP, UDP, QUIC), and/or an application category (e.g., business, social media, and/or risk level). Routing decision attributes associated with an application may additionally include data indicative of flagging an application as suspicious or trustworthy, assigning an application a risk score, results from simulating an application in a sandbox, and/or any other data generated based on a routing decision associated with an application. Session attributes may include traffic volume (e.g., bytes transferred or current bandwidth usage), session duration, session priority (e.g., a QoS value and/or DSCP tag), traffic direction (e.g., inbound, outbound, and/or internal), and/or traffic encryption status. Routing decision attributes associated with a session may additionally include data indicating selection of a new path and/or server cluster (e.g., to upgrade or downgrade QoS), dropping of a packet, requesting resending of a packet, terminating and/or re-establishing a session, and/or any other data generated based on a routing decision associated with a session. A network performance metric may include latency (e.g., round-trip time), packet loss, jitter (e.g., variations in delay), available bandwidth, link health and/or congestion status, and/or any other network performance metric as described elsewhere herein. Routing decision attributes associated with a network performance metric may additionally include data indicating continued us of an existing route, rerouting of a dataflows along a new route, diversion of a dataflow, reverting of a dataflow to a prior route, and/or any other data generating based on a routing decision associated with a network performance metric.

Routing decision attributes may additionally include security and/or policy attributes, such as a threat intelligence score, a reputation of an IP address and/or domain, access policy rules (e.g., Zero Trust policies and/or ACLs), a user identity and/or role, and/or device compliance and/or type. Routing decision attributes may additionally include user attributes, such as a user role, authentication strength, login time, login patterns, and/or an identity risk score. Routing decision attributes may additionally include topology and/or infrastructure attributes, such as next-hop availability, routing cost (e.g., BGP weight, OSPF cost), path preference and/or ranking, and/or edge node proximity (e.g., a nearest cloud edge and/or PoP). Routing decision attributes may additionally include policy-defined attributes, such as priority (e.g., traffic marked as critical), compliance requirements (e.g., data sovereignty constraints), time of day and/or schedule (e.g., to route certain traffic during off-peak periods), service-level agreement (SLA) match, and/or user-defined metadata for routing decisions.

Figure 25:
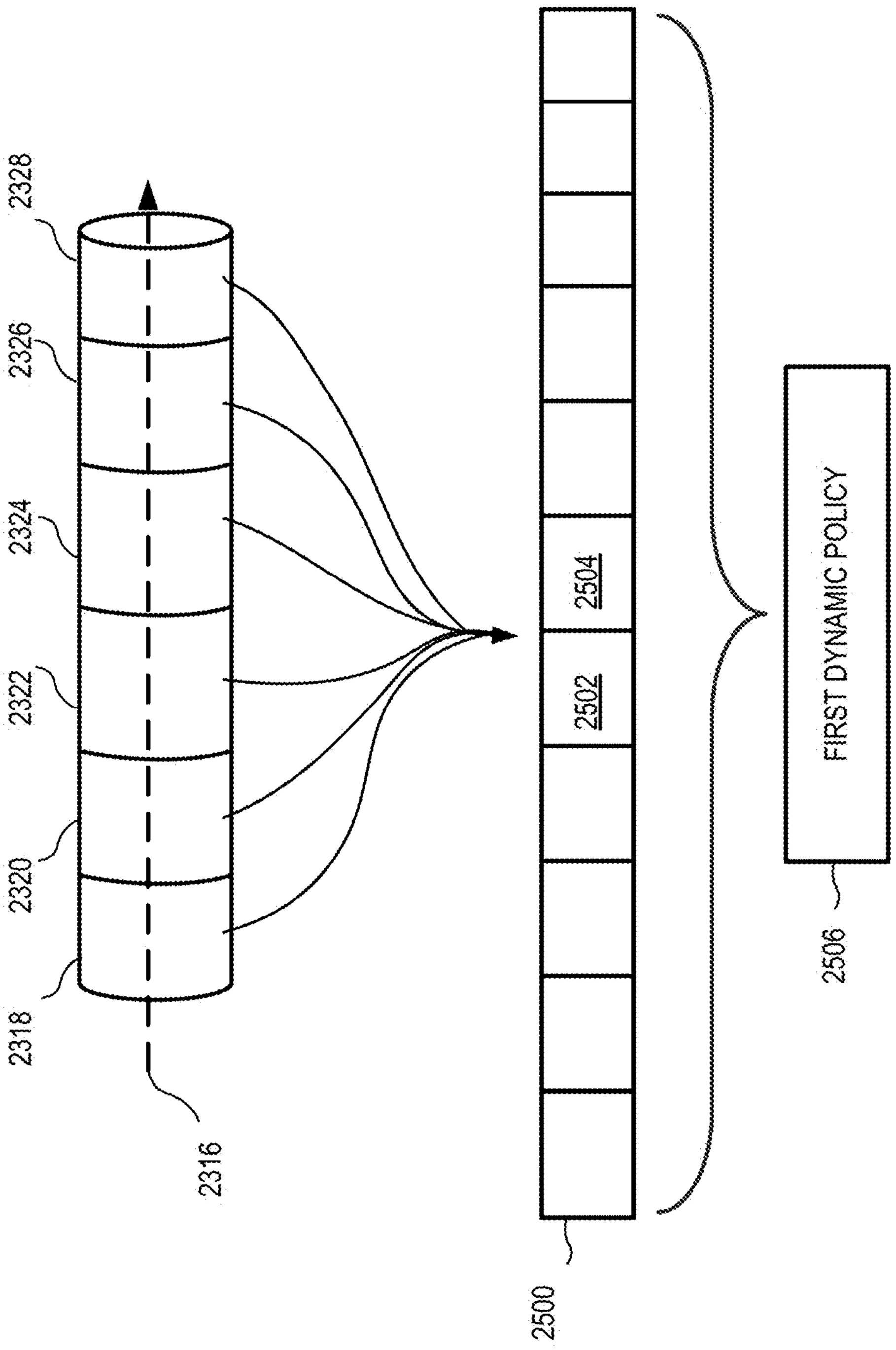
FIG. 25 is an exemplary schematic diagram of a first version of a single log line aggregating characteristics from a plurality of engines, consistent with some disclosed embodiments.

By way of a non-limiting example, reference is made to FIG. 25 which is an exemplary schematic diagram of a first version 2500 of a single log line aggregating characteristics from plurality of engines 2318 to 2328, consistent with some disclosed embodiments. At least one processor (e.g., processor 102 in FIG. 1) may receive, in real-time, a plurality of first characteristics from plurality of engines 2318 to 2328. The first characteristics may be output by plurality of engines 2318 to 2328 as a result of processing dataflow 2316. The at least one processor may generate, in real-time, first version 2500 of the single log line aggregating the first characteristics. For example, first version 2500 of the single log line may include a record with a plurality of fields (e.g., 2502 and 2504), each field being associated with one or more characteristics received from plurality of engines 2318 to 2328. The first characteristics may include at least security inspection attributes and routing decision attributes. In some embodiments, the security inspection attributes may be associated with threat detection, policy enforcement, or compliance assessment. In some embodiments, the routing decision attributes may be associated with at least one of a source, a destination, an application, a session, or a network performance metric.

Some disclosed embodiments involve, based on the first characteristics, generating a first real-time dynamic policy. A policy refers to a set of rules and/or conditions governing a cloud environment. A policy may define how users, devices, and/or applications access resources, and/or how network traffic may be inspected, routed, and/or blocked. A policy may be associated with access privileges, security, privacy, network performance, user preferences, and/or any other aspect affecting a cloud environment. Generating a real-time dynamic policy (e.g., based on the first characteristics) refers to producing and/or outputting a policy in response to events and/or changes in a network state as they occur, as indicated by the first characteristics. A real-time dynamic policy may be adapted in response to observed events and/or changes to a network state as they occur and may change over time, and thus may differ from a static policy that may remain unchanged over time. At least one processor (e.g., associated with a cloud service) may use characteristics aggregated from a plurality of engines in a cloud network to determine a policy for enforcing on a dataflow. The real-time dynamic policy may address one or more issues indicated by the characteristics aggregated in the single log line. Such issues may include, for example, vulnerabilities, access privileges, network performance, privacy, and/or any other factor affecting a dataflow. In some embodiments, the real-time dynamic policy may replace a prior policy, such that previous (e.g., earlier) portions of a dataflow may be governed by the prior policy, and subsequent (e.g., later) portions of the dataflow may be governed by a current dynamic policy, updated in real-time. In other words, a real-time dynamic policy governing a dataflow may exhibit responsiveness to one or more or more network events and/or changes to a network state indicated by the characteristics in the single log line. A first real-time dynamic policy may be relevant and/or pertain a first time instant and/or time window.

In some disclosed embodiments, the first real-time dynamic policy is at least partially based on a sequence associated with the dataflow passing through the plurality of engines. A sequence refers to an order, progression, and/or series. A sequence in which a plurality of cloud engines process a dataflow may affect how a policy is interpreted, enforced, and/or triggered because each engine may transform, filter, classify, and/or tag data in ways that may impact downstream decisions. Cloud engines may operate in a pipeline, where each engine may contribute context and/or state. The sequence of applying a plurality of cloud engines to a dataflow may affect which policies may be applied (e.g., based on data classification), how data may be interpreted (e.g., decrypted content may be treated differently from encrypted content), and/or if a policy condition has been met (e.g., updating a risk score may trigger or block an alert). For example, applying a DLP engine to a dataflow prior to a decryption engine may cause the DLP engine to miss sensitive content, and failure to trigger a security policy. As another example, a ZTNA engine may block access depending on a risk score. Applying a user risk score determination engine after application a ZTNA engine may cause the ZTNA engine to apply a policy based on an obsolete risk score. As a further example, content should be isolated prior to inspection. Applying a data inspection engine before an isolation engine may cause the data inspection engine to miss an active threat that would have been neutralized by rendering content in an isolated environment. Thus, the sequence or order of the engines through which a dataflow passes may affect the characteristics outputted by the engines, where differing sequences of engines may generate different characteristics.

In some disclosed embodiments, the first real-time dynamic policy is associated with at least one of a posture, a location, a network performance metric, or a risk score. A posture refers to a security status and/or compliance with one or more policies. A posture may be associated with a device (e.g., a device posture), and may include one or more criteria indicating if a device is safe to access network resources based on an operating system, software, security configurations, and/or applications installed on the device. Additionally or alternatively, a posture may be associated with an organization (e.g., a security posture) and may indicate how well an organization may be prepared to defend against and/or respond to cyber threats. A security posture may reflect the health of an organization's cybersecurity, and may include one or more policies, technologies, and/or practices. A location may include a physical and/or virtual location (e.g., geolocation, IP address, GPS location, and/or any other location information), as described elsewhere herein. Some locations may be more vulnerable to security threats than other regions, e.g., due to weaker cybersecurity infrastructure and/or enforcement capabilities. Additionally or alternatively, some locations may have a higher risk of being targeted for attacks, e.g., due to association with critical infrastructure and/or data. A network performance metric may be understood as described elsewhere herein. A risk score may be understood as described elsewhere herein. A dynamic policy may adapt mid-session, e.g., due to evolving contextual conditions, system state, user behavior, and/or risk level. For example, a policy may change if a device posture deteriorates (e.g., due to disabling of antivirus software), if a user moves to a different location (e.g., from a private office to a public Wi-Fi connection), and/or if a role and/or identity context changes (e.g., due privilege escalation, and/or re-authentication failure). In such a case, a dynamically changing policy may cause access to network resources to change from full access, to restricted and/or read-only access, to denial of access (e.g., disconnection). As another example, a change in a risk score (e.g., based on real-time user behavior analytics) may cause the risk score to cross a threshold, triggering a dynamically changing policy to revoke access and invoke a re-authentication process. As an additional example, real-time deep packet inspection may cause content to be reclassified mid-session, triggering a dynamically changing policy to block traffic that was previously allowed.

By way of a non-limiting example, in FIG. 25, based on the first characteristics (e.g., included in first version 2500 of the single log line), at least one processor (e.g., processor 102 in FIG. 1) may generate a first real-time dynamic policy 2506. In some embodiments, first real-time dynamic policy 2506 is at least partially based on a sequence associated with dataflow 2316 passing through plurality of engines 2318 to 2328. In some embodiments, first real-time dynamic policy 2506 may be associated with at least one of a posture of client device 2312, client device 2314, and/or external resource 2330, a location of client device 2312, client device 2314, and/or external resource 2330, a performance metric of cloud network 2300, and/or a risk score associated with client devices 2312, 2314 and/or external resource 2330.

Some disclosed embodiments involve applying the first real-time dynamic policy to current dataflow. This may be understood to mean enforcement of and/or ensuring compliance of a real-time dynamic policy on a dataflow presently passing through a communication network. Applying a real-time dynamic policy to a dataflow may involve blocking some or all of a dataflow, rerouting a dataflow (e.g., via a different server and/or server cluster), changing a dataflow (e.g., adding and/or removing packets in a dataflow), quarantining portions of a dataflow. Applying a real-time dynamic policy to a dataflow may additionally include dropping a packet, resending a packet, and/or quarantining a packet. Applying a real-time dynamic policy to a dataflow may additionally include encrypting and/or decrypting data, adding, removing and/or changing packet metadata, invoking an authentication process, establishing a new tunnel, terminating an existing tunnel, terminating a session, and/or restarting a session. Applying a real-time dynamic policy to a dataflow may additionally include inspecting one or more packets, probing a source, a destination, a router and/or a server along a path between the source and destination, and/or implementing any other rule and/or heuristic of a policy.

At least one processor may enforce one or more prior policies on a first (e.g., earlier) portion of a dataflow, and enforce one or more updated policies on a second (e.g., later) portion of a dataflow, e.g., in response to characteristics aggregated from a plurality of cloud engines. Thus, a policy governing a dataflow may change dynamically in real-time in response to one or more events and/or state changes to a network detected and/or indicated by a plurality of differing cloud engines. For instance, characteristics aggregated from a plurality of cloud engines may indicate one or more vulnerabilities, and/or deteriorations in network performance affecting a dataflow governed by a policy. At least one processor may dynamically update the policy in real-time, and apply the updated policy to subsequent portions of the dataflow to at least partially address and/or remedy the vulnerabilities and/or deteriorations.

In some disclosed embodiments applying the first real-time dynamic policy to the current dataflow includes at least one of allowing the dataflow, blocking the dataflow, quarantining the dataflow, or issuing an alert. A real-time dynamic policy may define how a dataflow may be handled, routed, allowed, blocked, modified, and/or monitored. At least one processor may perform one or more actions on a dataflow based on a real-time policy. Allowing a dataflow refers to permitting the dataflow to be transmitted to a destination designated in the dataflow (e.g., in the packet headers). For instance, the first characteristics outputted by the plurality of engines may indicate that an associated risk score is below a threshold level, causing the policy to permit access to one or more network resources. Blocking a dataflow refers to denying a dataflow access to a network path. For instance, the first characteristics outputted by the plurality of engines may indicate that an associated risk score is above a threshold level, causing the policy to permit access to one or more network resources. Quarantining a dataflow refers to isolation and/or restriction of the dataflow, e.g., as opposed to allowing the dataflow to proceed or blocking the dataflow. Quarantining a dataflow may include diverting the dataflow to a controlled environment (e.g., a sandbox, analysis queue, and/or isolation network). While quarantined, user access to the dataflow may be limited, and communication with sensitive resources may be blocked. A session may remain open during quarantining, but functionality may be limited. In some instances, quarantining a dataflow may trigger an alert and/or a log for investigation and response. Issuing an alert refers to sending a notification indicative of a potential risk and/or threat. In some embodiments, applying a policy to a dataflow may cause dropping of (e.g., suspicious) packets and/or termination of a session (e.g., in response to a risk score exceeding a threshold level). In some embodiments, applying a policy to a dataflow may trigger redirecting of the dataflow (e.g., to a proxy server and/or a sandbox), rerouting the dataflow (e.g., changing the path for the dataflow), modifying and/or rewriting portions of the dataflow (e.g., changing one or more packet headers), limiting a rate of the dataflow, and/or logging and/or auditing results of applying the policy. In some embodiments, cloud engine may feed data into an artificial intelligence and/or machine learning model (e.g., in a policy feedback loop) to adjust future policy decisions.

By way of a non-limiting example, in FIG. 25, at least one processor (e.g., processor 102 in FIG. 1) may apply first version 2500 real-time dynamic policy to dataflow 2316. In some embodiments, applying first version 2500 of the real-time dynamic policy to dataflow 2316 may include at least one of allowing dataflow 2316, blocking dataflow 2316, quarantining dataflow 2316, or issuing an alert.

Returning to the first example above, applying first version 2500 of the real-time dynamic policy to dataflow 2316 may cause at least one processor to allow dataflow 2316 to flow from client device 2312 to client device 2314 along a first path in cloud network 2300 (e.g., based on a performance metric indicated by characteristic 2502 of first version 2500 of the single log line). Returning to the second example above, applying first version 2500 of the real-time dynamic policy to dataflow 2316 may cause at least one processor to quarantine dataflow 2316 from external resource 2330 prior to transmission to client device 2312 for further inspection (e.g., based on a location of external resource 2330 indicated by characteristic 2504 of first version 2500 of the single log line).

Some disclosed embodiments involve, following application of the first real-time dynamic policy, tracking in real-time second characteristics of dataflow passing through the plurality of engines in the cloud network. Following application of the first real-time dynamic policy refers to after and/or subsequent to applying the first real-time dynamic policy. Tracking in real-time second characteristics of dataflow passing through the plurality of engines in the cloud network may be understood as described above regarding the first characteristics, but during a second time instant and/or time window, following a first time instant and/or time window. For example, at least one processor may continually monitor and/or record characteristics of a dataflow flowing the plurality of engines over time, e.g., by periodically polling the plurality of cloud engines for updated characteristics and/or receiving updated characteristics from one or more cloud engines in response to one or more network events and/or changes to network state.

By way of a non-limiting example, in FIG. 23, following application of first version 2500 of the real-time dynamic policy, at least one processor (e.g., corresponding to processor 102 of FIG. 1) may track in real-time second characteristics of dataflow 2316 passing through plurality of engines 2318 through 2328 in cloud network 2300.

Some disclosed embodiments involve aggregating in real-time the second characteristics to the single log line to generate a second version of the single log line. This may be understood similar to that described above for the first version of the single log line, but relating to a subsequent time instant and/or time window. A second version of the single log line may reflect one or more network events and/or changes to a network state that may have occurred in the interim, e.g., after the first version of the log line was generated. A second version of the single log line may include the same single log line, with updates and/or revisions associated with the second characteristics. Thus, at least one processor may continually update the single log line, to generate multiple versions thereof over time, each version reflecting up-to-date characteristics provided by a plurality of cloud engines. At least one processor may combine and/or merge second characteristics to the log line to generate the second version. In some embodiments, the second version of the single log line may be substantially similar to the first version of the single log line, with the exception of one or more characteristics that may have changed in the interim. In some embodiments, at least one processor may remove and/or replace one or more first characteristics in the first version of a single log line with one or more of the second characteristics to generate the second version of the single log line, e.g., if the one or more first characteristics are deemed obsolete. In some disclosed embodiments, the second characteristics include at least security inspection attributes and routing decision attributes, e.g., as described above for the first characteristics.

Figure 26:
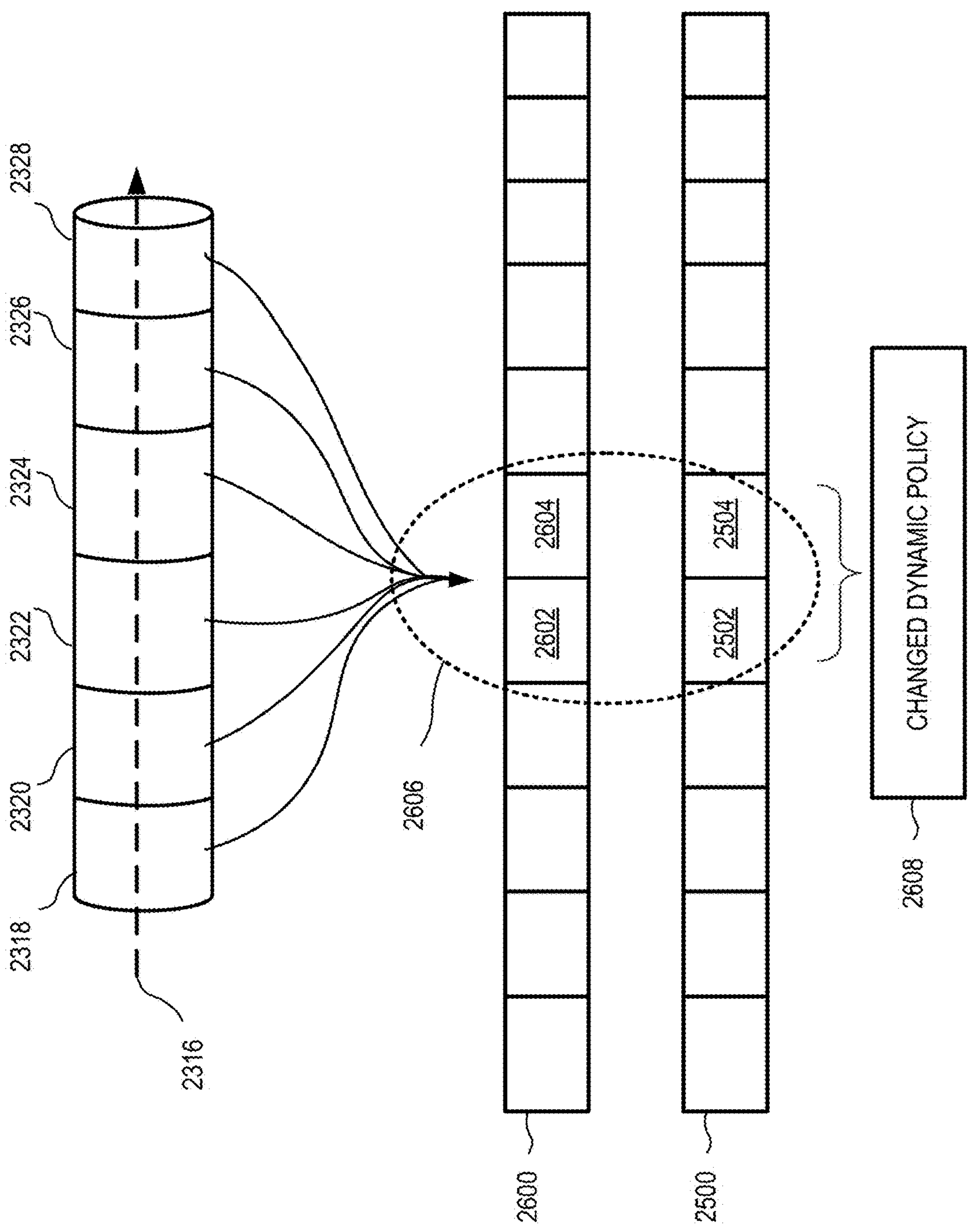
FIG. 26 is an exemplary schematic diagram comparing the first version of the single log line of FIG. 25 with a second version of the single log line, consistent with some disclosed embodiments.

By way of a non-limiting example, reference is made to FIG. 26, which is an exemplary schematic diagram comparing first version 2500 of the single log line with a second version 2600 of the single log line, consistent with some disclosed embodiments. At least one processor (e.g., processor 102 of FIG. 1) may aggregate in real-time, the second characteristics to generate second version 2600 of the single log line. Thus, first version 2500 of the single log line may be associated with a first pass of dataflow 2316 through plurality of engines 2318 to 2328 and second version 2600 may be associated with a second pass of dataflow 2316 through plurality of engines 2318 to 2328.

Some disclosed embodiments involve determining a real-time change between the first version of the single log line and the second version of the single log line. This may be understood as determining (as described elsewhere herein) a difference and/or delta between the first edition and/or variant of the single log line and the second edition and/or variant of the single log line. For example, the real-time change may be indicative of a network event and/or a change of state in the network that occurred between a first time instant corresponding to a first version of a single log line and a second time instant corresponding to a second version of the single log line. The change may be associated with a user, an account, a client device, a server, a router, a load balancer, a database and/or data structure, a vulnerability, a traffic route, a traffic flow, and/or any component and/or aspect of a communication network. The real-time change may be indicated by one or more of the second characteristics included in the second version of the single log line that differ from one or more of the first characteristics included in the first version of the single log line. For example, one or more of the second characteristics may indicate a change in connectivity, a user preference, an account setting, a priority, communication latency, and/or a network path that occurred after generation of the first version of the single log line. Additionally or alternatively, one or more of the second characteristics may indicate a security breach, packet loss, a new network connection, a terminated network connection, and/or any other network event that may have occurred after generation of the first version of the single log line. At least one processor may compare the first version and the second version of the single log line to determine the real-time change.

In some disclosed embodiments, the real-time change between the first version of the single log line and the second version of the single log line is associated with at least one of a network path, a network performance metric, a risk score, or a policy violation. A network path refers to a route through a network from a source to a destination. A network path may change between generation of the first version of the single log line and generation of the second version of the single log line due to changes in network traffic, a detected threat along a previous path, a change in an access privilege, and/or any other reason for changing a network path mid-session. A network performance metric may refer to a quantitative assessment on how a network functions, and may indicate efficiency, reliability (e.g., packet loss), bandwidth, communication latency, and/or any other criteria associated with network performance. A risk score may be understood as described elsewhere herein. A policy violation refers to non-compliance and/or non-conformance with a policy. A policy violation may be indicated by a setting a flag in a log line, and/or may trigger an alert.

By way of a non-limiting example, in FIG. 26, at least one processor (e.g., processor 102 in FIG. 1) may determine a real-time change 2606 between first version 2500 of the single log line and second version 2600 of the single log line. For example, the at least one processor may compare the first version 2500 of the single log line and a second version 2600 of the single log line (e.g., by performing a logical AND on characteristics 2502 and 2504 of first version 2500 of the single log line based on the first pass of dataflow 2316 through cloud engines 2318-2328 and characteristics 2602 and 2604 of second version 2600 of the single log line based on the second pass of dataflow 2316 through cloud engines 2318-2328) to determine real-time change 2606. In some embodiments, real-time change 2606 between the first version 2500 of the single log line and second version 2600 of the single log line may be associated with a network path, a network performance metric, a risk score, or a policy violation. For instance, real-time change 2606 may indicate an increase or decrease in latency along a network path for communicating from dataflow 2316 and/or a detected threat.

Returning to the first example above, real-time change 2606 may indicate an increase in latency along a current network path for dataflow 2316 from first client device 2312 to second client device 2314. For example, a server along the current network path may be overloaded or shut down. Returning to the second example above, real-time change 2606 may indicate that dataflow 2316 is now safe for transmission to client device 2312 and dataflow 2316 longer needs to be quarantined.

Some disclosed embodiments involve, based on the determined real-time change, generating a real-time change in the dynamic policy. This may be understood as producing and/or providing an updated dynamic policy associated with a difference between the first characteristics and the second characteristics in real-time. The real-time change in the dynamic policy may be responsive to events and/or changes in a cloud network as they occur. For example, at least one processor may update the dynamic policy to address one or more issues indicated by the real-time change. At least one processor may update a dynamic policy by adding, removing, and/or modifying one or more rules, conditions, contexts, settings, and/or any other aspect of the dynamic policy governing the dataflow. For example, a real-time change indicating an upgrade of a risk score (e.g., an improvement) may cause at least one processor to change the dynamic policy permit access to a resource to which access was previously denied. Similarly, a real-time change indicating a downgrade of a risk score (e.g., a degradation) may cause at least one processor to change the dynamic policy deny access to a resource to which access was previously permitted. By way of another example, a real-time change indicating an upgrade/downgrade in QoS for a particular user may cause at least one processor to change the dynamic policy to reroute a dataflow along a path providing a higher/lower bandwidth. By way of a further example, a real-time change indicating a threat associated with the dataflow and/or an associated network path may cause at least one processor to divert the dataflow, e.g., for quarantining and further testing (e.g., deep packet inspection), and/or for rerouting along a new path.

Some disclosed embodiments involve applying, in real-time to the current dataflow the real-time change in the dynamic policy. This may be understood as described earlier regarding application of the first real-time dynamic policy to the dataflow. Thus, a dataflow may be subject to differing versions of a dynamic policy over time, e.g., in response to network changes. At least one processor may continually aggregate characteristics from a plurality of engines processing a dataflow in a single log line, and continually update a dynamic policy applied to the dataflow in response to determined changes in the single log line. This may permit addressing issues that may affect a dataflow and detected by a plurality of differing cloud engines in real-time. For example, application of a prior version of a dynamic policy may permit/deny access to a resource, and application of a current dynamic policy, after implementing a real-time change, may deny/permit access to the resource, respectively, e.g., mid-session. As another example, application of a real-time change in a dynamic policy to a dataflow may increase or decrease a data transfer rate for the dataflow in response to an account upgrade or downgrade. As a further example, application of a prior version of a dynamic policy may permit a dataflow to reach a destination, whereas application of a real-time change in a dynamic policy to the dataflow may cause subsequent portions of the dataflow to be quarantined in response to a detected threat, thereby blocking the dataflow from reaching the destination, at least temporarily. As an additional example, application of a prior version of a dynamic policy may cause a dataflow to flow to a destination via a first route, whereas application of a real-time change in a dynamic policy to the dataflow may cause the dataflow to flow to the destination via a second route. At least one processor may use information received from a plurality of differing engines concurrently and use the information to update a single log line in real-time to change a dynamic policy. The plurality of differing engines may be associated with a single server, a plurality of servers included in a single cluster of servers, or a plurality of servers distributed across a plurality of differing cluster of servers.

In some disclosed embodiments, tracking in real-time the first characteristics of dataflow passing through the plurality of engines, and tracking in real-time the second characteristics of dataflow passing through the plurality of engines, determining the real-time change, and applying the real-time change in real-time to the current dataflow occur continuously in real-time, thereby continuously applying the real-time change in the dynamic policy to the current dataflow. Continuously in real-time refers to repeatedly and/or ongoing in a sufficiently short time span to respond to events and/or changes as they occur. It may refer to nonstop or uninterrupted, e.g., without pauses or breaks. It may refer to periodically (e.g., based on a schedule and/or in response to network events and/or changes). At least one processor may continually gather information from a plurality of cloud engines through which a dataflow passes, and continually use the information to update one or more policies applied to the dataflow throughout a communication session. Consequently, the at least one processor may respond to events and/or changes to a network state during the communication session by changing the policy applied to the dataflow. For example, this may permit applying one or more protective measure to detected threats, updating a priority, a permission and/or access privileges, rerouting and/or quarantining of data in real-time in response to processing by a plurality of different cloud engines on a dataflow.

By way of a non-limiting example, in FIG. 26, based on determined real-time change 2606, at least one processor (e.g., processor 102 in FIG. 1) may generate a real-time change in the dynamic policy 2608. The at least one processor may apply, in real-time to dataflow 2316, real-time change in the dynamic policy 2608. In some embodiments, Returning to the first example above, applying real-time change in the dynamic policy 2608 to dataflow 2316 may cause at least one processor to reroute dataflow 2316 from client device 2312 to client device 2314 along a second path in cloud network 2300 (e.g., based on real-time change 2606 in the dynamic policy) to meet one or more policy requirements. Returning to the second example above, applying real-time change in the dynamic policy 2608 to dataflow 2316 may cause at least one processor to permit dataflow 2316 to flow from external resource 2330 to client device 2312 (e.g., based on real-time change 2606 indicating that a risk score for external resource 2330 meets a threshold level).

In some embodiments, tracking in real-time the first characteristics of dataflow 2316 passing through plurality of engines 2318 through 2328, and tracking in real-time the second characteristics of dataflow 2316 passing through plurality of engines 2318 through 2328, determining real-time change 2606, and applying real-time change (e.g., in the dynamic policy) 2608 in real-time to current dataflow 2316 occurs continuously in real-time, thereby continuously applying a real-time change in the dynamic policy 2506 to current dataflow 2316. For instance, returning to the first example above, an additional (e.g., second or subsequent) application of real-time change 2606 in the dynamic policy to dataflow 2316 may cause at least one processor to re-authenticate client device 2312 (e.g., based on the additional real-time change indicating a change in location for client device 2312). Returning to the second example above, applying real-time change in the dynamic policy 2608 to dataflow 2316 may cause at least one processor to test dataflow 2316 in a sandbox prior to sending dataflow 2316 to client device 2312 (e.g., in response to a detected threat).

Figure 27:
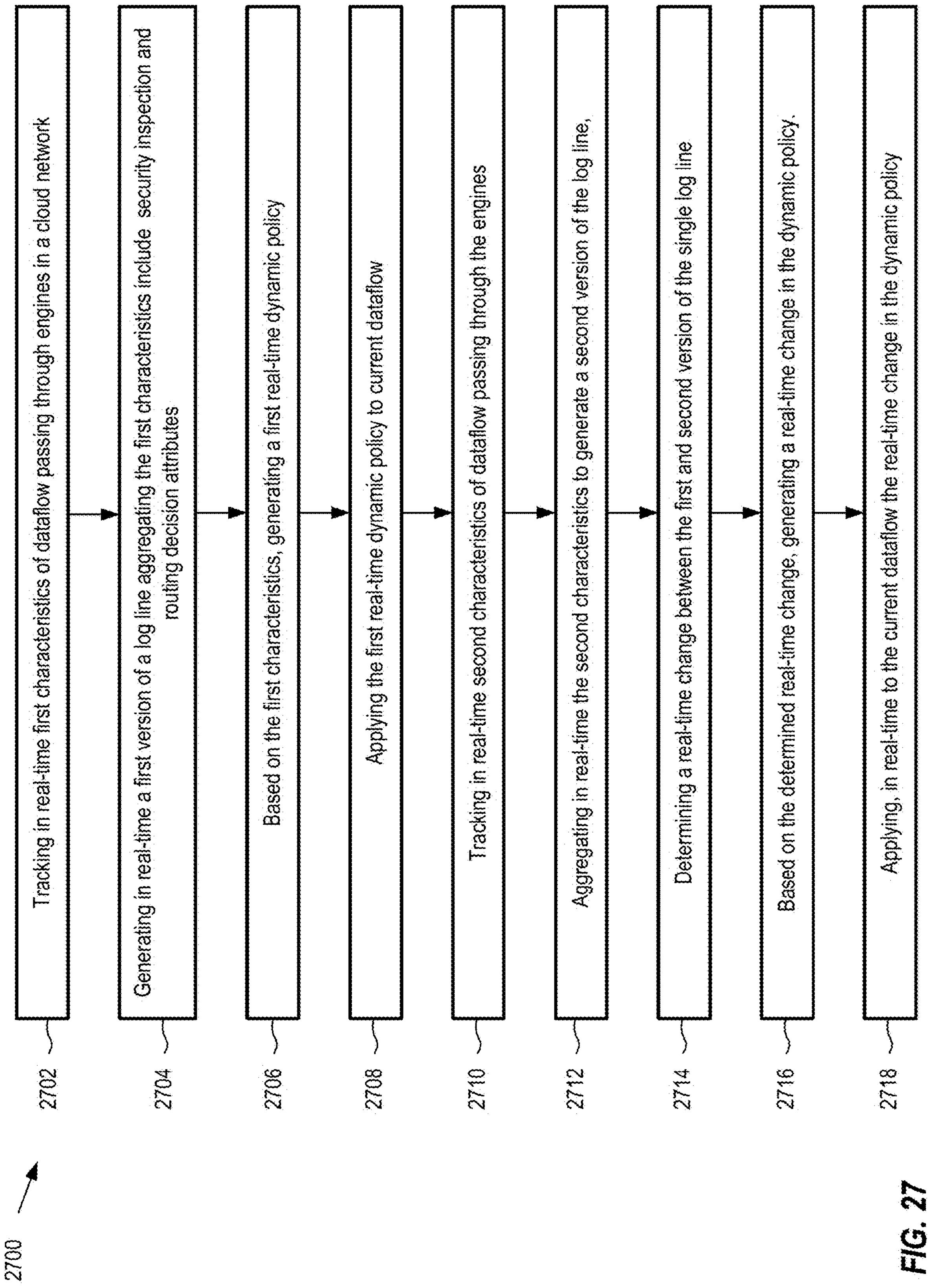
FIG. 27 is a flowchart of an example process for perming real-time dynamic policy revisions, consistent with some disclosed embodiments.

FIG. 27 is a flowchart of example process 2700 for performing real-time dynamic policy revisions, consistent with some disclosed embodiments. In some embodiments, process 2700 may be performed by at least one processor (e.g., processor 102 in FIG. 1) to perform operations or functions described herein. In some embodiments, some aspects of process 2700 may be implemented as software (e.g., program codes or instructions) that are stored in a memory (e.g., memory 104) or a non-transitory computer readable medium. In some embodiments, some aspects of process 2700 may be implemented as hardware (e.g., a specific-purpose circuit). In some embodiments, process 2700 may be implemented as a combination of software and hardware.

Referring to FIG. 27, process 2700 may include a step 2702 of tracking in real-time first characteristics of dataflow passing through a plurality of engines in a cloud network. By way of a non-limiting example, in FIG. 23, at least one processor may track, in real-time, first characteristics of dataflow 2316 passing through plurality of engines 2318 through 2328 in cloud network 2300.

Process 2700 may include a step 2704 of generating in real-time a first version of a single log line aggregating the first characteristics, wherein the first characteristics include at least security inspection attributes and routing decision attributes. By way of a non-limiting example, in FIG. 25, at least one processor may generate in real-time, first version 2500 of a single log line aggregating the first characteristics, wherein the first characteristics include at least security inspection attributes and routing decision attributes.

Process 2700 may include a step 2706 of based on the first characteristics, generating a first real-time dynamic policy. By way of a non-limiting example, in FIG. 25, based on the first characteristics, at least one processor may generate first real-time dynamic policy 2506.

Process 2700 may include a step 2708 of applying the first real-time dynamic policy to current dataflow. By way of a non-limiting example, in FIG. 23, at least one processor may apply first real-time dynamic policy 2506 to current dataflow 2316.

Process 2700 may include a step 2710 of, following application of the first real-time dynamic policy, tracking in real-time second characteristics of dataflow passing through the plurality of engines in the cloud network. By way of a non-limiting example, in FIG. 23, following application of first real-time dynamic policy 2506, at least one processor may track in real-time second characteristics of dataflow 2316 passing through plurality of engines 2318 through 2328 in cloud network 2300.

Process 2700 may include a step 2712 of aggregating in real-time the second characteristics to the single log line to generate a second version of the single log line, wherein the second characteristics include at least security inspection attributes and routing decision attributes. By way of a non-limiting example, in FIG. 26, at least one processor may aggregate in real-time the second characteristics to single log line 2500 to generate a second version 2600 of the single log line, where the second characteristics include at least security inspection attributes and routing decision attributes.

Process 2700 may include a step 2714 of determining a real-time change between the first version of the single log line and the second version of the single log line. By way of a non-limiting example, in FIG. 26, at least one processor may determine a real-time change 2606 between first version 2500 of the single log line and second version 2600 of the single log line.

Process 2700 may include a step 2716 of based on the determined real-time change, generating a real-time change in the dynamic policy. By way of a non-limiting example, in FIG. 23, based on determined real-time change 2606, at least one processor may generate a real-time change in the dynamic policy 2608.

Process 2700 may include a step 2718 of applying, in real-time to the current dataflow the real-time change in the dynamic policy. By way of a non-limiting example, in FIG. 23, at least one processor may apply, in real-time to the current dataflow 2316 the real-time change in the dynamic policy 2608.

Some disclosed embodiments involve context-based data leak prevention operations in a network. Context-based data leak prevention operations in a network refers to monitoring, analyzing, or controlling data movement or access across a network based on context. Context-based data leak prevention operations in a network may prevent unauthorized or unintended disclosure, exfiltration, misuse, or mishandling of data, especially data classified as sensitive. A data leak refers to the unauthorized or unintentional exposure, transmission, or access of sensitive data. A data leak occurs when sensitive data is exposed beyond authorized boundaries. Data leak prevention refers to a set of approaches to ensure that sensitive data remains secure and within authorized access. Data leak prevention may include a combination of strategies, technologies, and policies aimed at identifying, monitoring, and controlling the flow of sensitive data, which may include confidential or regulated data. Data leak prevention may include preventing the unauthorized or unintended transmission, exposure, or disclosure of this sensitive data. A Data leak prevention operation refers to a process, action, or technical control that may be performed by a system or framework to identify, monitor, manage, and prevent unauthorized or unintended exposure, transmission, or access to sensitive data. Exemplary data leak prevention operations include: accessing data, classifying data, intercepting network traffic, inspecting network traffic, determining context, and implementing a remedial measure to mitigate leakage. Additional exemplary data leak prevention operations may include: content inspection, policy-based data blocking, encryption enforcement, access restriction, controlling or logging use of system features that could be used to exfiltrate data (i.e. clipboard, print, or USB controls), quarantine, user education, user justification, or any other process, action or technical control that may prevent a data leak. Context-based data leak prevention operations are those data leak operations that incorporate context and the contextual factors and contextual information associated with the context. Context refers to the environment or situation in which an event, action, or data interaction takes place, formed by evaluating contextual factors, which are described by the collected or derived contextual information. Context may be identified through an application of machine learning (as previously described and exemplified) or by an implementation of machine learning techniques. Contextual information refers to the situational information or metadata surrounding a user, device, or data interaction that influences how a system responds, which includes the set of relevant conditions, attributes, or environmental factors that characterize a user action, system state, or data interaction at a particular time or place. Contextual factors are the categories or dimensions of the contextual information used to form the context. Contextual factors may include: (1) user context, which describes contextual information pertaining to the identity, role, group membership, reputation, authentication method associated, or any other information associated with the user performing an action, (2) device context, which describes contextual information pertaining to the device type, ownership, security posture, operating system, hardware attributes, or any other information associated with the device used to perform an action, (3) location context, which describes contextual information pertaining to the geolocation, network location, access point, cloud region, or any other information associated with the location (as previously described and exemplified) associated with the action, (4) time context, which describes contextual information pertaining to time of day, day of week, season or period (i.e. end-of-quarter, holidays), frequency, duration, or any other information associated with when the action occurs or the temporal nature of the action, (5) application context, which describes contextual information pertaining to application type, access method, protocol, session attributes, or any other information associated with a software, service, or application used for the action, (6) data context, which describes contextual information pertaining to content, type, format, origin, or any other feature or information associated with the data corresponding to the action, (7) behavioral context, which describes contextual information pertaining to anomaly detection, historical baseline, intent inference, and any other information associated with the user or system behavior over time, (8) environmental or system context, which describes contextual information pertaining to system load, threat intelligence, compliance requirements, business policies, or any other external or system-wide conditions associated, or (9) interaction context, which describes contextual information pertaining to action type, target resource, collaboration, audit trail, or any other information associated with an interaction or event associated with the action.

Some disclosed embodiments involve accessing data. Accessing data refers to the execution of operations that receive, retrieve, scan, or inspect data. Data may be accessed in order to analyze the content, metadata, context, or any other characteristic of the data that may inform data leak prevention or data leak prevention operations. Exemplary data that may be accessed by for data leak prevention or data leak prevention operations may include: personal and identifiable data, financial data, health and medical data, credentials and security data, confidential business data, intellectual property data, communication data, cloud and collaboration data, regulatory and compliance data, metadata and behavioral data, behavioral and contextual data, text content, structured data (as previously described and exemplified), unstructured data, code and scripts, attachments, encrypted data, file metadata, email metadata, network metadata, user metadata, access logs, public information, internal non-confidential data, anonymized data, aggregated data, operational or technical data, application data, protocol headers and control data, metadata and session data, control and management traffic, or any other data associated with a data movement or transmission in a network, including data movement or transmission intended to exit the network. An embodiment of accessed data may include: (1) textual and document-based files, such as word processing files (e.g. .doc, .docx, .odt), PDF documents (e.g. .pdf), plaintext files (e.g. .txt, .csv), rich text format files (e.g. .rtf), spreadsheets (e.g. .xls, .xlsx, .ods), or presentations (e.g. .ppt, .pptx, .odp), (2) messages, such as email bodies and headers (e.g. SMTP, IMAP, Exchange), instant messages or chat logs (e.g. Slack, Teams), SMS and mobile messaging transcripts, or social media messages, (3) structured data, such as database entries and records, CRM system data, ERP system data, HRM system data, form-submission content (e.g. web or application inputs), or API payloads (e.g. JSON or XML responses containing sensitive fields), (4) files, such as uploaded or downloaded files, attachments to email or web forms, files on local or networked drives, files synced to or from cloud storage services (e.g. OneDrive, Google Drive, Dropbox), or archived files (e.g. .zip, .rar, .tar), (5) visual and media files, such as scanned documents with text, images with embedded data, or video or audio recordings with spoken content, (6) code and configuration files, such as source code files (e.g. .py, .java, .c), scripts and automation files (e.g. .sh, .bat, .ps1), configuration files (e.g. .yaml, .json, .ini), or infrastructure-as-code templates (e.g. Terraform, CloudFormation), (7) logs and monitoring reports, such as system or application logs, access logs, or diagnostic reports or telemetry containing embedded identifiers, (8) network data (data in motion), such as HTTP/HTTPS request and response bodies, email transmission payloads, FTP/SFTP content, DNS queries and metadata, API calls transmitting content, or TLS handshake metadata (e.g. SNI, certificates).

In some disclosed embodiments, the accessing of the data includes receiving organization-specific documents. The accessing of the data includes receiving organization-specific documents refers to the process of accessing data involves the system or entity retrieving, scanning, or inspecting documents that are unique or proprietary to a particular organization, which may include internal reports, policies, contracts, trade secrets, intellectual property, or other materials created or owned by the particular organization associated with the organization-specific documents.

Some disclosed embodiments involve classifying the accessed data as sensitive. Classifying the accessed data as sensitive refers to analyzing and labeling the data that has been retrieved, scanned, or inspected as subject to protection based on rules that may reflect the nature, use, risk, or context of the data, the nature, use, risk, or context of the data may be determined by the content, structure, metadata, context, or associated action or movement of the data. Sensitive data, which may be labeled as subject to projection, refers to information that if transmitted, exposed, or disclosed in an unauthorized or accidental manner may result in harm to individuals, organizations, or systems, including by violating privacy, breaching regulations, causing economic loss, exposing intellectual property, or compromising security. Accessed data may be classified as sensitive by: (1) content-based analysis (pattern matching), where the system inspects the content of the data for known patterns or values associated with sensitivity, which may include techniques such as detecting formats (e.g. SSN, credit card numbers), keyword dictionaries (e.g. "confidential," "proprietary," "restricted"), file fingerprinting to identify known sensitive documents, or data identifiers for medical codes, account numbers, or personal records, (2) contextual analysis, where the sensitivity of the data may depend on the context (as described and exemplified herein) in which it appears, even if its content is ambiguous, which may include factors such as data source or location, user or role accessing the data, destination or channel, device state, or time or behavior pattern, (3) metadata evaluation, where data may be flagged as sensitive based on associated metadata, even without deep content inspection, which may include a file labeled as "confidential" or "internal use only," custom data classification tags (e.g. "Restricted," "Level 2 Sensitive"), email subject liners or headers, or file origin or creation tool, (4) user-defined classification, where users or administrators may manually label data as sensitive during creation or handling, which may include manual sensitivity tags (e.g. in Microsoft 365 or Google Workspace), file classification tools, or metadata added via document templates or forms, and (5) machine learning and AI-based classification, where systems may apply behavioral models or statistical classifiers to detect sensitivity based on learned patterns, which may include document structure and semantics, user behavior history, or comparison to past incidents or known sensitive examples.

In some disclosed embodiments, in a first context a particular type of the data is classified as sensitive and in a second context the particular type of the data is not classified as sensitive. In a first context a particular type of the data is classified as sensitive and in a second context the particular type of the data is not classified as sensitive refers to the dynamic and context-based aspects of the classification of the accessed data, where the same particular type of the data may receive different levels of protection based on the classification of the accessed data. The particular type of the data refers to a specific category, format, or classification of data, identifying a defined subset of the data that may require special handling, monitoring, or protection—such as sensitive, regulated, or security-critical information. Examples of the particular type of the data may include: personally identifiable information (PII), protected health information (PHI), payment and financial data (PCI/GLBA), authentication credentials, confidential business information, classified or regulated government data, educational records (FERPA), user activity data, system or device meta data, network performance or diagnostic data, application data structures, sensor or IoT data, business process data, content category indicators, training or simulation data, testing data, error or exception data, content format or structure data, operational or process data, behavioral data, network metadata, communication content and metadata, media or document types, structured application or API data, content classification and labels, synthetic data, debugging data, legal data, temporal data, contextual data, geospatial data, behavioral biometrics, interaction metrics, AI/model-specific data, blockchain and Web3 data, cloud and infrastructure state data, supply chain or logistics data, emotional or psychological data, or environmental and energy data. The classification of the accessed data may depend on the context, including the associated contextual information and contextual factors, of the data, and the context may be a determinant of classifying the particular type of the data as sensitive or not sensitive. The sensitivity classification of a specific type of data depends on the circumstances or environment in which it is accessed, used, or transferred. In an exemplary scenario, a product engineer tries to upload a technical design file from a company computer to two locations, the product engineer's personal computer (external to the company network) and the company's protected engineering collaboration platform with role-based access (internal to the company network). In the first scenario, the data of the technical design file may be classified as sensitive because the context of the product engineer's request includes that the file is leaving the company network with the aim of entering an untrusted dropbox. In the second scenario, the data of the technical design file may not be classified as sensitive because the context of the product engineer's request includes that the file is staying on the company network with the aim of entering a trusted collaboration platform with appropriately restricted access.

In some disclosed embodiments, the first context and the second context are associated with different software applications. The first context and the second context are associated with different software applications refers to a situation where the classification or handling a particular type of the data varies depending on an associated software application. Depending on the software application associated with a particular type of the data that is moving around a network, the data may be classified as sensitive in the first context (i.e. associated with a software application that indicates a risk of data leakage), and the data may be classified as not sensitive in the second context (i.e. associated with a software application that does not indicate a risk of data leakage). Exemplary components of context associated with different software applications may include: (1) security posture, where a particular type of the data associated with software applications lacking strong access controls, encryption, and monitoring may be classified as sensitive and the particular type of the data associated with software applications governed by enterprise-grade security controls, (2) usage purposes, where the intent and exposure affect sensitivity classification, a particular type of the data in transit, shared, or processed externally may be classified as sensitive, and the particular type of the data used internally for legitimate, authorized operations may be classified as not sensitive, (3) policy-based enforcement, where organizations define data classification rules that vary by application or usage channel, (4) varying levels of trust and control, where the trust level of the software informs the classification decision, unmanage applications may offer little visibility and control, so a particular type of the data may be classified as sensitive, while trusted enterprise apps may often be monitored and compliant, so the particular type of the data may be classified as not sensitive, and (5) different users and access scopes, where the software may be used by different users with different roles and access rights.

In some disclosed embodiments, the first context and the second context are associated with different data usage contexts. The first context and the second context are associated with different data usage contexts refers to the particular type of the data being used in different in two different contexts, where in the first context is associated with a data usage context and the particular type of the data is classified as sensitive, and in the second context is associated with a different data usage context and the particular type of the data is classified as not sensitive. A data usage context refers to the specific circumstances under which the user attempts to access, handle, transmit, or process the particular type of the data, which may encompass the purpose, method, environment, or user behavior involved in using the data. Exemplary data usage contexts may include: internal viewing, external sharing, cloud upload, printing, copy-paste, mobile device access, batch export, third-party API access, anonymized analytics, off-hours or unusual access, or any other process involving the accessing, handling, transmitting, or processing of data within a network.

In some disclosed embodiments, the first context and the second context are associated with different users. The first context and the second context are associated with different users refers to the particular type of the data being interacted with by different individuals, entities, or any other type of user on a network, where the roles, privileges, or trust levels of the different individuals, entities, or any other type of user on a network contributes to whether the particular type of the data is classified as sensitive or not sensitive. Exemplary types of users may include: an internal employee, an external contractor, authenticated user, anonymous guest, system administrator, end user, on-premise employee, remote user, user from a department associated with the particular type of the data, user from a department that is unrelated to the particular type of the data, user with high security clearance, user with low security clearance, user with a job title associated with the particular type of the data, user with a job title not associated with the particular type of the data, temporary employee, seasonal employee, company executive, legal representative, manager or other user with operational oversight, entry-level employee, automated scripts or bots, service accounts, automated applications or services, machine users, workload identities, APIs and integrations, or any other type of individual, entity, or network user—physical or non-physical—that may convey information about risk of data leakage.

In some disclosed embodiments, the first context and the second context are associated with different client device types. The first context and the second context are associated with different client device types refers to the particular type of the data interacted with by a differing types of client device (as previously described and exemplified), where the first context associated with a first client device type results in classification of the particular type of the data as sensitive and the second context associated with a second client device type results in classification of the particular type of the data as not sensitive. A client device type refers to the nature, characteristics, category, or classification of a client device (as previously described and exemplified), which may include descriptors of the form factor, platform, management status, intended use, operating system, ownership, security posture, connectivity, or usage context and may be indicative of risk level, capability, or trustworthiness of data handling by a client device. Exemplary client device types may include: (1) organization-managed devices, which are controlled by an organization and possibly enrolled in mobile device management or endpoint protection programs, such as a Windows enterprise laptop, a macOS MacBook Pro enrolled in mobile device management, an iPhone manage by corporate Intune, an Android tablet with enterprise configuration, or a desktop workstation with full disk encryption and endpoint protection, (2) unmanaged or personal devices, which are owned by a user, not controlled by the organization, and may not comply with organizational security policies, such as a personal Windows laptop not enrolled in mobile device management, an unsecured Android phone used for email, a shared iPad used to access work documents, or a laptop running an outdated or unsupported operating system, (3) mobile devices, which are portable, often used off-network, and vary in management and security posture, such as an iPhone accessing email over LTE, an Android phone using a corporate VPN, a Windows Surface tablet used for remote work, or a rugged tablet used in field service, (4) thin clients or virtual desktop terminals, which are devices that rely on backend virtual infrastructure for application and desktop delivery, such as a Citrix thin client terminal, VMware Horizon View access point, ChromeOS device running only web applications, or Linux-based dumb terminal with keyboard and monitor, (5) shared or public-use devices, which are possibly used by multiple people, often in kiosks or customer-facing environments, such as a retail POS system, a library kiosk workstation, a healthcare check-in tabled, or a hotel business center desktop, or (6) IoT and embedded devices, which are specialized devices with limited interfaces and functionality, such as a smart sensor reporting data to cloud, an industrial controller in a factory, a security camera for uploading footage, a smart TV, or a voice assistant device.

In some disclosed embodiments, the first context and the second context are associated with different locations. The first context and the second context are associated with different locations refers to the particular type of the data being interacted with in differing locations (as previously described and exemplified), where in the first context associated with a first location results in a classification of the particular type of the data as sensitive and in the second context associated with a second location results in a classification of the particular type of the data as not sensitive. Location can be determined through various methods, depending on the device, system, and level of precision required. Exemplary methods of location determination may include: (1) IP address-based geolocation, where the public IP address is used to estimate the location, matching the IP address to a location in a geolocation database, (2) Global Positioning System (GPS), where satellite signals are mused to determine the precise coordinates (e.g. longitude and latitude) of a GPS-enabled device, (3) Wi-Fi positioning, where nearby Wi-Fi access points are scanned for, comparing MAC addresses against a location database, (4) cell tower triangulation, where signal strength and ID of nearby cell towers are used to triangulate the position, (5) browser-based location services, where a combination of IP address, Wi-Fi signals, and GPS may be used by the web browser to determine location, often reliant upon the browser's access to OS-level APIs or user permissions, (6) enterprise network mapping, where knowledge of the internal network architecture (e.g. device IP ranges, subnet locations, VPN endpoints, network segmentation) may be used to map logical network segments to physical or administrative locations, or (7) device metadata and telemetry, where a device may report location-related metadata through endpoint agents, mobile device management (MDM) systems, or OS APIs.

Some disclosed embodiments involve intercepting outgoing network traffic. Intercepting outgoing network traffic refers to the act of capturing, monitoring, or analyzing outgoing network traffic (as previously described and exemplified). Intercepting refers to the act of intentionally capturing, observing, or redirecting data, signals, or communication in transit—typically between a sender and a receiver—before the data, signals, or communication reach their intended destination. Outgoing network traffic refers to network traffic that is transmitted to a destination external to a network. Exemplary methods for determining that network traffic as outgoing may include: source vs. destination IP address analysis, routing table and interface direction, firewall (as previously described and exemplified) or proxy content, network access translation (NAT) behavior, traffic flow direction in logs or sensors, or application context. Exemplary outgoing network traffic may include: web access and browsing, email and messaging sent externally, cloud storage and file transfers, API communications, software updates and telemetry, DNS and network services, remote work and VPN, or IoT device communication. Examples of intercepting outgoing network traffic may include: email scanning before sending, web upload blocking, proxy filtering web requests, firewall dropping suspicious traffic, API call scrubbing, Cloud Access Security Broker (CASB) policy enforcement, firewall and access control, application monitoring and policy enforcement, malware and threat detection, content filtering and productivity control, or network optimization and traffic shaping.

In some disclosed intercepting the outgoing network traffic occurs at a client device. Intercepting the outgoing network traffic occurs at a client device refers to the act of capturing, monitoring, or analyzing outgoing network traffic enabled by a client device, where the monitoring and analysis may happen within the client device (as previously described and exemplified), external to the client device, or both within and external to the client device (i.e. in a hybrid approach with initial local analysis and optional remote escalation). Examples of intercepting the outgoing network traffic occurs at a client device may include: kernel-level packet inspection, user-space proxy or middleware, network filter devices (e.g. Windows Filtering Platform—WFP), application-level hooks, certificate injection for transport layer security (TLS) interception, host-based intrusion prevention system (IPS), local packet capture tools (e.g. WinPcap, Npcap, Tcpdump wrappers), transparent local bridge interfaces, virtual network interfaces (e.g., VPN-like tunnels for monitoring and analysis), container or virtualized application isolation layers, device-level mobile device management (MDM) or enterprise mobility management (EMM) policy enforcement hooks, local content-aware clipboard and screen capture inspection, or local network address translation (NAT) or port-forwarding redirection.

In some disclosed embodiments, intercepting the outgoing network traffic occurs at a server. Intercepting the outgoing network traffic occurs at a server refers to the act of capturing, monitoring, or analyzing outgoing network traffic enabled by a server, where the monitoring and analysis may happen within the server (as previously described and exemplified), external to the server, or both within and external to the server (i.e. in a hybrid approach with initial local analysis and optional remote escalation. The server may be part of a server cluster (as previously described and exemplified). Examples of intercepting the outgoing network traffic occurs at a server may include: kernel-level packet inspection (e.g. iptables/netfilter on Linux), server-side application hooks or middleware, local proxy on the server (e.g. reverse proxy or egress proxy), transport layer security (TLS) interception on the server, outbound gateway firewalls or application-layer filters, server agent with cloud-based classification, packet capture or logging tools (e.g. tcpdump, TShark, Suricata), transparent bridging or virtual network interface cards (NIC), security middleware or API gateway interception, or security information and event management (SIEM) or network detection and response (NDR) integration.

In some disclosed embodiments, intercepting the outgoing network traffic occurs in transit between a client device and a server. Intercepting the outgoing network traffic occurs in transit between a client device and a server refers to the act of capturing, monitoring, or analyzing outgoing network traffic happening after the network traffic leaves the client device but before it reaches the destination server or after the network traffic leaves the server but before it reaches the destination client device. Intercepting the outgoing network traffic occurs in transit between a client device and a server may happen at an intermediate point in the network path between the client device and the server (i.e. after traffic leave the sender, client or server, but before it arrives at the recipient). Exemplary intermedia points may include: (1) on-premise network infrastructure, such as firewalls, intrusion prevention systems (IPS), or other data leakage prevention appliances located on the organization's local network (e.g. perimeter or internal switches or routers), where interception happens at the gateway, between virtual LANs (VLAN), or on a mirrored port, (2) data center or virtual switch layer, where interception may occur within a virtualized data center, such as the hypervisor, virtual switch, or service mesh layer, (3) inline security appliances or network taps, such as physical or virtual devices place inline between clients and a server of the network, which may include transparent proxies, SSL decryptors, or application-layer (layer 7 of the Open Systems Interconnection (OSI) model) data leakage prevention filters, (3) cloud-based security layers, where interception occurs in the cloud (e.g. Secure Access Service Edge (SASE) or Cloud Access Security Broker (CASB) frameworks), or WAN optimization or SD-WAN nodes, where in distributed networks, SD-WAN edge devices can intercept and shape traffic moving between branch locations and data centers or the cloud.

Some disclosed embodiments involve determining that the intercepted network traffic contains the particular type of the data. Determining that the intercepted network traffic contains the particular type of the data refers to determining (as previously described and exemplified) through analyzing or inspecting intercepted network traffic to identify (as previously described and exemplified) the particular type of the data, as described herein, is contained within the intercepted network traffic. Examples of determining that the intercepted network traffic contains the particular type of the data may include: detection of personally identifiable information (PII), recognition of credit card numbers in web uploads, identifying source code in an uploaded file, detection of confidential legal terms in documents, identifying health information in a support ticket, detection of unusual file metadata, recognition of device logs exfiltration, AI model input detection, AI model output detection, or determining—through analysis and inspection of intercepted network traffic—the presence of any other particular type of the data contained within intercepted network traffic.

Some disclosed embodiments involve determining whether the particular type of the data in the intercepted network traffic corresponds to the second context. Determining whether the particular type of the data in the intercepted network traffic corresponds to the second context refers to the process of evaluating whether the particular type of the data matches or aligns with the characteristics, conditions, or attributes associated with the second context. When associated with the second context, the particular type of the data is classified as not sensitive. This entails analyzing or inspecting both the content of the intercepted network traffic and the context (as described herein) of the intercepted network traffic, which may be used in the assessment of whether the data is being used, transmitted, handled, or otherwise moving around the network in a manner that complies with the rules, risks, or expectations associated with the second context. Exemplary determination of whether the particular type of the data in the intercepted network traffic corresponds to the second context may comprise capturing the contextual information (as described and exemplified herein) of the particular type of the data contained within the intercepted network traffic, capturing a contextual factor (as described and exemplified herein) of the particular type of the data contained within the intercepted network traffic, determining contextual factors of the particular type of the data contained within the network traffic (e.g. user identity/role, device details, application in use, location, time, network environment, session posture, data label/classification), determining contextual information associated with the particular type of the data matches with the contextual information associated with the second context, determining a contextual factor associated with the particular type of the data matches with the contextual factors associated with the second context, referencing the second context, or evaluation of the context associated with the particular type of the data contained within the intercepted network traffic for correspondence with the second context.

Some disclosed embodiments involve when the particular type of the data in the intercepted network traffic corresponds to the second context as opposed to the first context, implementing a remedial measure to mitigate leakage of the particular type of the data. When the particular type of the data in the intercepted network traffic corresponds to the second context as opposed to the first context refers to a situation where the particular type of the data in the intercepted network traffic is classified as not sensitive from its correspondence to the second context, as opposed to the particular type of the data corresponding to the first context, where it would be classified as sensitive. When the data is classified as not sensitive, there is a risk that the data is incorrectly or insufficiently classified as not sensitive, which may result in data leakage. To address this risk, the system may implement a remedial measure to mitigate leakage of the particular type of the data, which may include blocking, alerting, encrypting, or quarantining to prevent or mitigate the unauthorized or unintentional exposure of the particular type of the data. A remedial measure refers to actions or controls implemented to prevent, reduce, or respond to undesired data leakage events. Remedial measures may refer to any technical, procedural, or administrative steps taken to mitigate, contain, or correct risks related to data leakage. Exemplary remedial measures include: blocking, quarantining, encrypting, alerting, throttling, logging, user verification, data masking or redaction, access control measures, data handling controls, traffic and transmission controls, monitoring and detection, user interaction controls, policy enforcement, network and endpoint protection, incident response and recovery, legal and compliance controls, or any other action or control implemented to prevent, reduce, or respond to undesired data leakage events.

Some disclosed embodiments involve receiving organization-specific documents, and using machine learning to determine the second context, based on the received organization-specific documents. Receiving organization-specific documents, and using machine learning to determine the second context, based on the received organization-specific documents refers to the process where the system receives documents that are specific to or originated from a particular organization (these documents may include internal reports, contracts, emails, or any files unique to the organization's operations or data), applies machine learning techniques (such as classification models, clustering, or natural language processing) to analyze at least the contextual information and contextual factors of these documents in order to determine the second context, where the second context, as described herein, may be determined automatically based on machine learning techniques. Using machine learning to determine the second context may include: automatically analyzing organization-specific documents, automatically analyzing the access or transmission attributes of the organization-specific documents, risk scoring, policy decision support, learning patterns from historical data usage, learning patterns from access behavior, learning patterns from content structure, learning patterns from metadata, learning patterns from document features, learning patterns from access or usage metadata, learning patterns from behavioral features, or feature extraction. Exemplary machine learning techniques that may determine or assist in the determination of the second context may include: supervised learning, unsupervised learning, semi-supervised learning, reinforcement learning, natural language processing (NLP), graph-based learning, anomaly detection models, regression, or principal component analysis (PCA).

Some disclosed embodiments involve using the organization-specific documents with machine learning to determine the first context. Using the organization-specific documents with machine learning to determine the first context refers to the process where the system analyzes documents that are specific to a particular organization (these documents may include internal reports, contracts, emails or any files unique to the organization's operations or data), applies machine learning techniques to identify or infer a first context, to analyze at least the contextual information and contextual factors of these organization-specific documents in order to determine the first context, where the first context, as described herein, may be determined automatically based on machine learning techniques. Using machine learning to determine the first context may be enabled by using the same machine learning model, implementation, or techniques as using machine learning to determine the second context. Using machine learning to determine the first context may be enabled by using a different machine learning model, implementation, or techniques as using machine learning to determine the second context. Using machine learning to determine the first context may be enabled by using at least some of the same machine learning models, implementations, or techniques as using machine learning to determine the second context, and by using at least some different machine learning models, implementations, or techniques as using machine learning to determine the second context. Any implementation of machine learning used to determine the first context may be trained based on the same training set or a different training set from the implementation of machine learning used to determine the second context, and the associated training procedures or methodology of these implementations of machine learning may be the same or different. Any implementation of machine learning used to determine the first context may be tested based on the same test set or a different test set from the implementation of machine learning used to determine the second context, and the associated test procedures or methodology of these implementations may be the same or different. Using machine learning to determine the first context may include: automatically analyzing organization-specific documents, automatically analyzing the access or transmission attributes of the organization-specific documents, risk scoring, policy decision support, learning patterns from historical data usage, learning patterns from access behavior, learning patterns from content structure, learning patterns from metadata, learning patterns from document features, learning patterns from access or usage metadata, learning patterns from behavioral features, or feature extraction. Exemplary machine learning techniques that may determine or assist in the determination of the first context may include: supervised learning, unsupervised learning, semi-supervised learning, reinforcement learning, natural language processing (NLP), graph-based learning, anomaly detection models, regression, or principal component analysis (PCA).

Some disclosed embodiments involve analyzing network traffic from a plurality of organizations using machine learning to determine the second context. Analyzing network traffic from a plurality of organizations using machine learning to determine the second context refers to the process by which the system collects and examines network traffic data (such as transmitted content, metadata, protocols, and behavioral patterns) across multiple distinct organizations and applies machine learning techniques to identify or infer a second context, where the second context, as described herein, may be determined automatically based on machine learning techniques. Using machine learning to determine the second context may include: automatically analyzing network traffic from a plurality of organizations, automatically analyzing the access or transmission attributes of the network traffic from a plurality of organizations, risk scoring, policy decision support, learning patterns from historical data usage, learning patterns from access behavior, learning patterns from content, learning patterns from metadata, learning patterns from content features, learning patterns from access or usage metadata, learning patterns from behavioral features, or feature extraction. Exemplary machine learning techniques that may determine or assist in the determination of the second context may include: supervised learning, unsupervised learning, semi-supervised learning, reinforcement learning, natural language processing (NLP), graph-based learning, anomaly detection models, regression, or principal component analysis (PCA).

Some disclosed embodiments involve using the network traffic from the plurality of organizations with machine learning to determine the first context. Using network traffic from the plurality of organizations with machine learning to determine the first context refers to the process of collecting and analyzing network traffic data from multiple distinct organizations and applying machine learning techniques to identify the first context, where the first context, as described herein, may be determined automatically based on machine learning techniques. Using machine learning to determine the first context may include: automatically analyzing network traffic from a plurality of organizations, automatically analyzing the access or transmission attributes of the network traffic from a plurality of organizations, risk scoring, policy decision support, learning patterns from historical data usage, learning patterns from access behavior, learning patterns from content, learning patterns from metadata, learning patterns from content features, learning patterns from access or usage metadata, learning patterns from behavioral features, or feature extraction. Exemplary machine learning techniques that may determine or assist in the determination of the first context may include: supervised learning, unsupervised learning, semi-supervised learning, reinforcement learning, natural language processing (NLP), graph-based learning, anomaly detection models, regression, or principal component analysis (PCA).

In some disclosed embodiments, the remedial measure includes preventing transmission of at least the data classified as sensitive. The remedial measure includes preventing transmission of at least the data classified as sensitive refers to the remedial measure being implemented to mitigate leakage by preventing transmission of at least the data classified as sensitive. This may include the remedial measure causing the system to block, interrupt, or halt the sending, uploading, sharing, or otherwise transmitting of any portion of the data that has been classified as sensitive, thereby preventing it from leaving its current environment or reaching an unauthorized destination. Additionally, the remedial measure may redact, remove, or isolate the sensitive portion of the data before it leaves a system or the network. The remedial measure may be implemented at different layers (e.g. client device, in transit, server) and with various techniques. Exemplary techniques for the remedial measure preventing transmission of at least the data classified as sensitive may include: blocking the entire transmission, redacting or masking sensitive element, quarantining or isolating the data, rewriting or sanitizing the transmission, rerouting for policy enforcement, or encryption or secure channel enforcement.

In some disclosed embodiments, the remedial measure includes informing a user that the intercepted network traffic is classified as sensitive. The remedial measure may include informing a user that the intercepted network traffic is classified as sensitive refers to the remedial measure being implemented to mitigate leakage by alerting, notifying, or otherwise informing a user that the intercepted network traffic is classified as sensitive. This may include as part of a data protection response, the system notifying or alerting a user/system—such as an originator, administrator, security team, supervisor, intended sender, other employees, monitoring system, logging system, or any other user/system concerned with the intercepted network traffic, the data contained within the intercepted traffic, or the security of the network—that the network traffic the user initiated or attempted to transmit contains data classified as sensitive under organizational policy, regulatory rules, or (machine-learning) model classifications. Exemplary techniques for the remedial measure informing a user that the intercepted network traffic is classified as sensitive may include: a popup alert or dialog box, inline message in application UI, notification from an endpoint security tool, browser extension or plug-in notification, email or message notification, or justification prompt. The informing a user that the intercepted network traffic is classified as sensitive may include: the type of sensitivity detected (e.g. PII, source code, trade secret), the action taken (e.g. blocked, quarantined, encrypted), the reason for classification, or next steps.

Some disclosed embodiments involve receiving documents from a specific organization and applying machine learning to the received documents to thereby classify the data as sensitive. Receiving documents from a specific organization and applying machine learning to the received documents to thereby classify the data as sensitive refers to a process in which the system obtains documents originating from or associated with a specific organization, and then uses machine learning techniques to analyze the content and context of the data contained within the documents in order to determine the sensitivity classification of the data. This application of machine learning, where machine learning techniques are used to evaluate documents from a specific organization to determine and assign a sensitivity level, may allow for automatic sensitivity classification of the documents from a specific organization.

Some disclosed embodiments involve determining the first context and the second context based on the application of the machine learning to the received documents.

Figure 28:
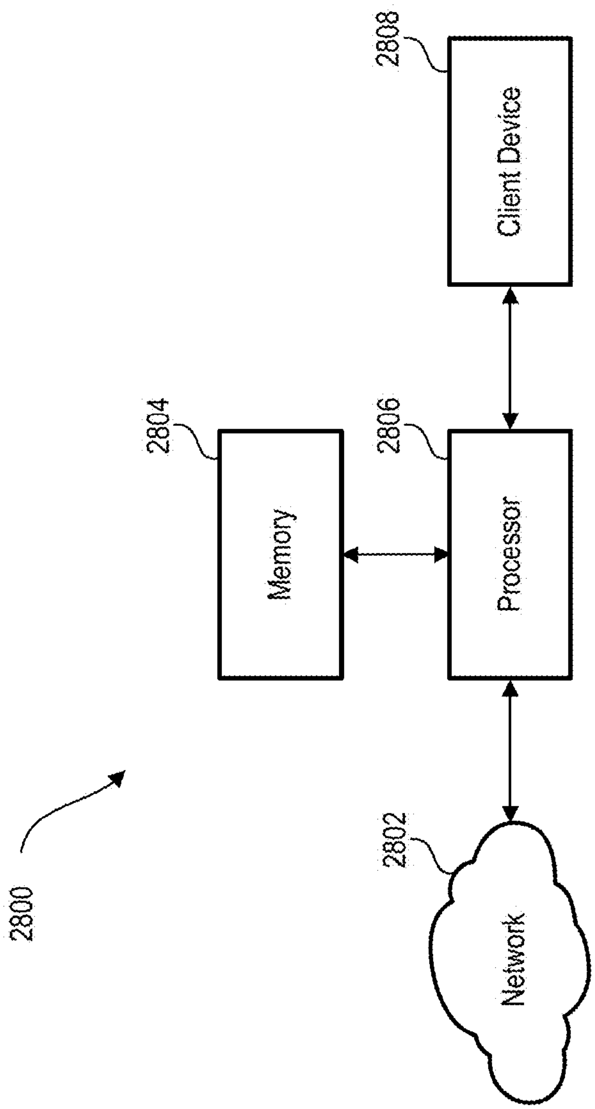
FIG. 28 illustrates an exemplary schematic diagram of a system for performing context-based data leak prevention operations in a network, consistent with some disclosed embodiments.

FIG. 28 illustrates an exemplary schematic diagram of a system 2800 for performing context-based data leak prevention operations in a network, consistent with some disclosed embodiments. In some embodiments, system 2800 may comprise a network 2802, which may be implemented as a SASE network (as previously described and exemplified). In some embodiments, system 2800 may comprise a processor 2806 (as previously described and exemplified). In some embodiments, system 2800 may comprise a memory 2804 or non-transitory computer readable medium (as previously described and exemplified). In some embodiments, system 2800 may comprise a client device 2808 (as previously described and exemplified).

Referring to FIG. 28, system 2800 may include at least one processor 2806 configured to access data, as described above and throughout this disclosure.

System 2800 may include at least one processor 2806 configured to classify the accessed data as sensitive, wherein in a first context a particular type of the data is classified as sensitive and in a second context the particular type of the data is not classified as sensitive, as described above and throughout this disclosure.

System 2800 may include at least one processor 2806 configured to intercept outgoing network traffic, as described above and throughout this disclosure.

System 2800 may include at least one processor 2806 configured to determine that the intercepted network traffic contains the particular type of the data, as described above and throughout this disclosure.

System 2800 may include at least one processor 2806 configured to determine whether the particular type of the data in the intercepted network traffic corresponds to the second context, as described above and throughout this disclosure.

System 2800 may include at least one processor 2806 configured to, when the particular type of the data in the intercepted network traffic corresponds to the second context as opposed to the first context, implement a remedial measure to mitigate leakage of the particular type of the data, as described above and throughout this disclosure.

Referring to FIG. 28, system 2800 may include a non-transitory computer readable medium containing instructions that when executed by at least one processor cause the processor to perform context-based leak prevention operations in a network, the operations may comprise accessing data, as described above and throughout this disclosure. In some embodiments, the accessing of the data includes receiving organization-specific documents, as described above and throughout this disclosure.

System 2800 may include a non-transitory computer readable medium containing instructions that when executed by at least one processor cause the processor to perform context-based leak prevention operations in a network, the operations may comprise classifying the accessed data as sensitive, wherein in a first context a particular type of the data is classified as sensitive and in a second context the particular type of the data is not classified as sensitive, as described above and throughout this disclosure. In some embodiments, the first context and the second context are associated with different software applications, as described above and throughout this disclosure. In some embodiments, the first context and the second context are associated with different data usage contexts, as described above and throughout this disclosure. In some embodiments, the first context and the second context are associated with different users, as described above and throughout this disclosure. In some embodiments, the first context and the second context are associated with different client device types, as described above and throughout this disclosure. In some embodiments, the first context and the second context are associated with different locations, as described above and throughout this disclosure.

System 2800 may include a non-transitory computer readable medium containing instructions that when executed by at least one processor cause the processor to perform context-based leak prevention operations in a network, the operations may comprise intercepting outgoing network traffic, as described above and throughout this disclosure. In some embodiments, intercepting the outgoing network traffic occurs at a client device, as described above and throughout this disclosure. In some embodiments, intercepting the outgoing network traffic occurs at a server, as described above and throughout this disclosure. In some embodiments, intercepting the outgoing network traffic occurs in transit between a client device and a server, as described above and throughout this disclosure.

System 2800 may include a non-transitory computer readable medium containing instructions that when executed by at least one processor cause the processor to perform context-based leak prevention operations in a network, the operations may comprise determining that the intercepted network traffic contains the particular type of the data, as described above and throughout this disclosure.

System 2800 may include a non-transitory computer readable medium containing instructions that when executed by at least one processor cause the processor to perform context-based leak prevention operations in a network, the operations may comprise determining whether the particular type of the data in the intercepted network traffic corresponds to the second context, as described above and throughout this disclosure.

System 2800 may include a non-transitory computer readable medium containing instructions that when executed by at least one processor cause the processor to perform context-based leak prevention operations in a network, the operations may comprise, when the particular type of the data in the intercepted network traffic corresponds to the second context as opposed to the first context, implementing a remedial measure to mitigate leakage of the particular type of the data, as described above and throughout this disclosure. In some embodiments, the remedial measure includes preventing transmission of at least the data classified as sensitive, as described above and throughout this disclosure. In some embodiments, the remedial measure includes informing a user that the intercepted network traffic is classified as sensitive, as described above and throughout this disclosure.

System 2800 may include a non-transitory computer readable medium containing instructions that when executed by at least one processor cause the processor to perform context-based leak prevention operations in a network, the operations may comprise receiving organization-specific documents, and using machine learning to determine the second context based on the received organization-specific documents, as described above and throughout this disclosure. In some embodiments, the operations may further comprise using the organization-specific documents with machine learning to determine the first context, as described above and throughout this disclosure.

System 2800 may include a non-transitory computer readable medium containing instructions that when executed by at least one processor cause the processor to perform context-based leak prevention operations in a network, the operations may comprise analyzing network traffic from a plurality of organizations using machine learning to determine the second context, as described above and throughout this disclosure. In some embodiments, the operations may further comprise using the network traffic from the plurality of organizations with machine learning to determine the first context, as described above and throughout this disclosure.

System 2800 may include a non-transitory computer readable medium containing instructions that when executed by at least one processor cause the processor to perform context-based leak prevention operations in a network, the operations may comprise receiving documents from a specific organization and applying machine learning to the received documents to thereby classify the data as sensitive, as described above and throughout this disclosure. In some embodiments, the operations may further comprise determining the first context and the second context based on the application of the machine learning to the received documents, as described above and throughout this disclosure.

Figure 29:
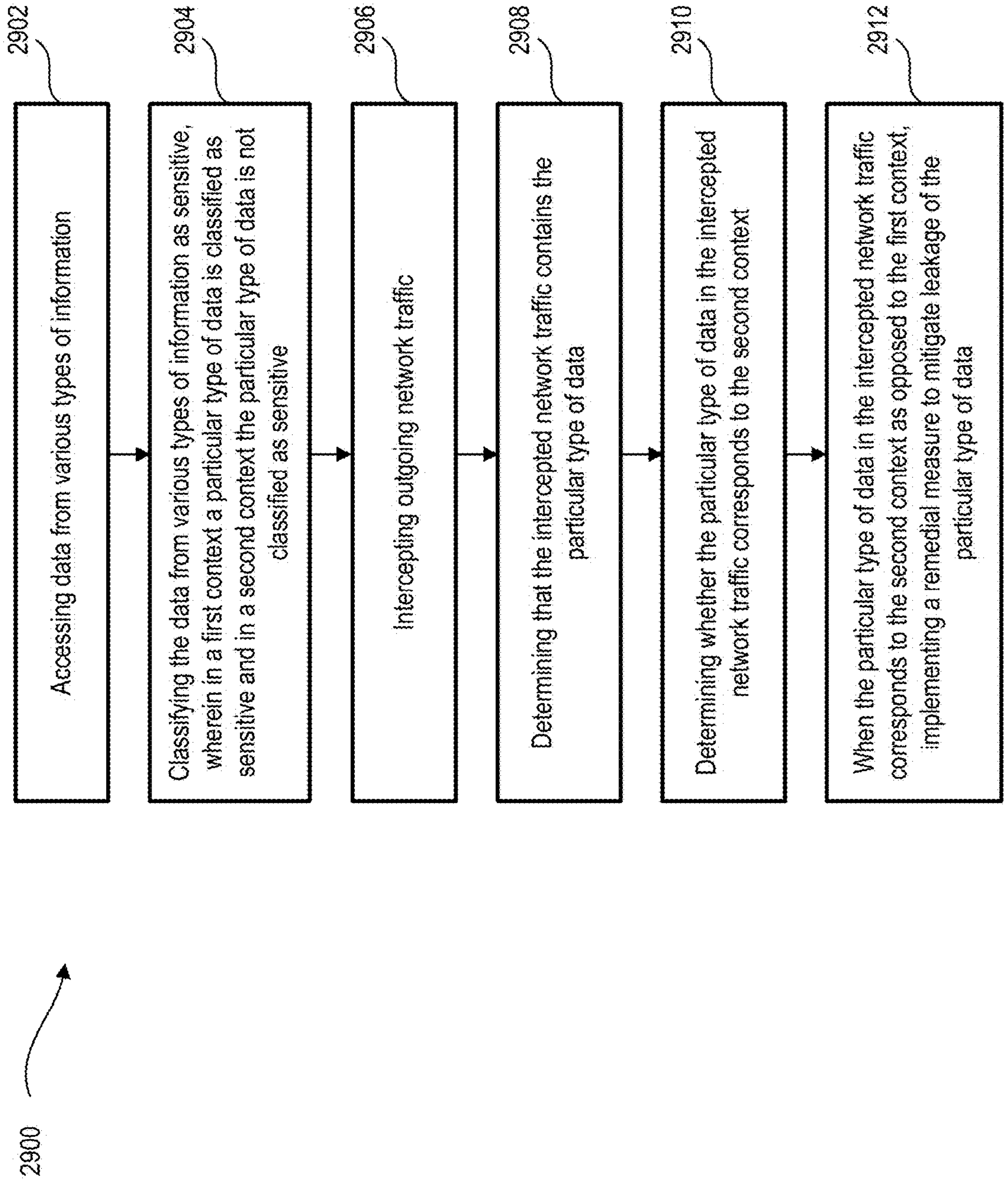
FIG. 29 is a flowchart of an example process for performing real-time dynamic policy revisions, consistent with some disclosed embodiments.

FIG. 29 is a flowchart of example process 2900 for performing real-time dynamic policy revisions, consistent with some disclosed embodiments. In some embodiments, process 2900 may be performed by at least one processor (e.g., processor 2806 in FIG. 28) to perform operations or functions described herein. In some embodiments, some aspects of process 2900 may be implemented as software (e.g., program codes or instructions) that are stored in a memory (e.g., memory 2804 in FIG. 28) or a non-transitory computer readable medium. In some embodiments, some aspects of process 2900 may be implemented as hardware (e.g., a specific-purpose circuit). In some embodiments, process 2900 may be implemented as a combination of software and hardware.

Referring to FIG. 29, process 2900 may include a step 2902 of accessing data.

Process 2900 may include a step 2904 of classifying the accessed data as sensitive, wherein in a first context a particular type of the data is classified as sensitive and in a second context the particular type of the data is not classified as sensitive.

Process 2900 may include a step 2906 of intercepting outgoing network traffic.

Process 2900 may include a step 2908 of determining that the intercepted network traffic contains the particular type of the data.

Process 2900 may include a step 2910 of determining whether a particular type of the data in the intercepted network traffic corresponds to the second context.

Process 2900 may include a step 2912 of when a particular type of the data in the intercepted network traffic corresponds to the second context as opposed to the first context, implementing a remedial measure to mitigate leakage of the particular type of the data.

Figure 30:
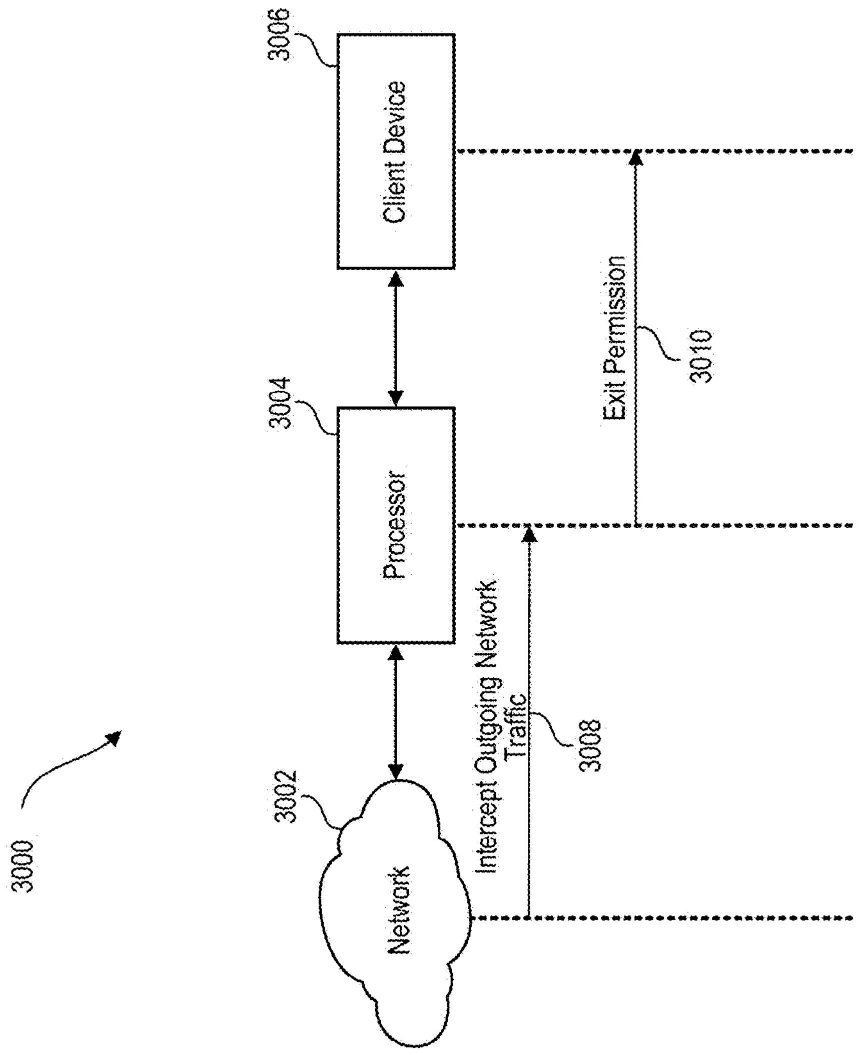
FIG. 30 illustrates an exemplary communication protocol for performing context-based data leak prevention operations in a network, consistent with some disclosed embodiments.

FIG. 30 illustrates an exemplary communication protocol 3000 for performing context-based data leak prevention operations in a network, consistent with some disclosed embodiments. In some embodiments, communication protocol 3000 may include a network 3002, which may be implemented as a SASE network (as previously described and exemplified). In some embodiments, communication protocol 3000 may include a processor (as previously described and exemplified) 3004, which may intercept outgoing network traffic 3008 from network 3002. In some embodiments, processor 3004 may determine implementing a remedial measure 3010 to mitigate leakage of the particular type of the data contained within the intercepted outgoing network traffic 3008 to client device (as previously described and exemplified) 3006.

Some disclosed embodiments involve enabling selective primary network architecture alterations from an external secondary network. As used herein, selective primary network architecture alterations refer to targeted, conditional, and policy-governed modifications to the structure, configuration, or behavior of a primary network, including but not limited to adjustments to routing logic, traffic flow, service availability, bandwidth provisioning, or deployment of network applications. As used herein, a primary network refers to a network infrastructure managed and administered by an enterprise, operator, or tenant, encompassing internal servers, endpoints, gateways, firewalls, and service components. A secondary network may be considered "external" relative to the primary network when the two networks are managed by different administrative domains or organizations, and/or use different network protocols, technologies, or control systems. Additionally, a secondary network may be external when its infrastructure is physically situated in a different physical location from the primary network. The primary network may be communicatively connected to the external secondary network such that data or signals may be transmitted between the two networks by means including, but not limited to, virtual private networks (VPNs), leased lines, direct interconnects, network address translation (NAT), application-level gateways, or one or more public networks.

As used herein, a network application refers to a software-based program or service that operates over a network to monitor, control, analyze, secure, or manage data traffic, user activity, or infrastructure components. A network application may include, but is not limited to, firewalls, content filters, intrusion detection or prevention systems (IDS/IPS), parental control services, bandwidth shaping tools, or telemetry agents for traffic monitoring and analytics. Such applications may perform tasks such as enforcing access policies, restricting undesirable content, detecting malicious behavior, logging activity for auditing or compliance purposes, or optimizing network performance. In some embodiments, the network application may operate within the primary network or externally within a secondary network, and may interact with the primary network via secure, policy-governed mechanisms such as APIs, tunnels, or designated communication ports. In certain cases, the network application may be provided by a vendor as a managed or SaaS-based solution hosted outside the primary network and integrated through conditional access.

As used herein, a secondary network refers to an external or third-party-managed network system (e.g., such as a vendor platform, partner network, or cloud-managed application service) that operates outside the administrative boundary of the primary network and interacts with the primary network in a controlled or restricted manner. The secondary network may be owned or operated by a vendor or service provider separate from the first entity administering the primary network, and may include resources such as external servers, virtual infrastructure, or software-defined networking components. Interactions between the secondary network and the primary network may be facilitated through secure interfaces, authenticated tunnels, or policy-governed APIs, and may support use cases such as telemetry, content filtering, intrusion detection, or external service provisioning. The secondary network may host one or more network applications configured to operate in coordination with components of the primary network, subject to authorization, opt-in permissions, and compliance safeguards.

Some embodiments may involve enabling a system or agent within the secondary network to initiate, request, or trigger changes to components, configurations, or services in the primary network. These changes may include, for example, enabling or disabling services, modifying routing paths, injecting application-layer logic, redirecting traffic flows, or provisioning bandwidth. In some embodiments, such alterations may be governed by predefined policies, opt-in permissions, or conditional triggers such as network events, security alerts, or administrative requests. The interaction between the external secondary network and the internal primary network may be mediated by secure APIs, orchestration frameworks, or policy enforcement gateways to ensure that control remains aligned with user intent, compliance mandates, and system safeguards. These alterations may be implemented across software-defined networks, hybrid cloud infrastructures, or federated service environments and may operate asynchronously or in real-time.

Some disclosed embodiments involve, in a primary network hosted by a first entity and configured to service a plurality of customers, enabling a vendor running a network application in a secondary network to connect to the primary network. Hosting may include maintaining physical infrastructure, managing virtualized environments (e.g., cloud-hosted platforms), or delegating operation responsibilities to managed service providers while retaining administrative authority. As used herein, a first entity may refer to an organization, enterprise, service provider, or administrative domain that owns, controls, or operates the primary network infrastructure. The first entity may manage physical or virtual network components, enforce network policies, and provide connectivity or services to internal or external users. A plurality of customers may refer to multiple independent users, organizations, tenants, or client environments that are serviced by the primary network. These customers may include subscribers to a multi-tenant service platform, enterprise departments, or organizational divisions that rely on the primary network for network access, resource sharing, or policy enforcement. A vendor refers to an external service provider, third-party operator, or authorized non-customer entity that develops, deploys, manages or supplies one or more network applications intended for use within or in connection with the primary network. A vendor may typically operation from a secondary network under separate administrative control and offer functionalities including, but not limited to, firewalling, traffic inspection, content filtering, honeypot deployment, security analytics, application monitoring, or threat detecting. The vendor may retain administrative responsibility for the hosted application while coordinating with the primary network to enable policy-compliant interactions or service delivery.

As used herein, a network application in a secondary network may refer to an application or service operated by a vendor in a distinct network environment external to the primary network. The secondary network may be under separate administrative control or ownership and may be implemented in a public cloud, private infrastructure, or hybrid environment. The network application may be configured to provide services such as firewalling, traffic monitoring, honeypot detection, data loss prevention, content filtering, bandwidth shaping, or performance analytics. For example, a vendor-operated intrusion detection system hosted in the secondary network may connect to the primary network to inspect selected traffic segments; a SaaS-based secure web gateway may be integrated into the primary network to enforce outbound traffic filtering; or a network monitoring tool may aggregate telemetry data from primary network components to generate reports on usage, anomalies, or compliance.

In some disclosed embodiments, the network application is a SaaS application. As used herein, a SaaS application (Software-as-a-Service application) refers to a software-based service hosted and managed in a remote environment, typically cloud-based, and accessed over a network by users or systems. A SaaS application may be provided by a vendor and may include services such as secure web gateways, firewalls, intrusion detection systems, data loss prevention tools, or performance analytics platforms. These applications may be designed to operate externally from the primary network but may interface with it through APIs, tunnels, or managed service endpoints. For example, a SaaS-based firewall platform may inspect and filter traffic routed from the primary network; a monitoring tool may analyze telemetry collected from primary network components; or a compliance engine may evaluate data movement policies across federated systems. The SaaS architecture allows vendors to maintain, update, and scale the application independently, while providing network services to the primary network on demand or via subscription.

In some disclosed embodiments, the network application includes a honeypot. As used herein, a honeypot refers to a decoy system, service, or resource intentionally designed to attract malicious activity or unauthorized access attempts in order to detect, analyze, or mitigate security threats. In the context of a network application operating within a secondary network, the honeypot may simulate vulnerable endpoints, misconfigured services, or exploitable protocols to lure threat actors or malware. When connected to the primary network, the honeypot may be used to observe probing behavior, log attack vectors, or trigger automated defenses without exposing actual production systems. For example, a vendor-operated honeypot hosted in a cloud-based secondary network may integrate with the primary network to monitor ingress attempts from suspicious IP ranges or detect lateral movement attempts from compromised devices. Honeypots may be configured to operate passively (for observation) or actively (for containment and response) and may contribute telemetry to centralized threat intelligence or security analytics systems.

In some disclosed embodiments, the network application includes a firewall. As used herein, a firewall refers to a network security system, software, or device configured to monitor, control, or filter incoming and outgoing network traffic based on predefined security rules or policies. In the context of a network application operated within a secondary network, the firewall may be managed by a vendor and configured to enforce traffic inspection, access control, intrusion prevention, or other security functions on behalf of the primary network. When connected to the primary network, the firewall may selectively intercept or process traffic based on attributes such as source, destination, protocol, content, or behavior. For example, a vendor-operated cloud-based firewall may be connected to the primary network to block known malicious IP addresses, enforce application-layer filtering, or apply geographic restrictions to inbound traffic. The firewall may support dynamic policy updates from the primary network and may integrate with orchestration or logging services to support compliance, monitoring, or incident response functions.

In some disclosed embodiments, the network application includes a content filter. As used herein, a content filter refers to a software-based mechanism configured to monitor, restrict, allow, or modify access to digital content transmitted through the primary network, based on predefined policies or rules. A content filter in the context of a network application within a secondary network refers to a service or software module operated by a vendor external to the primary network, configured to inspect, control, or restrict content traversing the primary network according to predefined filtering rules or organizational policies. The content filter may receive or intercept network traffic from the primary network (e.g., such as web requests, email messages, or file downloads) and analyze such traffic for compliance with filtering criteria, including but not limited to URL categories, MIME types, file extensions, keyword patterns, or data leakage risks. A content filter may analyze data packets, URLs, domain names, file types, or payload content to determine whether specific information should be delivered, blocked, redirected, or logged. Filtering criteria may include content categories (e.g., adult material, gambling, social media), reputation scores, keyword patterns, MIME types, or compliance attributes. For example, a content filter may block access to streaming video sites during business hours, strip executable attachments from inbound emails, or enforce safe search settings for educational institutions. In another example, the content filter may log access attempts to restricted websites for audit purposes or apply user- or group-based policies to allow differentiated filtering levels across organizational departments. The content filter may operate in line with traffic flows or through integration with proxy services, DNS resolvers, or security gateways.

In some disclosed embodiments, the network application is configured to access at least one of customer data, network flow data, and data associated with security events. Such access may be enabled to facilitate network optimization, security enforcement, anomaly detection, or compliance auditing, and may be governed by predefined policies, access controls, or consent mechanisms defined by the first entity.

As used herein, customer data may refer to information generated, stored, or transmitted by individual customers of the primary network, including but not limited to user credentials, configuration files, application usage data, metadata, or communication records. For example, customer data may include login credentials used to access cloud-hosted services, user-specific configuration files for VPN connections, telemetry logs from enterprise software used by a specific tenant, metadata about access patterns to internal APIs, or archived communication records such as email headers or chat transcripts between users. This data may reside in user-assigned storage regions, transit through internal gateways, or be collected for auditing, support, or security analysis purposes, depending on organizational policies and user consent.

Network flow data refers to aggregated records or metadata describing the movement of packets or sessions within the primary network, including information such as source and destination IP addresses, ports, protocols, packet counts, byte volumes, timestamps, and traffic patterns. For example, a flow record may indicate that a user device (192.168.1.20) initiated a 500 MB HTTPS session (TCP port 443) to an external server (172.217.12.206) at 10:03 AM and sustained it for 6 minutes. In another example, network flow data may reveal repeated SSH connection attempts from a foreign IP address across multiple internal hosts, which could signal a brute-force attack pattern. In yet another case, flow data may identify bandwidth consumption spikes on a specific VLAN used for video conferencing, prompting dynamic reallocation of bandwidth to maintain call quality.

Data associated with security events refers to information that reflects or characterizes potential or confirmed security incidents within the network, such as intrusion attempts, malware signatures, anomaly detection logs, failed authentications, or policy violations. For example, a network application such as a cloud-based firewall may access network flow data to identify unusual outbound traffic patterns, while a honeypot service may log and analyze unauthorized access attempts indicative of a security breach. In another example, a content filtering service may access customer data to apply user-specific access rules or audit logs based on compliance requirements. As used herein, security events refer to any observable occurrences or system-reported indicators within the network that may signal a deviation from normal operation, suggest malicious activity, or trigger a security response. Security events may include, but are not limited to, unauthorized access attempts, detection of malware or viruses, anomalies in traffic behavior, policy violations, suspicious login patterns, configuration changes, data exfiltration attempts, or alerts generated by intrusion detection systems (IDS), firewalls, endpoint protection platforms (EPP), or security information and event management (SIEM) tools. For example, a spike in failed login attempts from a foreign IP address may constitute a brute-force attack event; detection of outbound traffic to a known command-and-control server may indicate malware activity; and a firewall rule override at an unusual hour may be flagged as a policy violation requiring investigation. Security events may be detected, logged, analyzed, or acted upon by the network application operating within the secondary network, depending on configured permissions, and monitoring scope.

Some disclosed embodiments involve enabling the vendor to provide the network application as a service in the primary network. As used herein, providing the network application as a service in the primary network may refer to permitting execution, availability, or integration of the vendor's network application—originally hosted or controlled in a secondary network—within the operational environment of the primary network, such that it performs its designated functions for one or more customers of the primary network. This may include deploying service hooks, traffic redirection mechanisms, or secure interfaces that allow the vendor's application to monitor, filter, inspect, or respond to traffic, events, or data flows within the primary network. For example, the vendor may operate a cloud-based firewall service that the primary network integrates by forwarding selected traffic to the vendor's infrastructure; or the vendor may provide a honeypot that is logically instantiated within the primary network boundary but maintained through the secondary network. In such embodiments, the vendor is an external service provider that retains control over the application logic while allowing its service functionality to be invoked or consumed within the primary network according to agreed policies or permissions.

Providing the application "as a service" may involve logically extending the application's operational reach into the primary network using secure connections (e.g., tunnels, API endpoints, or controllable ports), while maintaining external control, updates, or scaling by the vendor. In contrast to merely "connecting" the application to the primary network for isolated interaction or data exchange, offering the application as a service may involve maintaining ongoing availability, service orchestration, user-specific policy handling, or multi-customer or multi-tenant access from within the primary network environment. For example, a cloud-based firewall may be presented to the primary network as an on-demand policy enforcement service invoked for specific traffic flows; or a threat detection engine operated by the vendor may be continuously available to analyze telemetry from all opted-in customers. This service model enables centralized operation and maintenance by the vendor while allowing the primary network to benefit from externally managed capabilities under fine-grained control, permissions, and policy enforcement.

In some disclosed embodiments, enabling the vendor running the network application in the secondary network to connect to the primary network includes opening a controllable port in the primary network. As used herein, connecting to the primary network refers to establishing a logical, secure, and policy-governed communication channel from a network application operating in a secondary network to components or services within the primary network. This connection may be transient or persistent and may support bidirectional or unidirectional data exchange, enabling the network application to access, monitor, process, or influence traffic, configurations, or data within the primary network. The connection may be mediated through secure APIs, VPN tunnels, message brokers, or dedicated gateway interfaces, and may be subject to authentication, authorization, and auditing.

As used herein, opening refers to the act of configuring a network component, such as a firewall, gateway, or router within the primary network, to permit data transmission through a previously restricted or closed communication path. This may involve allowing specific protocols (e.g., TCP, UDP), IP address ranges, or port numbers to pass traffic, and may be performed automatically, manually, or through an orchestration system. Opening may be temporary or persistent, and may be triggered by policy, schedule, or detection of predefined conditions.

As used herein, a controllable port refers to a logical communication endpoint—typically identified by a port number and associated protocol—that is subject to administrative, policy-based, or dynamic control within the primary network. A controllable port may be opened, closed, throttled, redirected, or otherwise managed in response to security rules, access permissions, system state, or vendor interactions. Control may be exercised by a cloud management application, an API gateway, firewall rules, or other enforcement mechanisms to ensure that access through the port is authorized and conforms to organizational or regulatory requirements.

In some disclosed embodiments, opening a controllable port in the primary network may include modifying firewall configurations, access control lists (ACLs), or routing rules to permit selective inbound or outbound communication with a network application operating in the secondary network. The port may correspond to a designated protocol (e.g., TCP port 443 for HTTPS, or UDP port 1194 for VPN) and may be opened conditionally based on predefined policies, authentication, or situational triggers such as scheduled service windows, administrative approval, or event detection. For example, the primary network may include a policy-enforced firewall or secure gateway that ordinarily blocks all external access to internal services. Upon detection that a verified vendor is running a network application such as a honeypot or firewall in the secondary network, the cloud service management application may initiate a process to open port 8443 on a specific gateway for bidirectional HTTPS traffic. This operation may be time-bounded, associated with session tokens, or coupled with role-based access controls to mitigate unauthorized access.

Some disclosed embodiments involve enabling a first customer to connect to a first set of external servers to thereby establish a first network architecture and enabling a second customer to connect to a second set of external servers to thereby create a second network architecture. As used herein, a first customer refers to a distinct tenant, user, business unit, or administrative entity serviced by the primary network, where each customer may operate under independent configurations or service agreements. Customers may represent separate organizations in a multi-tenant environment, or subdivisions within a single enterprise.

The term enabling a customer to connect may refer to provisioning, authorizing, or facilitating network-layer or application-layer communication between a customer's internal endpoints and designated external servers, either directly or through intermediate proxies, gateways, or virtual network functions. This connection may be established through virtual private network (VPN) links, secure tunnels, software-defined networking (SDN) routes, or policy-based redirection rules.

A first set of external servers may refer to one or more network-accessible computing systems that reside outside the administrative boundary of the primary network and are assigned to or associated with the first customer. These servers may be operated by a vendor, cloud provider, third-party service, or business partner and may offer services such as firewalling, telemetry aggregation, application filtering, analytics, or user authentication.

To establish a first network architecture, as used herein, refers to configuring or instantiating a topology and routing scheme in which network traffic for the first customer is selectively routed through, or interacts with, the first set of external servers. This architecture may include policy enforcement, security filtering, telemetry logging, or traffic shaping operations defined by the primary network or the customer. The resulting network behavior may differ per customer and may dynamically adjust in response to policy changes or operational conditions.

Similarly, a second set of external servers may represent a distinct group of externally hosted services, separate from the the first set, and selected or assigned for use by a second customer. The second customer may correspond to another tenant, department, or policy domain within the same primary network.

To create a second network architecture, as used herein, refers to configuring or instantiating a topology and routing scheme in which network traffic associated with the second customer may be selectively routed through, or interact with, the second set of external servers. Like the first network architecture, the second may include policy enforcement, telemetry, traffic shaping, or filtering tailored to the second customer's needs. While both architectures may follow similar implementation models, they may differ in the specific external services used, customer policies applied, or performance objectives pursued. The first and second network architectures may coexist in parallel, be instantiated dynamically per session or tenant, and may operate concurrently in a segmented or multi-tenant environment.

In an example, in a multi-tenant enterprise environment, a first customer may be a financial department within the organization. The system may enable the first customer to connect to a first set of external servers operated by a third-party fraud detection vendor. As a result, the system establishes a first network architecture in which all outgoing financial transaction data is routed through the vendor's anomaly detection service for inspection and reporting before reaching external destinations.

Meanwhile, a second customer, such as the human resources department, may be enabled to connect to a second set of external servers that host cloud-based document verification and identity management services. The system creates a second network architecture that enforces outbound traffic routing through those external services, applies content filtering, and logs user activity for compliance.

In both cases, the different routing paths, security services, and external integrations form distinct network architectures tailored to the needs and policies of each customer—while being centrally orchestrated and securely managed by the primary network. This is an illustrative example and is not intended to be limiting; other implementations may vary based on organizational structure, customer roles, types of external services, and network configuration policies.

Some disclosed embodiments involve receiving from at least some of the plurality of customers serviced by the primary network opt-in confirmations for the network application. As used herein, opt-in confirmations refer to explicit indications of consent or approval provided by users, customers, or entities to authorize a specific action, service, or data interaction. Such confirmations may be captured through user interfaces, API responses, digital signatures, configuration settings, or authenticated acknowledgments. Opt-in mechanisms are typically implemented to ensure informed consent, enhance transparency, and comply with privacy, security, or regulatory requirements. In the context of opt-in confirmations for the network application, the term refers to affirmative permissions granted by one or more customers of the primary network, authorizing the operation, data access, or interaction of a particular network application (e.g., content filtering, traffic analysis, or threat detection) as offered or managed by a vendor operating in a secondary network. These confirmations may enable the network application to inspect traffic, process user data, apply policy enforcement, or provide services that would otherwise be restricted without user authorization. The opt-in process may be applied per customer, per device, per service, or per session and may include conditions, scopes, or revocation capabilities defined by the customer or the primary network administrator.

Some disclosed embodiments involve limiting use of the network application within the primary network to the at least some of the plurality of customers from whom opt-in confirmations were received. As used herein, limiting refers to the act of restricting, constraining, or selectively enabling the functionality, scope, availability, or access of a system, service, or operation based on predefined criteria, conditions, or permissions.

In the context of limiting use of the network application within the primary network, the term refers to enforcing policy-based boundaries or permissions such that the network application—though technically capable of broader access—is only allowed to operate within designated scopes. This may involve technical enforcement mechanisms, such as access control lists (ACLs), role-based access restrictions, service-level segmentation, or tenant isolation, which restrict the application's ability to interact with certain data, resources, or network segments within the primary network.

In the context of limiting the network application to customers from whom opt-in confirmations were received, the limitation is applied based on user-specific consent. That is, only those customers of the primary network who have affirmatively provided opt-in confirmations are permitted to use, be served by, or be subject to the operations of the network application. For example, a threat detection service or parental control application may only inspect or analyze traffic for those customers who have explicitly authorized its use. All other traffic or user data would be excluded or bypassed by the application, ensuring that operation of the application remains consent-driven and compliant with user expectations and applicable regulations.

Figure 31:
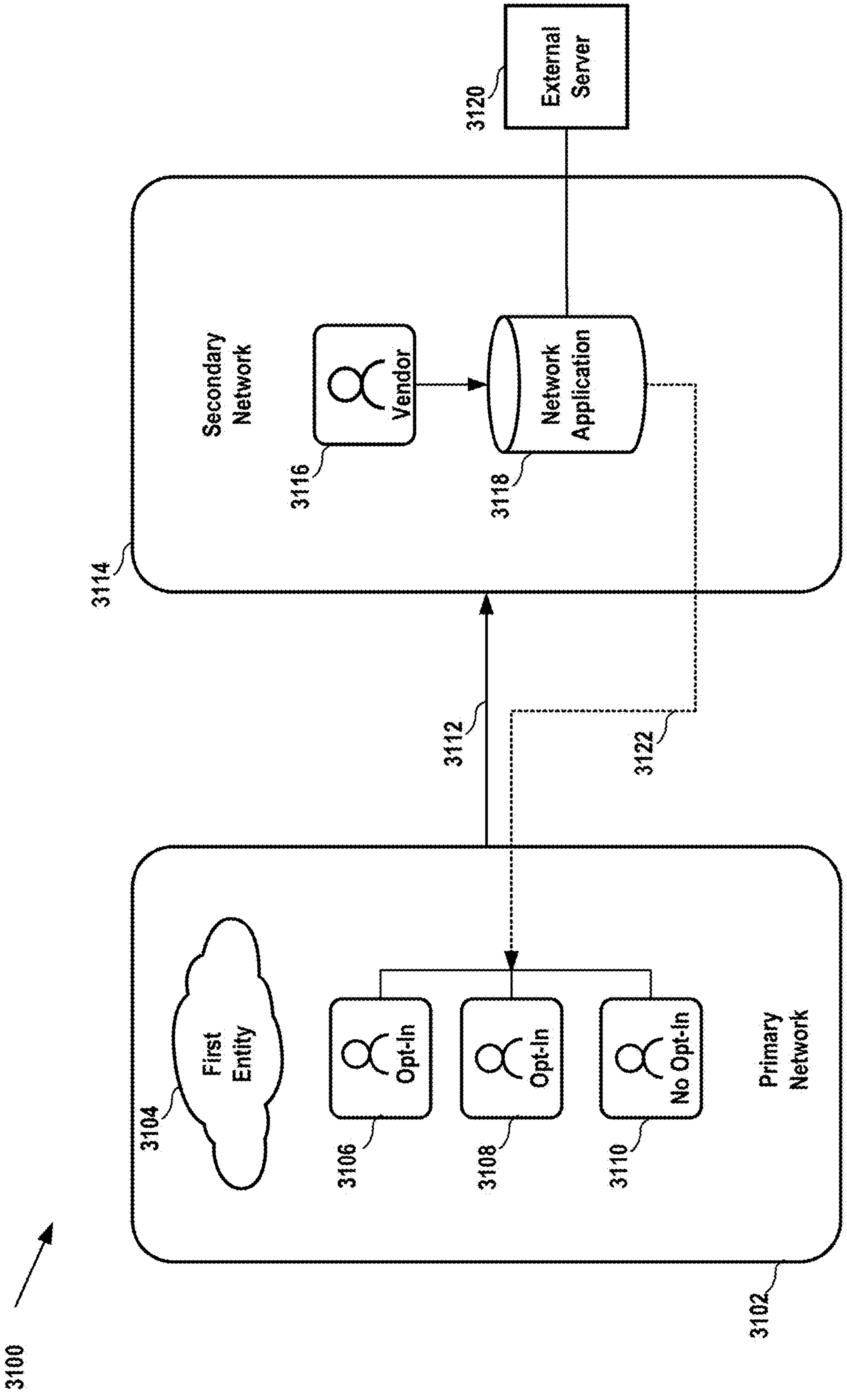
FIG. 31 is an exemplary schematic diagram of a system for enabling selective primary architecture alterations from an external secondary network, consistent with some disclosed embodiments.

FIG. 31 illustrates an exemplary system 3100 for enabling selective primary architecture alterations from an external secondary network, in accordance with some disclosed embodiments. The system 3100 comprises a primary network 3102 and a secondary network 3114 that are connected via a controlled communication link 3112. The communication link 3112 enables connections between the primary and secondary network architecture. The communication link 3112 may be implemented via an authenticated session, secure API, tunnel, or controlled network port.

The primary network 3102 may be hosted by a first entity 3104 and configured to service a plurality of customers. The plurality of customers are represented in this system by customer nodes 3106, 3108, and 3110. Each customer node may correspond to a distinct user, tenant, or client environment operating within the administrative domain of the primary network 3102. Some customers may have issued opt-in confirmations, such as customer nodes 3106 and 3108, indicating consent for participation in services provided by an external vendor 3116. Other customers, such as customer node 3110, have not opted-in and are therefore excluded from the services.

The secondary network 3114 may reside outside the administrative boundary of primary network 3102. The vendor 3116 operates a network application 3118 within the secondary network 3114 that may be configured to be provided as a service to the plurality of customers in primary network 3102. The network application 3118 may include, but is not limited to, services such as firewalls, content filters, parental controls, or monitoring controls. In some embodiments, network application 3118 may be hosted or extended by an external server 3120. The external server 3120 may support application execution, data storage, analysis, or coordination tasks and may operate under the vendor's control while remaining external to both the vendor and first entity.

The system 3100 may also include communication link 3122, which may control the use of the network application 3118. Communication link 3122 may limit the use of network application 3118 to customer nodes from whom opt-in confirmations are enabled. For example, customer nodes 3106 and 3108 may be permitted to route certain data through network application 3118, while access is blocked or redirected for customer node 3110.

System 3100 depicts an embodiment illustrating an arrangement of components. Alternative configurations may include additional layers of security, different forms of inter-network communication, or multiple vendors providing distinct application. The depicted architecture is not intended to be limiting.

In some disclosed embodiments, the network application is configured to run on an external server (e.g., 3120) in the secondary network (e.g., 3114), and wherein the operations further include enabling a connection between at least one server in the primary network (e.g., 3102) and the external server. As used herein, an external server refers to a computing system or network-accessible host that is located outside the administrative boundary of the primary network. It may be operated, owned, or managed by a third-party entity, such as a vendor or partner, and is not subject to direct administrative control by the first entity managing the primary network. An external server in the secondary network refers to a server that is part of the secondary network infrastructure, typically managed by the vendor or service provider, and configured to execute or host a network application. Such a server may reside in a public cloud environment (e.g., AWS, Azure), a private infrastructure operated by the vendor, or a dedicated third-party data center. The server communicates with the primary network through defined interfaces or protocols, subject to policy controls.

As used herein, a server in the primary network refers to a computing resource or system component that resides within the infrastructure managed by the first entity, which operates and administers the primary network. These servers may be physical or virtual machines tasked with executing services, hosting applications, storing customer data, enforcing policies, or facilitating communication between internal and external systems. In some embodiments, the servers may be configured to manage authentication, process network traffic, monitor telemetry, or apply bandwidth allocation rules in accordance with organizational preferences. The servers in the primary network may operate in conjunction with other internal devices or network elements and may also support interactions with external components or services as permitted by defined policies and security controls.

As used herein, enabling a connection between a server in the primary network and an external server may refer to authorizing, initiating, or configuring a secure communication channel (e.g., HTTPS, VPN, IPsec tunnel) between the two systems. This may involve provisioning network routes, opening firewall ports, authenticating endpoints, or exchanging credentials or certificates to establish trusted communication. The connection may allow for data exchange, command issuance, service invocation, or telemetry collection, in accordance with the operational intent of the network application and applicable policies.

In some disclosed embodiments, enabling the connection between the at least one server in the primary network and the external server includes authorizing the external server. As used herein, an external server refers to a computing system, resource, or service endpoint that is located outside the administrative boundary of the primary network and is operated by an entity other than the one managing the primary network. The external server may reside in the secondary network, such as within a vendor-managed cloud infrastructure, third-party data center, or partner network. It may be configured to run network applications or provide services—such as content filtering, intrusion detection, or monitoring—that interact with the primary network under secure and policy-governed conditions. The external server may communicate with components in the primary network through controlled interfaces, such as designated ports, APIs, or authenticated tunnels, as permitted by organizational policies.

As used herein, authorizing refers to the act of granting permission, access rights, or trust to a system, user, or component to perform certain operations, access specific resources, or participate in a defined set of interactions. Authorization may be implemented through mechanisms such as access control lists (ACLs), role-based access controls (RBAC), digital certificates, tokens, or policy-based access frameworks. In the context of authorizing the external server, the term refers to the process by which the primary network validates and permits the external server—operated outside its administrative domain—to establish communication and execute designated functions. This may include verifying the identity of the external server using digital certificates or cryptographic tokens, checking that the external server complies with pre-defined security policies, and assigning it a scope of allowed operations (e.g., filtering certain traffic types, accessing specific telemetry data, or enforcing a content policy). Authorization may be static (e.g., predefined in a configuration file) or dynamic (e.g., triggered by a real-time request evaluated against policy rules), and may be time-limited, revocable, or conditional based on system state, customer consent, or network context.

In some disclosed embodiments, the connection between the at least one server in the primary network and the external server includes a tunnel. As used herein, a tunnel refers to a secure, logical communication channel established between two endpoints, such as a server in the primary network and an external server in the secondary network. The tunnel facilitates the encapsulation and transmission of network traffic over existing network infrastructure while preserving confidentiality, integrity, and, in some cases, authentication of the transmitted data. The tunnel may be encrypted using protocols such as IPSec, SSL/TLS, or WireGuard and may encapsulate application-layer traffic, telemetry, or control messages within secure transport containers. The tunnel may operate across public or private networks and may be instantiated using technologies such as virtual private networks (VPNs), software-defined networking (SDN) overlays, or service mesh proxies. For example, a TLS-encrypted tunnel may be established between a cloud-based threat detection service hosted in a secondary network and an internal monitoring server in the primary network to securely transmit suspicious activity logs. In another example, a VPN tunnel may be created between an external firewall provider and an edge device in the primary network to allow real-time policy enforcement and diagnostics. The use of a tunnel enables controlled, authenticated, and secure communication between systems operating across network boundaries.

In some disclosed embodiments, the external server is authorized to run a parental control application. As used herein, a parental control application refers to a type of network application configured to monitor, restrict, or manage access to internet content, services, or applications based on predefined rules or user profiles, typically for the purpose of protecting minors or enforcing usage policies. When operated from an external server in a secondary network, the parental control application may inspect traffic originating from or destined for the primary network and apply filtering rules, time-of-day access limits, content categorization, or activity logging. For example, the parental control application may block access to adult or inappropriate websites, restrict streaming video access during school hours, or generate usage reports grouped by user profiles or devices. In some embodiments, the parental control application may enforce customizable policies per household, device type, or customer identity, and may integrate with the primary network through secure APIs, tunnels, or controllable ports. The functionality may be delivered as a cloud-based service operated by a vendor and enabled selectively for specific customers of the primary network.

Figure 32:
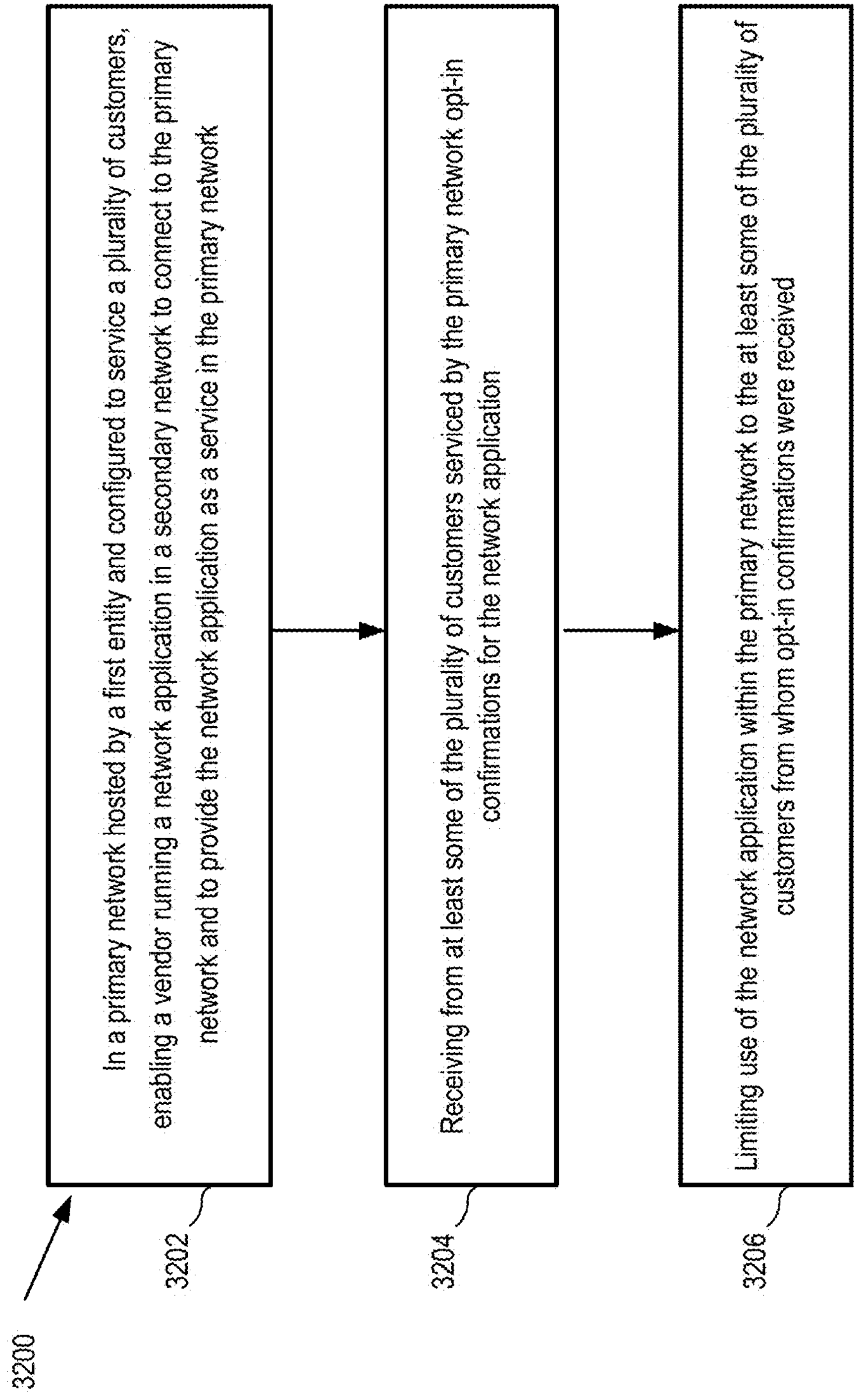
FIG. 32 is a flowchart of an example process for enabling selective primary network architecture alterations from an external secondary network, consistent with some disclosed embodiments.

FIG. 32 is a flowchart of example process 3200 for enabling selective primary network architecture alterations from an external secondary network, consistent with some disclosed embodiments. In some embodiments, process 3200 may be performed by at least one processor (e.g., processor 102 in FIG. 1) to perform operations or functions described herein. In some embodiments, some aspects of process 3200 may be implemented as software (e.g., program codes or instructions) that are stored in a memory (e.g., memory 104) or a non-transitory computer readable medium. In some embodiments, some aspects of process 3200 may be implemented as hardware (e.g., a specific-purpose circuit). In some embodiments, process 3200 may be implemented as a combination of software and hardware.

Referring to FIG. 32, process 3200 may include a step 3202 of in a primary network hosted by a first entity and configured to service a plurality of customers, enabling a vendor running a network application in a secondary network to connect to the primary network and to provide the network application as a service in the primary network. This connection allows controlled integration of external services with the primary network while maintaining administrative separation and policy-based access.

Process 3200 may include a step 3204 of receiving from at least some of the plurality of customers serviced by the primary network opt-in confirmations for the network application. The opt-in confirmations indicate the affirmative consent of ones of the plurality of customers to utilize the network application. These confirmations may be collected through user interfaces, APIS, or configuration settings, and ensure the network application may only be activated or permitted for customers who have explicitly authorized its operation.

Process 3200 may include a step 3206 of limiting use of the network application within the primary network to the at least some of the plurality of customers from whom opt-in confirmations were received. This may be enforced via policy control, access restrictions, or service segmentation to ensure that the network application operates exclusively within authorized scopes and complies with customer-specific permissions.

Some disclosed embodiments involve performance of operations for dynamically selecting egress locations in a network. Selecting refers to choosing, picking, or electing one or more items or options from a group. For example, selecting may include choosing an option based on a criterion, purpose or preference. Dynamic refers to a characteristic or capability to change, act, or respond to one or more conditions, stimuli, or circumstances, and/or during runtime.

Dynamically selecting may include, for example, choosing something at runtime or based on current conditions. For example, dynamically selecting may include choosing a first option based on a first set of circumstances or variables and choosing a second, different option based on a second, different set of circumstances or variables.

A location refers to a position, point, area, and/or site, and may include a physical location, a logical (e.g., virtual) location, a network setting and/or profile, and/or any other attribute affecting interconnectivity between a plurality of network nodes and/or resources, as described elsewhere herein. An egress refers to an exit or way out. For example, an egress may include data leaving a system, network, or node. An egress location may include a point at which data or signals leave or from which data or signals are transmitted. For example, an egress location may include a gateway, router, firewall, server, or any other suitable hardware and/or software component. A network (e.g., a communications network) refers to any type of physical, wired, wireless computer, or hybrid arrangement of interconnected devices used to exchange data, as described elsewhere herein. Thus, performance (e.g., implementation) of operations for dynamically selecting egress locations in a network by at least one processor may ensure that a network's egress location(s) are dynamically selected based on or in response to one or more conditions or stimuli.

By way of non-limiting example, at least one processor may include one or more central devices (e.g., a processor 3302) configured to execute instructions stored in a memory (e.g., database 3304) to perform operations for dynamically selecting egress locations in a network. Further, non-limiting examples of egress locations may include a server in server cluster 3306, such as server 3308 and/or server 3310.

Some disclosed embodiments involve determining a first egress location for data transfer from a first server in the network to an application external to the network.

Determining refers to arriving at an outcome, as described elsewhere herein. Data or a data structure refers to any collection of data values and relationships among them, as described elsewhere herein. Transfer refers to moving something from one place or system to another. For example, data transfer may include moving or transmitting digital information (e.g., data) from one system or device to another. Consequently, an egress location for data transfer may include a hardware or software point through which data may pass. In some embodiments, the egress location may be controlled or may facilitate the flow of network traffic therethrough. A server refers to a computing device interconnected with additional computing devices in a computing network for providing access to one or more services, data, additional computing devices (e.g., client devices and/or additional servers), and/or any other type of computing resource, as described elsewhere herein. An application refers to a set of computer code instructions, a software program, instructions contained in hardware, and/or collection of programs designed to perform specific tasks or functions, as described elsewhere herein. External refers to a characteristic of being situated on the outside or coming from outside a particular system, place, or organization. For example, external to a network may include any hardware or software component that can communicate with the network while not being included in the network. Consequently, an application external to a network may include any application running on or being hosted on a device or system that is not included in the network. Thus, determining a first egress location for data transfer from a first server in the network to an application external to the network by at least one processor includes choosing, by the at least one processor, a server from among the servers in the network to act as an egress location for data transfer to an application running on or hosted by a device not included in the network.

Figure 34:
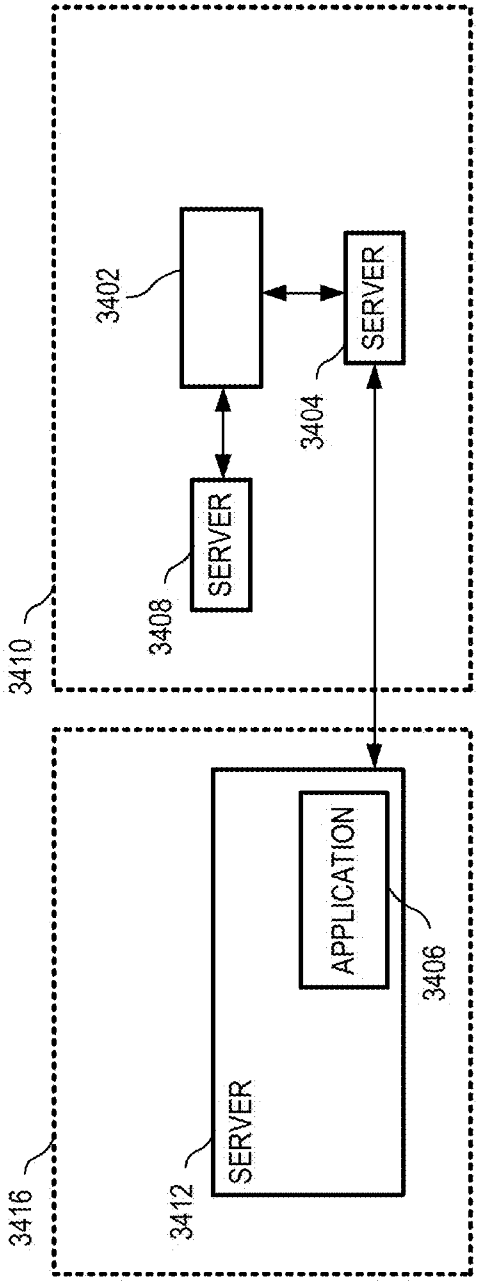
FIGS. 34 and 35 illustrate an exemplary schematic diagram of a system for dynamically selecting egress locations in a network, consistent with some disclosed embodiments.

By way of non-limiting example and with reference to FIG. 34, processor 3402 may determine a first egress location for data transfer from a first server 3404 to application 3406, consistent with disclosed embodiments. Processor 3402, server 3404, and a server 3408 may be in a first network 3410. Server 3412, which runs or hosts application 3406, may be in a second, external network 3416 relative to network 3410. For example, one network may be considered an external network relative to another network when the two networks are managed by different administrative domains or organizations and/or use different network protocols and/or technologies. Further, one network may be considered an external network relative to another network when the two networks are physically situated (e.g., the devices of the network) in different locations. A network may be communicatively connected to an external network such that data or signals may be transmitted between one network and an external network, including by means of virtual private networks (VPNs), leased lines, direct interconnects, network address translation (NAT), application-level gateways, and/or one or more public networks.

In general, it may be appreciated by one having ordinary skill in the art that processor system 3402 may comprise processor 3302, database 3304, any other processor, any other memory component, or any combination of the foregoing. Further, although FIG. 34 depicts processor 3402 determining the egress location at server 3404, one having ordinary skill in the art would appreciate that any server in network 3410 may be selected to act as an egress location, as further described and exemplified below.

In some disclosed embodiments, the network is a secure access service edge (SASE) network. A SASE network refers to a computer network that combines network connectivity with cloud-based security services as a unified and scalable cloud solution, as described elsewhere herein.

Figure 33:
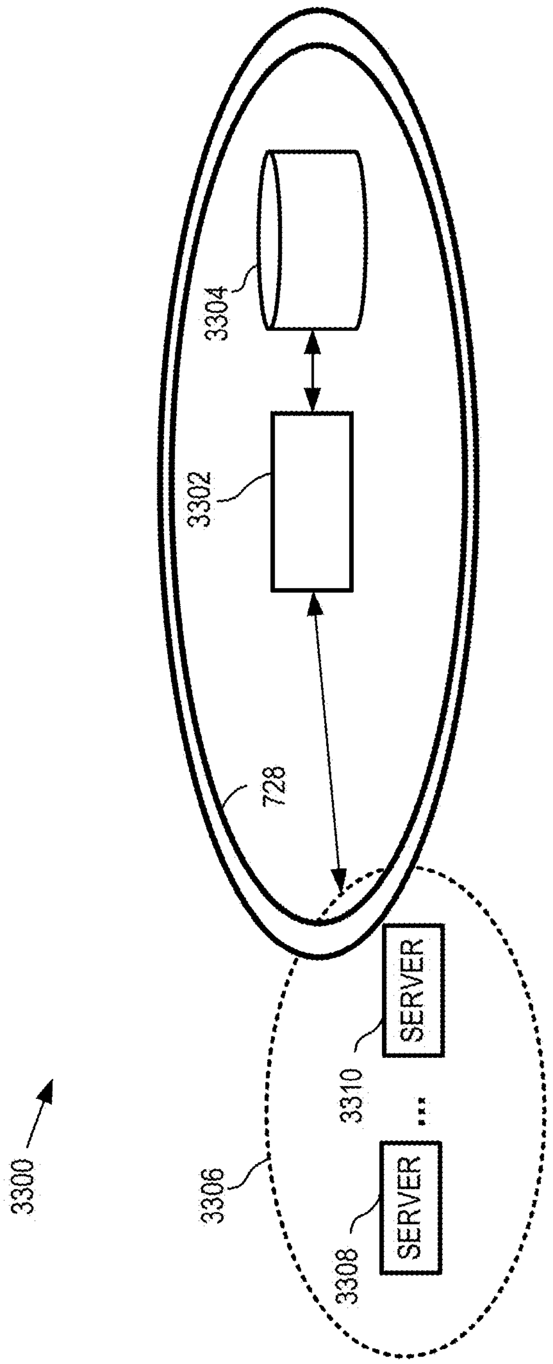
FIG. 33 illustrates an exemplary schematic diagram of a system for dynamically selecting egress locations in a network, consistent with some disclosed embodiments.

By way of non-limiting example and with reference to FIG. 33, network 3300 may be a SASE network. Further with reference to FIGS. 34 to 37, network 3410 may be a SASE network.

In some disclosed embodiments, the server is associated with a point-of-presence (PoP) for connecting to the external application via an additional network external to the SASE network. A point-of-presence (PoP) refers to a physical or virtual access point where a network or system can connect to another network or system. For example, a PoP may include network hardware, such as routers, switches, servers, or any other suitable equipment. One example of a PoP may include a server or a server cluster, as described elsewhere herein. A PoP may enable connectivity, data exchange, and traffic routing between networks or between users and services. A server associated with a PoP may include a server acting as a PoP, a server connected to a PoP, or a server configurable to act as a PoP. Connecting in this context refers to establishing and/or maintaining a communication path between a system or network and an external system or network. For example, connecting may include creating a secure and/or reliable communication path between a server in a first network with an application running in a second, different network. Additional refers to a characteristic of being separate, extra, or supplementary. For example, an additional network external to an SASE network may include a separate, extra network that is added on top of or is communicatively operating with an existing SASE network. The additional network may supplement the SASE network by serving a specific purpose, such as running an application external to the SASE network. Via refers to by way of, through, or using a particular route, medium, or method. For example, via a network may include using the network to facilitate the transmission or access of data. Thus, a server associated with a PoP for connecting to an external application via an additional network external to an SASE network may include the server acting as a PoP through which the SASE network can interact with (e.g., transmit data between) an application running on another network external to (e.g., not included in, separate) the SASE network.

By way of non-limiting example and with reference to FIG. 34, server 3404 may act as the PoP for connecting to external application 3406 (of network 3416) from SASE network 3410. Further, although FIG. 34 depicts server 3404 as the PoP, one having ordinary skill in the art would appreciate that any server in network 3410 may act as the PoP, as further described and exemplified below.

Some disclosed embodiments involve sending network traffic to the external application via the first egress location. Sending refers to transferring or conveying data, signals, or information from one system, device, or location to one or more others. For example, sending may be similar to transmitting, as described elsewhere herein. Network traffic refers to data transmitted over a network between two or more computing devices (e.g., clients, servers, routers, and/or any other connected computing device), as described elsewhere herein. Via an egress location may include using the egress location to facilitate the transmission or access of data. Thus, sending network traffic to the external application via the first egress location by at least one processor may include transmitting or routing some or all network traffic intended for the external application through or via the egress location.

By way of non-limiting example and with reference to FIG. 34, processor 3402 may coordinate or manage network traffic intended to be sent to external application 3406 such that the network traffic leaves network 3410 via the determined first egress location (e.g., server 3404). In such an example, network traffic intended to be sent to external application 3406 may be exclusively sent via the first egress location (e.g., server 3404). Alternatively, in such an example, network traffic intended to be sent to external application 3406 may be sent via the first egress location (e.g., server 3404) and one or more other egress locations (e.g., server 3408), with the first egress location acting as a primary or main egress location through which a plurality or majority of network traffic is sent.

Some disclosed embodiments involve determining a first data transfer condition associated with the first egress location. A condition refers to a current state, status, or situation of something. For example, if a condition may describe how something is functioning, operating, or appearing at a given time. A data transfer condition may include a condition or state associated with transferring data. For example, a data transfer condition may include a latency condition, a packet loss condition, a network security condition, a jitter condition, a virtual or physical distance to the receiving device or application, a network congestion state, a connection stability, an interface status condition, network reachability, or any other suitable variable. Further, a first data transfer condition associated with the first egress location may include a condition during or predicted to be during data transfer via the first egress location. Thus, determining a first data transfer condition associated with the first egress location by at least one processor may comprise determining a state or a predicted state during data transfer via the first egress location.

By way of non-limiting example and with reference to FIG. 34, processor 3402 may determine a first data transfer condition while using server 3404 as a first egress location, such as during a testing window for a predetermined amount of time. Additionally or alternatively, processor 3402 may be configured to predict a first data transfer condition if server 3404 were acting as an egress location.

Some disclosed embodiments involve determining at least one alternative data transfer condition associated with at least one alternative egress location and the external application. Alternative refers to a characteristic of being a different option, choice, and/or possibility instead of another. For example, an alternative data transfer condition may include a data transfer condition, as described above, that is different than the first data transfer condition. Further, an alternative egress location may include an egress location that is associated with a different hardware or software PoP. Thus, determining at least one alternative data transfer condition associated with at least one alternative egress location and an external application by at least one processor may include determining a predetermined or predicted state during data transfer via the at least one alternative egress location. For example, at least one processor may predict, using predetermined information stored in a memory or using a predictive model, a state of one or more components in the network and/or the network overall if data transfer were occurring via the at least one alternative egress location.

Figure 35:
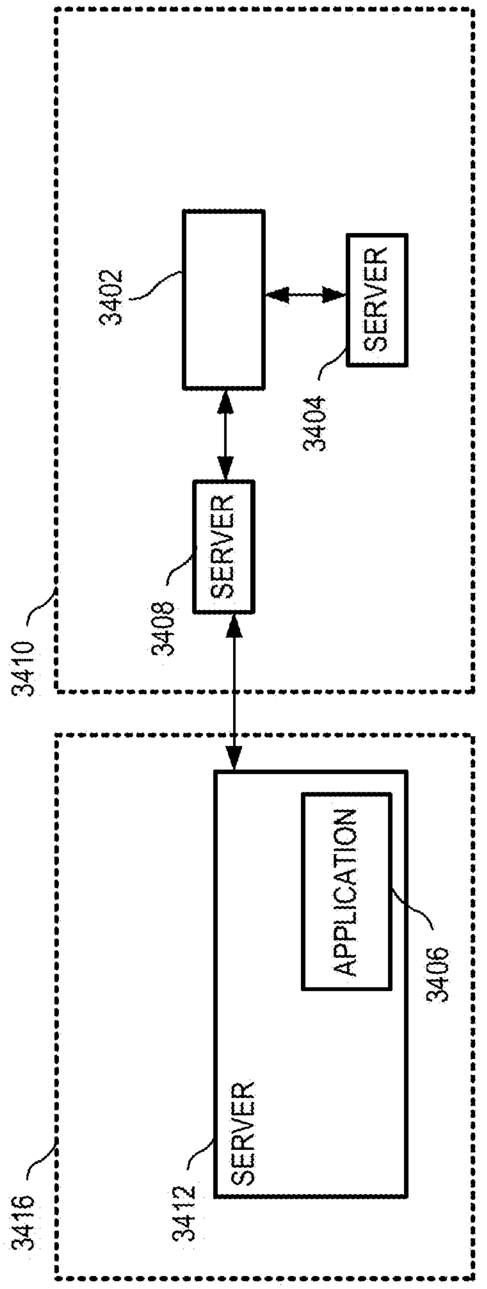

By way of non-limiting example and with reference to FIG. 35, processor 3402 may determine an alternative data transfer condition while using server 3408 as an alternative egress location, such as during a testing window for a predetermined amount of time. Additionally or alternatively, processor 3402 may be configured to predict an alternative data transfer condition if server 3408 were acting as an egress location. Although FIG. 35 only depicts a single alternative egress location, one having ordinary skill in the art would appreciate that network 3410 may include any number (e.g., 1, 2, 3, etc.) of alternative egress locations.

Some disclosed embodiments involve comparing the first data transfer condition with the alternative data transfer condition to ascertain whether the alternative data transfer condition constitutes an improvement. Comparing refers to examining two or more things to identify similarities, differences, or relative values. For example, comparing may include evaluating how a current condition differs from or matches a previous or expected condition, the results of which may inform decisions or trigger actions. Ascertaining refers to finding out, discovering, or determining something with a degree of certainty. For example, ascertaining may include investigating, measuring, or verifying if something is true. An improvement refers to a change or addition that makes something better, more effective, more efficient, or more valuable. For example, an improvement may include an increase in performance, functionality, quality, usability, or any other quantifiable or perceivable aspect. Constituting an improvement may describe something that forms, represents, or amounts to a positive change or is better than another. For example, a first option may constitute an improvement over a second option if the first option results in higher performance, lower cost, reduced storage, or other advantageous differences, compared to the second option. Consequently, ascertaining whether something constitutes an improvement may include determining, to a predetermined degree of certainty, that a first thing is better than a second thing in at least one way or characteristic. Thus, comparing the first data transfer condition with the alternative data transfer condition to ascertain whether the alternative data transfer condition constitutes an improvement by at least one processor may include determining if the alternative data transfer condition is better than the first data transfer condition in at least one way or characteristic.

By way of non-limiting example and with reference to FIGS. 34 and 35, processor 3402 may compare the first data transfer condition associated with server 3404 acting as a first egress location with the alternative data transfer condition associated with server 3408 acting as an alternative egress location. Processor 3402 may utilize one or more different criteria to determine whether the alternative data transfer condition constitutes an improvement, as further described and exemplified below.

In some disclosed embodiments, the improvement is associated with shorter communication latency. Latency refers to a time delay between when a request for data is made and when the response or data begins to arrive. For example, communication latency may include a delay in data transmission between two endpoints, such as a server and an external application, and may be measured in milliseconds. Further, communication latency may include a transmission delay, a propagation delay, a processing delay, queuing delay, or any other length of time associated with data transfer. Thus, an improvement associated with shorter communication latency may include a condition (e.g., alternative data transfer condition) having a shorter communication latency than another condition (e.g., first data transfer condition), thereby constituting an improvement over the first condition.

By way of non-limiting example and with reference to FIGS. 34 and 35, processor 3402 may determine a first communication latency associated with using server 3404 as a first egress location and an alternative communication latency associated with using server 3408 as an alternative egress location. Processor 3402 may compare the first and alternative communication latencies to determine which one is shorter, thereby constituting an improvement over the other.

In some disclosed embodiments, the improvement is associated with a reduction in packet loss. A packet refers to a unit of data formatted for transmission over a network, as described elsewhere herein. Packet loss refers to a failure of one or more data packets to reach their intended destination. For example, packet loss may be caused by network congestion, faulty hardware, software bugs or misconfigurations, signal degradation, firewall or security filtering, and/or buffer overflow in switches or routers. Reduction refers to an act or process of making something smaller, less, or lower in amount, degree, size, or intensity. For example, reduction may include decreasing some measurable quantity or state. Thus, an improvement associated with a reduction in packet loss may include a lower amount of packet loss associated with an alternative condition (e.g., alternative data transfer condition) that is lower (e.g., fewer data packets lost) compared to a first condition (e.g., first data transfer condition), thereby constituting an improvement over the first condition.

By way of non-limiting example and with reference to FIGS. 34 and 35, processor 3402 may determine a first amount of packet loss associated with using server 3404 as a first egress location and an alternative amount of packet loss associated with using server 3408 as an alternative egress location. Processor 3402 may compare the first and alternative amounts of packet loss to determine which one has a reduction in packet loss, thereby constituting an improvement over the other.

In some disclosed embodiments, the improvement is associated with network security. Security refers to practices, technologies, and/or policies designed to protect the integrity, confidentiality, and/or availability of data and/or systems that are transmitted or accessed, as described elsewhere herein. Network security may include security of and/or for a network, including any connected devices and/or associated data, as described elsewhere herein. Thus, an improvement associated with network security may include network security associated with an alternative condition (e.g., alternative data transfer condition) that is better compared to a first condition (e.g., first data transfer condition), thereby constituting an improvement over the first condition. For example, network security associated with a first condition may be better than network security associated with a second condition when the network security associated with a first condition more accurately enforces security policies, provides more detailed or granular visibility into traffic or behavior, is better at detecting and responding to threats, supports stronger authentication, encryption, or integrity checks, reduces false positives/negatives in threat detection, or is better in any other characteristic or parameter associated with network security.

By way of non-limiting example and with reference to FIGS. 34 and 35, processor 3402 may determine a first level of network security associated with using server 3404 as a first egress location and an alternative level of network security associated with using server 3408 as an alternative egress location. Processor 3402 may compare the first and alternative levels of network security to determine which one is higher (e.g., higher fidelity), thereby constituting an improvement over the other.

In some disclosed embodiments, the improvement is associated with a reduction in jitter. Jitter refers to a variation in the time delay between data packets as they travel across a network. For example, jitter may include any inconsistency caused by network congestion, routing changes, queueing delays at routers or switches, or hardware or software buffering. A reduction in jitter may include a smaller variation. Thus, an improvement associated with a reduction in jitter may include an amount of jitter associated with an alternative condition (e.g., alternative data transfer condition) is lower (e.g., smaller variations) compared to a first condition (e.g., first data transfer condition), thereby constituting an improvement over the first condition.

By way of non-limiting example and with reference to FIGS. 34 and 35, processor 3402 may determine a first amount of jitter associated with using server 3404 as a first egress location and an alternative amount of jitter associated with using server 3408 as an alternative egress location. Processor 3402 may compare the first and alternative amounts of jitter to determine which one has a reduction in jitter, thereby constituting an improvement over the other.

In some disclosed embodiments, the improvement is associated with a migration of the application external to the network from a first server external to the network to a second server external to the network.

A migration refers to a process of moving data, applications, or systems from one environment, platform, or location to another. For example, a migration from a first server to a second server may include transferring an application from being hosted by or running on the first server to being hosted by or running on the second server. Migrating an application from one server to another server may change the distance data needs to travel between the application and a server. Thus, an improvement associated with a migration of the application external to the network from a first server external to the network to a second server external to the network may include an improvement caused by migrating the application from a first server to a second server that is faster or physically situated closer to the network. For example, such an improvement may include technical benefits such as reduced latency, improved performance, enhanced reliability or availability, scalability, geographic compliance or data sovereignty, or cost optimization.

Figure 36:
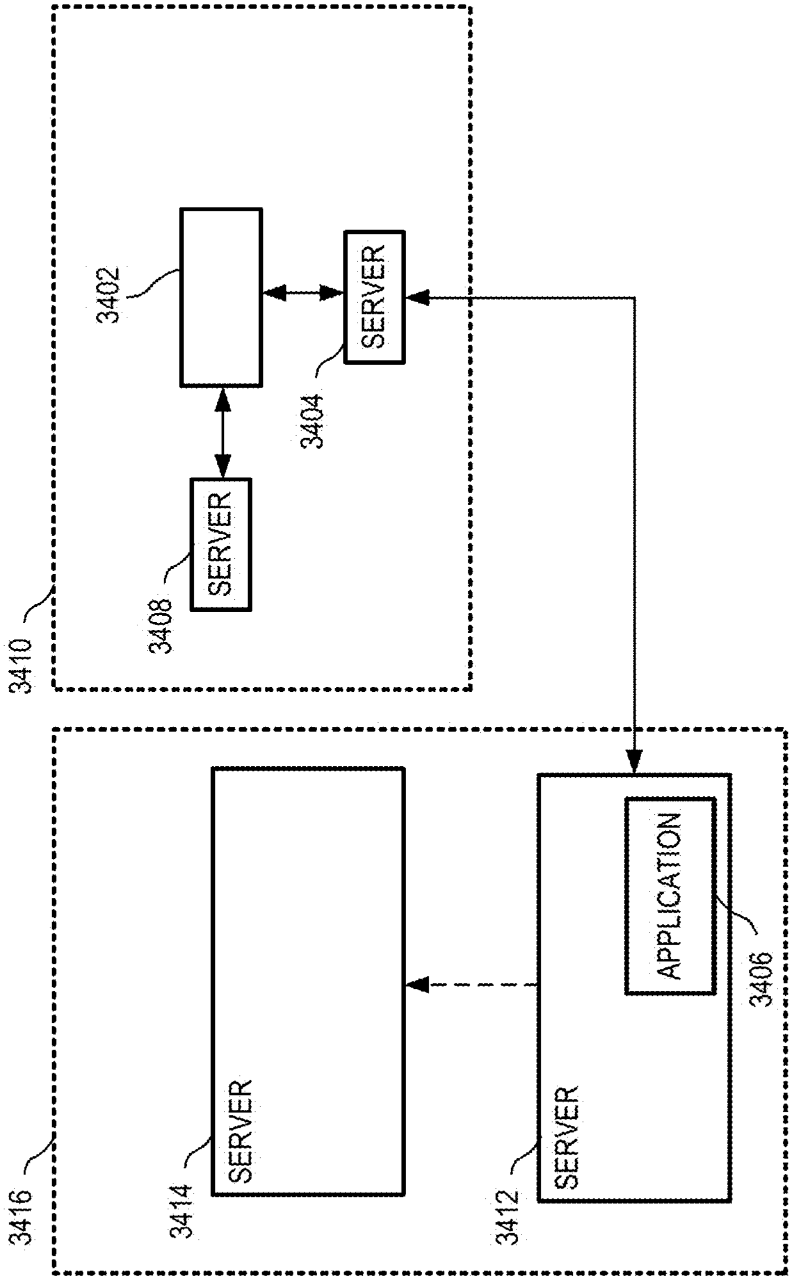
FIGS. 36 and 37 illustrate an exemplary schematic diagram of a system for dynamically selecting egress locations in a network, consistent with some disclosed embodiments.
Figure 37:
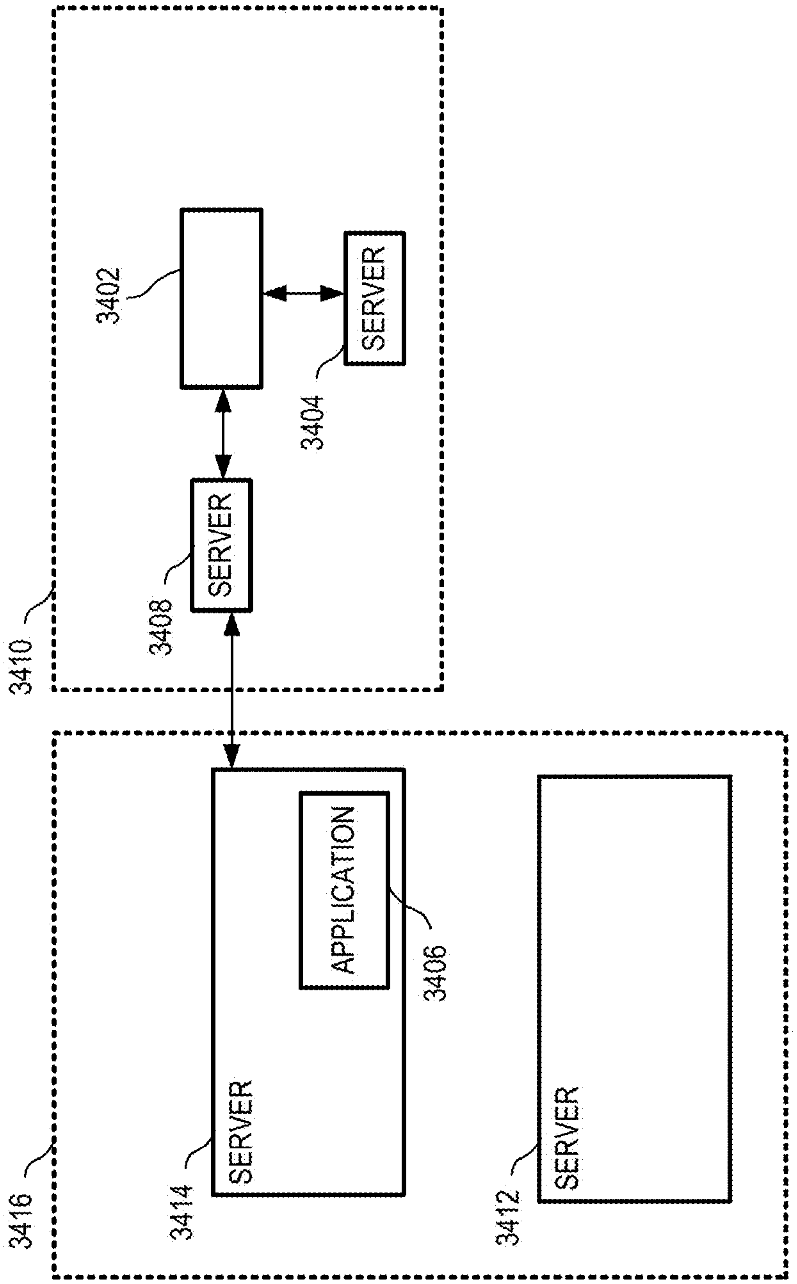

By way of non-limiting example and with reference to FIGS. 36 and 37, server 3412 may migrate application 3406 to server 3414. In such an example, processor 3402 may compare a first data transfer condition associated with using first server 3404 with a second data transfer condition associated with using alternative server 3408 to determine which one constitutes an improvement over the other.

Some disclosed embodiments involve, when the alternative data transfer condition is ascertained to constitute an improvement, rerouting the network traffic to the external application via the at least one alternative egress location. When an alternative data transfer condition is ascertained to constitute an improvement may include a specific criterion that is satisfied when at least one processor determines or ascertains that the alternative data transfer condition constitutes an improvement over the first data transfer condition.

Rerouting refers to changing the path or route that data, traffic, and/or a request takes from its source to its destination. For example, rerouting traffic may include dynamically or manually diverting traffic away from an original route to an alternative route. Further, rerouting network traffic to an external application via at least one alternative egress location may include at least one processor commanding devices to transmit some or all network traffic to the external application via the at least one alternative egress location instead of the first egress location. Thus, when the alternative data transfer condition is ascertained to constitute an improvement, rerouting the network traffic to the external application via the at least one alternative egress location by at least one processor may comprise redirecting some or all network traffic intended for the external application from exiting the network via the first egress location to exiting the network via the at least one alternative egress location.

By way of non-limiting example and with reference to FIGS. 34 and 35, processor 3402 may, in response to ascertaining that the alternative data transfer condition (e.g., associated with server 3408) constitutes an improvement over a first data transfer condition (e.g., associated with server 3404), reroute at least some network traffic from the first egress location (e.g., associated with server 3404) to the at least one alternative egress location (e.g., associated with server 3408). In some examples that include a plurality of alternative egress locations, processor 3402 may reroute a proportion of network traffic to each of the at least one alternative egress locations. For example, processor 3402 may symmetrically reroute network traffic between the plurality of alternative egress locations (e.g., 50% to a second server and 50% to a third server). Alternatively, processor 3402 may asymmetrically reroute network traffic between the plurality of alternative egress locations (e.g., 25% to a second server and 75% to a third server). Further, in examples in which only some of the network traffic is rerouted to the at least one alternative egress locations, processor 3402 may similarly symmetrically or asymmetrically reroute network traffic among the egress locations.

In some disclosed embodiments, each of: determining the first data transfer condition, determining the at least one alternative data transfer condition, comparing the first data transfer condition with the alternative data transfer condition, and rerouting the network traffic to the external application via the at least one alternative egress location, occurs continuously in real time, thereby continuously rerouting network traffic via different egress locations in response to changing data transfer conditions.

Occurring refers to happening or taking place. Continuously refers to a characteristic of an action or process that happens without interruption, without stopping, or in an ongoing, unbroken manner over time, it being understood that that an ongoing process punctuated by nominal interruptions or delays due to system limitations may be considered continuous in this context. Real time refers to the immediate or near-immediate processing, transmission, or response to data or events as they happen, with minimal or no noticeable delay or within a guaranteed time frame. For example, occurring continuously in real time may describe one or more processes or actions happening constantly with minimal delay. Different refers to a characteristic of being not the same as something else. For example, different elements may be distinct in nature, form, quality, or identity. Further, different egress locations may include at least two different egress locations that occupy different physical or virtual spaces or are associated with different devices. In response to refers to as a reaction to, as a result of, or because of something that happened or was received. For example, in response to may describe a cause-and-effect relationship in which one action or event triggers another. Changing refers to undergoing a transformation, modification, or transition from one state, form, condition, or value to another. For example, changing data transfer conditions may include dynamic or varying factors that affect how, when, or whether data is transmitted between systems, devices, or networks. Thus, processes occurring continuously in real time, thereby continuously rerouting network traffic via different egress locations in response to changing data transfer conditions may include performing operations concurrently such that the network is capable of dynamically adapting to constantly changing or shifting data transfer conditions.

By way of non-limiting example, processor 3402 may determine a first data transfer condition (e.g., associated with server 3404), determine the at least one alternative data transfer condition (e.g., associated with server 3408), compare the first data transfer condition with the alternative data transfer condition, and reroute the network traffic to the external application (e.g., application 3406) via the at least one alternative egress location (e.g., associated with server 3408) such that the aforementioned operations occur continuously in real time. In such an example, processor 3402 may continuously reroute network traffic intended for external application 3406 between egress locations (e.g., server 3404, 3408) in response to changing data transfer conditions associated with egress locations.

Some disclosed embodiments involve identifying at least one alternative egress location using a predictive model based on network traffic. Identifying refers to recognizing, ascertaining, and/or discovering, as described elsewhere herein. A predictive model refers to a process that considers patterns in past data to make educated guesses about what might happen next. For example, a predictive model may involve machine learning, as described elsewhere herein. Using a predictive model may include applying a trained algorithm or statistical method to analyze current or past data in order to forecast future outcomes, behaviors, or conditions. Based on refers to using something as a foundation, reference, and/or source of information to inform a decision, judgment, prediction, or action. Thus, identifying at least one alternative egress location using a predictive model based on network traffic by at least one processor may include the at least one processor analyzing network traffic to make a prediction used identify at least one alternative egress location.

In some disclosed embodiments, the predictive model is based on network traffic during a specific day of a week. During refers to throughout the course of, or at some point in the time span of a particular event, process, or condition. Specific refers to a characteristic of being particular, clearly defined, identified, or limited. A day of a week refers to one of the seven named periods that make up a standard week: Monday, Tuesday, Wednesday, Thursday, Friday, Saturday, or Sunday. Further, a day of a week may refer to a type of day, such as a weekday or weekend. For example, network traffic during a specific day of a week may include any network traffic that occurs during a given day of a week, and data associated with network traffic during different days of a week may be stored in different memory locations. Thus, the predictive model being based on network traffic during a specific day of a week may include taking into account, during an analysis, a specific day of a week associated with the network traffic. The analysis may thereby identify at least one alternative egress location.

In some disclosed embodiments, the predictive model is based on network traffic during a specific time of day. A time of day refers to a specific point or period within a day. For example, a specific time of day may include a specific hour and minute (e.g., 3:00 pm) or a specific range of time (e.g., morning, afternoon, evening, 3:00 pm to 4:10 pm). Thus, the predictive model being based on network traffic during a specific time of day may include taking into account, during an analysis, a specific time of day (or time frame during the day) associated with the network traffic. The analysis may thereby identify at least one alternative egress location.

In some disclosed embodiments, the predictive model is based on network traffic during a specific month of a year. A month of a year refers to one of the twelve named divisions that make up a calendar year, typically January, February, March, April, May, June, July, August, September, October, November, or December. Further, a month of a year may include a number of months, such as a season, i.e., spring, summer, autumn, winter. Thus, the predictive model being based on network traffic during a specific month of a year may include taking into account, during an analysis, a specific month of a year associated with the network traffic. The analysis may thereby identify at least one alternative egress location.

In some disclosed embodiments, the predictive model being based on network traffic associated with a characterization of the application external to the network. Characterization refers a description, identification, one or more defining distinctive features, qualities, or attributes of something. A characterization of an application may include a description and/or analysis of an application's features, performance, behavior, and/or qualities. For example, a characterization of an application may include an egress location via which the network communicates with an external application. Further, a characterization of an application may include functional features, performance metrics, behavior under load, security properties, reliability and availability, compatibility and environment, user experience, and/or any other suitable characteristic of an application. Network traffic associated with a characterization of an application may include network traffic that is linked to or interpreted in light of the characterization of the application, including an associated egress location. Thus, a predictive model based on network traffic associated with a characterization of an application external to the network may include taking into account, during an analysis, an external application and/or an egress location with which the network traffic is associated. The analysis may thereby identify at least one alternative egress location.

By way of non-limiting example, processor 3302 may host or run the predictive model, and database 3304 may store data relating to network traffic of network 3300. Processor 3302 may retrieve the data relating to network traffic and input said data into the predictive model to identify at least one alternative egress location. The data may be labeled or divided based on which specific day of the week, time of day, or month of the year during which the network traffic occurs or is transmitted. Additionally or alternatively, the data may involve a characterization of an application external to the network, such as via which egress location (e.g., server 3308, 3310) network traffic to and from the external application (e.g., application 3406) is transmitted.

Figure 38:
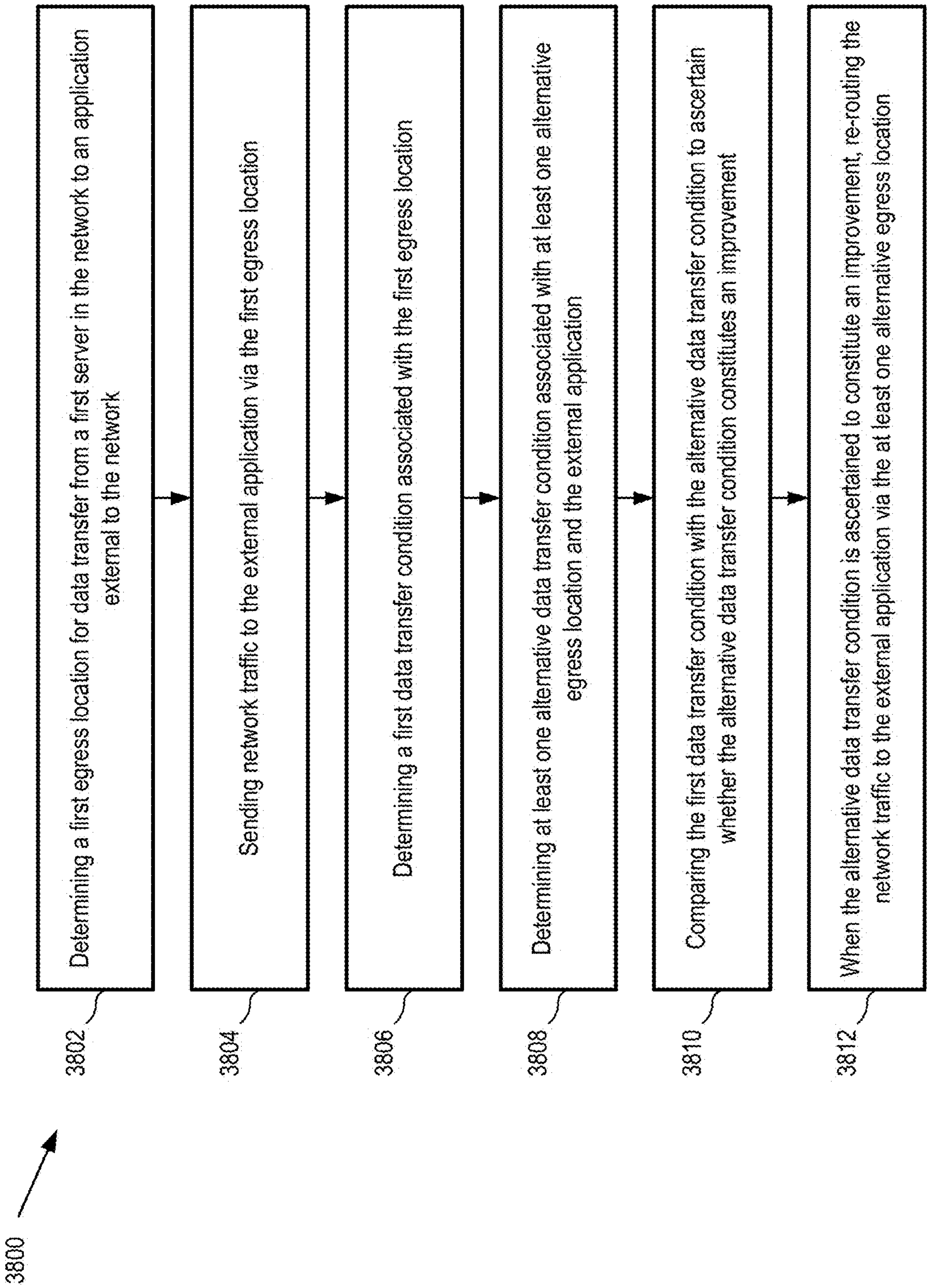
FIG. 38 is a flowchart of an example process for dynamically selecting egress locations in a network, consistent with some disclosed embodiments.

FIG. 38 is a flowchart of example process 3800 for performing operations for dynamically selecting egress locations in a network, consistent with some disclosed embodiments. In some disclosed embodiments, process 3800 may be performed by at least one processor (e.g., processor 102 in FIG. 1) to perform operations or functions described herein. In disclosed some embodiments, some aspects of process 3800 may be implemented as software (e.g., program codes or instructions) that are stored in a memory (e.g., memory 104) or a non-transitory computer readable medium. In disclosed some embodiments, some aspects of process 3800 may be implemented as hardware (e.g., a specific-purpose circuit). In some disclosed embodiments, process 3800 may be implemented as a combination of software and hardware.

Referring to FIG. 38, process 3800 may include a step 3802 of determining a first egress location for data transfer from a first server in the network to an application external to the network. By way of non-limiting example, in FIG. 34, at least one processor (e.g., processor 102 in FIG. 1) may determine a first egress location for data transfer from a first server (e.g., server 3404) in the network (e.g., network 3410) to an application external to the network (e.g., application 3406), consistent with described embodiments.

Process 3800 may include a step 3804 of sending network traffic to the external application via the first egress location. By way of non-limiting example, in FIG. 34, at least one processor (e.g., processor 102 in FIG. 1) may send network traffic to the external application (e.g., application 3406) via the first egress location (e.g., associated with server 3404), consistent with described embodiments.

Process 3800 may include a step 3806 of determining a first data transfer condition associated with the first egress location. By way of non-limiting example, in FIG. 34, at least one processor (e.g., processor 102 in FIG. 1) may determine a first data transfer condition associated with the first egress location (e.g., associated with server 3404), consistent with described embodiments.

Process 3800 may include a step 3808 of determining at least one alternative data transfer condition associated with at least one alternative egress location and the external application. By way of non-limiting example, in FIG. 34, at least one processor (e.g., processor 102 in FIG. 1) may determine at least one alternative data transfer condition associated with at least one alternative egress location (e.g., associated with server 3408) and the external application (e.g., application 3406), consistent with described embodiments.

Process 3800 may include a step 3810 of comparing the first data transfer condition with the alternative data transfer condition to ascertain whether the alternative data transfer condition constitutes an improvement. By way of non-limiting example, in FIG. 34, at least one processor (e.g., processor 102 in FIG. 1) may compare the first data transfer condition (e.g., associated with server 3404) with the alternative data transfer condition (e.g., associated with server 3408) to ascertain whether the alternative data transfer condition constitutes an improvement, consistent with described embodiments.

Process 3800 may include a step 3812 of, when the alternative data transfer condition is ascertained to constitute an improvement, re-routing the network traffic to the external application via the at least one alternative egress location. By way of non-limiting example, in FIG. 35, at least one processor (e.g., processor 102 in FIG. 1) may, when the alternative data transfer condition (e.g., associated with server 3408) is ascertained to constitute an improvement (e.g., compared to the first data transfer condition associated with server 3404), re-route the network traffic to the external application (e.g. application 3406) via the at least one alternative egress location (e.g., associated with server 3408), consistent with described embodiments.

Some disclosed embodiments involve client application-less operations for performing digital experience monitoring based on real user communications. Client application-less operations for performing digital experience monitoring based on real user communications refers to methods that enable the observation, analysis, and evaluation of user interactions with digital systems, applications, services, or content—without installing, requiring, or relying on any local application or software agent associated with the client to perform these methods—by leveraging data generated by or gathered from the users' real interactions with the digital systems, applications, services, or content.

A client is any computing entity that acts as a consumer in a communication or service exchange, typically by sending requests and receiving responses from a provider entity. A client may initiate interaction or consume resources or services, and a client may or may not rely on a centralized server. Types of clients may include: (1) a client device (as previously described an exemplified), such as a physical endpoint like a laptop, smartphone, or IoT device that connects to a network or server, (2) a client application, such as a web browser, email client, or API consumer that sends requests to a server or other provider entity, (3) thin client, which relies primarily on non-local resources for processing, (4) thick (fat) client, which relies primarily on local resources for processing, or (5) any other computing entity that acts as a consumer in a communication or service exchange. A client may communicate with a server, a service, a gateway/proxy, an edge node/edge device, another client, a peer, a local resource, or any other provider entity.

Applications are software systems or programs designed to perform specific functions, tasks, or services for end users, other software systems or programs, or devices. Applications may operate on hardware systems. Applications may be standalone or network-connected. Applications may include a subset of software operating at the application layer at a software stack and may rely on underlying system software (e.g., an OS) and hardware components (e.g., CPU, memory, disk) to function. Applications may include a graphical user interface (GUI) and may be directly interacted with by human users or real users (e.g., a word processor). Applications may perform automated or backend operations for other applications or devices (e.g., APIs, background services). Applications may require hardware resources to execute (e.g., CPU cycles, memory, storage, input interfaces, output interfaces), and applications may abstract the complexity of hardware, which may enable a user-friendly interface or service access layer. Some applications may be network-enabled, which may include communication across local or global networks (e.g., the Internet or enterprise LANs), reliance on network protocols (e.g., HTTP, SMTP, FTP) or exchange of data or services with other applications or systems (e.g., cloud services, client-server architecture). Applications may be distributed (e.g., microservices), web-based, or cloud-native, where network connectivity is central to their function.

Exemplary classifications of applications may include: (1) by function or use case, which may include: productivity applications (e.g., Microsoft Word, Google Docs, Microsoft Excel, Notion), communication applications (e.g., Zoom, Slack, Microsoft Teams, WhatsApp), web browsing applications (e.g., Google Chrome, Mozilla Firefox, Safari), multimedia applications (e.g., VLC, Adobe Photoshop, Spotify, GarageBand), gaming applications (e.g., Fortnite, Minecraft Candy Crush, Steam), security and privacy applications (e.g., Norton Antivirus, VPN client applications, Firewalls), finance applications (e.g., QuickBooks, PayPal, Mint, Venmo), file management applications (e.g., Dropbox, Google Drive, Windows File Explorer), development tools applications (e.g., Visual Studio, GitHub Desktop, Postman), or system utilities applications (e.g., Task Manager, Disk Cleanup, System Monitor), (2) by platform, which may include: desktop applications (e.g., Photoshop, Outlook, LibreOffice), mobile applications (e.g., Instagram, TikTok, Google Maps), web-based applications (e.g., Gmail, Trello, Salesforce), cloud-native applications (e.g., AWS Lambda-based apps, Google Workspace), embedded applications (e.g., Smart TV software, IoT firmware, car infotainment), or hybrid/cross-platform applications (e.g. Flutter applications, Electron applications), (3) by execution environment, which may include: user-facing GUI applications (e.g., Calculator, Zoom, Microsoft Word), headless/background applications (e.g., Windows Service, cron jobs, antivirus daemons), client-side applications (e.g., iOS Mail, Adobe Acrobat), server-side applications (e.g., Node.js server, Apache HTTP server), containerized/microservice applications (e.g., Dockerized applications, Kubernetes pods), or virtualized applications (e.g., VMware-hosted apps, Citrix apps), (4) by licensing or delivery model, which may include proprietary applications (e.g., Microsoft Office, Adobe Creative Suite), open source applications (e.g., GIMP, VLC, LibreOffice), freemium applications (e.g., Spotify, Grammarly, Zoom), subscription-based (SaaS) applications (e.g., Salesforce, Microsoft 365, Figma), or on-premise applications (e.g., Oracle DB, legacy ERP systems), or (5) any other are software systems or programs designed to perform specific functions, tasks, or services for end users, other software systems or programs, or devices.

A client application is an application that is designed to run on a client-side system—such as a user device (e.g., laptops, smartphones, tablets), an edge device (e.g., gateways, local compute nodes), or a virtualized environment—and that interact with digital systems, applications, services, or remote servers to request, consume, or render data, content, or services. A client application may run on a plurality of client-side systems. Client applications may operate in standalone or network-connected configurations and may rely on application layer software, system software (e.g., operating systems, middleware), and hardware resources (e.g., CPU, memory, storage) of a client device (as previously described and exemplified) to function. Client applications may present a graphical user interface (GUI) for direct interaction with human users (e.g., web browsers, productivity tools), or they may operate in the background to perform automated interactions on behalf of users or other software systems (e.g., synchronization services, update agents, API client applications). Client applications may implement or consume network protocols (e.g., HTTP, WebSocket, FTP, DNS) to communicate with one or more servers, cloud-based services, or distributed systems in a client-server or peer-to-peer architecture. Client applications may be installed as native software (e.g., desktop or mobile apps), accessed through a web browser (e.g., web applications), or deployed within containerized or virtualized environments. Client applications may be part of larger distributed application ecosystems (e.g., cloud-native or microservices-based platforms).

Client application-less operations refer to computing or network-based processes that are performed without requiring the installation, execution, or involvement of a dedicated client application on a user device, edge device, or other client-side environment. Client application-less operations may be performed externally—such as at the network layer, through intermediaries like gateways or proxies, or via passive observation—and may be performed without interacting with, altering logic within, or embedding logic within a client application. Client application-less operations may be performed at any network accessible location, system, or service that is positioned to observe, intercept, or analyze real user communications without requiring involvement from a client application. Client application-less operations may be performed by intermediary, backend, or infrastructure systems, which may not include an edge device. Locations where client application-less operations may occur include: cloud-based platforms, on-premises infrastructure (e.g., gateway appliances, routers, firewalls monitoring ingress/egress traffic, network taps/port mirrors that feed network traffic to passive monitoring systems), service provider networks (e.g., ISP-managed telemetry systems, SD-WAN hubs), virtualized or containerized environments (e.g., virtual middleboxes or service chains in network function virtualization (NFV) frameworks, Kubernetes sidecars/service meshes that analyze application-layer traffic), security or performance monitoring systems (e.g., network performance monitoring (NPM) tools, digital experience monitoring systems that infer experience via passive observation), or any other location that may perform computing or network-based processes that are performed without requiring the installation, execution, or involvement of a dedicated client application on a user device, edge device, or other client-side environment.

Digital experience encompasses the totality of all interactions and perceptions a user has when engaging with digital technologies, which may include performance, usability, accessibility, visual design, responsiveness, satisfaction, and any other measurement of user interactions or perceptions. Digital experience may refer to the overall quality and effectiveness of a user's interaction with digital systems, applications, services, or content, which may include websites, applications, devices, or online platforms. Digital experience may encompass how users perceive, navigate, and are impacted by digital interfaces and services across any device or channel. Components of digital experience may include:

(1) performance, which may be described as measuring how quickly and reliably a digital system, application, service, or content functions and may include measuring page load time, time to first byte (TTFB), latency, error rates, throughput, bandwidth, or any other performance metric pertaining to a user's interaction with a digital system, application, service, or content, (2) usability, which may be described as the ease with which a user can understand, navigate, or use a digital system, application, service, or content and may include measuring a task success rate, time on task, click pattern, interaction pattern, user error rate, or any other usability metric pertaining to a user's interaction with a digital system, application, service, or content, (3) responsiveness, which may be described as the speed with which a system reacts to user actions or changes in environment and may include measuring response time, input lag, frame rate, or any other responsiveness metric pertaining to a user's interaction with a digital system, application, service, or content, (4) consistency, which may be described as the uniformity of interaction patterns, visuals, or logic across touchpoints and may include measuring consistency through UI audits, UX audits, user surveys, or any other consistency metric pertaining to a user's interaction with a digital system, application, service, or content, (5) accessibility, which may be described as the ability with which users of different capabilities can user the digital system, application, service, or content effectively and may include measuring compliance scores, compatibility with assistive technology, accessibility with automated accessibility scanners (e.g., Axe or WAVE), or any other accessibility metric pertaining to a user's interaction with a digital system, application, service, or content, (6) content quality, which may be described as the clarity, relevance, accuracy, and usefulness of presented information and may include measuring readability scores, engagement metrics (e.g., bounce rates, time spent on content pages), feedback, ratings or any other content quality metric pertaining to a user's interaction with a digital system, application, service, or content, (7) user satisfaction, which may be described as the user's overall perception of value, ease, and enjoyment after interacting with the digital system, application, service, or content and may include measuring a net promotor score (NPS), customer satisfaction (CSAT), sentiment through sentiment analysis, churn rate, or any other user satisfaction metric, or (8) any other component or factor that may characterize the digital experience of a user.

Digital experience metrics may be collected through (1) passive monitoring, including capturing real user traffic and interactions (e.g., network taps, real user monitoring (RUM)), (2) active monitoring, including synthetic testing with scripted interactions to simulate users, (3) surveys and feedback, including direct user input via forms, pop-ups, or interview, (4) analytics platforms, including tools such as Google Analytics, Mixpanel, or Adobe Analytics, or (5) logs and telemetry, including system logs, error reports, and telemetry data, (6) any other method of measuring data that may characterize the digital experience of a user.

Digital experience monitoring (DEM) is the observation, measurement, or analysis of the performance and quality of user interactions with digital systems, applications, services, or content, from the perspective of the user. Digital experience monitoring may include a set of technologies and processes used to continuously measure and evaluate the end-user experience, focusing on the performance, availability, usability, and satisfaction pertaining to the user's interaction with digital systems, applications, services, or content. Digital experience monitoring may include: (1) real user monitoring (RUM), which may include the passive monitoring of real user interactions (e.g., load times, errors, behavior) and the capturing of diverse environments (e.g., devices, browsers, geographies), (2) synthetic monitoring, which may include testing with active, scripted tests that simulate user behavior and measuring performance from controlled locations and conditions (e.g., uptime tests, SLA checks), (3) endpoint monitoring, which may include observing metrics from the user's device (e.g., CPU, memory, app responsiveness), (4) network and infrastructure visibility, which may include measuring how network conditions affect user experience (e.g., latency, packet loss, routing) and may include WAN, SD-WAN, Wi-Fi, cloud, or SASE environments, (5) user feedback collection, which may include surveys (CSAT, NPS), session recordings, or sentiment analysis and may help to correlate technical performance with perceived experience, or (6) any other technology or process that may enable the observation, measurement, or analysis of the performance or quality of user interactions with digital systems, applications, services, or content.

A user refers to any entity—human or non-human—that interacts with a system, application, service, or device to perform actions, consume resources, or receive outputs. A user may include an agent—such as a person, software process, or device—that initiates or participates in interactions with a digital system, a digital application, a digital service, or digital content for the purpose of accessing functionality, data, or services. Exemplary classifications of users may include: (1) the nature of the user, including a human user, an automated user, a system user, or a device-as-user, (2) the interaction of the user, including an interactive user, a non-interactive user, a real user, or a synthetic user, (3) the access or privilege level of the user, including a guest user, a registered user, a privileged user, a power user, an administrator, a service account, a service user, a superuser, or a root user, (4) the role or purpose of the user, including an end user, an internal user, an external user, a test user, a developer, a developer user, or a support user, (5) the identity of authentication type of the user, including an anonymous user, an authenticated user, a federated user, a temporary user, or an ephemeral user, (6) the environment or channel of the user, including a web user, a mobile user, a desktop user, a local user, a remote user, or an API user, or (7) any other classification that may describe a type of user.

A real user refers to any entity—human or automated—that generates genuine, meaningful interactions with a digital system, application, service, or content within an environment intended for actual or realistic use. A real user may generate authentic behavioral, performance, or experience data, reflecting real usage patterns, devices, and network conditions. A real user may be a human end user who engages with a digital system or service in a real-world, unsimulated context—producing genuine input, traffic, and feedback that reflects their intent and experiences. Exemplary classifications of real users may include: (1) based on the role or relationship to the system of the real user, including an end user, an internal user, an external user, a customer, a citizen, or a constituent, (2) based on the access level or identity of the real user, including an anonymous user, an authenticated user, a federated user, or a guest user, (3) based on the usage context or intent of the real user, including a transactional user, an exploratory user, a power user, or an occasional user, (4) based on the device or access channel of the real user, including a web user, a mobile application user, a desktop application user, a multi-platform user, (5) based on the environment of the real user, including a remote user, an on-premises user, or a personal device user, (6) based on the engagement level of the real user, including an active user, an inactive user, a new user, or a returning user, or (7) any other classification that may describe a type of real user.

Real user communications refers to data exchanges—such as messages, requests, responses, or streams—generated as a result of interactions between real users and digital systems, applications, services, or content. Real user communications may occur in environments intended for actual or realistic use and may reflect authentic behavioral patterns, device conditions, network characteristics, and system contexts. Real user communications may include both initiated (e.g., a user clicking a link or submitting a form) and responsive (e.g., receiving a web page or data stream) exchanges. Real user communications may traverse various layers of the network or application stack, including protocols such as HTTP, TCP, WebSocket, or other protocols. Real user communications may be used to assess performance, digital user experience, or behavioral analytics in live or near-live conditions, in historical conditions, or in both.

Some disclosed embodiments involve monitoring network traffic from at least one non-edge device in a SASE network. Monitoring network traffic from at least one non-edge device in a SASE network refers to the process of observing, capturing, analyzing, or inspecting the network traffic (as previously described and exemplified) that originates from devices within a Secure Access Service Edge (SASE) network (as previously described and exemplified)—where the devices originating the monitored network traffic are not located at the network edge, but are internal or intermediate components within the network. Monitoring network traffic refers to the process of observing, capturing, analyzing, or inspecting data packets and communication flows moving across a network. Exemplary types of monitoring network traffic may include:

(1) passive monitoring, where network traffic is observed without altering the network traffic, which may be performed using packet sniffers, SPAN ports, network taps, or mirrored traffic, and which may be enabled by tools such as Wireshark, tcpdump, Zeek, or NetFlow/sFlow collectors, (2) active monitoring, where synthetic traffic is sent or a response to a probe is measured, which may be performed by generating test packets or simulating transactions, and which may be enabled by tools such as Ping, traceroute, or synthetic transaction generator, (3) inline monitoring, where traffic is intercepted and inspected as it flows through a live path, which may be performed where traffic passes through a device that monitors and may block or allow the network traffic, and which may be enabled by firewalls, secure web gateways, or inline data leakage prevention systems, (4) log-based monitoring, where metadata and logs related to network activity are analyzed, which may be performed by collecting logs from routers, firewalls, or cloud services, and may be enabled by SIEM systems (e.g., Splunk, Elastic) or flow log aggregators, (5) edge monitoring, which occurs at the network perimeter (e.g., firewall, gateway, SD-WAN edge and may monitor external communication, ingress traffic, and egress traffic, (6) internal monitoring, which occurs within the network core or segments (e.g., between VLANs, between applications) and may monitor East-west traffic or lateral movement, (7) cloud/remote monitoring, which involves observing traffic to and from cloud or remote services and may monitor SaaS access, API calls, or hybrid workloads, (8) packet-level monitoring, which involves deep inspection of raw packets, including headers and payload, and may be enabled by tools such as Wireshark or full packet capture appliances, (9) flow-level monitoring, which involves summarized traffic flows (e.g., NetFlow, IPFIX, sFlow) and may be enabled by tools such as SolarWinds, nProbe, or Cisco NetFlow,

(10) session/application-level monitoring, which may involve observing application behaviors or user sessions and may be enabled by tools such as APM tools (e.g., AppDynamics, Dynatrace) or proxy logs,

(11) behavioral monitoring, which may use machine learning or baselines to detect anomalies and may be enabled by tools such as NDR systems, UEBA, or AI-based monitoring,

(12) hybrid monitoring, which may combine multiple method for monitoring network traffic (e.g., passive monitoring and active monitoring, packet-level monitoring and flow-level monitoring) and may be used in SASE, Zero Trust, or cloud-native architectures, or

(13) any other type or method of observing, capturing, analyzing, or inspecting data packets or communication flows moving across a network.

An edge device (as previously described and exemplified) refers to a hardware device that may connect an internal network to an external network. An edge device (as previously described and exemplified may serve as an entry and/or exit point for network traffic and may be positioned at the "edge" (e.g., a boundary, border, and/or peripheral limit) of a network for interfacing with other networks (e.g., the Internet, a cloud service, and/or a remote server).

A non-edge device refers to a hardware device that does not connect an internal network to an external network. A non-edge device does not serve as an entry and/or exit point for network traffic and is not positioned at the "edge" (e.g., a boundary, border, and/or peripheral limit) of a network for interfacing with other networks (e.g., the Internet, a cloud service, and/or a remote server). A non-edge device is any computing or network-connected component that does not serve as an access point between a local network and external networks and does not function as an enforcement or control point at the network perimeter (i.e., the "edge"). A non-edge device may operate within the interior of a network or cloud environment and may rely on upstream edge devices or services for external connectivity, security enforcement, or traffic routing. Exemplary non-edge devices may include: (1) endpoints or end-user devices, (2) application and compute infrastructure, (3) storage and database systems, (4) Internet of Things (IoT) and Operational Technology (OT), (5) internal networking components, (6) virtualized and cloud-native infrastructure, (7) peripheral and support devices, or (8) any other computing or network-connected component that does not serve as an access point between a local network and external networks and does not function as an enforcement point or control point at the network perimeter.

In some disclosed embodiments, the network traffic includes a traffic history. The network traffic includes a traffic history refers to the observed, captured, analyzed, or inspected network traffic contains or is associated with historical records of past network communications. Traffic history refers to the recorded or derived information about past network communications involving one or more entities (such as systems, devices, users, applications, or services). Traffic history may reflect patterns, behaviors, and characteristics of network activity over a period of time. Traffic history may include:

(1) session-based history involving historical records of complete sessions or flows and which may include start time, end time, session ID, or duration, (2) packet-level history involving detailed per-packet logs or captures, and which may include pcap files or timestamped packet metadata, (3) protocol-level history involving history categorized by network protocols used, and which may include HTTP request logs, DNS queries, or TLS handshakes, (4) application-level history involving traffic history tied to application behavior or API use and which may include Web application traffic logs or SaaS telemetry, (5) behavioral history reflecting usage patterns or behavioral traits and which may include access frequency, time-of-day patterns, or anomaly trends, (6) recent history involving a short-term historical view and which may include session history or retry patterns, (7) long-term history involving extended history and which may include trend analysis, baselining, or archive logs, (8) client-side history involving history captured at the user or endpoint device and which may include browser logs or endpoint telemetry, (9) server-side history involving history captured on back-end services or applications and which may include web server logs or API gateway logs,

(10) network infrastructure history involving history captured within the network fabric and which may include router logs, firewall flow records, or NetFlow,

(11) cloud or third-party history involving history monitored by cloud services or remote APIs and which may include SaaS traffic metadata or cloud telemetry,

(12) security monitoring history involving threat detection, anomaly detection, or policy violations and which may include data leakage prevention violations or malware communication trails,

(13) performance analysis history involving performance evaluation over time and which may include latency trends or throughput baselines,

(14) compliance auditing history involving past adherence to policy or regulation and which may include access logs or encryption protocol usage,

(15) user behavior analytics (UBA) history involving models and assessments of human or machine behavior and which may include login patterns, device switching, or data access,

(16) structured history involving pre-formatted or queryable (e.g., logs, DB entries) historical records and which include JSON logs, CSV reports, or SIEM tables,

(17) unstructured history involving raw or semi-structured data needing preprocessing and which may include raw packet captures or syslogs, or

(18) any other recorded or derived information about past network communications involving one or more entities.

In some disclosed embodiments, the network traffic includes real-time data flow through the network. The network traffic includes real-time data flow through the network refers to the observed, captured, analyzed, or inspected network traffic consists of live, active transmissions of data occurring immediately and continuously across the network, rather than data that is delayed, stored, or replayed. Real-time data flow refers to the continuous, immediate transmission of data between two entities with minimal latency, which may allow for instant processing or consumption of information as it is generated or received. Exemplary classifications of real-time data flow may include: (1) classification by communication mode, which may include unidirectional data flow, bidirectional data flow, or multicast/broadcast data flow, (2) classification by latency sensitivity, which may include hard real-time data flow (strict timing requirements; delays are unacceptable), soft real-time data flow (minor delays tolerated, but timing is still important), or near real-time data flow (slight delay is acceptable, not mission-critical), (3) classification by application domain, which may include communications, monitoring/analytics, finance and trading, IoT and industrial, or media and entertainment, (4) classification by transport mechanism, which may include streaming protocol data flow, message-oriented data flow, polling-based (pseudo) data flow, or push-based data flow, (5) classification by content type, which may include audio/video data flow, telemetry/metrics data flow, textual/transactional data flow, or binary/structured data flow, (6) classification by initiation mode, which may include user-initiated data flow or system-initiated data flow, or (7) any other classification of continuous, immediate transmission of data between two entities with minimal latency. The network traffic may include only a traffic history, only real-time data flow through the network, or a combination of traffic history and real-time data flow through the network.

In some disclosed embodiments, the monitoring of the network traffic from the at least one non-edge device in the SASE network occurs continually over time. The monitoring of the network traffic from the at least one non-edge device in the SASE network occurs continually over time refers to the process of observing, capturing, analyzing, or inspecting network traffic from one or more internal (non-edge) devices within a SASE network (as previously described and exemplified) is performed on an ongoing, uninterrupted basis, rather than at fixed intervals or on-demand. Exemplary monitoring of the network traffic from the at least one non-edge device in the SASE network occurs continually over time may include: (1) continuous security monitoring, where the SASE system continuously inspects traffic from a non-edge device in the SASE network to detect threats, malware, or data exfiltration attempts in real-time and over extended periods of time, (2) performance and availability tracking, where application servers are monitored inside the corporate network nonstop to measure uptime, response times, and throughput, ensuring consistent user experience, (3) behavioral analytics, where anomalies are continuously monitored or detected in network traffic based on established behavioral baselines, (4) compliance logging, where metadata and flow information from databases or file servers are persistently captured to maintain audit trails for regulatory compliance, (5) IoT device traffic monitoring, where sensor and actuator traffic within an enterprise or industrial environment is continuously observed, ensuring operational integrity and security, or (6) any other process or action to monitor network traffic from at least one non-edge device in a SASE network that occurs continuously over time.

Some disclosed embodiments involve for each of a plurality of applications running on each of a plurality of edge devices, determining a digital user experience score from the at least one non-edge device. For each of a plurality of applications running on each of a plurality of edge devices, determining a digital user experience score from the at least one non-edge device refers to a process in which a system that is a non-edge device (as described and exemplified herein) analyzes and calculates a digital user experience score based on a digital user experience (as described and exemplified herein) for each active application running on at least one edge device (as previously described and exemplified).

An application running on an edge device refers to an instance of a software program that is actively executing on an edge device, which may include using the edge device's processor and system resources (e.g., memory, CPU cycles, network bandwidth) to perform application's functions. An application running on an edge device may operate in real time or near-real time. An application running on an edge device may process data locally to reduce latency, bandwidth consumptions, or reliance on upstream systems. Execution of an application running on an edge device may involve interacting with sensors, user interfaces, other devices, remote services, digital systems, applications, services, or content. An application running on an edge device may perform autonomous functions, serve user interfaces, or act as a bridge between local environments and cloud or centralized systems. An application running on an edge device may be user-facing, background, or system level. An application running on an edge device may communicate with cloud services, local hardware, peer devices, or other networked resources over a network. An application running on an edge device may include an application that has been launched and is currently in an active state, with its instructions being processed by a CPU. An application running on an edge device may occupy RAM (memory), use CPU time, and may access disk storage, network interfaces input/output devices, or other system components. An application running on an edge device may maintain an active runtime environment, which may include an internal state (e.g., variables, data structures), threads, processes, event handling, or input processing. An application running on an edge device may interact with users (e.g., through a GUI or command line) or operate in the background (e.g., a server daemon or system service). An application running on an edge device may be connected to a network, sending or receiving data, accessing APIs, syncing with cloud services, or facilitating remote communication. An application running on an edge device may be active software in execution, consuming resources and performing actions, and an application running on an edge device may exist as an active process or set of processes. Exemplary classifications of applications running on an edge device may include:

(1) by execution environment, including local (client-side) applications (e.g., a running instance of Microsoft Word, Safari, or a mobile application like Instagram), edge applications (e.g., a real-time analytics process on a CDN edge server), virtualized/containerized applications (e.g., a running docker container for a Python API), or embedded applications (e.g., real-time firmware running on a smart thermostat), (2) by user visibility, including: foreground applications (e.g., a running instance of Google Chrome or Adobe Premiere), background applications (e.g., a running antivirus scan, update service, or Dropbox sync process), headless service applications (e.g., running cron job, backend API listener, SSH daemon), or scheduled or triggered applications (e.g., a backup application running every night, Lambda triggered by upload), (3) by application function, including web browser applications (e.g., a running instance of Firefox rendering a webpage), productivity applications (e.g., running Microsoft Word or Notion for editing a document), media applications (e.g., VLC playing a video), game applications (e.g., Fortnite running on a console or PC), developer tools applications (e.g., Visual Studio compiling code), network security applications (e.g., a firewall process actively inspecting packets), monitoring/analytics applications (e.g., Prometheus running and scraping metrics), business applications (e.g., Salesforce or SAP session executing user workflows), database system applications (e.g., PostgreSQL running as a service and handling queries), or virtual assistant applications (e.g., Siri or Google Assistant actively listening), (4) by platform, including desktop applications (e.g., a running PowerPoint presentation or Excel spreadsheet), mobile applications (e.g., running Spotify or Uber applications on a phone), web (browser) applications (e.g., running Gmail in an open browser tab), IoT applications (e.g., running code on a smart light controller), or edge-native applications (e.g., running latency-sensitive traffic optimizer at a base station), or (5) any other classification of an instance of a software program that is actively being executed by an edge device, which may include using the edge device's processor and system resources (e.g., memory, CPU cycles, network bandwidth) to perform its functions.

A digital user experience score is a qualitative or quantitative metric that represents the digital user experience (as described and exemplified herein), which may include the overall quality of a user's interactions with digital systems, services, applications, or content. A digital user experience score may reflect how effectively, efficiently, and satisfactorily users are able to accomplish their tasks in a digital environment. A digital user experience score may include an aggregate or composite metric that measures the perceived and actual performance, usability, reliability, responsiveness, and satisfaction of a user interacting with digital systems, services, applications, networks or content. A score of a digital user experience score may be calculated using an aggregate scoring model that combines multiple metrics representing digital user experience (as described and exemplified herein), where the aggregate scoring model may produce a score that may be a single, interpretable value that quantifies a user's digital experience.

Calculating a digital user experience score may be based on rule-based assignment of score (e.g., based on thresholds or conditionals), event-driven evaluation for scoring (i.e., a key-user impacting event overrides all other conditions or metrics to determine score), scoring through contextual mapping or pattern recognition (i.e., a system may match network traffic against known digital user experience profiles based on context), state-based scoring (i.e., the digital user experience score represents a user state, not a value, where the score is a label chosen based on operational state, not derived from a math model), machine learning classification for scoring, where a machine learning model may output experience categories or digital user experience component/factor scores, composite or aggregate scoring, or any other method of calculating a digital user experience score that quantifies or qualifies digital user experience (as described and exemplified herein). Calculating a digital user experience score may include using multiple methods to quantify or qualify digital user experience, and multiple digital user experience scores may be calculated through a same method, a different method, a same combination of methods, or a different combination of methods. Calculating a digital user experience score may include selecting or determining metrics describing digital user experience (as described and exemplified herein), normalizing these metrics (i.e., bring each metric to a common scale for ease and validity of comparison or combination), weighting the metrics (i.e., where a weight defines the importance of each metric in defining user experience, where—for instance—weighting may be predetermined, determined through training a model, determined through training a machine learning model, static, dynamic), computing an aggregate or composite score through summation or applying a function to combine each of the weighted metrics), or contextual adjustments where the digital user experience score may be determined in part or adjusted based on the context (as previously described and exemplified).

Comparison of digital user experience scores may include numerical comparison (e.g., direct value comparison, threshold-based evaluation, delta analysis), categorical comparison (e.g., ordinal ranking, distribution analysis), temporal comparison (e.g., trends, spikes, plateaus), per-user or per-segment comparison (e.g., by user groups, regions, device types, connection types), cross-application or cross-service application (i.e., comparison of digital user experience scores for different applications or services, which are generated through the same method of calculation), comparison by benchmarking against targets or service-level agreements (SLA), or any other method for the comparison of digital user experience scores.

Exemplary scoring methods for a digital user experience score may include one or more of the features of the following:

(1) based on a threshold (e.g., >500 milliseconds round-trip time (RTT) (i.e., how long it takes for a request to go to a server and back) results in a poor score), (2) deducting from a base score (e.g., a base score, such as 100%, is deducted from by the percentage of failed transactions, where the percentage of failed transactions is the percentage of user actions that return errors or fail to complete (for example, [digital user experience score]=[100%]−[% failed transactions])), (3) reducing a base score based on exponential decay (e.g., a base score, such as 100%, is not changed if service availability and uptime are measured at 100%, but if the service availability and uptime are less than 100%, the base score is reduced by an exponential decay function that is dependent on the measured service availability and uptime (for example, [digital user experience score]=[100%]*exp(−([100%][% service availability and uptime]))), (4) normalize score to an expected value (e.g., a digital user experience score is at the highest possible value, if the effective or measured throughput is at or above an expected value, if effective or measured throughput is below the expected value, then the digital user experience score is equal to the ratio of effective or measured throughput to expected throughput (for example,

[digital user experience score]=[effective or measured throughput]/[expected throughput])), (5) a weighted index penalties (e.g., more important factors, which may be measured resource usage or responsiveness in some instances, are associated with a larger weight (i.e., higher scalar multiplier for contribution to digital user experience score) than less important factors, which may be measured bounce rate in some instances, so measured high resource usage or slow responsiveness will more negatively impact the digital user experience score than a high bounce rate) (for example, [digital user experience score]=[100%]−0.9*[resource usage]−0.1*[bounce rate]), (6) additive score components (e.g., a baseline digital user experience score may be zero and positive digital user experience factors, such as low DNS lookup time, low TLS handshake time, or other positive performance metrics may add to the baseline digital user experience score) (for example, [digital user experience score]=[measured latency]/[expected latency]+[% error]+[measured throughput]/[expected throughput]+[behavior score]+[measured jitter]/[expected jitter]), (7) baseline score based on testing (i.e., synthetic users generate baseline digital user experience scores to supplement or compare against real user metrics, where if a metric for digital user experience exceeds the metric associated with the baseline score, the digital user experience score is at least baseline score) (for example, [digital user experience score]=[testing baseline]+[measurement correction factor], where measurement correction factor depends on deviation from baseline and may be positive or negative, depending on whether the deviation is positive or negative for the system) (for example, [digital user experience score]=[measured]/[testing baseline]), (8) composite or aggregate weighted scoring models (for example, [digital user experience score]=0.3*[Measured Latency Score]+0.2*[Error Score]+0.2*[Throughput Score]+0.3*[Behavior Score]), (9) any combination of these exemplary scoring methods, or

(10) any other scoring methods for a digital user experience score that enable the qualitative, quantitative, or comparative description of digital user experience.

Exemplary methods of scoring for a qualitative digital user experience score may include: user-centric survey integration that uses qualitative labels (e.g., "Excellent," "Good," "Satisfactory," "Poor," "Unusable"), rule-based or threshold-based evaluation (e.g., latency <100 ms corresponds to "Smooth" or "Good," packet loss >5% corresponds to "Choppy" or "Poor"), behavioral pattern assessment (e.g., assigning labels to user behaviors such as session abandonment, repeated retries, or usage interruptions, where labels may be "Frustrated," "Normal," "Delayed," "Blocked"), sentiment analysis of support interactions (e.g., applying natural language processing (NLP) to user support tickets, chat logs, or feedback to determine a sentiment category, such as "Positive," "Negative," or "Neutral"), anomaly tagging (e.g., detecting deviations from baseline digital user experience and labeling with qualitative indicators, such as "Below Normal," "Unexpected degradation," or "Consistent with Expectations"), heuristic composite modeling (e.g., combining multiple indicators like performance metrics, error rates, or retries and using domain knowledge to derive qualitative labels, such as "Acceptable," "Degraded," or "Failing"), context-aware (as previously described and exemplified) scoring (e.g., "Good for mobile," "Subpar on LTE," or "Optimized for Wi-Fi"), or any other scoring method capable of outputting a label that describes the qualities of a digital user experience. A qualitative label for a digital user experience score may be derived from a quantitative digital user experience score (e.g., a digital user experience score of 0.93 or 93% labeled as "excellent," a digital user experience score of 0 labeled as "poor").

In some disclosed embodiments, the performance of the digital experience monitoring of the plurality of applications running on the plurality of edge devices is implemented without installing an associated client application on each of the plurality of edge devices. The performance of the digital experience monitoring of the plurality of applications running on the plurality of edge devices is implemented without installing an associated client application of the plurality of edge devices refers to the monitoring of the digital user experience (as described and exemplified herein) does not involve installing a client application on each of the plurality of edge devices (as previously described and exemplified), where the digital user monitoring is applied to multiple running applications (as described and exemplified herein), each of the multiple running applications application running on edge devices.

Exemplary locations (as previously described and exemplified) where digital experience monitoring of applications running on edge devices may occur, where the plurality of applications running on the plurality of edge devices is implemented without installing an associated client application on each of the plurality of edge devices, may include: (1) upstream network infrastructure, where the infrastructure at upstream network locations may inspect and analyze network traffic flowing to and/or from edge devices to infer or determine digital user experience, and this upstream network infrastructure may include: an SD-WAN gateway, a SASE point of presence (PoP), a cloud access security broker (CASB), or a secure web gateway (SWG), (2) cloud-based monitoring services, where the applications and traffic associated with digital user experience are monitored via cloud analytics platforms that may collect data from the network, third-party APIs, or logs and there is no need to install any client application on the edge device, (3) proxy servers or VPN gateways, where traffic from edge devices may pass through proxies, which may observe latency, error rates, protocol behavior, or destinations, and may allow for the inference or determination of digital user experience metrics, (4) inline network devices, such as firewalls or load balancers, where devices that are inline with the data flow can observe application-layer performance metrics without direct involvement form the endpoint or installation of any client application, (5) application or resource-side instrumentation, where metrics can be collected from the servers or services the edge device connects to (e.g., application response time, connection attempts, monitoring the response time of a web application hosted in a cloud server when accessed by various edge users), or (6) any other location (as previously described and exemplified) where digital experience monitoring may occur for applications running on edge devices without the installation of an associated client application on each edge device.

In some disclosed embodiments, each digital user experience score includes an aggregate score for the plurality of applications. Each digital user experience score includes an aggregate score for the plurality of applications refers to the digital user experience score including a single, combined score is generated to represent the overall digital user experience across multiple applications. The aggregate score (as described and exemplified herein) may be one score included in the digital user experience score or be one of a plurality of scores included in the digital user experience score.

Exemplary classifications of methods for calculating an aggregate score of a digital user experience score may include: (1) statistical and mathematical methods, which may include: a simple average (arithmetic mean), a geometric mean, a weighted average, a median, a mode, a trimmed mean, geometric mean, harmonic mean, range-based aggregation, percentile-based, or standard deviation or variance scores, (2) heuristic and rule-based methods, which may include: threshold aggregation (i.e., aggregate score set by whether a certain number/percentage of individual scores cross a threshold), scoring tiers or buckets (i.e., individual scores mapped to categories, then aggregated by a dominant category), penalty-based system (i.e., start with a perfect score, then subtract points based on observed performance issues), or best/worst case aggregation (i.e., aggregate score equals the best or worst observed score, may be used for optimistic or risk-averse systems, respectively), (3) composite metric methods, which may include: z-score normalization before aggregation (i.e., normalize individual scores to standard deviation scores and average the Z-scores), principal component analysis (PCA) (i.e., reduce dimensionality and weight contributions of each metric in aggregate), custom domain-specific formulas (e.g., SLA adherence models, NPS-weighted performance, or time-decayed scoring to give recent events more weight), and time-series aggregation (i.e. aggregate score based on time windows), (4) machine learning-based aggregation, which may include: regression models, clustering, classification-based aggregation, or ensemble methods, (5) a combination of these methods, or (6) any other method to aggregate quantitative and/or qualitative scores based on digital user experience for a plurality of applications.

In some disclosed embodiments, each digital user experience score is associated with communication latency. Each digital user experience score is associated with communication latency refers to the inclusion of communication latency as a factor in digital user experience and inclusion of communication latency as a factor in the digital user experience score.

Exemplary ways in which a digital user experience score may be associated with communication latency may include: communication latency as a direct input for score calculation, communication latency as a categorical association for a digital user experience score, communication latency as a threshold-based adjustment to the digital user experience score, communication latency as an associated metric for digital user experience where the communication latency metric is incorporated in score calculation, latency as a trigger for re-scoring, or statistical or machine learning models that incorporate communication latency as a feature in a model that may predict, infer, or determine digital user experience or a digital user experience score. Communication latency is the elapsed time for a data packet to travel from a source or origination point to a destination across a network. Communication latency may be the time delay from when the data is sent from one point in a network and when it is received at its destination. Communication latency may be caused by propagation delay (i.e., time for a signal to travel through a medium, such as a fiber optic cable), transmission delay (i.e., time to push all of a packet's bits onto the medium of propagation), processing delay (i.e. time router/switches take to process a packet header), queuing delay (i.e. time the packet waits in line at routers/switches due to congestion), or any other source of delay in the transmission of data.

In some disclosed embodiments, each digital user experience score is associated with jitter. Each digital user experience score is associated with jitter refers to the inclusion of jitter as a factor in digital user experience and inclusion of jitter as a factor in the digital user experience score. Jitter refers to the variation in packet arrival times during data transmission over a network. Jitter may include the statistical variance in the latency of received packets over time, and Jitter may be measured as the difference between successive packet arrival times. Jitter as a metric may characterize the inconsistency of network latency. Jitter may be caused by network congestion, route changes, timing drift, or any other factor that impacts inconsistency or latency in the transmission path of data.

Exemplary ways in which a digital user experience score may be associated with jitter may include: jitter as a direct input for score calculation, jitter as a categorical association for a digital user experience score, jitter as a threshold-based adjustment to the digital user experience score, jitter as an associated metric for digital user experience where the jitter metric is incorporated in score calculation, jitter as a trigger for re-scoring, or statistical or machine learning models that incorporate jitter as a feature in a model that may predict, infer, or determine digital user experience or a digital user experience score.

In some disclosed embodiments, each digital user experience score is associated with a branch site or datacenter with or without a socket device. Each digital user experience score is associated with a branch site or datacenter with or without a socket device refers to for every digital user experience score, there is a corresponding physical or logical location—either a branch site or a datacenter—from which or for which the score is derived, regardless of whether that location has a socket device installed.

A branch site is a physically distinct location (as previously described and exemplified) within an organization's network infrastructure, which may consist of local users, local devices, or network services, and may be connected to central resources of the organization (e.g., datacenters, cloud services) through wide area networks (WAN) or secure access solutions, such as SD-WAN (as previously described and exemplified) or a SASE network (as previously described and exemplified). Exemplary branch sites may include: (1) corporate or business locations, such as a regional sales office, a satellite HR office, or a local customer support center, (2) retail locations, such as a chain store, a franchise restaurant, or a gas station with point-of-sale systems, (3) healthcare facilities, such as local clinics or urgent care centers linked to a central hospital network or telehealth satellite offices, (4) educational campuses, such as satellite campuses of a university or training centers affiliated with a main institution, (5) manufacturing and warehousing sites, such as a factory that uploads production data to a central ERP system or a warehouse that syncs with central inventory system, (6) financial institutions, such as bank branches that access central transaction systems or insurance agency field offices, or (7) any other physically distinct location within an organization's network infrastructure that is physically separate from the main headquarters or central datacenter of the organization but is connected to and dependent on the organization's IT and networking infrastructure.

A datacenter is dedicated physical or virtual infrastructure that provides centralized access to digital systems, applications, services, or content, which may include servers, storage systems, networking hardware, power supplies, cooling systems, or security mechanisms to support critical operations or data processing for an organization. A datacenter may include capabilities for high-capacity computing (e.g., through hosting physical or virtual servers for running applications, storing data, and supporting cloud services), acting as a network backbone (e.g., acting as a hub for internal and external communication between users, systems, applications, services, and content), or security and redundancy (e.g., equipped with fire suppression, backup power, physical security, power redundancy, cooling redundancy, and connectivity redundancy), within a managed environment (e.g., operated by in-house teams, colocation providers or public cloud vendors, such as AWS, Azure, Google Cloud). Exemplary types of datacenters may include enterprise datacenters that are owned and operated by a single organization, colocation datacenters that are shared spaces where organizations rent servers or racks, hyperscale datacenters that are massive, cloud-provider-operated facilities, or edge datacenters that are smaller, decentralized facilities located closer to end users. Datacenters may be integrated with network traffic monitoring systems to assess performance, latency, availability, or any other metrics or factors contributing to digital user experience or digital user experience scores.

A socket device is a physical or virtual network appliance that establishes, secures, and manages communication between local systems (e.g., at a branch site) and centralized infrastructure (e.g., a datacenter or cloud service). A socket device may provide functions including tunneling, encryption, traffic inspection, routing, or digital experience monitoring. A socket device may be a hardware component deployed at a remote location (e.g., a branch site or collocated with a user) that serves as a connection point between local devices and a larger network, system, application, or service. A socket device may enable security, monitoring, or routing operations at this connection point between local devices and a larger network, system, application, or service. A socket device may include features or capabilities for secure communication, traffic routing and forwarding, data collection or telemetry (e.g., for user experience monitoring), policy enforcement (e.g., SASE or Zero Trust access), or lightweight processing of traffic (e.g., edge computing). Exemplary socket devices may include: an SD-WAN edge device, a Zero Trust edge gateway, a remote monitoring appliance, an IoT gateway, or a virtual socket agent.

Exemplary ways in which a digital user experience score may be associated with a branch site or datacenter with or without a socket device may include: (1) active monitoring or passive collection with a socket device, where the socket device (e.g., monitoring appliance, inline probe, or edge gateway) may be installed at a branch site or datacenter, such that it may directly contribute to or compute a digital user experience score and may measure network performance (e.g., communication latency, jitter, throughput) between local applications and external resources, it may monitor application health and responsiveness from the perspective of users or services hosted at the location, or correlating network metrics with user or application behavior to contribute to or compute a digital user experience score, (2) remote or agentless monitoring without a socket device, which may include remote traffic correlation (i.e., the monitoring system observes traffic patterns flowing to/from the branch site or datacenter via upstream devices (e.g., SD-WAN controllers, cloud proxies), based on traffic metadata (e.g., source, IP, subnets, application behavior) the system maps scores to the originating location), client-side telemetry or endpoint reporting (i.e., endpoints at the sit send telemetry data (e.g., latency, application load time) to a central server, the server aggregates these metrics and associates them with the user's location (branch or datacenter) based on IP, VPN assignment, or directory structure), or network path inference or location tagging (i.e., application or user behavior is inferred to originate from a location tagged as a branch site or datacenter, performance metrics associated with that behavior are grouped by location to computed a location-level experience score).

Exemplary ways in which a digital user experience score may be associated with a location, such as a branch site or datacenter with or without a socket device, may include: (1) tagging scores by physical or network location, which may be based on IP address or subnet, VPN gateway or SD-WAN path, Wi-Fi access point or cell tower, or geolocation data (e.g., latency and application responsiveness for devices within the IP range 192.0.2.0/24 are attributed to the Chicago office, allowing a score to be generated per that branch), (2) generating per-location experience scores, which may include calculating digital user experience scores separately for each site or region to highlight local performance trends, which may be based on average application latency or errors per branch, aggregated telemetry per country or continent, or local service issues (e.g., the New York branch has a digital user experience score of 92 (or "Excellent") due to low jitter and fast login times, which the Tokyo branch has a score of 67 (or "Satisfactory") due to intermittent application load failures of a non-critical application), (3) location as a weighting factor in composite scores, which may include location influencing how heavily certain metrics are weighted in computing the digital user experience score (i.e., when user expectations or infrastructure conditions differ across locations) (e.g., high packet loss at a remote branch on satellite internet may affect digital user experience scores less than at a headquarters with fiber connectivity), (4) detecting location-based experience anomalies, which may include tracking digital user experience scores over time and comparing these scores across locations, such that the system may detect when one location deviates from expected or baseline performance (e.g., a sudden 25% drop in digital user experience score at a datacenter in Frankfurt triggers investigation, as all other locations remain stable), or mapping digital user experience scores onto geographical dashboards, which may include using location-based aggregation, may allow digital user experience scores to be visualized on a heatmap or geodashboard, and may support real-time performance monitoring by geography or rapid identification of regional outages or degradation.

In some disclosed embodiments, each digital user experience score is associated with packet loss. Each digital user experience score is associated with packet loss refers to for every digital user experience score calculated packet loss metrics are considered either directly or indirectly in determining the digital user experience and digital user experience score. Packet loss refers to a network condition where data packets (as previously described and exemplified) transmitted from a source to a destination are dropped or discarded somewhere along the transmission path, resulting in incomplete or degraded communication. Packet loss may include the failure of one or more data packets to successfully reach their intended destination across a computer network. Factors that may influence or cause packet loss may include network congestion, faulty networking hardware, wireless signal interference, overutilized network links or buffers, software bugs or misconfigurations, routing issues or misrouted packets, security measures, or any other way in which packets may not be received at their intended destination.

Exemplary ways in which a digital user experience score may be associated with packet loss may include:

(1) through direct integration of a packet loss metric in the calculation or computation of a digital user experience score, (2) through integration of a packet loss metric as a weight or variable of a weighted scoring model such that packet loss may influence the digital user experience score calculated by a weighted scoring model, (3) through a threshold-based penalty, where the digital user experience score is penalized or adjusted when packet loss exceeds a defined threshold, (4) through a context-aware adjustment, where packet loss is interpreted in context (as previously described and exemplified) to adjust a digital user experience score, (5) through a historical baseline comparison, where the digital user experience score reflects deviation in packet loss compared to historical norms for the same edge device or application, (6) aggregated session or location analysis, where packet loss metrics may be aggregated across multiple users, applications, or edge devices influencing the overall digital user experience score for a group, (7) time-based trends or anomalies, where sudden increases or patterns in packet loss over time may cause temporal fluctuations in digital user experience scores, (8) association via diagnostic tags or metadata, where packet loss may not be a core part of the score but is tagged alongside the score for diagnostic or triage purposes, (9) machine learning (ML) or AI model-based scoring, where packet loss is input to a machine learning model trained to predict user satisfaction or perceived experience,

(10) policy-driven score mapping, where enterprise policies may dictate that certain levels of packet loss correspond to specific digital user experience score ranges, or

(11) any other way in which a digital user experience score may be associated with packet loss.

Some disclosed embodiments involve cross-referencing different digital user experience scores of the digital user experience scores associated with at least one common application of the plurality of applications to thereby determine a performance characterization of the at least one common application. Cross-referencing different digital user experience scores of the digital user experience scores associated with at least one common application of the plurality of applications to thereby determine a performance characterization of the at least one common application refers to the process of comparing and analyzing multiple digital user experience scores that are all associated with at least one common application, even though the digital user experience score might originate from different users, devices, locations, networks conditions, or other factors contributing to digital user experience, which may allow for a system to identify trends or patterns that may help to describe the performance of the at least one common application.

Cross-referencing is the process of comparing or correlating multiple sets of data that share at least one common feature, which may be done to identify relationships, inconsistencies, or patterns. Exemplary dimensions of comparison for cross-referencing different user experience scores associated with at least one common application may include a temporal comparison, location-based comparison, device or endpoint type comparison, network condition-based comparison, user role or identity comparison, application version or update comparison. This Cross-referencing based on these exemplary dimensions of comparison may involve the identification of a common application, the grouping of digital user experience scores by a common application, the alignment of metadata (e.g., metadata associated with device type, location or site, time of measurement, network performance metrics (e.g., communication latency, jitter, packet loss)), normalization of scores, comparison across dimensions, analysis for patterns or outliers (e.g., with machine learning), or generation of a characterization (e.g., based on application behavior, consistent/degraded performance, environmentally-dependent behavior, impact of external factors). Exemplary tools and techniques enabling this cross-referencing may include data correlation engines, dashboards or visualizations, rule-based analytics, machine learning models, or any other tool or technique that allows for the comparison or correlation of digital user experience scores.

A common application refers to an application that is used, observed, or measured across multiple systems, devices, users, networks, or locations, making it a shared point for comparison, benchmarking, or optimization. A common application may be widely deployed or accessed, consistent across environments, or a target for monitoring or scoring. A common application may be an application that is frequently used or shared among multiple users, devices, or systems, and may serve similar functions or purposes across different environments or contexts (as previously described and exemplified).

Performance characterization is the assessment and description of performance attributes (e.g., latency, throughput, availability, reliability) of a system or components, and may include assessment and description done through measurement, analysis, or modeling. Performance characterization may refer to the process of identifying, describing, and quantifying how a system, application, service, device, or network performs under specific conditions or across various dimensions (e.g., time, location, load). Performance characterization may provide a structured or measurable assessment or description of behavior, responsiveness, stability, or efficiency. Performance characterization of an application may be accomplished by collecting, analyzing, and interpreting data related to how an application behaves under various conditions or in various environments, how well and application performs, or factors that affect application performance. Performance characterization of an application may include identifying the application (e.g., web-based CRM, video conferencing application) and scope (e.g., all users, specific regions, branch sites, device types), collecting performance data (i.e., collecting data through telemetry, logs, packet captures, agentless monitoring) (e.g., communication latency, jitter, packet loss, CPU/memory usage, load times or transaction speeds, error rates, throughput, session duration and stability), associate contextual metadata (e.g., link each data point with time, location, user/device identity, network path or conditions), analyze and model the data (e.g., use statistical or machine learning tools to detect deviations from normal patterns, identify performance bottlenecks or degradations, group similar usage conditions, or correlate events with metrics), characterize the performance (e.g., create a performance profile or summary including average vs. peak values, best- and worst-case scenarios, impact of location/device/network, performance variability over time, response to load or resource constraints), or output insights for action (e.g., provide triggers for alerts or changes in policy, adjust routing or resource allocation, provide feedback to developers or IT operations team, feed into digital experience scoring systems).

In some disclosed embodiments, the at least one common application includes at least two common applications belonging to a peer group, and wherein determining performance characterizations of the at least two common applications permits a performance comparison between the at least two common applications within the peer group. The at least one common application includes at least two common applications belonging to a peer group, and wherein determining performance characterizations of the at least two common applications permits a performance comparison between the at least two common applications within the peer groups refers to a set of applications with at least two that are considered common, which are grouped into a peer group of applications—applications that serve similar functions, are used in similar environments, or are intended to be evaluated together—that allows for the characterization of performance of each application within the set of applications, where these characterizations may be compared to evaluate relative performance between each of the applications in the peer group.

A peer group refers to a set of at least two applications that share common characteristics, functions, or roles, which may allow for meaningful comparison, analysis, or evaluation within the group. Exemplary peer groups may include: (1) a peer group of office productivity applications such as Microsoft Word, Google Docs, Apple Pages, or LibreOffice Writer, (2) a peer group of video conferencing applications such as Zoom, Microsoft Teams, Google Meet, or Cisco Webex, (3) a peer group of cloud storage applications such as Dropbox, Google Drive, OneDrive, or Box, (4) a peer group of email client applications such as Outlook, Apple Mail, Thunderbird, or Gmail, (5) a peer group of code editors or IDEs such as Visual Studio Code, Sublime Text, Atom, JetBrains PyCharm, or (6) any other group of at least two applications that share common characteristics, functions, or roles, which may allow for meaningful comparison, analysis, or evaluation within the group.

Some disclosed embodiments involve determining trends within the peer group based on the performance comparison. Determining trends within the peer group based on the performance comparison refers to the process of identifying patterns, tendencies, or directional changes among the peer group by analyzing and comparing their respective performance metrics over time or under similar conditions.

Performance may be compared within the peer group by identifying common performance metrics (e.g., communication latency, availability/uptime, resource utilization, user experience scores, throughput, transaction success/failure rates), collecting data (e.g., real user monitoring, telemetry data, log files, system metrics, application-level analytics, data from network monitoring tools, data from performance management platforms), normalizing and aligning the data (e.g., ensuring data is collected in a comparable format, adjusting for differences in scale/deployment/configuration, using statistical normalization techniques), performing comparative analysis (e.g., using statistical methods, visualizing with graphs/dashboards/heat maps, applying ranking models or scoring systems, benchmarking each application against the other applications/the group average/a defined baseline).

Trends in this performance may be determined with time series analysis (i.e., identifying increasing/decreasing/cyclical behavior by using moving averages/exponential smoothing/seasonal decomposition), statistical trend detection (i.e., using linear regression, control charts, or anomaly detection), peer group movement (i.e., track how individual applications rank or cluster relative to others in the peer group, determine relative outperformance/underperformance, detect if a new version or update shifts standing within the group), or visual analysis and reporting (e.g., dashboards showing performance evaluation, use color-coded heat maps to track changes, highlight improvements/regressions/stability).

Some disclosed embodiments involve transmitting each of the digital user experience scores associated with each of the plurality of applications running on each of the plurality of edge devices to at least one administrator of the SASE network. Transmitting each of the digital user experience scores associated with each of the plurality of applications running on each of the plurality of edge devices to at least one administrator of the SASE network refers to transmitting (as previously defined and exemplified) all digital user experience scores for all applications running on all edge devices to at least one administrator responsible for managing or overseeing the Secure Access Service Edge (SASE) network, where each score may reflect the digital user experience (as described and exemplified herein) for a given application as observed on a specific edge device and where the digital user experience score may be communicated to enable centralized monitoring, analysis, or decision-making.

An administrator of the SASE network refers to an individual or system responsible for managing, monitoring, or enforcing policies across the SASE network infrastructure (as previously described and exemplified). An administrator of the SASE network may include: an IT security manager for an organization, a network operations center (NOC) engineer, an automated policy management system (which may be AI/ML-based), a managed service provider (MSP) administrator, or any other individual or system responsible for managing, monitoring, or enforcing policies across the SASE network infrastructure.

Figure 39:
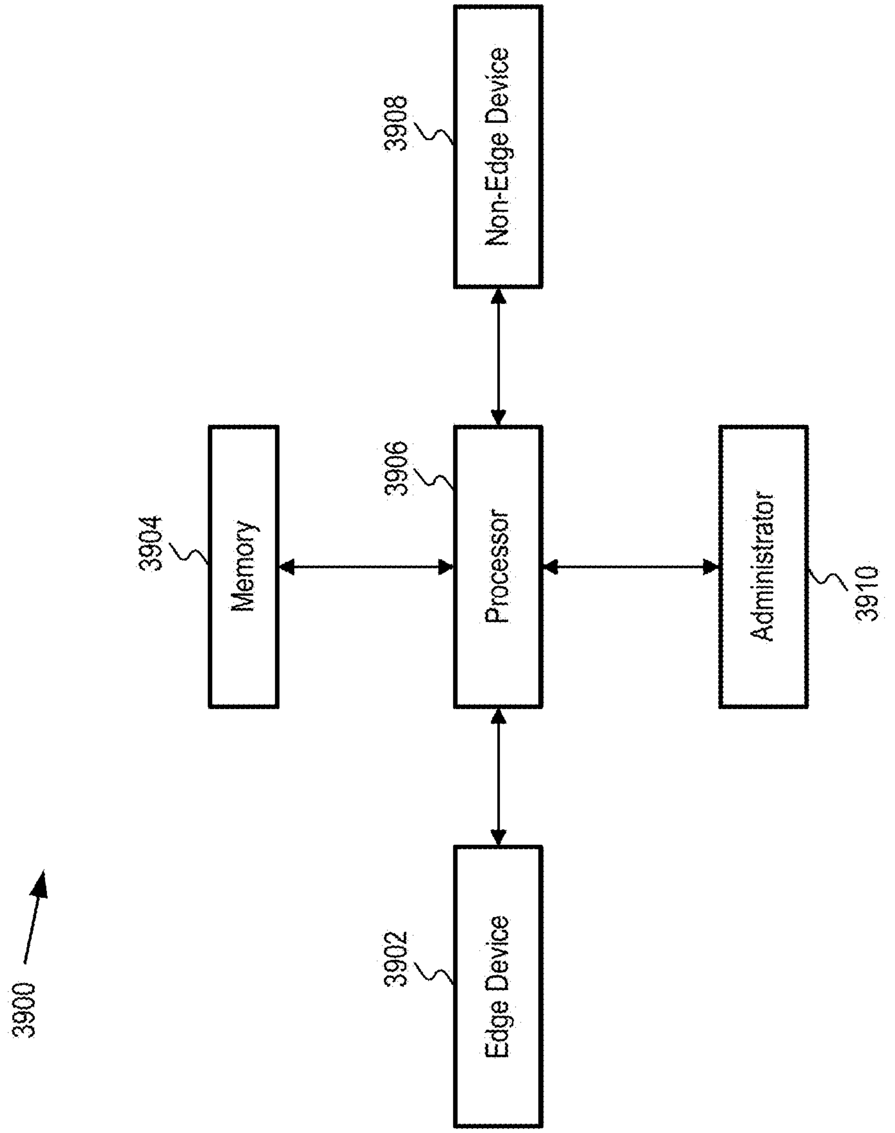
FIG. 39 illustrates an exemplary schematic diagram of a system for performing client application-less operations for digital experience monitoring, consistent with some disclosed embodiments.

FIG. 39 illustrates an exemplary schematic diagram of a system 3900 for performing client application-less operations for digital experience monitoring, consistent with some disclosed embodiments. In some embodiments, system 3900 may comprise an edge device 3902 (as previously described and exemplified). In some embodiments, system 3900 may comprise a processor 3906 (as previously described and exemplified). In some embodiments, system 3900 may comprise a memory 3904 or non-transitory computer readable medium (as previously described and exemplified). In some embodiments, system 3900 may comprise a non-edge device 3908 (as described and exemplified herein). In some embodiments, system 3900 may comprise an administrator 3910 (as described and exemplified herein).

Referring to FIG. 39, system 3900 may include at least one processor 3906 configured to monitor network traffic from at least one non-edge device in a SASE network, as described above and throughout this disclosure. In some embodiments, the network traffic includes a traffic history, as described above and throughout this disclosure. In some embodiments, the network traffic includes real-time data flow through the network, as described above and throughout this disclosure. In some embodiments, the network traffic from the at least one non-edge device in the SASE network occurs continually over time, as described above and throughout this disclosure.

System 3900 may include at least one processor 3906 configured to, for each of a plurality of applications running on each of a plurality of edge devices, determine a digital user experience score from the at least one non-edge device, as described above and throughout this disclosure. In some embodiments, the performance of the digital experience monitoring of the plurality of applications running on the plurality of edge devices is implemented without installing an associated client application on each of the plurality of edge devices, as described above and throughout this disclosure. In some embodiments, each digital user experience score includes an aggregate score for the plurality of applications, as described above and throughout this disclosure.

System 3900 may include at least one processor 3906 configured to transmit each of the digital user experience scores associated with each of the plurality of applications running on each of the plurality of edge devices to at least one administrator of the SASE network, as described above and throughout this disclosure.

System 3900 may include a non-transitory computer readable medium containing instructions that when executed by at least one processor cause the processor to perform client application-less operations for performing digital experience monitoring based on real user communications, the operations may comprise monitoring network traffic from at least one non-edge device in a SASE network, as described above and throughout this disclosure. In some embodiments, the network traffic includes a traffic history, as described above and throughout this disclosure. In some embodiments, the network traffic includes real-time data flow through the network, as described above and throughout this disclosure. In some embodiments, the monitoring of the network traffic from the at least one non-edge device in the SASE network occurs continually over time, as described above and throughout this disclosure.

System 3900 may include a non-transitory computer readable medium containing instructions that when executed by at least one processor cause the processor to perform client application-less operations for performing digital experience monitoring based on real user communications, the operations may comprise, for each of a plurality of applications running on each of a plurality of edge devices, determining a digital user experience score from the at least one non-edge device, as described above and throughout this disclosure. In some embodiments, the performance of the digital user experience monitoring of the plurality of applications running on the plurality of edge devices is implemented without installing an associated client application on each of the plurality of edge devices, as described above and throughout this disclosure. In some embodiments, the digital user experience score includes an aggregate score for the plurality of applications, as described above and throughout this disclosure. In some embodiments, each digital user experience score is associated with communication latency, as described above and throughout this disclosure. In some embodiments, each digital user experience score is associated with jitter, as described above and throughout this disclosure. In some embodiments, each digital user experience score is associated with a branch site or datacenter with or without a socket device, as described above and throughout this disclosure. In some embodiments, each digital user experience score is associated with packet loss, as described above and throughout this disclosure.

System 3900 may include a non-transitory computer readable medium containing instructions that when executed by at least one processor cause the processor to perform client application-less operations for performing digital experience monitoring based on real user communications, the operations may comprise cross-referencing different digital user experience scores of the digital user experience scores associated with at least one common application of the plurality of applications to thereby determine a performance characterization of at least one common application, as described above and throughout this disclosure. In some embodiments, the at least one common application includes at least two applications belonging to a peer group, and wherein determining performance characterizations of the at least two common applications permits a performance comparison between the at least two common applications within the peer group, as described above and throughout this disclosure.

System 3900 may include a non-transitory computer readable medium containing instructions that when executed by at least one processor cause the processor to perform client application-less operations for performing digital experience monitoring based on real user communications, the operations may comprise determining trends within the peer group based on the performance comparison, as described above and throughout this disclosure.

System 3900 may include a non-transitory computer readable medium containing instructions that when executed by at least one processor cause the processor to perform client application-less operations for performing digital experience monitoring based on real user communications, the operations may comprise transmitting each of the digital user experience scores associated with each of the plurality of applications running on each of the plurality of edge devices to at least one administrator of the SASE network, as described above and throughout this disclosure.

Figure 40:
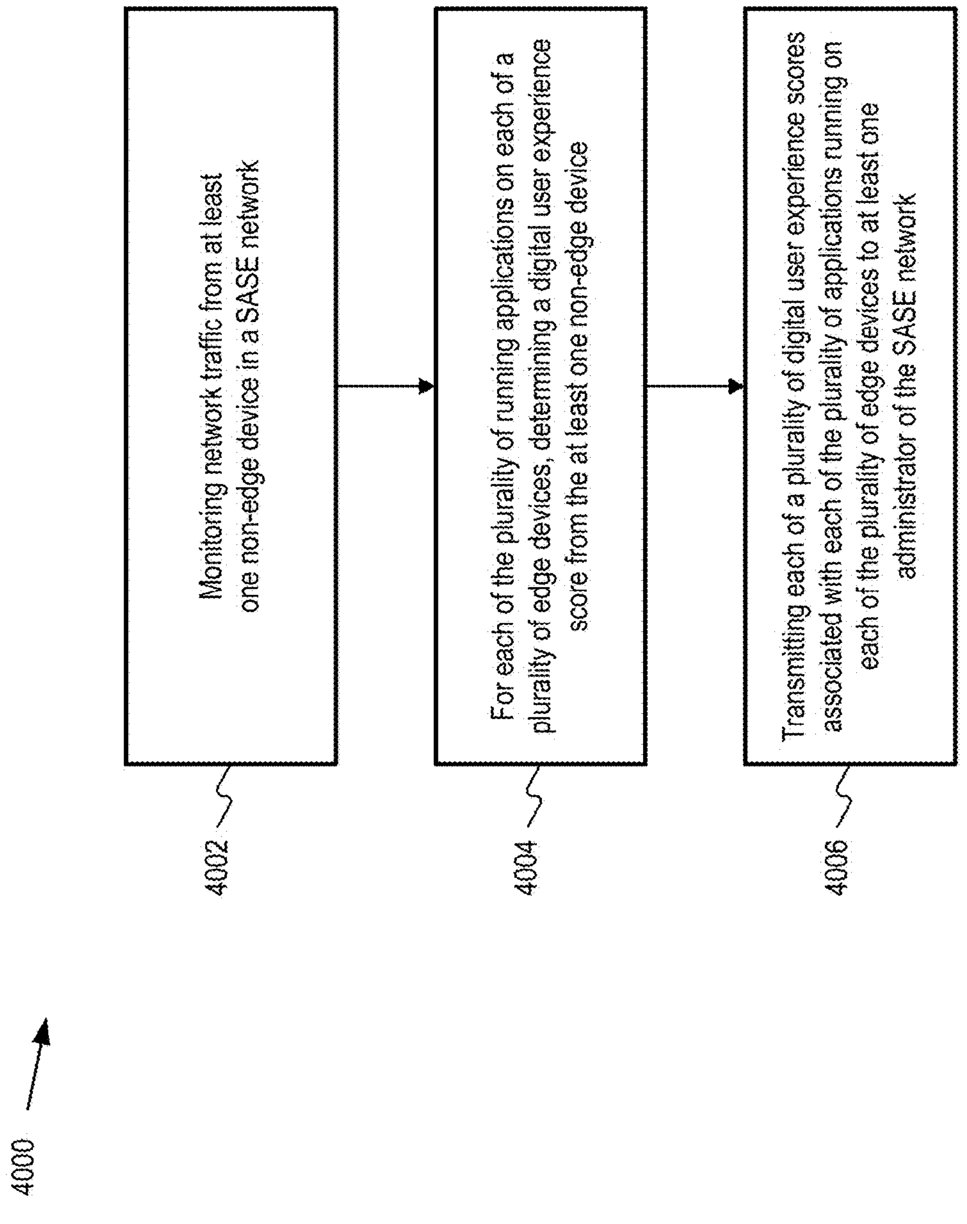
FIG. 40 is a flowchart of an example process for performing client application-less operations for digital experience monitoring, consistent with some disclosed embodiments.

FIG. 40 is a flowchart of example process 4000 for performing client application-less operations for digital experience monitoring based on real user communications, consistent with some disclosed embodiments. In some embodiments, process 4000 may be performed by at least on processor (e.g., processor 3906 in FIG. 39) to perform operations or functions described herein. In some embodiments, some aspects of process 4000 may be implemented as software (e.g., program codes or instructions) that are stored in a memory (e.g., memory 3904 in FIG. 39) or a non-transitory computer readable medium. In some embodiments, some aspects of process 4000 may be implemented as hardware (e.g., a specific-purpose circuit). In some embodiments, process 4000 may be implemented as a combination of software and hardware.

Referring to FIG. 40, process 4000 may include a step 4002 of monitoring network traffic from at least one non-edge device in a SASE network.

Process 4000 may include a step 4004 of for each of the plurality of applications running on each of a plurality of edge devices, determining a digital user experience score from the at least one non-edge device.

Process 4000 may include a step 4006 of transmitting each of the digital user experience scores associated with each of the plurality of applications running on each of the plurality of edge devices to at least one administrator of the SASE network.

Figure 41:
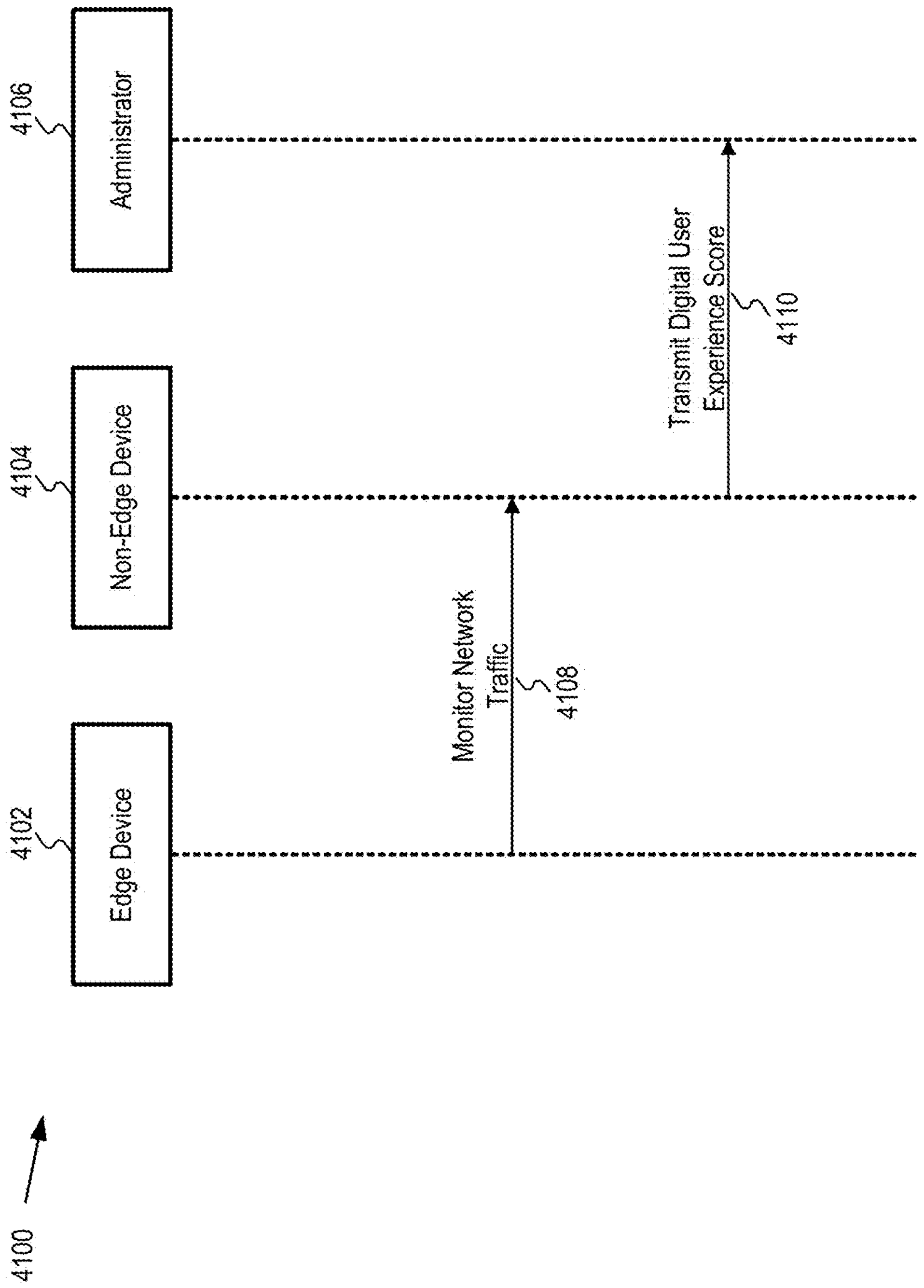
FIG. 41 illustrates an exemplary communication protocol for performing client application-less operations for digital experience monitoring, consistent with some disclosed embodiments.

FIG. 41 illustrates an exemplary communication protocol 4100 for performing client application-less operations for digital experience monitoring, consistent with some disclosed embodiments. In some embodiments, communication protocol 4100 may include an edge device 4102 (as previously described and exemplified). In some embodiments, communication protocol 4100 may include a non-edge device 4104 (as described and exemplified herein). In some embodiments, communication protocol 4100 may include an administrator 4106 (as described and exemplified herein). In some embodiments, communication protocol 4100 may include a non-edge device 4104 that monitors network traffic 4108 (as described and exemplified herein) associated with an edge device 4102. In some embodiments, a non-edge device 4104 may transmit digital user experience scores 4110 (as described and exemplified herein) to an administrator 4106, where the transmitted digital user experience scores 4110 correspond to the monitored network traffic 4108 originating from the edge device 4102.

Examples of inventive concepts are contained in the following clauses which are an integral part of this disclosure:

Clause 1. A computer readable medium containing instructions that when executed by at least one processor causes the at least one processor to perform network synchronization operations in a network containing a plurality of distributed server clusters connected to a plurality of edge devices, the operations comprising:

- maintaining a plurality of copies of a routing table, the plurality of copies of the routing table being distributed to a plurality of locations across the distributed server clusters and the plurality of edge devices;
- detecting, at at least one server in the plurality of distributed server clusters, a connectivity change, the connectivity change being expressible as a delta in the routing table; and
- distributing the delta to the plurality of locations across the distributed server clusters and the plurality of edge devices to thereby update the plurality of copies of the routing table rendering the plurality of copies of the routing table synchronized.

Clause 2. The computer readable medium of clause 1, the operations further comprising associating the delta with at least one particular edge device, determining a subset of the plurality of distributed server clusters communicatively associated with the at least one particular edge device, and wherein distributing the delta includes sending the delta to the subset and avoiding transmission of the delta to at least some of the plurality of distributed server clusters outside the subset.

Clause 3. The computer readable medium of any of clauses 1-2, wherein at least some of the plurality of copies of the distributed routing table differ from other of the plurality of copies of the distributed routing table.

Clause 4. The computer readable medium of any of clauses 1-3, wherein the at least some of the plurality of distributed server clusters outside the subset include all of the plurality of distributed server clusters outside the subset.

Clause 5. The computer readable medium of any of clauses 1-4, wherein the operations further comprise predicting that at least one additional server cluster not communicatively associated with the at least one particular edge device may later become communicatively associated with the at least one particular edge device and transmitting the delta to at least one additional server cluster.

Clause 6. The computer readable medium of any of clauses 1-5, wherein the connectivity change is associated with a new edge device previously not identified in the network.

Clause 7. The computer readable medium of any of clauses 1-6, wherein the connectivity change is associated with one of the plurality of edge devices disconnecting from the network.

Clause 8. The computer readable medium of any of clauses 1-7, wherein the connectivity change is detected based on traffic analysis.

Clause 9. The computer readable medium of any of clauses 1-8, wherein the plurality of edge devices include a gateway device.

Clause 10. The computer readable medium of any of clauses 1-9, wherein the plurality of edge devices include a router device.

Clause 11. The computer readable medium of any of clauses 1-10, wherein the plurality of edge devices include a network segment.

Clause 12. The computer readable medium of any of clauses 1-11, wherein one of the plurality of edge devices is associated with a user.

Clause 13. The computer readable medium of any of clauses 1-12, wherein the network is a SASE network.

Clause 14. The computer readable medium of any of clauses 1-13, wherein the delta is associated with an Internet Protocol address for a computing device.

Clause 15. The computer readable medium of any of clauses 1-14, wherein the plurality of copies of the routing table are associated with a common security policy configured for enforcement across the distributed server clusters and the plurality of edge devices.

Clause 16. The computer readable medium of any of clauses 1-15, wherein the common security policy includes a common firewall for the distributed server clusters and the plurality of edge devices.

Clause 17. A system for performing network synchronization operations in a network containing a plurality of distributed server clusters connected to a plurality of edge devices, the system comprising:

at least one processor configured to:

- maintain a plurality of copies of a routing table, the plurality of copies of the routing table being distributed to a plurality of locations across the distributed server clusters and the plurality of edge devices;
- detect, at at least one server in the plurality of distributed server clusters, a connectivity change, the connectivity change being expressible as a delta in the routing table; and
- distribute the delta to the plurality of locations across the distributed server clusters and the plurality of edge devices to thereby update the plurality of copies of the routing table rendering the plurality of copies of the routing table synchronized.

Clause 18. A method for performing network synchronization operations in a network containing a plurality of distributed server clusters connected to a plurality of edge devices, the method comprising:

- maintaining a plurality of copies of a routing table, the plurality of copies of the routing table being distributed to a plurality of locations across the distributed server clusters and the plurality of edge devices;
- detecting, at at least one server in the plurality of distributed server clusters, a connectivity change, the connectivity change being expressible as a delta in the routing table; and
- distributing the delta to the plurality of locations across the distributed server clusters and the plurality of edge devices to thereby update the plurality of copies of the routing table rendering the plurality of copies of the routing table synchronized.

Clause 19. A computer readable medium containing instructions that when executed by at least one processors cause the at least one processor to perform network connection operations comprising:

accessing a cloud service via a client device, the cloud service containing real-time network information including at least two of a real-time server load for a plurality of network servers, real-time server capacity for the plurality of network servers, at least one customer preference, or geolocation IP;

receiving from the cloud service, identities of a plurality of candidate servers from among the plurality of network servers, wherein, based on the real time network information, the plurality of candidate servers meet criteria for potential establishment of a network connection with the client device;

transmitting probe packets from the client device to at least some of the plurality of candidate servers;

receiving responses to the probe packets;

determining from the responses, communication characteristics for at least some of the transmitted probe packets;

selecting a server based on the determined communication characteristics; and establishing a network connection between the client device and the selected server.

Clause 20. The computer readable medium of any of clauses 1-19, wherein the plurality of candidate servers are selected from among the plurality of network servers based on geographical proximity to the client device.

Clause 21. The computer readable medium of any of clauses 1-20, wherein the plurality of candidate servers are selected from among the plurality of network servers based on user preferences.

Clause 22. The computer readable medium of any of clauses 1-21, wherein the plurality of candidate servers are selected from among the plurality of network servers based on network load.

Clause 23. The computer readable medium of any of clauses 1-22, wherein the plurality of candidate servers are selected from among the plurality of network servers based on communication latency.

Clause 24. The computer readable medium of any of clauses 1-23, wherein the plurality of candidate servers are selected from among the plurality of network servers based on a local language.

Clause 25. The computer readable medium of any of clauses 1-24, wherein the plurality of candidate servers are selected from among the plurality of network servers based on server load.

Clause 26. The computer readable medium of any of clauses 1-25, wherein the plurality of candidate servers are selected from among the plurality of network servers based on network traffic predictions.

Clause 27. The computer readable medium of any of clauses 1-26, wherein the plurality of candidate servers are selected from among the plurality of network servers based on a history of connectivity with the client device.

Clause 28. The computer readable medium of any of clauses 1-27, wherein the determined communication characteristics for selecting the server include user preferences.

Clause 29. The computer readable medium of any of clauses 1-28, wherein the user preferences include a location associated with a geolocation IP service.

Clause 30. The computer readable medium of any of clauses 1-29, wherein the determined communication characteristics for selecting the server include a prediction for meeting a threshold level of network performance.

Clause 31. The computer readable medium of any of clauses 1-30, wherein the threshold level of network performance is associated with communication latency.

Clause 32. The computer readable medium of any of clauses 1-31, wherein the threshold level of network performance is associated with packet loss.

Clause 33. The computer readable medium of any of clauses 1-32, wherein the threshold level of network performance is associated with jitter.

Clause 34. A system for performing network connection operations comprising:

at least one processor configured to:

access a cloud service via a client device, the cloud service containing real-time network information including at least two of a real-time server load for a plurality of network servers, real-time server capacity for the plurality of network servers, at least one customer preference, or geolocation IP;

receive from the cloud service, identities of a plurality of candidate servers from among the plurality of network servers, wherein, based on the real-time network information, the plurality of candidate servers meet criteria for potential establishment of a network connection with the client device;

transmit probe packets from the client device to at least some of the plurality of candidate servers;

receive responses to the probe packets;

determine from the responses, communication characteristics for at least some of the transmitted probe packets;

select a server based on the determined communication characteristics; and establish a network connection between the client device and the selected server.

Clause 35. The system of any of clauses 1-34, wherein the plurality of candidate servers are selected from among the plurality of network servers based on geographical proximity to the client device.

Clause 36. The system of any of clauses 1-35, wherein the plurality of candidate servers are selected from among the plurality of network servers based on user preferences.

Clause 37. The system of any of clauses 1-36, wherein the plurality of candidate servers are selected from among the plurality of network servers based on network load.

Clause 38. A method for performing network connection operations, the method comprising:

accessing a cloud service via a client device, the cloud service containing real-time network information including at least two of a real-time server load for a plurality of network servers, real-time server capacity for the plurality of network servers, at least one customer preference, or geolocation IP;

receiving from the cloud service, identities of a plurality of candidate servers from among the plurality of network servers, wherein, based on the real-time network information, the plurality of candidate servers meet criteria for potential establishment of a network connection with the client device;

transmitting probe packets from the client device to at least some of the plurality of candidate servers;

receiving responses to the probe packets;

determining from the responses, communication characteristics for at least some of the transmitted probe packets;

selecting a server based on the determined communication characteristics; and establishing a network connection between the client device and the selected server.

Clause 39. A computer readable medium containing instructions that when executed by at least one processor cause the at least one processor to perform operations for load balancing network traffic, the operations comprising:

receiving at a particular server among a plurality of candidate servers, one of a plurality of probes sent from a client device to the plurality of candidate servers;

interpreting, at the particular server, the received probe to recognize that the received probe is a precursor to a persistent connection between the particular server and the client device;

determining that a prospective connection between the particular server and the client device would be sub-optimal; and transmitting a biased response from the particular server to the client device to discourage establishment of the persistent connection between the client device and the particular server.

Clause 40. The computer readable medium of any of clauses 1-39, wherein the biased response is a delayed response.

Clause 41. The computer readable medium of any of clauses 1-40, wherein the biased response includes information discouraging the persistent connection.

Clause 42. The computer readable medium of any of clauses 1-41, wherein the determination that that a prospective connection between the particular server and the client device would be sub-optimal is based on at least one of a current load on the particular server, an available bandwidth, a number of devices connected to the particular server, an extent of network flow, or a maintenance schedule.

Clause 43. The computer readable medium of any of clauses 1-42, further comprising determining the biased response based on an identify of a user associated with the client device.

Clause 44. The computer readable medium of any of clauses 1-43, further comprising determining the biased response based on a location associated with the client device.

Clause 45. The computer readable medium of any of clauses 1-44, further comprising determining the biased response based on a role associated with the client device.

Clause 46. The computer readable medium of any of clauses 1-45, further comprising determining the biased response based on an application associated with the client device.

Clause 47. The computer readable medium of any of clauses 1-46, further comprising determining the biased response based on a prediction of subsequent activity by the client device.

Clause 48. The computer readable medium of any of clauses 1-47, wherein the plurality of candidate servers are selected from a plurality of servers in a SASE network based on real time network information including at least two of: a real time server load for the plurality of network servers, real time server capacity for the plurality of network servers, at least one customer preference, or geolocation IP.

Clause 49. The computer readable medium of any of clauses 1-48, wherein, based on the real time network information, the plurality of candidate servers meet criteria for potential establishment of a network connection with the client device.

Clause 50. A system for load balancing network traffic, the system comprising: at least one processor configured to:

receive at a particular server among a plurality of candidate servers, one of a plurality of probes sent from a client device to the plurality of candidate servers;

interpret, at the particular server, the received probe to recognize that the received probe is a precursor to a persistent connection between the particular server and the client device;

determine that a prospective connection between the particular server and the client device would be sub-optimal; and transmit a biased response from the particular server to the client device to discourage establishment of the persistent connection between the client device and the particular server.

Clause 51. The system of any of clauses 1-50, wherein the biased response is a delayed response.

Clause 52. The system of any of clauses 1-51, wherein the biased response includes information discouraging the persistent connection.

Clause 53. The system of any of clauses 1-52, wherein the determination that that a prospective connection between the particular server and the client device would be sub-optimal is based on at least one of a current load on the particular server, an available bandwidth, a number of devices connected to the particular server, an extent of network flow, or a maintenance schedule.

Clause 54. The system of any of clauses 1-53, further comprising determining the biased response based on an identity of a user associated with the client device.

Clause 55. The system of any of clauses 1-54, further comprising determining the biased response based on a location associated with the client device.

Clause 56. The system of any of clauses 1-55, further comprising determining the biased response based on a role associated with the client device.

Clause 57. The system of any of clauses 1-56, further comprising determining the biased response based on an application associated with the client device.

Clause 58. A method for load balancing network traffic, the method comprising: receiving at a particular server among a plurality of candidate servers, one of a plurality of probes sent from a client device to the plurality of candidate servers;

interpreting, at the particular server, the received probe to recognize that the received probe is a precursor to a persistent connection between the particular server and the client device;

determining that a prospective connection between the particular server and the client device would be sub-optimal; and transmitting a biased response from the particular server to the client device to discourage establishment of the persistent connection between the client device and the particular server.

Clause 59. A computer readable medium containing instructions that when executed by at least one processor cause the at least one processor to perform operations for altering network connections during maintenance periods, the operations comprising:

monitoring via a cloud service, a network of distributed servers and client devices, wherein the monitoring includes maintaining records of software upgrade schedules for the distributed servers and existing tunnels between the client devices and the distributed servers;

receiving at the cloud service a request to upgrade software on a particular server among the distributed servers;

in response to the request, scheduling the software upgrade;

accessing the records to identify an existing tunnel between a client device and the particular server;

prior to the scheduled software upgrade, accessing the records to identify an alternative server to which existing tunnel traffic can be directed during the software upgrade; and following identification of the alternative server and prior to the scheduled software upgrade, rerouting network traffic flow from the client device to the alternative server to thereby avoid a communication blip.

Clause 60. The computer readable medium of any of clauses 1-59, wherein the software upgrade is scheduled to occur within a time window, and wherein the operations further comprise receiving from the client device a specific time for rerouting the network traffic flow within the time window.

Clause 61. The computer readable medium of any of clauses 1-60, wherein the operations further comprise, following completion of the scheduled software upgrade, routing network traffic flow back from the alternative server to the particular server.

Clause 62. The computer readable medium of any of clauses 1-61, wherein the operations further comprise, following completion of the scheduled software upgrade, maintaining network traffic flow between the client device and the alternative server.

Clause 63. The computer readable medium of any of clauses 1-62, wherein the identification of the alternative server is based at least on a recent completion of the software upgrade on the alternative server.

Clause 64. The computer readable medium of any of clauses 1-63, wherein the particular server and the alternative server are included in a common cluster of servers.

Clause 65. The computer readable medium of any of clauses 1-64, further comprising scheduling the software upgrade for each server in the common cluster of servers.

Clause 66. The computer readable medium of any of clauses 1-65, wherein the software upgrade is scheduled during different time windows for at least some of the servers in the cluster of servers.

Clause 67. The computer readable medium of any of clauses 1-66, wherein the software upgrade is scheduled during a common time window for at least some of the servers in the cluster of servers.

Clause 68. The computer readable medium of any of clauses 1-67, wherein the particular server is included in a first cluster of servers, and wherein the alternative server is included in a second cluster of servers.

Clause 69. The computer readable medium of any of clauses 1-68, further comprising scheduling the software upgrade for each server in the first cluster of servers.

Clause 70. The computer readable medium of any of clauses 1-69, wherein the operations further comprise accessing the records to identify at least one additional existing tunnel between at least one additional client device and the particular server; and prior to performance of the scheduled software upgrade on the particular server, rerouting network traffic flow from the at least one additional client device to thereby avoid at least one an additional communication blip.

Clause 71. The computer readable medium of any of clauses 1-70, wherein the network traffic flow is rerouted from the at least one additional client device to the alternative server.

Clause 72. The computer readable medium of any of clauses 1-71, wherein the network traffic flow is rerouted from the at least one additional client device to at least one additional alternative server.

Clause 73. The computer readable medium of any of clauses 1-72, wherein the alternative server and the at least one additional alternative server are included in a common cluster of servers.

Clause 74. The computer readable medium of any of clauses 1-73, wherein the alternative server is included in a first cluster of servers and wherein the at least one additional server is included in a second cluster of servers.

Clause 75. The computer readable medium of any of clauses 1-74, wherein the rerouting of the network traffic flow from the client device and from the at least one additional client device occur during a common time window.

Clause 76. A system for altering network connections during maintenance periods, the system comprising;

At least one processor configured to:

monitor via a cloud service, a network of distributed servers and client devices, wherein the monitoring includes maintaining records of software upgrade schedules for the distributed servers and existing tunnels between the client devices and the distributed servers;

receive at the cloud service a request to upgrade software on a particular server among the distributed servers;

in response to the request, schedule the software upgrade;

access the records to identify an existing tunnel between a client device and the particular server;

prior to the scheduled software upgrade, access the records to identify an alternative server to which existing tunnel traffic can be directed during the software upgrade; and following identification of the alternative server and prior to the scheduled software upgrade, reroute network traffic flow from the client device to the alternative server to thereby avoid a communication blip.

Clause 77. A method for altering network connections during maintenance periods, the method comprising:

monitoring via a cloud service, a network of distributed servers and client devices, wherein the monitoring includes maintaining records of software upgrade schedules for the distributed servers and existing tunnels between the client devices and the distributed servers;

receiving at the cloud service a request to upgrade software on a particular server among the distributed servers;

in response to the request, scheduling the software upgrade;

accessing the records to identify an existing tunnel between a client device and the particular server;

prior to the scheduled software upgrade, accessing the records to identify an alternative server to which existing tunnel traffic can be directed during the software upgrade; and following identification of the alternative server and prior to the scheduled software upgrade, rerouting network traffic flow from the client device to the alternative server to thereby avoid a communication blip.

Clause 78. A computer readable medium containing instructions that when executed by at least one processor cause the at least one processor to perform unified network security management operations, comprising:

maintaining in a cloud service management application, a unified policy for controlling network security across a plurality of servers and edge devices, wherein the plurality of servers and edge devices are configured to perform differing and complementary security actions;

instructing, consistent with the unified policy, each edge device to perform first subsets of the security actions; and instructing, consistent with the unified policy, each server to perform second subsets of the security actions, wherein the first subsets of security actions and the second subsets of security actions are coordinated to achieve an overall security state defined by the unified policy.

Clause 79. The computer readable medium of any of clauses 1-78, wherein the unified policy for controlling network security includes at least an implementation of a common firewall at each edge device and at each server.

Clause 80. The computer readable medium of any of clauses 1-79, wherein the unified policy for controlling network security includes at least an implementation of a coordinated encryption protocol at each edge device and at each server.

Clause 81. The computer readable medium of any of clauses 1-80, wherein the unified policy for controlling network security includes at least a connectivity portion.

Clause 82. The computer readable medium of any of clauses 1-81, wherein the connectivity portion includes restricting incoming and outgoing data associated with at least one application running on the edge devices.

Clause 83. The computer readable medium of any of clauses 1-82, wherein the connectivity portion includes assigning different priorities for allocating bandwidth to different applications running on the edge devices.

Clause 84. The computer readable medium of any of clauses 1-83, wherein the connectivity portion includes assigning different priorities for allocating bandwidth to different edge devices associated with different users.

Clause 85. The computer readable medium of any of clauses 1-84, wherein the instructing includes transmitting a common configuration file defining at least a portion of the unified policy to each edge device and to each server.

Clause 86. The computer readable medium of any of clauses 1-85, wherein the instructing includes transmitting a first configuration file defining the unified policy to each edge device and transmitting a second configuration file defining the unified policy to each server.

Clause 87. The computer readable medium of any of clauses 1-86, wherein the first configuration file is formatted according to first file format and wherein the second configuration file is formatted according to a second file format.

Clause 88. The computer readable medium of any of clauses 1-87, wherein capabilities of the unified policy differ between the edge devices and the servers.

Clause 89. The computer readable medium of any of clauses 1-88, further comprising providing an administrative view of the differences in capabilities.

Clause 90. The computer readable medium of any of clauses 1-89, wherein the first subsets of the security actions and the second subsets of the security actions include at least partial enforcement of the unified policy.

Clause 91. A system for performing unified network security management operations, the system comprising:

at least one processor configured to:

maintain in a cloud service management application, a unified policy for controlling network security across a plurality of servers and edge devices, wherein the plurality of servers and edge devices are configured to perform differing and complementary security actions;

instruct, consistent with the unified policy, each edge device to perform first subsets of the security actions; and instruct, consistent with the unified policy, each server to perform second subsets of the security actions, wherein the first subsets of security actions and the second subsets of security actions are coordinated to achieve an overall security state defined by the unified policy.

Clause 92. The system of any of clauses 1-91, wherein the unified policy for controlling network security includes at least an implementation of a common firewall at each edge device and at each server.

Clause 93. The system of any of clauses 1-92, wherein the unified policy for controlling network security includes at least an implementation of a coordinated encryption protocol at each edge device and at each server.

Clause 94. The system of any of clauses 1-93, wherein the unified policy for controlling network security includes at least a connectivity portion.

Clause 95. The system of any of clauses 1-94, wherein the connectivity portion includes restricting incoming and outgoing data associated with at least one application running on the edge devices.

Clause 96. The system of any of clauses 1-95, wherein the connectivity portion includes assigning different priorities for allocating bandwidth to different applications running on the edge devices.

Clause 97. A method for performing unified network security management operations, the method comprising:

maintaining in a cloud service management application, a unified policy for controlling network security across a plurality of servers and edge devices, wherein the plurality of servers and edge devices are configured to perform differing and complementary security actions;

instructing, consistent with the unified policy, each edge device to perform first subsets of the security actions; and instructing, consistent with the unified policy, each server to perform second subsets of the security actions, wherein the first subsets of security actions and the second subsets of security actions are coordinated to achieve an overall security state defined by the unified policy.

Clause 98. A computer readable medium containing instructions that when executed by at least one processor cause the at least one processor to perform bidirectional network policy optimization operations, comprising:

maintaining in a cloud service management application a policy prioritizing bandwidth allocation based on organizational preferences;

distributing the policy to servers in a network to thereby cause the servers to implement the policy by controlling a first allocation of bandwidth to inbound traffic; and distributing the policy to edge devices in the network to thereby cause the edge devices to implement the policy by controlling a second allocation of bandwidth to outbound traffic.

Clause 99. The computer readable medium of any of clauses 1-98, further comprising updating the policy prioritizing bandwidth dynamically in response to detection of at least one condition, distributing the updated policy to the servers to thereby cause the servers to implement the updated policy by controlling a third allocation of bandwidth to inbound traffic, and distributing the updated policy to the edge devices to thereby cause the edge devices to implement the updated policy by controlling a fourth allocation of bandwidth to inbound traffic.

Clause 100. The computer readable medium of any of clauses 1-99, wherein the at least one condition is associated with at least one of a traffic congestion threshold, channel capacity threshold, a communication link quality threshold, a time of day, a latency threshold, a packet loss threshold, a jitter threshold, a round trip time (RTT) threshold, a quality of service threshold, at least one client preference.

Clause 101. The computer readable medium of any of clauses 1-100, wherein controlling the first allocation of bandwidth and controlling the second allocation of bandwidth includes prioritizing allocations of bandwidth.

Clause 102. The computer readable medium of any of clauses 1-101, wherein prioritizing allocations of bandwidth includes allocating bandwidth for at least one first application at a higher priority than allocation of bandwidth for at least one second application.

Clause 103. The computer readable medium of any of clauses 1-102, wherein prioritizing allocations of bandwidth includes allocation of bandwidth for at least one first user at a higher priority than allocation of bandwidth for at least one second user.

Clause 104. The computer readable medium of any of clauses 1-103, wherein controlling the first allocation of bandwidth and controlling the second allocation of bandwidth includes restricting data flow associated with at least one application.

Clause 105. The computer readable medium of any of clauses 1-104, wherein controlling the first allocation of bandwidth and controlling the second allocation of bandwidth includes restricting data flow through at least one region.

Clause 106. The computer readable medium of any of clauses 1-105, wherein controlling the first allocation of bandwidth and controlling the second allocation of bandwidth is based on availability of at least one resource.

Clause 107. The computer readable medium of any of clauses 1-106, wherein controlling the first allocation of bandwidth and controlling the second allocation of bandwidth includes compliance with at least one regulation.

Clause 108. The computer readable medium of any of clauses 1-107, wherein the regulation is associated with a specific region.

Clause 109. A system for performing bidirectional network policy optimization operations, the system comprising:

at least one processor configured to:

- maintain in a cloud service management application a policy prioritizing bandwidth allocation based on organizational preferences;
- distribute the policy to servers in a network to thereby cause the servers to implement the policy by controlling a first allocation of bandwidth to inbound traffic; and
- distribute the policy to edge devices in the network to thereby cause the edge devices to implement the policy by controlling a second allocation of bandwidth to outbound traffic.

Clause 110. The system of any of clauses 1-109, further comprising updating the policy prioritizing bandwidth dynamically in response to detection of at least one condition, distributing the updated policy to the servers to thereby cause the servers to implement the updated policy by controlling a third allocation of bandwidth to inbound traffic, and distributing the updated policy to the edge devices to thereby cause the edge devices to implement the updated policy by controlling a fourth allocation of bandwidth to inbound traffic.

Clause 111. The system of any of clauses 1-110, wherein the at least one condition is associated with at least one of a traffic congestion threshold, channel capacity threshold, a communication link quality threshold, a time of day, a latency threshold, a packet loss threshold, a jitter threshold, a round trip time (RTT) threshold, a quality of service threshold, at least one client preference.

Clause 112. The system of any of clauses 1-111, wherein controlling the first allocation of bandwidth and controlling the second allocation of bandwidth includes prioritizing allocations of bandwidth.

Clause 113. The system of any of clauses 1-112, wherein prioritizing allocations of bandwidth includes allocating bandwidth for at least one first application at a higher priority than allocation of bandwidth for at least one second application.

Clause 114. The system of any of clauses 1-113, wherein prioritizing allocations of bandwidth includes allocation of bandwidth for at least one first user at a higher priority than allocation of bandwidth for at least one second user.

Clause 115. The system of any of clauses 1-114, wherein controlling the first allocation of bandwidth and controlling the second allocation of bandwidth includes restricting data flow associated with at least one application.

Clause 116. The system of any of clauses 1-115, wherein controlling the first allocation of bandwidth and controlling the second allocation of bandwidth includes restricting data flow through at least one region.

Clause 117. A method for performing bidirectional network policy optimization operations, the method comprising:

- maintaining in a cloud service management application a policy prioritizing bandwidth allocation based on organizational preferences;
- distributing the policy to servers in a network to thereby cause the servers to implement the policy by controlling a first allocation of bandwidth to inbound traffic; and
- distributing the policy to edge devices in the network to thereby cause the edge devices to implement the policy by controlling a second allocation of bandwidth to outbound traffic.

Clause 118. A computer readable medium containing instructions that when implemented by at least one processor cause the at least one processor to perform dynamic network security operations, comprising:

- monitoring traffic associated with endpoints in a SASE network;
- classifying endpoint behavior based on the monitored traffic;
- generating a dynamic secure access policy for each endpoint based on classified behavior associated with each endpoint, the dynamic secure access policy governing a plurality of resources provided by a plurality of non-related entities and to which each endpoint is entitled to access;
- enforcing the policy based on the classified behavior to thereby prevent unapproved access to resources among the plurality of non-related entities;
- monitoring changes in endpoint traffic behavior to determine resource usage variances; and revising the dynamic secure access policy based on the resource usage variances to reduce an attack surface.

Clause 119. The computer readable medium of any of clauses 1-118, further comprising automatically applying the revised dynamic secure access policy in response to the monitored changes.

Clause 120. The computer readable medium of any of clauses 1-119, further comprising confirming approval of the automatic application of the revised dynamic secure access policy following the automatic application of the revised dynamic secure access policy.

Clause 121. The computer readable medium of any of clauses 1-120, wherein classifying the endpoint behavior is based on endpoint device type.

Clause 122. The computer readable medium of any of clauses 1-121, wherein classifying the endpoint behavior is based on user type.

Clause 123. The computer readable medium of any of clauses 1-122, wherein classifying the endpoint behavior is based on traffic type.

Clause 124. The computer readable medium of any of clauses 1-123, wherein the plurality of non-related entities are associated with at least two of an email application, a file sharing application, or a web browsing application.

Clause 125. The computer readable medium of any of clauses 1-124, wherein the dynamic secure access policy permits transmission of a data type in association with a first context and denies transmission of the data type in association with a second context.

Clause 126. The computer readable medium of any of clauses 1-125, wherein the revised dynamic secure access policy restricts access to a resource to which access was previously permitted.

Clause 127. The computer readable medium of any of clauses 1-126, wherein the revised dynamic secure access policy permits access to a resource to which access was previously restricted.

Clause 128. The computer readable medium of any of clauses 1-127, wherein the resource usage variances include at least one time-based anomaly.

Clause 129. The computer readable medium of any of clauses 1-128, wherein the resource usage variances include at least one context-based anomaly.

Clause 130. The computer readable medium of any of clauses 1-129, wherein the resource usage variances include at least one location-based anomaly.

Clause 131. The computer readable medium of any of clauses 1-130, wherein the resource usage variances include at least one usage-based anomaly.

Clause 132. The computer readable medium of any of clauses 1-131, wherein the usage-based anomaly indicates cessation of performance of an activity that was previously permitted, and wherein the revised dynamic secure access policy denies performance of the activity.

Clause 133. The computer readable medium of any of clauses 1-132, wherein the usage-based anomaly indicates performance of a new activity, and wherein the revised dynamic secure access policy permits performance of the activity.

Clause 134. A system for performing dynamic network security operations, the system comprising:

at least one processor configured to:

monitor traffic associated with endpoints in a SASE network;

classify endpoint behavior based on the monitored traffic;

generate a dynamic secure access policy for each endpoint based on classified behavior associated with each endpoint, the dynamic secure access policy governing a plurality of resources provided by a plurality of non-related entities and to which each endpoint is entitled to access;

enforce the policy based on the classified behavior to thereby prevent unapproved access to resources among the plurality of non-related entities;

monitor changes in endpoint traffic behavior to determine resource usage variances; and revise the dynamic secure access policy based on the resource usage variances to reduce an attack surface.

Clause 135. A method for performing dynamic network security operations, the method comprising:

monitoring traffic associated with endpoints in a SASE network;

classifying endpoint behavior based on the monitored traffic;

generating a dynamic secure access policy for each endpoint based on classified behavior associated with each endpoint, the dynamic secure access policy governing a plurality of resources provided by a plurality of non-related entities and to which each endpoint is entitled to access;

enforcing the policy based on the classified behavior to thereby prevent unapproved access to resources among the plurality of non-related entities;

monitoring changes in endpoint traffic behavior to determine resource usage variances; and revising the dynamic secure access policy based on the resource usage variances to reduce an attack surface.

Clause 136. A non-transitory computer readable medium containing instructions that when executed by at least one processor cause the at least one processor to perform operations for synchronizing network and endpoint security protocols, the operations comprising:

receiving a device posture from an application running on an edge device;

receiving from a server in communication with the edge device, network traffic information associated with the edge device;

correlating the device posture and the network traffic information; and implementing a network security policy based on the correlation such that both the device posture from the edge device and the network traffic information from the server are used to enforce the network security policy.

Clause 137. The computer readable medium of any of clauses 1-136, wherein the device posture includes at least one software application type.

Clause 138. The computer readable medium of any of clauses 1-137, wherein the device posture includes at least one software application version.

Clause 139. The computer readable medium of any of clauses 1-138, wherein the device posture includes at least one endpoint device type.

Clause 140. The computer readable medium of any of clauses 1-139, wherein the device posture indicates at least one obsolete security standard and wherein implementing the network security policy includes taking a remedial action.

Clause 141. The computer readable medium of any of clauses 1-140, wherein the remedial action includes permitting communication associated with a first group of resources, and denying communication associated with a second group of resources.

Clause 142. The computer readable medium of any of clauses 1-141, wherein the remedial action includes conditioning communication in response to receiving a confirmation from a user.

Clause 143. The computer readable medium of any of clauses 1-142, wherein the network traffic information includes a destination server type.

Clause 144. The computer readable medium of any of clauses 1-143, wherein the network traffic information includes a destination server location.

Clause 145. The computer readable medium of any of clauses 1-144, wherein the network traffic information includes prioritization of traffic based on traffic type.

Clause 146. A system for synchronizing network and endpoint security protocols, the system comprising:

at least one processor configured to:

receive a device posture from an application running on an edge device;

receive from a server in communication with the edge device, network traffic information associated with the edge device;

correlate the device posture and the network traffic information; and implement a network security policy based on the correlation such that both the device posture from the edge device and the network traffic information from the server are used to enforce the network security policy.

Clause 147. The system of any of clauses 1-146, wherein the device posture includes at least one software application type.

Clause 148. The system of any of clauses 1-147, wherein the device posture includes at least one software application version.

Clause 149. The system of any of clauses 1-148, wherein the device posture includes at least one endpoint device type.

Clause 150. The system of any of clauses 1-149, wherein the device posture indicates at least one obsolete security standard and wherein implementing the network security policy includes taking a remedial action.

Clause 151. The system of any of clauses 1-150, wherein the remedial action includes permitting communication associated with a first group of resources, and denying communication associated with a second group of resources.

Clause 152. The system of any of clauses 1-151, wherein the remedial action includes conditioning communication in response to receiving a confirmation from a user.

Clause 153. The system of any of clauses 1-152, wherein the network traffic information includes a destination server type.

Clause 154. The system of any of clauses 1-153, wherein the network traffic information includes a destination server location.

Clause 155. A method for synchronizing network and endpoint security protocols, the method comprising:

receiving a device posture from an application running on an edge device;

receiving from a server in communication with the edge device, network traffic information associated with the edge device;

correlating the device posture and the network traffic information; and implementing a network security policy based on the correlation such that both the device posture from the edge device and the network traffic information from the server are used to enforce the network security policy.

Clause 156. A non-transitory computer readable medium containing instructions that when executed by at least one processor cause the at least one processor to perform real-time dynamic policy revisions, the operations comprising:

tracking, in real-time, first characteristics of dataflow passing through a plurality of engines in a cloud network;

generating in real-time a first version of a single log line aggregating the first characteristics, wherein the first characteristics include at least security inspection attributes and routing decision attributes;

based on the first characteristics, generating a first real-time dynamic policy;

applying the first real-time dynamic policy to current dataflow;

following application of the first real-time dynamic policy, tracking in real-time second characteristics of dataflow passing through the plurality of engines in the cloud network;

aggregating in real-time the second characteristics to the single log line to generate a second version of the single log line, wherein the second characteristics include at least security inspection attributes and routing decision attributes;

determining a real-time change between the first version of the single log line and the second version of the single log line;

based on the determined real-time change, generating a real-time change in the dynamic policy; and applying, in real-time to the current dataflow the real-time change in the dynamic policy.

Clause 157. The computer readable medium of any of clauses 1-156, wherein tracking in real-time the first characteristics of dataflow passing through the plurality of engines, and tracking in real-time the second characteristics of dataflow passing through the plurality of engines, determining the real-time change, and applying the real-time change in real-time to the current dataflow occurs continuously in real-time, thereby continuously applying the real-time change in the dynamic policy to the current dataflow.

Clause 158. The computer readable medium of any of clauses 1-157, wherein the first real-time dynamic policy is at least partially based on a sequence associated with the dataflow passing through the plurality of engines.

Clause 159. The computer readable medium of any of clauses 1-158, wherein the plurality of engines are located in a single cluster of servers.

Clause 160. The computer readable medium of any of clauses 1-159, wherein the plurality of engines are distributed across a plurality of clusters of servers.

Clause 161. The computer readable medium of any of clauses 1-160, wherein the plurality of engines include at least two of a device posture identification engine, a user risk score determination engine, a packet inspection engine, an Internet Protocol address (IP) reputation engine, a malware classification engine, a Data Loss Prevention (DLP) classification engine, a Next-generation of firewalls (NGFW) engine, an intrusion prevention system (IPS) engine, a secure web gateway (SWG) engine, a cloud access security broker (CASB) engine, a Zero Trust Network Access (ZTNA) engine, and a Remote browser isolation (RBI) engine.

Clause 162. The computer readable medium of any of clauses 1-161, wherein real-time application of the plurality of engines to the data flow is coordinated by a single entity.

Clause 163. The computer readable medium of any of clauses 1-162, wherein the security inspection attributes are associated with threat detection, policy enforcement, or compliance assessment.

Clause 164. The computer readable medium of any of clauses 1-163, wherein the routing decision attributes are associated with at least one of a source, a destination, an application, a session, or a network performance metric.

Clause 165. The computer readable medium of any of clauses 1-164, wherein the first real-time dynamic policy is associated with at least one of a posture, a location, a network performance metric, or a risk score.

Clause 166. The computer readable medium of any of clauses 1-165, wherein applying the first real-time dynamic policy to the current dataflow includes at least one of allowing the dataflow, blocking the dataflow, quarantining the dataflow, or issuing an alert.

Clause 167. The computer readable medium of any of clauses 1-166, wherein the real-time change between the first version of the single log line and the second version of the single log line is associated with at least one of a network path, a network performance metric, a risk score, or a policy violation.

Clause 168. A system for performing real-time dynamic policy revisions, the operations comprising:

at least one processor configured to:

track in real-time first characteristics of dataflow passing through a plurality of engines in a cloud network;

generate in real-time a first version of a single log line aggregating the first characteristics, wherein the first characteristics include at least security inspection attributes and routing decision attributes;

based on the first characteristics, generate a first real-time dynamic policy;

apply the first real-time dynamic policy to current dataflow;

following application of the first real-time dynamic policy, track in real-time second characteristics of dataflow passing through the plurality of engines in the cloud network;

aggregate in real-time the second characteristics to the single log line to generate a second version of the single log line, wherein the second characteristics include at least security inspection attributes and routing decision attributes;

determine a real-time change between the first version of the single log line and the second version of the single log line;

based on the determined real-time change, generate a real-time change in the dynamic policy; and apply, in real-time to the current dataflow the real-time change in the dynamic policy.

Clause 169. The system of any of clauses 1-168, wherein tracking in real-time the first characteristics of dataflow passing through the plurality of engines, and tracking in real-time the second characteristics of dataflow passing through the plurality of engines, determining the real-time change, and applying the real-time change in real-time to the current data flow occurs continuously in real-time, thereby continuously applying the real-time change in the dynamic policy to the current dataflow.

Clause 170. The system of any of clauses 1-169, wherein the first real-time dynamic policy is at least partially based on a sequence associated with the dataflow passing through a plurality of engines.

Clause 171. The system of any of clauses 1-170, wherein the plurality of engines are located in a single cluster of servers.

Clause 172. The system of any of clauses 1-171, wherein the plurality of engines are distributed across a plurality of clusters of servers.

Clause 173. The system of any of clauses 1-172, wherein the plurality of engines include at least two of a device posture identification engine, a user risk score determination engine, a packet inspection engine, an Internet Protocol address (IP) reputation engine, a malware classification engine, a Data Loss Prevention (DLP) classification engine, a Next-generation of firewalls (NGFW) engine, an intrusion prevention system (IPS) engine, a secure web gateway (SWG) engine, a cloud access security broker (CASB) engine, a Zero Trust Network Access (ZTNA) engine, and a Remote browser isolation (RBI) engine.

Clause 174. A method for performing real-time dynamic policy revisions, the method comprising:

tracking in real-time first characteristics of dataflow passing through a plurality of engines in a cloud network;

generating in real-time a first version of a single log line aggregating the first characteristics, wherein the first characteristics include at least security inspection attributes and routing decision attributes;

based on the first characteristics, generating a first real-time dynamic policy;

apply the first real-time dynamic policy to current dataflow;

following application of the first real-time dynamic policy, tracking in real-time second characteristics of dataflow passing through the plurality of engines in the cloud network;

aggregating in real-time the second characteristics to the single log line to generate a second version of the single log line, wherein the second characteristics include at least security inspection attributes and routing decision attributes;

determining a real-time change between the first version of the single log line and the second version of the single log line;

based on the determined real-time change, generating a real-time change in the dynamic policy; and applying, in real-time to the current dataflow the real-time change in the dynamic policy Clause 175. A non-transitory computer readable medium containing instructions that when executed by at least one processor cause the at least one processor to perform context-based data leak prevention operations in a network, the operations comprising:

accessing data;

classifying the accessed data, wherein in a first context a particular type of the data is classified as sensitive and in a second context the particular type of the data is not classified as sensitive;

intercepting outgoing network traffic;

determining that the intercepted network traffic contains the particular type of the data;

determining whether the particular type of the data in the intercepted network traffic corresponds to the second context; and when the particular type of the data in the intercepted network traffic corresponds to the second context as opposed to the first context, implementing a remedial measure to mitigate leakage of the particular type of the data.

Clause 176. The computer readable medium of any of clauses 1-175, wherein the operations further include:

receiving organization-specific documents, and using machine learning to determine the second context based on the received organization-specific documents.

Clause 177. The computer readable medium of any of clauses 1-176, wherein the operations further include using the organization-specific documents with machine learning to determine the first context.

Clause 178. The computer readable medium of any of clauses 1-177, wherein the operations further include analyzing network traffic from a plurality of organizations using machine learning to determine the second context.

Clause 179. The computer readable medium of any of clauses 1-178, wherein the operations further include using the network traffic from the plurality of organizations with machine learning to determine the first context.

Clause 180. The computer readable medium of any of clauses 1-179, wherein the accessing of the data includes receiving organization-specific documents.

Clause 181. The computer readable medium of any of clauses 1-180, wherein the first context and the second context are associated with different software applications.

Clause 182. The computer readable medium of any of clauses 1-181, wherein the first context and the second context are associated with different data usage contexts.

Clause 183. The computer readable medium of any of clauses 1-182, wherein the first context and the second context are associated with different users.

Clause 184. The computer readable medium of any of clauses 1-183, wherein the first context and the second context are associated with different client device types.

Clause 185. The computer readable medium of any of clauses 1-184, wherein the first context and the second context are associated with different locations.

Clause 186. The computer readable medium of any of clauses 1-185, wherein intercepting the outgoing network traffic occurs at a client device.

Clause 187. The computer readable medium of any of clauses 1-186, wherein intercepting the outgoing network traffic occurs at a server.

Clause 188. The computer readable medium of any of clauses 1-187, wherein intercepting the outgoing network traffic occurs in transit between a client device and a server.

Clause 189. The computer readable medium of any of clauses 1-188, wherein the remedial measure includes preventing transmission of at least the data classified as sensitive.

Clause 190. The computer readable medium of any of clauses 1-189, wherein the remedial measure includes informing a user that the intercepted network traffic is classified as sensitive.

Clause 191. The computer readable medium of any of clauses 1-190, wherein the operations further include receiving documents from a specific organization and applying machine learning to the received documents to thereby classify the data as sensitive.

Clause 192. The computer readable medium of any of clauses 1-191, wherein the operations further include determining the first context and the second context based on the application of the machine learning to the received documents.

Clause 193. A system for performing context-based data leak prevention operations in a network, the system comprising:

at least one processor configured to:

access data;

classify the accessed data, wherein in a first context a particular type of the data is classified as sensitive and in a second context the particular type of the data is not classified as sensitive;

intercept outgoing network traffic;

determine that the intercepted network traffic contains the particular type of the data;

determine whether the particular type of the data in the intercepted network traffic corresponds to the second context; and when the particular type of the data in the intercepted network traffic corresponds to the second context as opposed to the first context, implement a remedial measure to mitigate leakage of the particular type of the data.

Clause 194. A method for performing real-time dynamic policy revisions, the method comprising:

accessing data;

classifying the accessed data, wherein in a first context a particular type of the data is classified as sensitive and in a second context the particular type of the data is not classified as sensitive;

intercepting outgoing network traffic;

determining that the intercepted network traffic contains the particular type of the data;

determining whether the particular type of the data in the intercepted network traffic corresponds to the second context; and when the particular type of the data in the intercepted network traffic corresponds to the second context as opposed to the first context, implementing a remedial measure to mitigate leakage of the particular type of the data.

Clause 195. A non-transitory computer readable medium containing instructions that when executed by at least one processor cause the at least one processor to enable selective primary network architecture alterations from an external secondary network, the operations comprising:

in a primary network hosted by a first entity and configured to service a plurality of customers, enabling a vendor running a network application in a secondary network to connect to the primary network and to provide the network application as a service in the primary network;

receiving from at least some of the plurality of customers serviced by the primary network opt-in confirmations for the network application; and limiting use of the network application within the primary network to the at least some of the plurality of customers from whom opt-in confirmations were received.

Clause 196. The computer readable medium of any of clauses 1-195, wherein the network application is configured to run on an external server in the secondary network, and wherein the operations further include enabling a connection between at least one server in the primary network and the external server.

Clause 197. The computer readable medium of any of clauses 1-196, wherein enabling the connection between the at least one server in the primary network and the external server includes authorizing the external server.

Clause 198. The computer readable medium of any of clauses 1-197, wherein the connection between the at least one server in the primary network and the external server includes a tunnel.

Clause 199. The computer readable medium of any of clauses 1-198, wherein the external server is authorized to run a parental control application.

Clause 200. The computer readable medium of any of clauses 1-199, wherein enabling the vendor running the network application in the secondary network to connect to the primary network includes opening a controllable port in the primary network.

Clause 201. The computer readable medium of any of clauses 1-200, wherein the network application is a SaaS application.

Clause 202. The computer readable medium of any of clauses 1-201, wherein the network application includes a honeypot.

Clause 203. The computer readable medium of any of clauses 1-202, wherein the network application includes a firewall.

Clause 204. The computer readable medium of any of clauses 1-203, wherein the network application includes a content filter.

Clause 205. The computer readable medium of any of clauses 1-204, wherein the operations further include enabling a first customer to connect to a first set of external servers to thereby establish a first network architecture and enabling a second customer to connect to a second set of external servers to thereby create a second network architecture.

Clause 206. The computer readable medium of any of clauses 1-205, wherein the network application is configured to access at least one of customer data, network flow data, and data associated with security events.

Clause 207. A system to enable selective primary network architecture alterations from an external secondary network, the system comprising:

at least one processor configured to:

in a primary network hosted by a first entity and configured to service a plurality of customers, enable a vendor running a network application in a secondary network to connect to the primary network and to provide the network application as a service in the primary network;

receiving from at least some of the plurality of customers serviced by the primary network opt-in confirmations for the network application; and limiting use of the network application within the primary network to the at least some of the plurality of customers from whom opt-in confirmations were received.

Clause 208. The system of any of clauses 1-207, wherein the network application is configured to run on an external server in the secondary network, and wherein the operations further include enabling a connection between at least one server in the primary network and the external server.

Clause 209. The system of any of clauses 1-208, wherein enabling the connection between the at least one server in the primary network and the external server includes authorizing the external server.

Clause 210. The system of any of clauses 1-209, wherein the connection between the at least one server in the primary network and the external server includes a tunnel.

Clause 211. The system of any of clauses 1-210, wherein enabling the vendor running the network application in the secondary network to connect to the primary network includes opening a controllable port in the primary network.

Clause 212. The system of any of clauses 1-211, wherein the network application is a SaaS application.

Clause 213. The system of any of clauses 1-212, wherein the network application includes a honeypot.

Clause 214. A method for enabling selective primary network architecture alterations from an external secondary network, the method comprising:

in a primary network hosted by a first entity and configured to service a plurality of customers, enabling a vendor running a network application in a secondary network to connect to the primary network and to provide the network application as a service in the primary network;

receiving from at least some of the plurality of customers serviced by the primary network opt-in confirmations for the network application; and limiting use of the network application within the primary network to the at least some of the plurality of customers from whom opt-in confirmations were received.

Clause 215. A non-transitory computer readable medium containing instructions that when executed by at least one processor cause the at least one processor to perform operations for dynamically selecting egress locations in a network, the operations comprising:

determining a first egress location for data transfer from a first server in the network to an application external to the network;

sending network traffic to the external application via the first egress location;

determining a first data transfer condition associated with the first egress location;

determining at least one alternative data transfer condition associated with at least one alternative egress location and the external application;

comparing the first data transfer condition with the alternative data transfer condition to ascertain whether the alternative data transfer condition constitutes an improvement; and when the alternative data transfer condition is ascertained to constitute an improvement, rerouting the network traffic to the external application via the at least one alternative egress location.

Clause 216. The computer readable medium of any of clauses 1-215, wherein the network is a secure access service edge (SASE) network and wherein the server is associated with a point-of-presence (PoP) for connecting to the external application via an additional network external to the SASE network.

Clause 217. The computer readable medium of any of clauses 1-216, wherein each of: determining the first data transfer condition, determining the at least one alternative data transfer condition, comparing the first data transfer condition with the alternative data transfer condition, and rerouting the network traffic to the external application via the at least one alternative egress location, occurs continuously in real time, thereby continuously rerouting network traffic via different egress locations in response to changing data transfer conditions.

Clause 218. The computer readable medium of any of clauses 1-217, wherein the improvement is associated with shorter communication latency.

Clause 219. The computer readable medium of any of clauses 1-218, wherein the improvement is associated with a reduction in packet loss.

Clause 220. The computer readable medium of any of clauses 1-219, wherein the improvement is associated with network security.

Clause 221. The computer readable medium of any of clauses 1-220, wherein the improvement is associated with a reduction in jitter.

Clause 222. The computer readable medium of any of clauses 1-221, wherein the improvement is associated with a migration of the application external to the network from a first server external to the network to a second server external to the network.

Clause 223. The computer readable medium of any of clauses 1-222, wherein the operations further comprise identifying the at least one alternative egress location using a predictive model based on network traffic.

Clause 224. The computer readable medium of any of clauses 1-223, wherein the predictive model is based on network traffic during a specific day of a week.

Clause 225. The computer readable medium of any of clauses 1-224, wherein the predictive model is based on network traffic during a specific time of day.

Clause 226. The computer readable medium of any of clauses 1-225, wherein the predictive model is based on network traffic during a specific month of a year.

Clause 227. The computer readable medium of any of clauses 1-226, wherein the predictive model is based on network traffic associated with a characterization of the application external to the network.

Clause 228. A system for dynamically selecting egress locations in a network, the system comprising:

at least one processor configured to:

determine a first egress location for data transfer from a first server in the network to an application external to the network;

send network traffic to the external application via the first egress location;

determining a first data transfer condition associated with the first egress location;

determine at least one alternative data transfer condition associated with at least one alternative egress location and the external application;

compare the first data transfer condition with the alternative data transfer condition to ascertain whether the alternative data transfer condition constitutes an improvement; and when the alternative data transfer condition is ascertained to constitute an improvement, reroute the network traffic to the external application via the at least one alternative egress location.

Clause 229. The system of any of clauses 1-228, wherein the network is a SASE network and wherein the server is associated with a point-of-presence (PoP) for connecting to the external application via an additional network external to the SASE network.

Clause 230. The system of any of clauses 1-229, wherein each of: determining the first data transfer condition, determining the at least one alternative data transfer condition, comparing the first data transfer condition with the alternative data transfer condition, and rerouting the network traffic to the external application via the at least one alternative egress location, occurs continuously in real time, thereby continuously rerouting network traffic via different egress locations in response to changing data transfer conditions.

Clause 231. The system of any of clauses 1-230, wherein the improvement is associated with shorter communication latency.

Clause 232. The system of any of clauses 1-231, wherein the improvement is associated with a reduction in packet loss.

Clause 233. The system of any of clauses 1-232, wherein the improvement is associated with network security.

Clause 234. A method for dynamically selecting egress locations in a network, the method comprising:

determining a first egress location for data transfer from a first server in the network to an application external to the network;

sending network traffic to the external application via the first egress location;

determining a first data transfer condition associated with the first egress location;

determining at least one alternative data transfer condition associated with at least one alternative egress location and the external application;

comparing the first data transfer condition with the alternative data transfer condition to ascertain whether the alternative data transfer condition constitutes an improvement; and when the alternative data transfer condition is ascertained to constitute an improvement, rerouting the network traffic to the external application via the at least one alternative egress location.

Clause 235. A non-transitory computer readable medium containing instructions that when executed by at least one processor cause the at least one processor to perform client application-less operations for performing digital experience monitoring based on real user communications, the operations comprising:

monitoring network traffic from at least one non-edge device in a SASE network;

for each of a plurality of applications running on each of a plurality of edge devices, determining a digital user experience score from the at least one non-edge device; and transmitting each of the digital user experience scores associated with each of the plurality of applications running on each of the plurality of edge devices to at least one administrator of the SASE network.

Clause 236. The computer readable medium of any of clauses 1-235, wherein the network traffic includes a traffic history.

Clause 237. The computer readable medium of any of clauses 1-236, wherein the network traffic includes real-time data flow through the network.

Clause 238. The computer readable medium of any of clauses 1-237, wherein the monitoring of the network traffic from the at least one non-edge device in the SASE network occurs continually over time.

Clause 239. The computer readable medium of any of clauses 1-238, wherein the performance of the digital experience monitoring of the plurality of applications running on the plurality of edge devices is implemented without installing an associated client application on each of the plurality of edge devices.

Clause 240. The computer readable medium of any of clauses 1-239, wherein each digital user experience score includes an aggregate score for the plurality of applications.

Clause 241. The computer readable medium of any of clauses 1-240, wherein each digital user experience score is associated with communication latency.

Clause 242. The computer readable medium of any of clauses 1-241, wherein each digital user experience score is associated with jitter.

Clause 243. The computer readable medium of any of clauses 1-242, wherein each digital user experience score is associated with a branch site or datacenter with or without a socket device.

Clause 244. The computer readable medium of any of clauses 1-243, wherein each digital user experience score is associated with packet loss.

Clause 245. The computer readable medium of any of clauses 1-244, further comprising cross-referencing different digital user experience scores of the digital user experience scores associated with at least one common application of the plurality of applications to thereby determine a performance characterization of the at least one common application.

Clause 246. The computer readable medium of any of clauses 1-245, wherein the at least one common application includes at least two common applications belonging to a peer group, and wherein determining performance characterizations of the at least two common applications permits a performance comparison between the at least two common applications within the peer group.

Clause 247. The computer readable medium of any of clauses 1-246, further comprising determining trends within the peer group based on the performance comparison.

Clause 248. A system for performing client application-less operations for digital experience monitoring based on real user communications, the system comprising:

at least one processor configured to:

monitor network traffic from at least one non-edge device in a SASE network;

for each of the plurality of applications running on each of a plurality of edge devices, determine a digital user experience score from the at one least non-edge device; and transmit each of the digital user experience scores associated with each of the plurality of applications running on each of the plurality of edge devices to at least one administrator of the SASE network.

Clause 249. The system of any of clauses 1-248, wherein the network traffic includes a traffic history.

Clause 250. The system of any of clauses 1-249, wherein the network traffic includes real-time data flow through the network.

Clause 251. The system of any of clauses 1-250, wherein the monitoring of the network traffic from the at least one non-edge device in the SASE network occurs continually over time.

Clause 252. The system of any of clauses 1-251, wherein the performance of the digital experience monitoring of the plurality of applications running on the plurality of edge devices is implemented without installing an associated client application on each of the plurality of edge devices.

Clause 253. The system of any of clauses 1-252, wherein each digital user experience score includes an aggregate score for the plurality of applications.

Clause 254. A method for performing client application-less operations for digital experience monitoring based on real user communications, the method comprising:

monitoring network traffic from at least one non-edge device in a SASE network;

for each of the plurality of applications running on each of a plurality of edge devices, determining a digital user experience score from the at least one non-edge device; and transmitting each of the digital user experience scores associated with each of the plurality of applications running on each of the plurality of edge devices to at least one administrator of the SASE network.

Disclosed embodiments may include any one of the following bullet-pointed features alone or in combination with one or more other bullet-pointed features, whether implemented as a system and/or method, by one or more hardware components disclosed herein, as well as by at least one processor or circuitry, and/or stored as executable instructions on non-transitory computer readable media or computer readable media.

perform network synchronization operations in a network containing a plurality of distributed server clusters connected to a plurality of edge devices;

maintaining a plurality of copies of a routing table;

the plurality of copies of the routing table being distributed to a plurality of locations across the distributed server clusters and the plurality of edge devices;

detecting, at at least one server in the plurality of distributed server clusters, a connectivity change;

a connectivity change being expressible as a delta in the routing table;

distributing a delta to a plurality of locations across the distributed server clusters and the plurality of edge devices;

updating the plurality of copies of a routing table rendering the plurality of copies of the routing table synchronized;

associating a delta with at least one particular edge device;

determining a subset of a plurality of distributed server clusters communicatively associated with at least one particular edge device;

distributing a delta includes sending the delta to a subset of servers and avoiding transmission of the delta to at least some of a plurality of distributed server clusters outside the subset;

at least some of a plurality of copies of a distributed routing table differ from other of the plurality of copies of the distributed routing table;

at least some of a plurality of distributed server clusters outside a subset include all of the plurality of distributed server clusters outside the subset;

predicting that at least one additional server cluster not communicatively associated with at least one particular edge device may later become communicatively associated with the at least one particular edge device;

transmitting a delta to at least one additional server cluster;

a connectivity change is associated with a new edge device previously not identified in a network;

a connectivity change is associated with one of a plurality of edge devices disconnecting from a network;

a connectivity change is detected based on traffic analysis;

a plurality of edge devices includes a gateway device;

a plurality of edge devices includes a router device;

a plurality of edge devices includes a network segment;

one of a plurality of edge devices is associated with a user;

a network is a SASE network;

a delta is associated with an Internet Protocol address for a computing device;

a plurality of copies of a routing table are associated with a common security policy configured for enforcement across a distributed server clusters and a plurality of edge devices;

a common security policy includes a common firewall for a distributed server clusters and a plurality of edge devices;

performing network connection operations;

accessing a cloud service via a client device;

a cloud service containing real-time network information including at least two of a real-time server load for a plurality of network servers, real-time server capacity for a plurality of network servers, at least one customer preference, or geolocation IP;

receiving from a cloud service, identities of a plurality of candidate servers from among a plurality of network servers;

based on real time network information, a plurality of candidate servers meet criteria for potential establishment of a network connection with a client device;

transmitting probe packets from a client device to at least some of a plurality of candidate servers;

receiving responses to a probe packets;

determining from responses, communication characteristics for at least some of transmitted probe packets;

selecting a server based on determined communication characteristics;

establishing a network connection between a client device and a selected server;

a plurality of candidate servers are selected from among a plurality of network servers based on geographical proximity to a client device;

a plurality of candidate servers are selected from among a plurality of network servers based on user preferences;

a plurality of candidate servers are selected from among a plurality of network servers based on network load;

a plurality of candidate servers are selected from among a plurality of network servers based on communication latency;

a plurality of candidate servers are selected from among a plurality of network servers based on a local language;

a plurality of candidate servers are selected from among a plurality of network servers based on server load;

a plurality of candidate servers are selected from among a plurality of network servers based on network traffic predictions;

a plurality of candidate servers are selected from among a plurality of network servers based on a history of connectivity with a client device;

a determined communication characteristics for selecting a server include user preferences;

a user preferences include a location associated with a geolocation IP service;

a determined communication characteristics for selecting a server include a prediction for meeting a threshold level of network performance;

a threshold level of network performance is associated with communication latency;

a threshold level of network performance is associated with packet loss;

a threshold level of network performance is associated with jitter;

load balancing network traffic;

receiving at a particular server among a plurality of candidate servers, one of a plurality of probes sent from a client device to a plurality of candidate servers;

interpreting, at a particular server, a received probe to recognize that a received probe is a precursor to a persistent connection between a particular server and a client device;

determining that a prospective connection between a particular server and a client device would be sub-optimal;

transmitting a biased response from a particular server to a client device to discourage establishment of a persistent connection between the client device and the particular server;

a biased response is a delayed response;

a biased response includes information discouraging a persistent connection;

a determination that that a prospective connection between a particular server and a client device would be sub-optimal is based on at least one of a current load on a particular server, an available bandwidth, a number of devices connected to the particular server, an extent of network flow, or a maintenance schedule;

determining a biased response based on an identify of a user associated with a client device;

determining a biased response based on a location associated with a client device;

determining a biased response based on a role associated with a client device;

determining a biased response based on an application associated with a client device;

determining a biased response based on a prediction of subsequent activity by a client device;

a plurality of candidate servers are selected from a plurality of servers in a SASE network based on real time network information including at least two of: a real time server load for a plurality of network servers, real time server capacity for the plurality of network servers, at least one customer preference, or geolocation IP.

based on a real time network information, a plurality of candidate servers meet criteria for potential establishment of a network connection with a client device.

altering network connections during maintenance periods;

monitoring via a cloud service, a network of distributed servers and client devices;

monitoring includes maintaining records of software upgrade schedules for distributed servers and existing tunnels between a client devices and the distributed servers;

receiving at a cloud service a request to upgrade software on a particular server among distributed servers;

in response to a request, scheduling a software upgrade;

accessing records to identify an existing tunnel between a client device and a particular server;

prior to a scheduled software upgrade, accessing records to identify an alternative server to which existing tunnel traffic can be directed during a software upgrade;

following identification of a alternative server and prior to a scheduled software upgrade, rerouting network traffic flow from a client device to the alternative server to thereby avoid a communication blip;

a software upgrade is scheduled to occur within a time window;

receiving from a client device a specific time for rerouting network traffic flow within a time window;

following completion of a scheduled software upgrade, routing network traffic flow back from a alternative server to a particular server;

following completion of a scheduled software upgrade, maintaining network traffic flow between a client device and an alternative server;

identification of an alternative server is based at least on a recent completion of a software upgrade on the alternative server;

a particular server and an alternative server are included in a common cluster of servers;

scheduling a software upgrade for each server in a common cluster of servers;

a software upgrade is scheduled during different time windows for at least some servers in a cluster of servers;

a software upgrade is scheduled during a common time window for at least some servers in a cluster of servers;
a particular server is included in a first cluster of servers, and wherein an alternative server is included in a second cluster of servers;
scheduling a software upgrade for each server in a first cluster of servers;
accessing records to identify at least one additional existing tunnel between at least one additional client device and particular server;
prior to performance of a scheduled software upgrade on a particular server, rerouting network traffic flow from at least one additional client device to thereby avoid at least one an additional communication blip;
network traffic flow is rerouted from at least one additional client device to an alternative server;
network traffic flow is rerouted from at least one additional client device to at least one additional alternative server;
an alternative server and at least one additional alternative server are included in a common cluster of servers;
an alternative server is included in a first cluster of servers and wherein at least one additional server is included in a second cluster of servers;
rerouting of the network traffic flow from a client device and from at least one additional client device occurs during a common time window;
performing unified network security management operations;
maintaining in a cloud service management application, a unified policy for controlling network security across a plurality of servers and edge devices;
a plurality of servers and edge devices are configured to perform differing and complementary security actions;
instructing, consistent with a unified policy, each edge device to perform first subsets of security actions;
instructing, consistent with a unified policy, several servers to perform second subsets of security actions;
first subsets of security actions and second subsets of security actions are coordinated to achieve an overall security state defined by a unified policy;
a unified policy for controlling network security includes at least an implementation of a common firewall at each edge device and at each server;
a unified policy for controlling network security includes at least an implementation of a coordinated encryption protocol at each edge device and at each server;
a unified policy for controlling network security includes at least a connectivity portion;
a connectivity portion includes restricting incoming and outgoing data associated with at least one application running on edge devices;
a connectivity portion includes assigning different priorities for allocating bandwidth to different applications running on edge devices;
a connectivity portion includes assigning different priorities for allocating bandwidth to different edge devices associated with different users;
instructing includes transmitting a common configuration file defining at least a portion of a unified policy to each edge device and to each server;
instructing includes transmitting a first configuration file defining a unified policy to each edge device and transmitting a second configuration file defining the unified policy to each server;
a first configuration file is formatted according to first file format and wherein a second configuration file is formatted according to a second file format;
capabilities of a unified policy differ between edge devices and servers;
providing an administrative view of differences in capabilities;
first subsets of security actions and second subsets of the security actions include at least partial enforcement of a unified policy;
performing bidirectional network policy optimization operations;
maintaining in a cloud service management application a policy prioritizing bandwidth allocation based on organizational preferences;
distributing a policy to servers in a network to thereby cause the servers to implement the policy by controlling a first allocation of bandwidth to inbound traffic;
distributing a policy to edge devices in a network to thereby cause edge devices to implement the policy by controlling a second allocation of bandwidth to outbound traffic;
updating a policy prioritizing bandwidth dynamically in response to detection of at least one condition;
distributing an updated policy to servers to thereby cause the servers to implement the updated policy by controlling a third allocation of bandwidth to inbound traffic;
distributing an updated policy to edge devices to thereby cause the edge devices to implement the updated policy by controlling a fourth allocation of bandwidth to inbound traffic;
at least one condition is associated with at least one of a traffic congestion threshold, channel capacity threshold, a communication link quality threshold, a time of day, a latency threshold, a packet loss threshold, a jitter threshold, a round trip time (RTT) threshold, a quality of service threshold, at least one client preference;
controlling a first allocation of bandwidth and controlling a second allocation of bandwidth includes prioritizing allocations of bandwidth;
prioritizing allocations of bandwidth includes allocating bandwidth for at least one first application at a higher priority than allocation of bandwidth for at least one second application;
prioritizing allocations of bandwidth includes allocation of bandwidth for at least one first user at a higher priority than allocation of bandwidth for at least one second user;
controlling a first allocation of bandwidth and controlling a second allocation of bandwidth includes restricting data flow associated with at least one application;
controlling a first allocation of bandwidth and controlling a second allocation of bandwidth includes restricting data flow through at least one region;
controlling a first allocation of bandwidth and controlling a second allocation of bandwidth is based on availability of at least one resource;
controlling a first allocation of bandwidth and controlling a second allocation of bandwidth includes compliance with at least one regulation;
a regulation is associated with a specific region;
performing dynamic network security operations;
monitoring traffic associated with endpoints in a SASE network;
classifying endpoint behavior based on monitored traffic;

generating a dynamic secure access policy for each endpoint based on classified behavior associated with each endpoint;

a dynamic secure access policy governing a plurality of resources provided by a plurality of non-related entities and to which each endpoint is entitled to access;

enforcing a policy based on a classified behavior to thereby prevent unapproved access to resources among a plurality of non-related entities;

monitoring changes in endpoint traffic behavior to determine resource usage variances;

revising a dynamic secure access policy based on a resource usage variances to reduce an attack surface;

automatically applying a revised dynamic secure access policy in response to monitored changes;

confirming approval of an automatic application of a revised dynamic secure access policy following the automatic application of the revised dynamic secure access policy;

classifying endpoint behavior based on endpoint device type;

classifying endpoint behavior based on user type;

classifying endpoint behavior based on traffic type;

a plurality of non-related entities are associated with at least two of an email application, a file sharing application, or a web browsing application;

a dynamic secure access policy permits transmission of a data type in association with a first context and denies transmission of a data type in association with a second context;

a revised dynamic secure access policy restricts access to a resource to which access was previously permitted;

a revised dynamic secure access policy permits access to a resource to which access was previously restricted;

resource usage variances include at least one time-based anomaly;

resource usage variances include at least one context-based anomaly;

resource usage variances include at least one location-based anomaly;

resource usage variances include at least one usage-based anomaly;

a usage-based anomaly indicates cessation of performance of an activity that was previously permitted;

a revised dynamic secure access policy denies performance of an activity;

a usage-based anomaly indicates performance of a new activity;

a revised dynamic secure access policy permits performance of an activity;

synchronizing network and endpoint security protocols;

receiving a device posture from an application running on an edge device;

receiving from a server in communication with an edge device, network traffic information associated with the edge device;

correlating a device posture and network traffic information;

implementing a network security policy based on a correlation such that both a device posture from an edge device and network traffic information from server are used to enforce the network security policy;

a device posture includes at least one software application type;

a device posture includes at least one software application version;

a device posture includes at least one endpoint device type;

a device posture indicates at least one obsolete security standard and wherein implementing a network security policy includes taking a remedial action;

a remedial action includes permitting communication associated with a first group of resources, and denying communication associated with a second group of resources;

a remedial action includes conditioning communication in response to receiving a confirmation from a user;

network traffic information includes a destination server type;

network traffic information includes a destination server location;

network traffic information includes prioritization of traffic based on traffic type;

performing real-time dynamic policy revisions;

tracking, in real-time, first characteristics of dataflow passing through a plurality of engines in a cloud network;

generating in real-time a first version of a single log line aggregating first characteristics;

first characteristics include at least security inspection attributes and routing decision attributes;

based on first characteristics, generating a first real-time dynamic policy;

applying a first real-time dynamic policy to current dataflow;

following application of a first real-time dynamic policy, tracking in real-time second characteristics of dataflow passing through a plurality of engines in a cloud network;

aggregating in real-time second characteristics to a single log line to generate a second version of the single log line;

second characteristics include at least security inspection attributes and routing decision attributes;

determining a real-time change between a first version of a single log line and a second version of the single log line;

based on a determined real-time change, generating a real-time change in a dynamic policy;

applying, in real-time to current dataflow a real-time change in a dynamic policy;

tracking in real-time first characteristics of dataflow passing through a plurality of engines, and tracking in real-time second characteristics of dataflow passing through the plurality of engines, determining a real-time change, and applying the real-time change in real-time to current dataflow continuously in real-time;

continuously applying real-time change in a dynamic policy to a current dataflow;

a first real-time dynamic policy is at least partially based on a sequence associated with dataflow passing through a plurality of engines;

a plurality of engines are located in a single cluster of servers;

a plurality of engines are distributed across a plurality of clusters of servers;

a plurality of engines include at least two of a device posture identification engine, a user risk score determination engine, a packet inspection engine, an Internet Protocol address (IP) reputation engine, a malware classification engine, a Data Loss Prevention (DLP) classification engine, a Next-generation of firewalls (NGFW) engine, an intrusion prevention system (IPS)

engine, a secure web gateway (SWG) engine, a cloud access security broker (CASB) engine, a Zero Trust Network Access (ZTNA) engine, and a Remote browser isolation (RBI) engine;

real-time application of a plurality of engines to data flow is coordinated by a single entity;

security inspection attributes are associated with threat detection, policy enforcement, or compliance assessment;

routing decision attributes are associated with at least one of a source, a destination, an application, a session, or a network performance metric;

a first real-time dynamic policy is associated with at least one of a posture, a location, a network performance metric, or a risk score;

applying a first real-time dynamic policy to current dataflow includes at least one of allowing dataflow, blocking the dataflow, quarantining the dataflow, or issuing an alert;

a real-time change between a first version of a single log line and a second version of the single log line is associated with at least one of a network path, a network performance metric, a risk score, or a policy violation;

performing context-based data leak prevention operations in a network;

accessing data;

classifying accessed data:

in a first context a particular type of the data is classified as sensitive;

in a second context the particular type of the data is not classified as sensitive;

intercepting outgoing network traffic;

determining that intercepted network traffic contains a particular type of data;

determining whether a particular type of data in intercepted network traffic corresponds to a second context;

when a particular type of data in intercepted network traffic corresponds to a second context as opposed to a first context, implementing a remedial measure to mitigate leakage of the particular type of a data;

receiving organization-specific documents;

using machine learning to determine a second context based on received organization-specific documents;

using organization-specific documents with machine learning to determine a first context;

analyzing network traffic from a plurality of organizations using machine learning to determine a second context;

using network traffic from a plurality of organizations with machine learning to determine a first context;

accessing of data includes receiving organization-specific documents;

a first context and a second context are associated with different software applications;

a first context and a second context are associated with different data usage contexts;

a first context and a second context are associated with different users;

a first context and a second context are associated with different client device types;

a first context and a second context are associated with different locations;

intercepting outgoing network traffic occurs at a client device;

intercepting outgoing network traffic occurs at a server;

intercepting outgoing network traffic occurs in transit between a client device and a server;

a remedial measure includes preventing transmission of at least a portion of data classified as sensitive;

a remedial measure includes informing a user that intercepted network traffic is classified as sensitive;

receiving documents from a specific organization and applying machine learning to the received documents to thereby classify data as sensitive;

determining a first context and a second context based on an application of machine learning to received documents;

enabling selective primary network architecture alterations from an external secondary network;

in a primary network hosted by a first entity and configured to service a plurality of customers, enabling a vendor running a network application in a secondary network to connect to a primary network and to provide a network application as a service in the primary network;

receiving from at least some of a plurality of customers serviced by a primary network opt-in confirmations for a network application;

limiting use of a network application within a primary network to at least some of a plurality of customers from whom opt-in confirmations were received;

a network application is configured to run on an external server in a secondary network, and wherein operations further include enabling a connection between at least one server in a primary network and an external server;

enabling a connection between at least one server in a primary network and an external server includes authorizing the external server;

a connection between at least one server in a primary network and an external server includes a tunnel;

an external server is authorized to run a parental control application;

enabling a vendor running a network application in a secondary network to connect to a primary network includes opening a controllable port in the primary network;

a network application is a SaaS application, a honeypot, a firewall, and/or a content filter;

enabling a first customer to connect to a first set of external servers to thereby establish a first network architecture enabling a second customer to connect to a second set of external servers to thereby create a second network architecture;

a network application is configured to access at least one of customer data, network flow data, and data associated with security events;

dynamically selecting egress locations in a network;

determining a first egress location for data transfer from a first server in a network to an application external to the network;

sending network traffic to an external application via a first egress location;

determining a first data transfer condition associated with a first egress location;

determining at least one alternative data transfer condition associated with at least one alternative egress location and an external application;

comparing a first data transfer condition with an alternative data transfer condition to ascertain whether the alternative data transfer condition constitutes an improvement;

when a alternative data transfer condition is ascertained to constitute an improvement, rerouting network traffic to an external application via the at least one alternative egress location;

a network is a secure access service edge (SASE) network and wherein a server is associated with a point-of-presence (PoP) for connecting to an external application via an additional network external to the SASE network;

each of: determining a first data transfer condition, determining a at least one alternative data transfer condition, comparing the first data transfer condition with the alternative data transfer condition, and rerouting network traffic to the external application via at least one alternative egress location, occurs continuously in real time, thereby continuously rerouting network traffic via different egress locations in response to changing data transfer conditions;

an improvement is associated with one or more of shorter communication latency, a reduction in packet loss, network security, jitter reduction, and/or a migration of an application external to a network from a first server external to the network to a second server external to the network;

identifying at least one alternative egress location using a predictive model based on network traffic;

a predictive model is based on network traffic during a specific day of a week;

a predictive model is based on network traffic during a specific time of day;

a predictive model is based on network traffic during a specific month of a year;

a predictive model is based on network traffic associated with a characterization of an application external to the network;

performing digital experience monitoring based on real user communications;

monitoring network traffic from at least one non-edge device in a SASE network;

for each of a plurality of applications running on each of a plurality of edge devices, determining a digital user experience score from at least one non-edge device;

transmitting each digital user experience score associated with each of a plurality of applications running on each of a plurality of edge devices to at least one administrator of a SASE network;

network traffic includes a traffic history;

network traffic includes real-time data flow through a network;

monitoring of network traffic from at least one non-edge device in a SASE network occurs continually over time;

the performance of a digital experience monitoring of a plurality of applications running on a plurality of edge devices is implemented without installing an associated client application on each of the plurality of edge devices;

each digital user experience score includes an aggregate score for a plurality of applications;

each digital user experience score is associated with communication latency;

each digital user experience score is associated with jitter;

each digital user experience score is associated with a branch site or datacenter with or without a socket device;

each digital user experience score is associated with packet loss;

cross-referencing different digital user experience scores of digital user experience scores associated with at least one common application of a plurality of applications;

determine a performance characterization of at least one common application;

at least one common application includes at least two common applications belonging to a peer group;

determining performance characterizations of at least two common applications permits a performance comparison between the at least two common applications within a peer group;

determining trends within a peer group based on a performance comparison.

What is claimed is:

1. A non-transitory computer readable medium containing instructions that when executed by at least one processor cause the at least one processor to perform real-time dynamic policy revisions, the operations comprising:

tracking, in real-time, first characteristics of dataflow passing through a plurality of engines in a cloud network;

generating in real-time a first version of a single log line aggregating the first characteristics, wherein the first characteristics include at least security inspection attributes and routing decision attributes;

based on the first characteristics, generating a first real-time dynamic policy;

applying the first real-time dynamic policy to current dataflow;

following application of the first real-time dynamic policy, tracking in real-time second characteristics of dataflow passing through the plurality of engines in the cloud network;

aggregating in real-time the second characteristics to the single log line to generate a second version of the single log line, wherein the second characteristics include at least security inspection attributes and routing decision attributes;

determining a real-time change between the first version of the single log line and the second version of the single log line;

based on the determined real-time change, generating a real-time change in the dynamic policy; and applying, in real-time to the current dataflow the real-time change in the dynamic policy.

2. The computer readable medium of claim 1, wherein tracking in real-time the first characteristics of dataflow passing through the plurality of engines, and tracking in real-time the second characteristics of dataflow passing through the plurality of engines, determining the real-time change, and applying the real-time change in real-time to the current dataflow occurs continuously in real-time, thereby continuously applying the real-time change in the dynamic policy to the current dataflow.

3. The computer readable medium of claim 1, wherein the first real-time dynamic policy is at least partially based on a sequence associated with the dataflow passing through the plurality of engines.

4. The computer readable medium of claim 1, wherein the plurality of engines are located in a single cluster of servers.

5. The computer readable medium of claim 1, wherein the plurality of engines are distributed across a plurality of clusters of servers.

6. The computer readable medium of claim 1, wherein the plurality of engines include at least two of a device posture identification engine, a user risk score determination engine, a packet inspection engine, an Internet Protocol address (IP)

reputation engine, a malware classification engine, a Data Loss Prevention (DLP) classification engine, a Next-generation of firewalls (NGFW) engine, an intrusion prevention system (IPS) engine, a secure web gateway (SWG) engine, a cloud access security broker (CASB) engine, a Zero Trust Network Access (ZTNA) engine, and a Remote browser isolation (RBI) engine.

7. The computer readable medium of claim 1, wherein real-time application of the plurality of engines to the data flow is coordinated by a single entity.

8. The computer readable medium of claim 1, wherein the security inspection attributes are associated with threat detection, policy enforcement, or compliance assessment.

9. The computer readable medium of claim 1, wherein the routing decision attributes are associated with at least one of a source, a destination, an application, a session, or a network performance metric.

10. The computer readable medium of claim 1, wherein the first real-time dynamic policy is associated with at least one of a posture, a location, a network performance metric, or a risk score.

11. The computer readable medium of claim 1, wherein applying the first real-time dynamic policy to the current dataflow includes at least one of allowing the dataflow, blocking the dataflow, quarantining the dataflow, or issuing an alert.

12. The computer readable medium of claim 1, wherein the real-time change between the first version of the single log line and the second version of the single log line is associated with at least one of a network path, a network performance metric, a risk score, or a policy violation.

13. A system for performing real-time dynamic policy revisions, the operations comprising:

at least one processor configured to:

track in real-time first characteristics of dataflow passing through a plurality of engines in a cloud network;

generate in real-time a first version of a single log line aggregating the first characteristics, wherein the first characteristics include at least security inspection attributes and routing decision attributes;

based on the first characteristics, generate a first real-time dynamic policy;

apply the first real-time dynamic policy to current dataflow;

following application of the first real-time dynamic policy, track in real-time second characteristics of dataflow passing through the plurality of engines in the cloud network;

aggregate in real-time the second characteristics to the single log line to generate a second version of the single log line, wherein the second characteristics include at least security inspection attributes and routing decision attributes;

determine a real-time change between the first version of the single log line and the second version of the single log line;

based on the determined real-time change, generate a real-time change in the dynamic policy; and apply, in real-time to the current dataflow the real-time change in the dynamic policy.

14. The system of claim 13, wherein tracking in real-time the first characteristics of dataflow passing through the plurality of engines, and tracking in real-time the second characteristics of dataflow passing through the plurality of engines, determining the real-time change, and applying the real-time change in real-time to the current data flow occurs continuously in real-time, thereby continuously applying the real-time change in the dynamic policy to the current dataflow.

15. The system of claim 13, wherein the first real-time dynamic policy is at least partially based on a sequence associated with the dataflow passing through a plurality of engines.

16. The system of claim 13, wherein the plurality of engines are located in a single cluster of servers.

17. The system of claim 13, wherein the plurality of engines are distributed across a plurality of clusters of servers.

18. The system of claim 13, wherein the plurality of engines include at least two of a device posture identification engine, a user risk score determination engine, a packet inspection engine, an Internet Protocol address (IP) reputation engine, a malware classification engine, a Data Loss Prevention (DLP) classification engine, a Next-generation of firewalls (NGFW) engine, an intrusion prevention system (IPS) engine, a secure web gateway (SWG) engine, a cloud access security broker (CASB) engine, a Zero Trust Network Access (ZTNA) engine, and a Remote browser isolation (RBI) engine.

19. A method for performing real-time dynamic policy revisions, the method comprising:

tracking in real-time first characteristics of dataflow passing through a plurality of engines in a cloud network;

generating in real-time a first version of a single log line aggregating the first characteristics, wherein the first characteristics include at least security inspection attributes and routing decision attributes;

based on the first characteristics, generating a first real-time dynamic policy;

apply the first real-time dynamic policy to current dataflow;

following application of the first real-time dynamic policy, tracking in real-time second characteristics of dataflow passing through the plurality of engines in the cloud network;

aggregating in real-time the second characteristics to the single log line to generate a second version of the single log line, wherein the second characteristics include at least security inspection attributes and routing decision attributes;

determining a real-time change between the first version of the single log line and the second version of the single log line;

based on the determined real-time change, generating a real-time change in the dynamic policy; and applying, in real-time to the current dataflow the real-time change in the dynamic policy.

* * * * *